US00RE49291E

(19) United States
(12) Reissued Patent
Hong et al.

(10) Patent Number: US RE49,291 E
(45) Date of Reissued Patent: *Nov. 8, 2022

(54) BROADCAST SIGNAL TRANSMITTING APPARATUS, BROADCASTING DATA USING FEC AND METHODS THEREOF

(71) Applicant: LG ELECTRONICS INC., Seoul (KR)

(72) Inventors: Hotaek Hong, Seoul (KR); Sangchul Moon, Seoul (KR); Woosuk Ko, Seoul (KR)

(73) Assignee: LG Electronics Inc., Seoul (KR)

( * ) Notice: This patent is subject to a terminal disclaimer.

(21) Appl. No.: 17/063,547

(22) Filed: Oct. 5, 2020

Related U.S. Patent Documents

Reissue of:
(64) Patent No.: 9,521,652
Issued: Dec. 13, 2016
Appl. No.: 14/198,454
Filed: Mar. 5, 2014

U.S. Applications:
(63) Continuation of application No. 16/218,368, filed on Dec. 12, 2018, now Pat. No. Re. 48,249, which is an
(Continued)

(51) Int. Cl.
*H04W 72/00* (2009.01)
*H04L 1/00* (2006.01)
(Continued)

(52) U.S. Cl.
CPC ..... *H04W 72/005* (2013.01); *H04H 20/72* (2013.01); *H04L 1/0042* (2013.01);
(Continued)

(58) Field of Classification Search
CPC . H04W 72/005; H04W 28/06; H04W 28/065; H04H 20/72; H04L 1/0042;
(Continued)

(56) References Cited

U.S. PATENT DOCUMENTS 8,498,262 B2 * 7/2013 Vesma ..... H04H 20/426 370/330
9,100,932 B2 * 8/2015 Hong et al.
(Continued)

FOREIGN PATENT DOCUMENTS

CN 101888541 A 11/2010
WO 2010038133 A2 4/2010

OTHER PUBLICATIONS

Jokela, T. et al., "L1 Signal Parameter Definition and Signaling Transmission in T2", Nov. 2, 2007, pp. 1-22.
(Continued)

*Primary Examiner* — Mark Sager
(74) *Attorney, Agent, or Firm* — Dentons US LLP

(57) ABSTRACT

Disclosed are a broadcast signal transmitting apparatus, a broadcast signal receiving apparatus, and a broadcast signal transceiving method in the broadcast signal transmitting and receiving apparatuses. The broadcast signal transmitting method comprises the steps of: compressing headers of data packets which are included in an Internet protocol (IP) stream identified by access information, wherein the compressed data packets include a first packet containing both static information and dynamic information in the header thereof, and a second packet containing dynamic information in the header thereof; splitting the static information from the header of the first packet and diverting the remaining part thereof into the second packet; outputting an IP stream, which includes the second packet, via a data physical layer pipe (PLP); outputting, via a common PLP, a common stream, which includes the static information of the header of the first packet split in the previous step, compression information and IP-PLP mapping information for linking the IP stream and the data PLP; generating a signal frame on the basis of the data from the data PLP and the data
(Continued)

of the common PLP; and transmitting a broadcast signal which includes the signal frame.

17 Claims, 57 Drawing Sheets

Related U.S. Application Data application for the reissue of Pat. No. 9,521,652, which is a continuation of application No. 13/989,317, filed as application No. PCT/KR2011/008951 on Nov. 23, 2011, now Pat. No. 9,100,932.

(60) Provisional application No. 61/420,334, filed on Dec. 7, 2010, provisional application No. 61/417,466, filed on Nov. 29, 2010, provisional application No. 61/416,296, filed on Nov. 23, 2010.

(51) Int. Cl.

| | |
|---|---|
| ***H04L 65/70*** | (2022.01) |
| ***H04L 65/611*** | (2022.01) |
| ***H04W 28/06*** | (2009.01) |
| ***H04H 20/72*** | (2008.01) |
| *H04L 69/04* | (2022.01) |

(52) U.S. Cl.

CPC ..... *H04L 1/0072* (2013.01); *H04L 65/611* (2022.05); *H04L 65/70* (2022.05); *H04W 28/06* (2013.01); *H04W 28/065* (2013.01); *H04L 69/04* (2013.01); *H04L 2001/0093* (2013.01)

(58) Field of Classification Search

CPC . H04L 1/0072; H04L 65/4076; H04L 65/607; H04L 69/04; H04L 2001/0093; H04L 65/611; H04L 65/70

See application file for complete search history.

(56) References Cited

U.S. PATENT DOCUMENTS

| | | | | |
|---|---|---|---|---|
| RE48,249 | E * | 10/2020 | Hong et al. | |
| 2009/0094356 | A1 | 4/2009 | Vare | |
| 2009/0103649 | A1 | 4/2009 | Vare | |
| 2009/0187949 | A1 | 7/2009 | Vare | |
| 2009/0190677 | A1 * | 7/2009 | Jokela | H04L 1/0071 375/260 |
| 2009/0303922 | A1 | 12/2009 | Jalil | |
| 2010/0085985 | A1 | 4/2010 | Pekonen | |
| 2010/0284472 | A1 | 11/2010 | Liao | |
| 2011/0013732 | A1 * | 1/2011 | Atungsiri | H04L 27/2656 375/343 |
| 2012/0287869 | A1 | 11/2012 | Xi et al. | |
| 2013/0039278 | A1 | 2/2013 | Bouazizi | |
| 2015/0146608 | A1 | 5/2015 | Kim et al. | |
| 2015/0146802 | A1 | 5/2015 | Shin et al. | |
| 2015/0155975 | A1 | 6/2015 | Baek et al. | |
| 2015/0163082 | A1 | 6/2015 | Mun et al. | |
| 2015/0163083 | A1 | 6/2015 | Hwang et al. | |
| 2015/0189486 | A1 | 7/2015 | Lee et al. | |
| 2015/0195067 | A1 | 7/2015 | Kim et al. | |
| 2015/0215746 | A1 | 7/2015 | Jeong et al. | |
| 2015/0229443 | A1 | 8/2015 | Hwang et al. | |
| 2015/0236884 | A1 | 8/2015 | Suh et al. | |
| 2015/0349872 | A1 | 12/2015 | Baek et al. | |

OTHER PUBLICATIONS

"DVB-NGH Study Mission Report TM-H", Internet Citation, Jun. 6, 2008, pp. 1-96.

"Digital Video Broadcasting (DVB); Frame Structure Channel Coding and Modulation For A Second Generation Digital Terrestrial Television Broadcasting System (DVB-T2)", European Standards (Telecommunications Series), Jul. 1, 2009, No. V1.1.1, Chapters 4, 5.2.3, 6, 7, 8.

* cited by examiner

| Filed | Bits |
|---|---|
| S1 | 3 |
| S2 filed 1 | 3 |
| S2 filed 2 | 1 |

| Filed | Bits |
|---|---|
| PILOT_PATTERN | 4 |
| L1_PRE_SPREAD_LENGTH | 3 |

FIG. 37

| Filed | Bits |
|---|---|
| TYPE | 8 |
| BWT_EXT | 1 |
| S1 | 3 |
| S2 | 4 |
| L1_REPETITION_FLAG | 1 |
| GUARD_INTERVAL | 3 |
| PAPR | 4 |
| L1_MOD | 4 |
| L1_COD | 2 |
| L1_FEC | 2 |
| L1_POST_SIZE | 18 |
| L1_POST_INFO_SIZE | 18 |
| PILOT_PATTERN | 4 |
| TX_ID_AVAILABILITY | 8 |
| CELL_ID | 16 |
| NETWORK_ID | 16 |
| NGH_SYSTEM_ID | 16 |
| NUM_NGH_FRAMES | 8 |
| NUM_T2_FRAMES | 8 |
| L1_POST_SPREAD_LENGTH | 12 |
| NUM_DATA_SYMBOLS | 12 |
| NUM_MISO_SYMBOLS | 12 |
| MIMO_SYMBOL_INTERVAL | 12 |
| MIMO_SYMBOL_LENGTH | 12 |
| REGEN FLAG | 3 |
| L1_POST_EXTENSION | 1 |
| NUM_RF | 3 |
| CURRENT_RF_IDX | 3 |
| RESERVED | 10 |
| CRC_32 | 32 |

FIG. 38

| Filed | Bits |
|---|---|
| SUB_SLICES_PER_FRAME | 15 |
| NUM_PLP | 8 |
| NUM_AUX | 4 |
| AUX_CONFIG_RFU | 8 |
| | |
| for i = 0..NUM_RF-1 { | |
| RF_IDX | 3 |
| FREQEUNCY | 32 |
| } | |
| | |
| if S2 == 'xxx1' { | |
| FEF_TYPE | 4 |
| FEF_LENGTH | 22 |
| FEF_INTERVAL | 8 |
| NEXT_NGH_SUPERFRAME | 8 |
| } | |
| | |
| RESERVED_2 | 32 |
| | |
| for i = 0..NUM_AUX-1 { | |
| AUX_RFU | 32 |
| } | |

| Filed | Bits |
|---|---|
| for i = 0..NUM_PLP-1 { | |
| PLP_ID | 8 |
| PLP_TYPE | 3 |
| PLP_PAYLOAD_TYPE | 5 |
| PLP_PROFILE | 2 |
| FF_FLAG | 1 |
| FIRST_RF_IDX | 3 |
| FIRST_FRAME_IDX | 8 |
| PLP_GROUP_ID | 8 |
| PLP_COD | 3 |
| PLP_MOD | 3 |
| PLP_MIMO_TYPE | 2 |
| PLP_ROTATION | 1 |
| PLP_FEC_TYPE | 2 |
| PLP_NUM_BLOCKS_MAX | 10 |
| FRAME_INTERVAL | 8 |
| TIME_IL_LENGTH | 8 |
| TIME_IL_TYPE | 1 |
| IN_BAND_FLAG | 1 |
| RESERVED_1 | 16 |
| } | |

FIG. 39

| Filed | Bits |
|---|---|
| FRAME_IDX | 8 |
| SUB_SLICE_INTERVAL | 22 |
| TYPE_2_START | 22 |
| L1_CHANGE_COUNTER | 8 |
| START_RF_IDX | 3 |
| RESERVED_1 | 8 |
| | |
| if S2 == 'xxx1' { | |
| NEXT_NGH_FRAME | 8 |
| } | |
| | |
| for i = 0..NUM_PLP-1 { | |
| PLP_ID | 8 |
| PLP_START | 22 |
| PLP_NUM_BLOCKS | 10 |
| RESERVED_2 | 8 |
| } | |
| | |
| RESERVED_3 | 8 |
| | |
| for i = 0..NUM_AUX-1 { | |
| AUX_RFU | 48 |
| } | |

FIG. 40

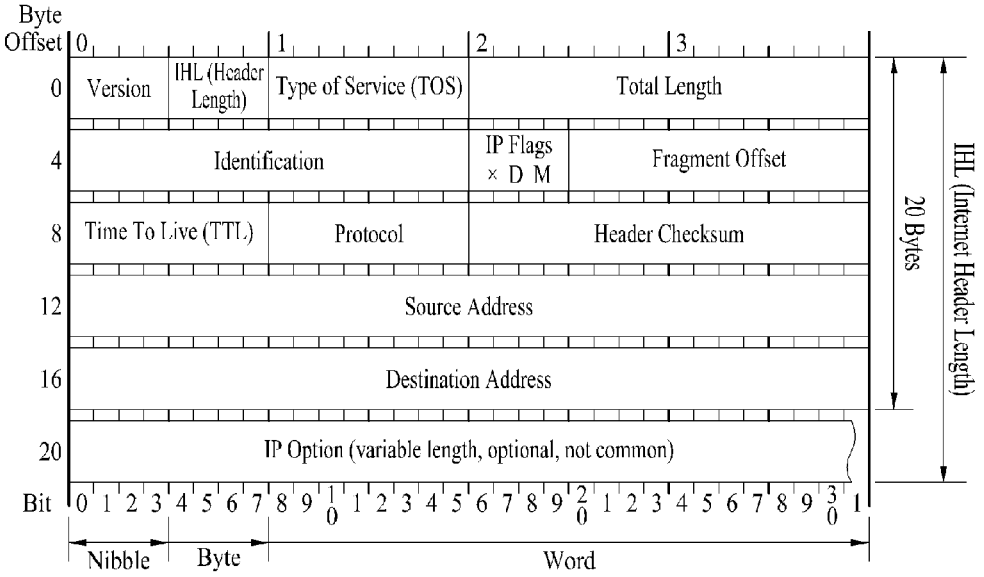

Version

Version of IP Protocol. 4 and 6 are valid. This diagram represents version 4 structure only.

Protocol

IP Protocol ID. Including (but not limited to):

| | | |
|---|---|---|
| 1 ICMP | 17 UDP | 57 SKIP |
| 2 IGMP | 47 GRE | 88 EIGRP |
| 6 TCP | 50 ESP | 89 OSPF |
| 9 IGRP | 51 AH | 112 L2TP |

Fragment offset

Fragment offset from start of IP datagram. Measured in 8 byte (2words, 64bits) increments. If IP datagram is fragmented, fragment size (Total Length) must be a multiple of 8bytes.

IP Flags

× D M

× 0×80 reserved (evil bit)
D 0×40 Do Not Fragment
M 0×20 More Fragments follow

Header Length

Number of 32 - bit words in TCP header, minimum value of 5. Multiply by 4 to get byte count.

Total Length

Total length of IP datagram, or IP fragment if fragmented. Measured in Bytes.

Header Checksum

Checksun of entire IP header.

RFC 791

Please refer to RFC 791 for the complete internet Protocol (IP) Specification.

FIG. 59
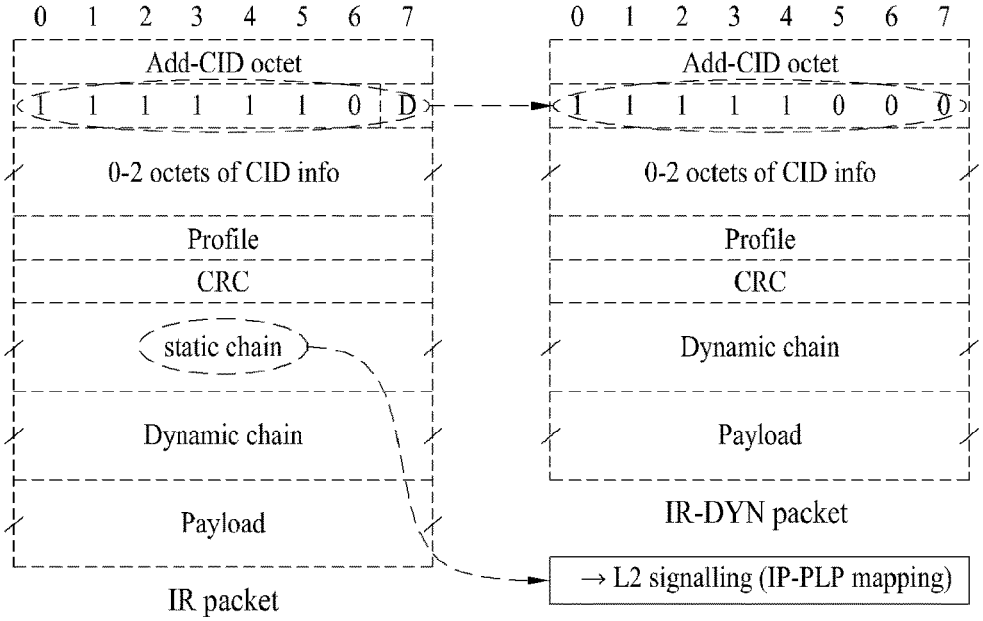
(a) Transmitter: IR → IR-DYN
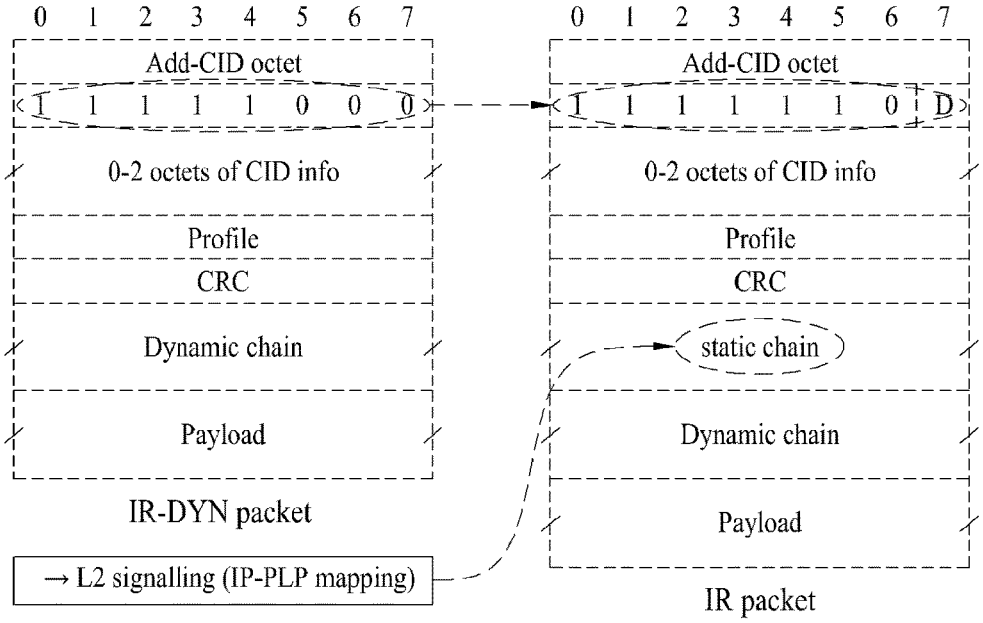
(b) Receiver: IR-DYN → IR

FIG. 64

| Name | No.of bits |
|---|---|
| service association section() { | |
| section_length | 32 |
| number_of_services | 8 |
| for (i=0; i<N; i++){ | |
| number_of_components | 8 |
| for (j=0; j<N1; j++) { | |
| URL_length | 8 |
| for (k=0; k<N2; k++) { | |
| URL_byte or IP address + port number | 8 |
| } | |
| context_id | 8 |
| context_profile | 8 |
| static_info_length | 8 |
| for (l=0; l<N3; l++) { | |
| static chain byte() | 8 |
| } | |
| PLP_id | 8 |
| } | |
| LLP_id | 8 |
| } | |
| CRC_byte | 32 |
| } | |

BROADCAST SIGNAL TRANSMITTING APPARATUS, BROADCASTING DATA USING FEC AND METHODS THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 9,521,652. The reissue applications are application Ser. Nos. 17/063,547 (the present application), and 16/218,368. Application Ser. No. 17/063,547 filed on Oct. 5, 2020 is a continuation reissue of application Ser. No. 16/218,368, and application Ser. No. 16/218,368 filed on Dec. 12, 2018 is a reissue of application Ser. No. 14/198,454.*

[This application is a continuation of application Ser. No. 13/989,317 filed May. 23, 2013, which claims the benefit of 35 USC §371 National Stage entry of International Application No. PCT/KR2011/008951 filed Nov. 23, 2011, and claims priority of U.S. provisional Application Nos. 61/416,296 filed Nov. 23, 2010; 61/417,466 filed Nov. 29, 2010 and 61/420,334 filed Dec. , 2010, which are hereby incorporated by reference in its entirety.] *This application is a continuation reissue of U.S. patent application Ser. No. 16/218,368, filed Dec. 12, 2018, which is a Reissue of U.S. patent application Ser. No. 14/198,454, filed Mar. 5, 2014, U.S. Pat. No. 9,521,652, which is a continuation of application Ser. No. 13/989,317 filed, Jul. 8, 2013, U.S. Pat. No. 9,100,932 which claims the benefit of 35 USC § 371 National Stage entry of International Application No. PCT/KR2011/008951 filed Nov. 23, 2011, and claims priority of U.S. provisional Application Nos. 61/416,296, filed Nov. 23, 2010; 61/417,466 filed Nov. 29, 2010 and 61/420,334 filed Dec. 7, 2010, all of which are hereby incorporated by reference in their entirety.*

FIELD OF THE INVENTION

The present invention relates to a broadcast signal transmitting apparatus for transmitting a broadcast signal, a broadcast receiving apparatus for receiving a broadcast signal, and a method of transmitting and receiving a broadcast signal and, most particularly, to an apparatus and method for transmitting and receiving a mobile broadcast signal.

BACKGROUND ART

As the time has neared to end (or terminate) the transmission of analog broadcast signals, diverse technologies for transmitting and receiving digital broadcast signals are being researched and developed. Herein, a digital broadcast signal may include high capacity video/audio data as compared to an analog broadcast signal, and, in addition to the video/audio data, the digital broadcast signal may also include diverse additional data.

More specifically, a digital broadcasting system for digital broadcasting may provide HD (High Definition) level images, multiple-channel sound (or audio), and a wide range of additional services. However, a data transmission efficiency for transmitting high capacity data, a robustness of transmitting and receiving network, and flexibility in a network considering mobile receiving equipments are still required to be enhanced.

DETAILED DESCRIPTION OF THE INVENTION

Technical Objects

Accordingly, an object of the present invention is to provide a broadcast signal transmitting apparatus and a broadcast receiving apparatus that can transmit and receive additional broadcast signals, a method for transmitting and receiving additional broadcast signals, by using an RF signal of a conventional broadcasting system without having to ensure any additional frequency.

Another object is to provide a broadcast signal transmitting apparatus and a broadcast receiving apparatus that can transmit and receive mobile broadcast signals, a method for transmitting and receiving mobile broadcast signals, by using an RF signal of a conventional broadcasting system without having to ensure any additional frequency.

Yet another object of the present invention is to provide a broadcasting signal transmitting apparatus, a broadcasting signal receiving apparatus, and a method for transmitting/receiving a broadcasting signal using the same that can distinguish data corresponding to a service for each component, and transmit the corresponding data to each component through separate PLPs, so that the transmitted data can be received and processed.

Yet another object of the present invention is to provide a broadcasting signal transmitting apparatus, a broadcasting signal receiving apparatus, and a method for transmitting/receiving a broadcasting signal using the same that can signal signaling information required for servicing a broadcasting signal.

Yet another object of the present invention is to provide a broadcasting signal transmitting apparatus, a broadcasting signal receiving apparatus, and a method for transmitting/receiving a broadcasting signal using the same that can signal signaling information, so that a broadcasting signal can be received in accordance with a receiver characteristic.

Yet another object of the present invention is to provide an apparatus for transmitting a broadcast signal, an apparatus for receiving a broadcast signal, and a method for transmitting and receiving a broadcast signal that can reduce an overhead of a data packet by compressing a header of the data packet, when performing an IP-based transmission of a broadcasting signal, and transmitting the compressed header, and by having a receiver release the compression (or perform decompression).

Technical Solutions

In order to achieve the above-described technical object of the present invention, a broadcast signal transmitting method according to an embodiment of the present invention includes compressing headers of data packets being included in an IP (Internet Protocol) stream, the IP stream being identified by access information, wherein the compressed data packets include a first packet including static information and dynamic information in its header, and a second packet including dynamic information in its header; separating static information from the header of the first packet and converting remaining portion to the second packet; outputting an IP stream including the second packet through a data PLP (physical layer pipe); outputting a common stream through a common PLP, the common stream including the static information separated from the header of the first packet, compression information of the header of the first packet, and IP-PLP mapping information for linking the IP stream with the data PLP; generating a signal frame based upon data of the data PLP and data of the common PLP; and transmitting a broadcast signal including the signal frame.

Herein, the static information is removed from the header of the first packet and header identification information of the first packet is changed to header identification information of the second packet thereby converting to the second packet.

The static information and the compression information of the header of the first packet and the IP-PLP mapping information are signaled to L2 signaling information in a binary format and the L2 signaling information is included in the common PLP.

A broadcast signal transmitting method according to an embodiment of the present invention includes an RoHC encoding unit compressing headers of data packets being included in an IP (Internet Protocol) stream, the IP stream being identified by access information, wherein the compressed data packets include a first packet including static information and dynamic information in its header, and a second packet including dynamic information in its header; a transmission replacing unit separating static information from the header of the first packet, converting remaining portion to the second packet, and outputting an IP stream including the second packet through a data PLP (physical layer pipe); a multiplexer outputting a common stream through a common PLP, the common stream including the static information separated from header of the first packet by the transmission replacing unit, compression information of the header of the first packet, and IP-PLP mapping information for linking the IP stream with the data PLP; and a transmitter generating a signal frame based upon data of the data PLP and data of the common PLP and transmitting a broadcast signal including the generated signal frame.

Effects of the Invention

According to the present invention, a transmitter may perform transmission by generating a PLP for each component configuring a service, and a receiver may identify and decode the PLP, which is received for each component. Thus, the present invention may respond to the mobile broadcast communication environment with more flexibility.

The transmitter of the present invention may distinguish one component as a component of a base layer and as a component of at least one enhancement layer, and may transmit the distinguished component. And, the receiver may decode only the component of the base layer so as to provide an image with basic picture quality, or the receiver may decode the component of the base layer along with the component of at least one enhancement layer so as to provide an image with higher picture quality. Thus, the present invention may provide images having diverse picture qualities in accordance with the receiver characteristic.

By compressing a header of the data packet, when performing an IP-based transmission of a broadcasting signal, and transmitting the compressed header, and by having the receiver recover the compressed header, the present invention may reduce the overhead of an IP-based data packet. Thus, IP-based broadcasting may be efficiently supported in a mobile environment.

Most particularly, by transmitting at least a portion of the header information of a compressed data packet through a common PLP, the present invention is advantageous not only in that overhead of data PLP can be reduced, but also in that the receiver is capable of receiving and decoding the compressed data packet regardless of the time point at which a broadcast signal is received. According to an embodiment of the present invention, by matching the sync of (or by synchronizing) information transmitted to the common PLP and information transmitted to data PLP using a sequence number, the initial (or original) signal may be exactly recovered. According to another embodiment of the present invention, among the header information of an Initialization and Refresh (hereinafter referred to as IR) packet, by transmitting non-variable (non-changing) static information out-of-band via L2 signaling, separate compression rate may be additionally gained, thereby demonstrating a more efficient IP stream transmission effect.

By using a MIMO system, the present invention may increase data transmission efficiency and may enhance robustness in broadcasting signal transmission/reception.

Therefore, according to the present invention, the present invention may provide a method and apparatus for transmitting/receiving a broadcasting signal that can receive a digital broadcasting signal without any error even in a mobile receiving equipment or an indoor environment.

BRIEF DESCRIPTION OF THE DRAWINGS

FIG. 37 illustrates an exemplary syntax structure of L1-pre signaling information according to an embodiment of the present invention, FIG. 38 illustrates an exemplary syntax structure of configurable L1-post signaling information according to an embodiment of the present invention, FIG. 39 illustrates an exemplary syntax structure of dynamic L1-post signaling information according to an embodiment of the present invention, FIG. 40 illustrates an IP header configuring of a header of a data packet according to an embodiment of the present invention, FIG. 64 illustrates a syntax structure of a service association section including static information according to an detailed embodiment of the present invention.

BEST MODE FOR CARRYING OUT THE PRESENT INVENTION

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein.

Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

The present invention relates to an apparatus and method for transmitting and receiving an additional broadcast signal, while sharing an RF frequency band with related art broadcasting system, such as a conventional terrestrial broadcast system (or also referred to as a T2 system), e.g., DVB-T2. In the present invention, the additional broadcast signal may correspond to an extension (or enhanced) broadcast signal and/or a mobile broadcast signal.

In the description of the present invention, an additional broadcast signal refers to as signal that is processed and transmitted in accordance with a non-MIMO (Multi Input Multi Output) method or a MIMO method. Herein, a MISO (Multi Input Single Output) method, a SISO (Single Input Single Output) method, and so on, may correspond to the non-MIMO method.

Hereinafter, 2 antennae may be given as an example of the multi antennae of the MISO method or the MIMO for simplicity of the description of the present invention. And, such description of the present invention may be applied to all types of systems using 2 or more antennae.

Figure 1:
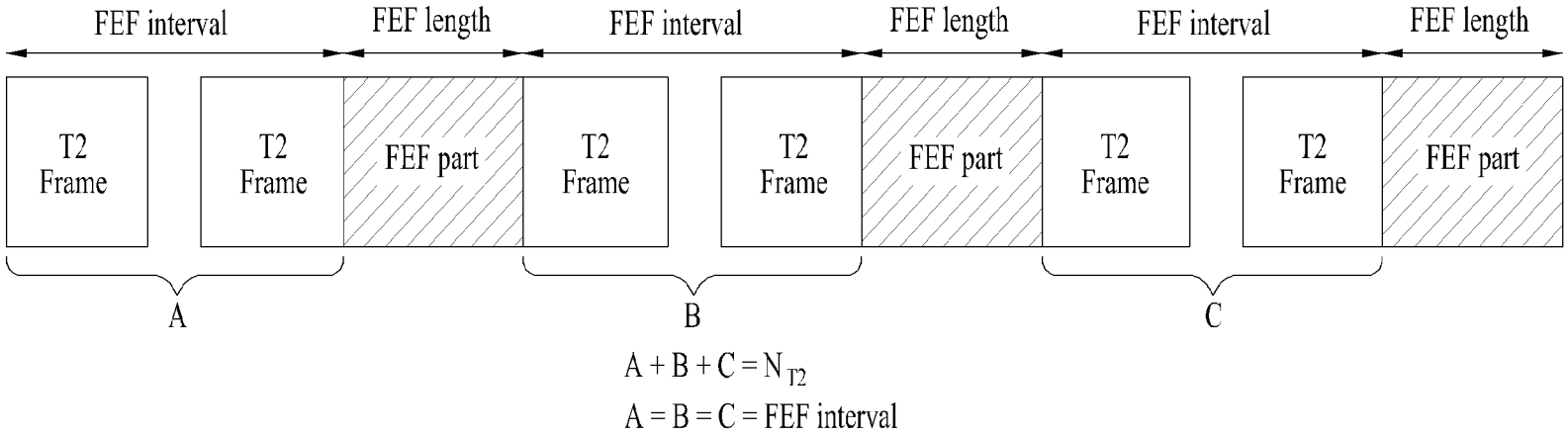
FIG. 1 illustrates an exemplary super frame structure according to the present invention.

FIG. 1 illustrates an exemplary super frame structure including an additional broadcast signal (e.g., mobile broadcast signal) according to the present invention. A super frame may be configured of a plurality of signal frames, and the signal frames belonging to one super frame may be transmitted by using the same transmission method. The super frame according to the embodiment of the present invention may be configured of multiple T2 frames (also referred to as a terrestrial broadcast frame) and additional non-T2 frames for the additional broadcast signal. Herein, a non-T2 frame may include an FEF (Future Extension Frame) part being provided by the related art T2 system. The FEF part may not be contiguous and may be inserted in-between the T2 frames. The additional broadcast signal may be included in the T2 frame or FEF part, so as to be transmitted.

When a mobile broadcast signal is transmitted through FET part, the FEF part will be referred to as an NGH (Next Generation Handheld) frame.

At this point, 1 NGH frame may be transmitted for each N number of T2 frames (i.e., NGH-T2 frame ratio=1/N or N:1), and the T2 frame and the NGH frame may be alternately transmitted (i.e., NGH-T2 frame ratio=1/2 or 1:1). If the NGH-T2 frame ratio is equal to 1/N, the time consumed by the receiver in order to receive an NGH frame after receiving a previous NGH frame is equivalent to the time corresponding to N number of T2 frames.

Meanwhile, among the components configuring a broadcast service, the present invention may divide a video component to multiple video components and may transmit the divided video components. For example, a video component may be divided into a basic video component and an extension video component, and may then be transmitted accordingly.

According to an embodiment of the present invention, in order to enhance transmission stability, the basic video component may be transmitted in a non-MIMO method, and the extension video component may be transmitted in an MIMO method in order to provide an enhanced throughput. In the present invention, the basic video component will hereinafter be referred to as a video component of a base layer, and the extension video component will hereinafter be referred to as a video component of an enhancement layer. Additionally, for simplicity of the description, in the present invention, the video component of the base layer will be used in combination with video data of the base layer (or data of the base layer), and the video component of the enhancement layer will be used in combination with video data of the enhancement layer (or data of the enhancement layer).

According to an embodiment of the present invention, the present invention may encode video data by using an SVC (Scalable Video Coding) method, thereby dividing the encoded video data into video data of the base layer (or base layer video data) and video data of the enhancement layer (or enhancement layer video data). Herein, the SVC method is merely exemplary. And, therefore, other arbitrary video coding methods having scalability may also be used herein.

The data of the base layer (or the base layer data) correspond to data for images having basic picture quality. Herein, although the base layer data are robust against the communication environment, the base layer data have low picture quality. And, the data of the enhancement layer (or the enhancement layer data) correspond to additional data for images of higher picture quality and may, therefore, provide images having high picture quality. However, the enhancement layer data are weak against the communication environment.

In the present invention, video data for terrestrial broadcasting may be divided into base layer data and enhancement layer data, and video data for mobile broadcasting may be divided into base layer data and enhancement layer data in order to flexibly respond to the mobile broadcasting communication environment.

The receiver may decode only video layer of the base data (or base layer video data), so as to provide an image having basic picture quality, or the receiver may decode both the base layer video data and the video layer of the enhancement data (or enhancement layer video data), so as to provide an image having a higher picture quality.

According to an embodiment of the present invention the enhancement layer video data may be transmitted through an FEF, and the base layer data may be transmitted through the T2 frame and/or FEF.

In the present invention, an audio component may include an audio component of a base layer (or base layer audio component) for providing basic sound quality, such as 2 channel or 2.1 channel, and an audio component of an enhancement layer (or enhancement layer audio component) for providing additional sound quality, such as 5.1 channel or MPEG-Surround.

According to an embodiment of the present invention, a signal frame may refer to any one of a T2 frame, an FEF transmitting a mobile broadcasting signal (i.e., NGH frame), a T2 frame transmitting base layer video data, and an FEF transmitting enhancement layer video data. In the description of the present invention, the signal frame and the transmission frame will be used to have the same meaning.

In the present invention, a PLP (physical layer pipe) corresponding to an identifiable data (or stream) unit. Also, the PLP may be considered as a physical layer TDM (Time Division Multiplex) channel, which transmits (or delivers) one or more services. More specifically, each service may be transmitted and received through multiple RF channels. Herein, the PLP may represent a path through which such service is being transmitted or may represent a stream being transmitted through such path. The PLP may also be located in slots being distributed to multiple RF channels at predetermined time intervals, and the PLP may also be distributed in a single RF channel at predetermined time intervals. Therefore, signal frame may transmit a PLP, which is distributed to a single RF channel based upon a time reference. In other words, one PLP may be distributed to a single RF channel or multiple RF channels based upon a time reference.

In the present invention, one service may be transmitted to one PLP, and components configuring a service may be divided (or differentiated), so that each of the differentiated components can be transmitted to a different PLP. If service components configuring a single service are differentiated from one another so as to be respectively transmitted to a different PLP, the receiver may gather (or collect) the multiple components, so as to combine the collected components to a single service. In the present invention, the service component and the component will be used to have the same meaning.

Figure 2:
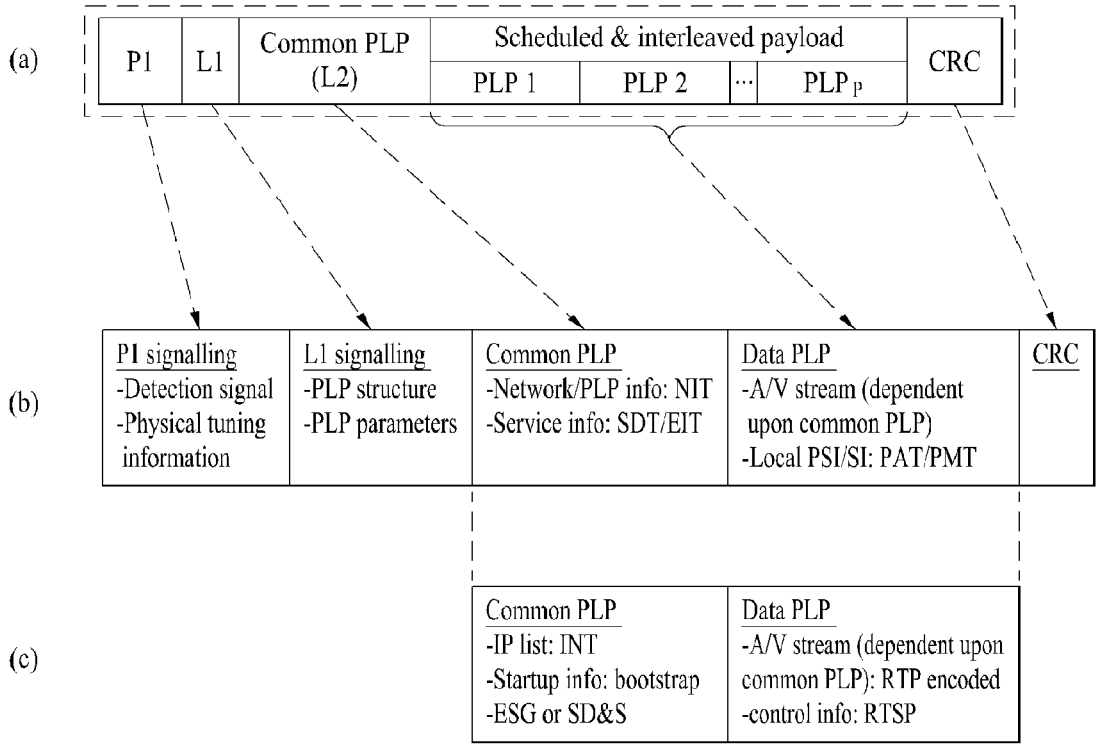
FIG. 2 illustrates an exemplary structure of a signal frame according to an embodiment of the present invention.

FIG. 2 illustrates an exemplary structure of a signal frame over a physical layer according to an embodiment of the present invention. The signal frame includes a P1 signaling information region (or part or area), an L1 signaling information region, and a PLP region. More specifically, the P1 signaling information region may be allocated to a foremost portion of the corresponding signal frame, and, then, the L1 signaling information region and the PLP region may be sequentially allocated after the P1 signaling information region. In the description of the present invention, only the information being included in the L1 signaling information region may be referred to as L1 signaling information, or signaling information being included in the P1 signaling information region and signaling information being included in the L1 signaling information region may be collectively referred to as the L1 signaling information.

As shown in FIG. 2, P1 signaling information that is being transmitted to the P1 signaling information region may be used for detecting a signal frame (or NGH broadcast signal) and may include tuning information and information for identifying preamble itself.

Based upon the P1 signaling information, the subsequent L1 signaling information region is decoded, so as to acquire information on the PLP structure and the signal frame configuration. More specifically, the L1 signaling information includes L1-pre-signaling information and L1-post-signaling information. Herein, the L1-pre-signaling information includes information required by the receiver to receive and decode L1-post-signaling information. And, the L1 -post-signaling information includes parameters required by the receiver for accessing the PLP. The L1-post-signaling information may then include Configurable L1-post-signaling information, Dynamic L1-post-signaling information, Extension L1-post-signaling information, and CRC information, and the L1-post-signaling information may further include L1 padding data. In the present invention, configurable L1-post signaling information has the same meaning as the L1-post configurable signaling information. Moreover, dynamic L1-post signaling information has the same meaning as the L1-post dynamic signaling information Meanwhile, in the signal frame, the PLP region is configured of at least one common PLP and at least one data PLP.

A common PLP includes PSI/SI (Program and System Information/Signaling Information).

Specifically, when a broadcast signal is a TS format, the common PLP may include network information, such as an NIT (Network Information Table), or PLP information, and service information, such as an SDT (Service Description Table), an EIT (Event Information Table) and a PMT (Program Map Table)/a PAT (Program Association Table). Based upon the intentions of the system designer, service information, such as SDT and PMT/PAT, may be included in data PLP and may then be transmitted. The PAT corresponds to special information being transmitted by a packet having a PID of '0', and the PAT includes PID information of the PMT and PID information of the NIT. The PMT includes a program identification number, PID information of a TS packet to which individual bit streams, such as video, audio, and so on, are being transmitted, wherein the individual bit streams configure a program or (service), and PID information through which a PCR is being delivered. The NIT includes information of an actual transmission network (i.e., physical network). The EIT includes information on an event (or program or service) (e.g., title, start time, and so on). The SDT includes information describing a service, such as a service name or service provider.

When a broadcasting signal corresponds to an IP format, the common PLP may include an IP information table, such as n INT (IP/MAC notification table). In the description of the present invention information being included in the common PLP may be referred to as L2 signaling information. In addition, the common PLP may further include start information such as bootstrap and meta data for service guide such as ESG or SD&S.

More specifically, L1 signaling information includes information required by the broadcasting signal receiver for processing a PLP within a signal frame, and the L2 signaling information includes information that can be commonly applied to multiple PLPs. Accordingly, the broadcasting signal receiver may use P1 signaling information included in a P1 signaling information region, so as to decode an L1 signaling information region, thereby acquiring information on the structure of PLP included in the signal frame and information a frame structure. Most particularly, the broadcasting signal receiver may be capable of knowing through which PLP each of the service components being included in the corresponding service is being transmitted by referring to the L1 signaling information and/or the L2 signaling information. Additionally, the BICM encoder (or referred to as a BICM module) of the broadcasting signal transmitter may encode signaling information associated with a broadcast service and may transmit L1/L2 signaling information, so that the broadcasting signal receiver can perform decoding. Moreover, the MICM decoder of the broadcasting signal receiver may decode the L1/L2 signaling information.

At this point, when the L1 signaling information includes information on the service components, the broadcasting signal receiver may recognize the information on the service components at the same time the broadcasting signal receiver receives the signal frame, and the broadcasting signal receiver may then apply the corresponding information. However, since the size of the L1 signaling information is limited, the size (or amount) of the information on the service components that can be transmitted from the broadcasting signal transmitter may also be limited. Accordingly, the L1 signaling information region is most adequate for recognizing the information on the service components at the same time the broadcasting signal receiver receives the signal frame and for transmitting information that can be applied to the broadcasting signal receiver.

If the L2 signaling information includes information on the service components, the broadcasting signal receiver may acquire information on the service components after the decoding of the L2 signaling information is completed. Therefore, the broadcasting signal receiver may not be capable of recognizing the information on the service components at the same time the broadcasting signal receiver receives the signal frame and may not be capable of modifying the corresponding information. However, since the size of the region transmitting the L2 signaling information is larger than the L1 signaling information region, the L2 signaling information region may transmit a larger amount (or size) of service component data. Accordingly, the L2 signaling information is adequate for transmitting general information on service components.

According to an embodiment of the present invention the L1 signaling information may be used along with the L2 signaling information. More specifically, the L1 signaling information may include information that can be modified (or changed) at the same time the broadcasting signal receiver receives the signal frame in a PLP level, such as a high mobile performance and a high-speed data communication characteristic, or may include information of service components that can be modified (or changed) at any time during the broadcasting signal transmission. Additionally, the L2 signaling information may include information on the service components and general information on channel reception, which are included in a service.

Meanwhile, if the broadcast signal corresponds to a TS format, a data PLP, which is included in the signal frame, may include audio, video, and data TS streams. Furthermore, the TS-based data PLP may include PSI/SI information such as a PAT (Program Association Table) and a PMT (Program Map Table). If the broadcasting signal corresponds to an IP format, the data PLP may include audio, video, and data IP streams. At this point, IP packets, which configure each of the IP streams, may be packetized by using an RTP (Real Time Protocol) or FLUTE (File Delivery over Unidirectional Transport). Additionally, IP-based data PLP may include control information, which is packetized by using an RTSP (Real Time Streaming Protocol) method. In the present invention, a data PLP including PAT/PMT or a data PLP including control information may also be referred to a base PLP (or referred to as an anchor PLP or an SI PLP). The data PLP may include a Type1 data PLP, which is transmitted by one sub-slice for each signal frame, and a Type2 data PLP, which is transmitted by multiple sub-slices. In the description of the present invention, for simplicity of the description, P number of data PLPs will hereinafter be indicated as PLP1~PLPp. More specifically, audio, video, and data TS streams and PSI/SI information (or control information), such as PAT/PMT, are transmitted through PLP1~PLPp. The data PLPs of FIG. 2 correspond to examples after scheduling and interleaving.

In the present invention the common PLP may be decoded along with a data PLP, and the data PLP may be selectively (or optionally) decoded. More specifically, a common PLP+data PLP may always be decoded. However, in some cases data PLP1+data PLP2 may not be decoded. Information being included in the common PLP may include the PSI/SI information. Additionally, Auxiliary Data may be added to the signal frame. Moreover, CRC data may be added to the signal frame.

Figure 3:
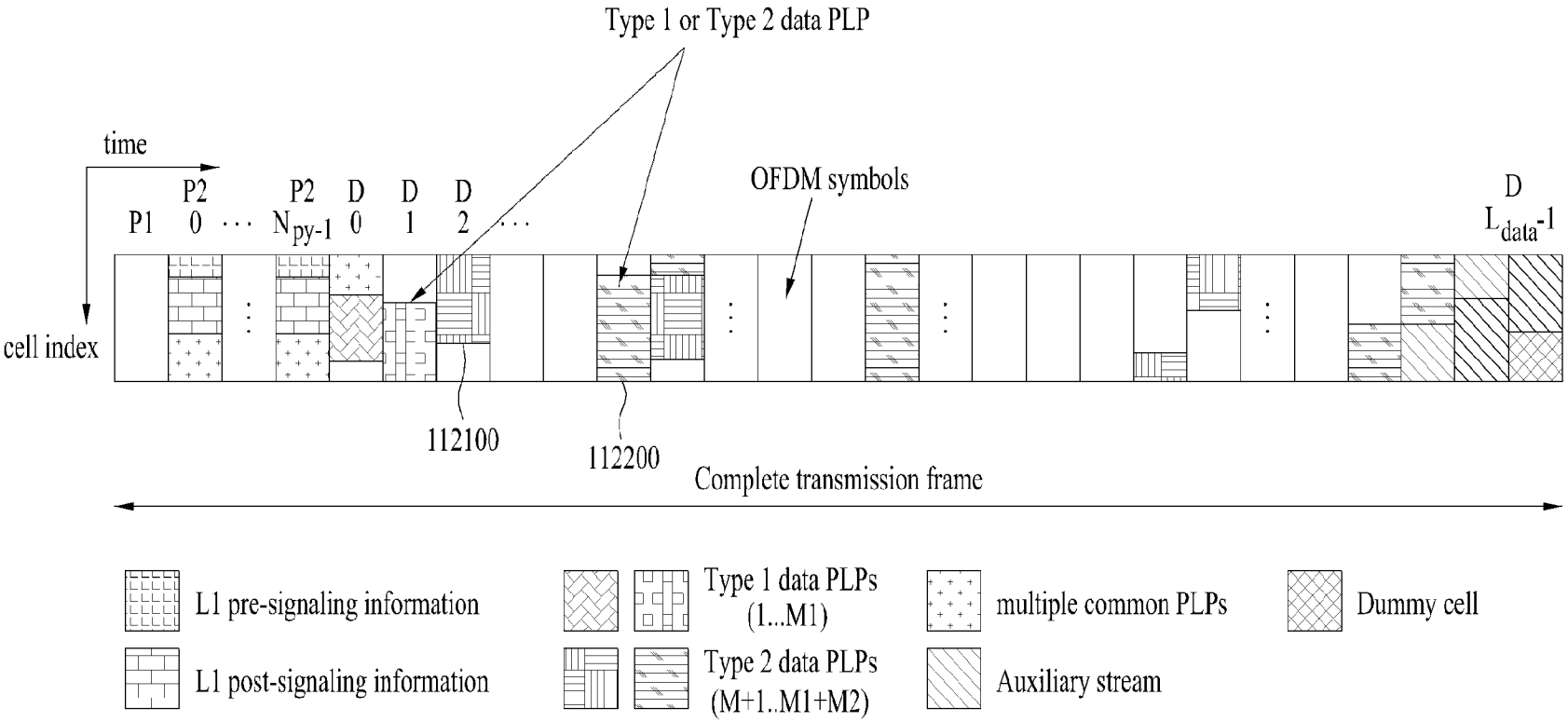
FIG. 3 illustrates a PLP-based signal frame structure according to an embodiment of the present invention, (a) of FIG. 4 illustrates a P1 symbol structure according to the present invention, (b) of FIG. 4 illustrates a block diagram showing an exemplary structure of a P1 symbol generator according to the present invention.

FIG. 3 illustrates a signal frame structure at a symbol level according to an embodiment of the present invention.

In light of the symbol level, the signal frame according to the present invention is divided into a preamble region and a data region. The preamble region is configured of a P1 symbol and at least one or more P2 symbols, and the data region is configured of a plurality of data symbols.

Herein, the P1 symbol transmits P1 signaling information. The at least one or more P2 symbols transmit L1-pre-signaling information, L1-post-signaling information, and signaling information being included in the common PLP (i.e., L2 signaling information). The signaling information being included in the common PLP may be transmitted through a data symbol. Therefore, in light of the signal frame over a physical layer, the preamble region includes a P1 signaling information region, an L1 signaling information region, and a portion or an entire portion of the common PLP region. In the description of the present invention a PLP transmitting PSI/SI and, more particularly, PAT/PMT will hereinafter be referred to a base PLP (or anchor PLP or SI PLP).

Data PLPs being transmitted through multiple data symbols may include a Type1 data PLP being transmitted, which is transmitted by one sub-slice for each signal frame, and a Type2 data PLP, which is transmitted by multiple sub-slices. According to an embodiment of the present invention, when both the Type 1 data PLP and the Type2 data PLP exist in a signal frame, the Type1 data PLP is first allocated, and the Type2 data PLP is allocated afterwards.

The Type1 data PLP refers to having one sub-slice within a signal frame, i.e., one PLP being continuously transmitted within a signal frame. For example, when it is assumed that 2 type1 data PLPs (PLP1, PLP2) are being transmitted, when all of the data of PLP1 are first allocated to the corresponding signal frame, then all of the data of PLP2 are allocated afterwards, and, thereafter, the data are transmitted.

The Type2 data PLP refers to a PLP having two or more sub-slices within the signal frame. More specifically, the data of each PLP are divided into as many sections as the number of sub-slices. And, then, the divided data are distributed and transmitted to each sub-slice. For example, when it is assumed that 2 Type2 data PLP (PLP3, PLP4) exist in a single signal frame, and when it is assumed that each Type2 data PLP has 2 sub-slices, the data of PLP3 and the data of PLP4 are each divided into 2 equal sections, and the divided data are sequentially allocated to the 2 sub-slices of the corresponding PLP. At this point, according to the embodiment of the present invention, the sub-slice for PLP3 and the sub-slice for PLP4 are alternately positioned so as to be transmitted accordingly. In order to gain higher time diversity, the present invention uses the Type2 data PLP.

In the description of the present invention, one data PLP may correspond to one service, and one data PLP may also correspond to at least one of the service components configuring a service, such as a video component (or also referred to as a base layer video component), an extension video component (or also referred to as an enhancement layer video component), and audio component, and a data component other than the video and audio components. That is, single data PLP may transmit a service or transmit one or more service components of a plurality of service components composing the service.

Meanwhile, the present invention may transmit separate signaling information from the transmitter, so that the receiver can identify additional broadcast signal frame, such as an NGH frame, and process the identified frame. The present invention transmits separate signaling information through a P1 symbol. And, herein, the P1 symbol will be referred to as a new_system_P1 symbol.

The new_system_P1 symbol may be different from the P1 symbol, and a plurality of new_system_P1 symbols may be used herein. At this point, according to the embodiment of the present invention, the new_system_P1 symbol is located at the beginning of the signal frame, i.e., located at a front portion of a first P2 symbol within a preamble region. In this case, the preamble region may be configured of at least one or more new_system_P1 symbols and at least one or more P2 symbols.

Figure 4:
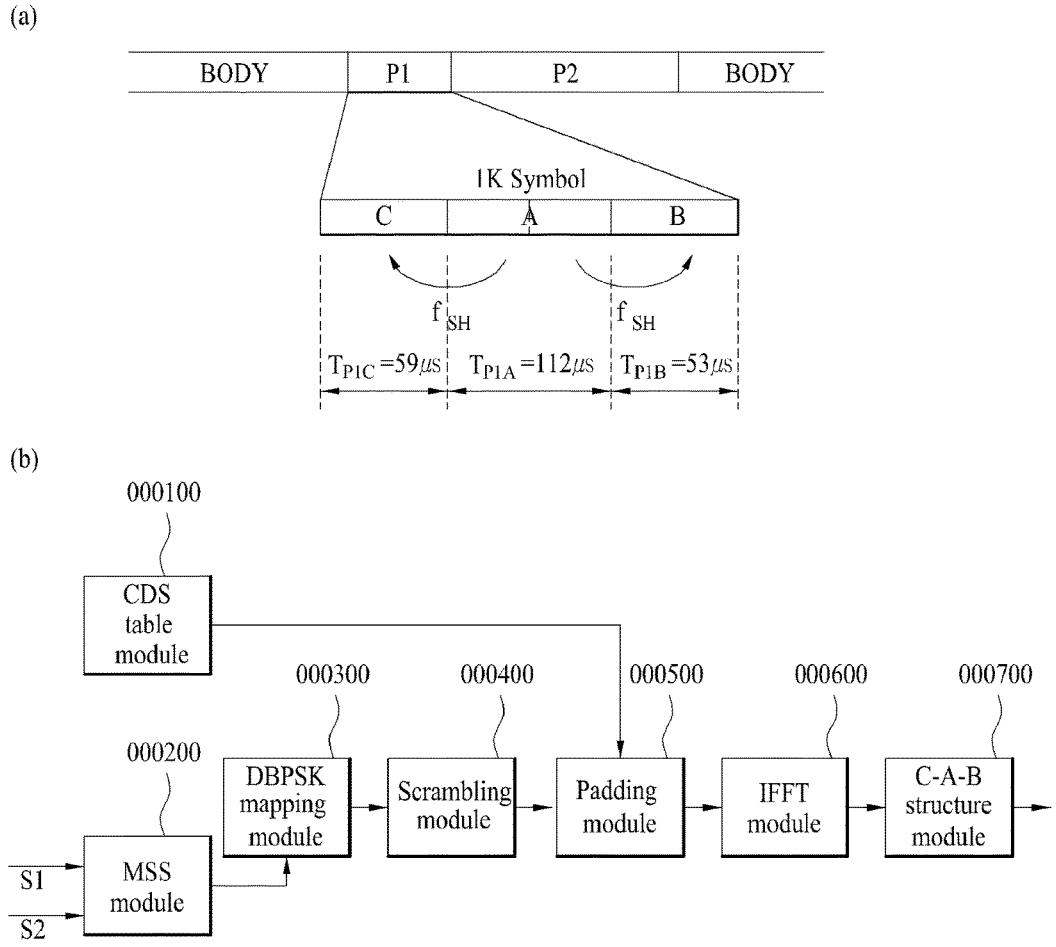

(a) of FIG. 4 illustrates a P1 symbol structure according to the present invention. In (a) of FIG. 4, the P1 symbol and P2 symbol portion will be referred to as a preamble region, and a body region will be referred to as a data region. The data region may be configured of a plurality of data symbols (also referred to as data OFDM symbols).

In (a) of FIG. 4, P1 symbol is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion. In the description of the present invention, such P1 symbol structure will also be referred to as a C-A-B structure. At this point, according to the present invention, the P1 symbol corresponds to 1K OFDM symbol. And, according to the embodiment of the present invention, the A portion ($T_{P1A}$) may have the length of 112 us, the C portion ($T_{P1C}$) may have the length of 59 us, and the B portion ($T_{P1B}$) may have the length of 53 us.

(b) of FIG. 4 illustrates a block diagram showing an exemplary structure of a P1 symbol generator according to the present invention. Herein, (b) of FIG. 4 includes a CDS (Carrier Distribution Sequence) table module (000100), an MSS (Modulation Signaling Sequence) module (000200), a DBPSK (Differential Binary Phase Shift Keying) mapping module (000300), a scrambling module (000400), a padding module (000500), an IFFT module (000600), and a C-A-B structure module (000700). After being processed with the operations of each block included in the P1 symbol generator shown in (b) of FIG. 4, the P1 symbols shown in (a) of FIG. 4 is finally outputted from the C-A-B structure module (000700).

According to the embodiment of the present invention, the structure of the P1 symbol, shown in (a) of FIG. 4, may be modified, or the P1 symbol generator, shown in (b) of FIG. 4 may be modified, so as to generate a new_system_P1 symbol.

If the new_system_P1 symbol is generated by modifying the P1 symbol shown in (a) of FIG. 4, the new_system_P1 symbol may be generated by using at least one of the following methods. For example, the new_system_P1 symbol may be generated by modifying a frequency shift (or displacement) value ($f_{SH}$) for a prefix and a postfix. In another example, the new_system_P1 symbol may be generated by modifying (or changing) the length of the P1 symbol (e.g., $T_{P1C}$ and $T_{P1B}$ lengths). In yet another example, the new_system_P1 symbol may be generated by replacing the length of the P1 symbol from 1K to 512, 256, 128, and so on. In this case, the parameters (e.g., $f_{SH}$, $T_{P1C}$, $T_{P1B}$) that are used in the P1 symbol structure should be adequately corrected.

If the new_system_P1 symbol is generated by modifying the P1 symbol generator shown in (b) of FIG. 4, the new_system_P1 symbol may be generated by using at least one of the following methods. For example, the new_system_P1 symbol may be generated by using a method of changing the distribution of active carriers (e.g., a method of having the CDS table module (000100) use another CSS (Complementary Set of Sequence)), which are used for the P1 symbol, through the CDS table module (000100), the MSS module (000200), and the C-A-B structure module (000700). In another example, the new_system_P1 symbol may be generated by using a method of changing a pattern for transmitting information to the P1 symbol (e.g., a method of having the MSS module (000200) use another CSS), and so on.

Meanwhile, the present invention may additionally allocate a preamble symbol to the preamble region within a signal frame, particularly an NGH frame. Hereinafter, the additional preamble signal will be referred to as an AP1 symbol (Additional Preamble symbol) for simplicity in the description of the present invention. In order to enhance the detection performance for detecting a mobile broadcast (i.e., NGH) signal, in a considerably low SNR condition or a time-selective fading condition, at least one or more AP1 symbol is added to the signal frame.

At this point, according to the embodiment of the present invention, the AP1 symbol is located between a P1 symbol and a first P2 symbol within the preamble region of a signal frame. More specifically, the P1 symbol and the AP1 symbol are consecutively transmitted. According to the embodiment of the present invention, if the P2 symbol is not transmitted to the signal frame, the AP1 symbol may be located between the P1 symbol and the first data symbol within the preamble region of the signal frame. According to another embodiment of the present invention, the P1 symbol and the AP1 symbol may be allocated to non-consecutive positions within a single signal frame, so as to be transmitted.

For example, when a signal frame includes an AP1 symbol, the preamble region of the signal frame is configured of a P1 symbol, at least one or more AP1 symbols, and at least one or more P2 symbols. And, the data region may be configured of a plurality of data symbols (or data OFDM symbols).

As described in the embodiments for generating the new_system_P1 symbol, according to the embodiment of the present invention, the AP1 symbol may be generated by modifying the structure of the P1 symbol, shown in (a) of FIG. 4, or by modifying the P1 symbol generator, shown in (b) of FIG. 4. According to the embodiment of the present invention, the AP1 symbol may be generated by modifying both the structure of the P1 symbol, shown in (a) of FIG. 4, and the P1 symbol generator, shown in (b) of FIG. 4.

As described in the embodiment of the present invention, when at least 2 or more preamble symbols are used, the present invention is advantageous in that the present invention can be more robust against a burst fading effect, which may occur in a mobile fading environment, and that a signal detection performance can be enhanced.

Figure 5:
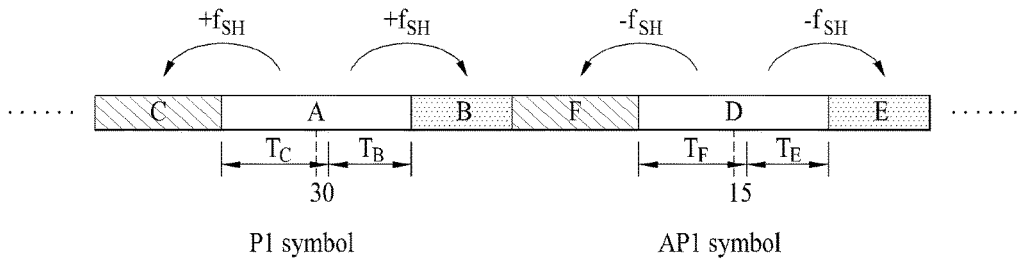
FIG. 5 illustrates an exemplary structure of a P1 symbol and an exemplary structure of an AP1 symbol according to an embodiment of the present invention.

FIG. 5 illustrates an exemplary structure of a P1 symbol and an exemplary structure of an AP1 symbol according to an embodiment of the present invention. FIG. 5 shows an example of generating an AP1 symbol by modifying the P1 symbol.

In FIG. 5, P1 symbol, which is shown on the left side, is generated by having each of a front portion and an end portion of an effective (or valid) symbol copied, by having a frequency shift performed as much as $+f_{sh}$, and by having the frequency-shifted copies respectively positioned at a front portion (C) and an end portion (B) of the effective symbol (A). In the present invention, the C portion will be referred to as a prefix, and the B portion will be referred to as a postfix. More specifically, P1 symbol is configured of a prefix portion, an effective symbol portion, and a postfix portion.

In FIG. 5, AP1 symbol, which is shown on the right side, is generated by having each of a front portion and an end portion of an effective (or valid) symbol copied, by having a frequency shift performed as much as $-f_{sh}$, and by having the frequency-shifted copies respectively positioned at a front portion (F) and an end portion (E) of the effective symbol (D). In the present invention, the F portion will be referred to as a prefix, and the E portion will be referred to as a postfix. More specifically, AP1 symbol is configured of a prefix portion, an effective symbol portion, and a postfix portion.

Herein, the two frequency-shift values $+f_{sh}$, $-f_{sh}$, which are used in the P1 symbol and the AP1 symbol, may have the same absolute value yet be given opposite signs. More specifically, the frequency-shift is performed in opposite directions. And, the lengths C and F, which are copied to the front portion of the effective symbol, may be set to have different values. And, the lengths B and E, which are copied to the end portion of the effective symbol, may be set to have different values. Alternatively, the lengths C and F may be set to have different values, and the lengths B and E may be set to have the same value, or vice versa. According to another embodiment of the present invention, an effective symbol length of the P1 symbol and an effective symbol length of the AP1 symbol may be differently determined. And, according to yet another embodiment of the present invention, a CSS (Complementary Set Sequence) may be used for tone selection and data scrambling within the AP1 may be scrambled by AP1.

According to the embodiment of the present invention, the lengths of C and F, which are copied to the front portion of the effective (or valid) symbol, may be set to have different values, and the lengths of B and E, which are copied to the end portion of the effective (or valid) symbol, may also be set to have different values.

The C,B,F,E lengths according to the present invention may be obtained by using Equation 1 shown below.

$$\text{Length of } C(T_C)=\{\text{Length of } A(T_A)/2+30\}$$

$$\text{Length of } B(T_B)=\{\text{Length of } A(T_A)/2-30\}$$

$$\text{Length of } E(T_F)=\{\text{Length of } D(T_D)/2+15\}$$

$$\text{Length of } E(T_E)=\{\text{Length of } D(T_D)/2-15\} \qquad \text{Equation 1}$$

As shown in Equation 1, P1 symbol and AP1 symbol have the same frequency shift value. However, each of the P1 symbol and the AP1 symbol are given opposite signs. Additionally, in order to determine the lengths of C and B, the present invention determines an offset value being added to or subtracted from a value corresponding to the length of A $(T_A)/2$. And, in order to determine the lengths of F and E, the present invention determines an offset value being added to or subtracted from a value corresponding to the length of D $(T_D)/2$. Herein, each of the offset values is set up differently. According to the embodiment of the present invention, the offset value of P1 symbol is set to 30, and the offset value of AP1 symbol is set to 15. However, the values given in the above-described examples are merely exemplary. And, therefore, it will be apparent that the corresponding values may easily be varied or changed by anyone skilled in the art. Thus, the present invention will not be limited only to the values presented herein.

According to the present invention, by generating AP1 symbol and an AP1 symbol to configure the structure shown in FIG. 5, and by inserting the generated symbols to each signal frame, the P1 symbol does not degrade the detection performance of the AP1 symbol, and, conversely, the AP1 symbol does not degrade the detection performance of the P1 symbol. Additionally, the detection performance of the P1 symbol is almost identical to the detection performance of the AP1 symbol. Furthermore, by configuring the symbols so that the P1 symbol and the AP1 symbol have similar symbol structures, the complexity level of the receiver may be reduced.

At this point, the P1 symbol and the AP1 symbol may be transmitted consecutively, or each of the symbols may be allocated to different positions within the signal frame and may then be transmitted. And, in case the P1 symbol and AP1 symbol are each allocated to a different position within the signal frame, so as to be transmitted, a high time diversity effect may be gained with respect to the preamble symbol. According to the embodiment of the present invention, the P1 symbol and the AP1 symbol are consecutively transmitted.

Figure 6:
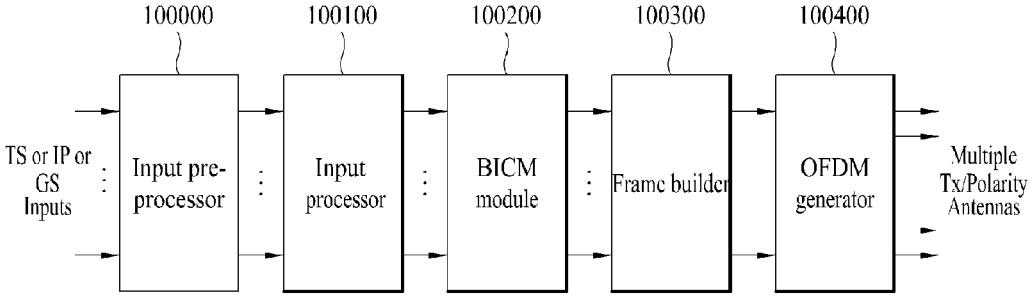
FIG. 6 illustrates a block diagram showing a broadcasting signal transmitting apparatus according to an embodiment of the present invention.

FIG. 6 illustrates a block diagram showing a broadcasting signal transmitting apparatus (or also referred to as a broadcasting signal transmitter or a transmitter) according to an embodiment of the present invention.

As shown in FIG. 6, the broadcasting signal transmitting apparatus may include an input pre-processor (100000), an input processor (100100), a BICM encoder (100200), a frame builder (100300), and an OFDM generator (100400). Herein, the BICM encoder (100200) is also referred to as a BICM module.

The input stream may include at least one of a TS stream, an internet protocol (IP) stream, and a GSE (General Stream Encapsulation) stream (or also referred to as a GS stream).

The input pre-processor (100000) may receive at least one the TS stream, the IP stream, and the GS stream, so as to generate at least one or more PLPs in service units (or service component units) in order to provide robustness.

The input processor (100100) generates a BB frame including at least one or more of the PLPs generated from the input pre-processor (100000). In case the input processor (100100) receives a PLP corresponding to a service, the input processor (100100) may categorize the received PLP as PLPs corresponding to the service components and may, then, generate the BB frame.

The BICM encoder (100200) adds redundancy to the output of the input processor (100100), so that any error occurring over the transmission channel can be corrected, and then the BICM encoder (100200) performs interleaving.

The frame builder (100300) maps the plurality of PLPs to the transmission frame is cell units, so as to complete the transmission frame (or signal frame) structure.

The OFDM generator (100400) performs OFDM modulation on the input data, so as to generate a baseband signal that can be transmitted to the antenna.

Figure 7:
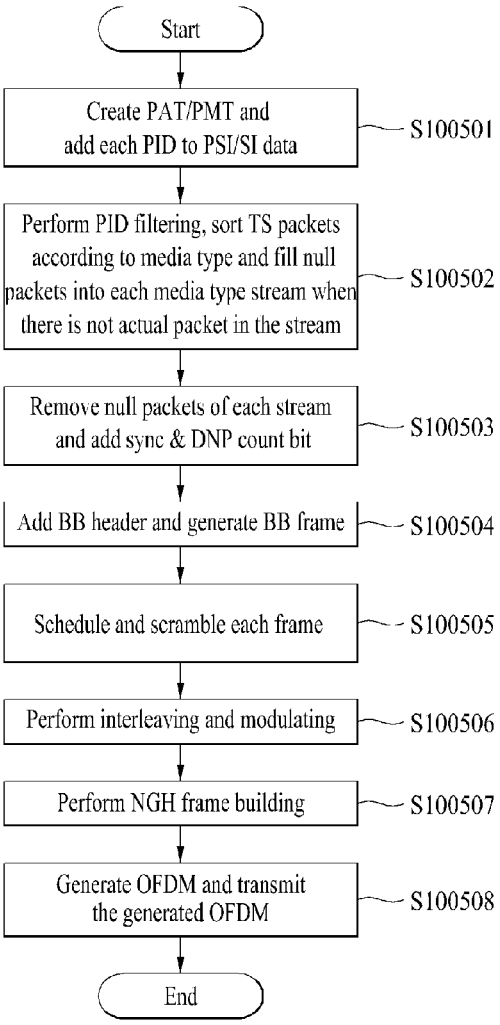
FIG. 7 illustrates a flow chart showing a method of transmitting a TS-based broadcast signal according to an embodiment of the present invention.

FIG. 7 illustrates a flow chart of a method for receiving a TS in a TS packet unit, sorting (or categorizing) the received TS with respect to each component, and transmitting the sorted (or categorized) TS in component PLP units.

In order to do so, PSI/SI data such as PAT/PMT may be generated, and a PID is added to each table (S100501). At this point, the PID of a PAT is given a fixed value, and the PID of a PMT is signaled to the PAT. The PID of each component, i.e., video, audio, data ES, and so on, is signaled to the PMT. The process step S100501 may be performed in the input pre-processor (100000) or may be performed in another block (not shown) and then delivered to the input pre-processor (100000).

The input pre-processor (100000) uses the PID of each component, which is acquired from the PSI/SI, so as to filter the TS packet and to sort (or categorize) the TS packets in accordance with the media type (i.e., on a component basis) (S100502). In the TS being sorted by a component basis, a position, which was previously occupied by another component, is filled by a null packet. For example, in the video TS, a null packet is inserted in a packet position other than the position of an actual video TS packet. The TSs of each component (i.e., the PLP of each component) having the null packet inserted therein are inputted to the input processor (100100).

The input processor (100100) deletes the null packet other than the valid packets within each TS being outputted from the input pre-processor (100000), and inserts information on the number of deleted null packets (DNPs) with respect to the deleted positions (S100503). Additionally, a synchronization (sync) byte is inserted in front of each DNP byte, so as to allow the receiving end to perform synchronization. Subsequently, the input processor (100100) slices each TS into a predetermined number of bit units, so as to map the sliced bit units to a BB frame payload, and, then, the input processor (100100) inserts a BB header to the BB frame payload, so as to generate a BB frame (S100504).

Moreover, the input processor (100100) performs scheduling in order to map multiple PLPs to the transmission frame, and then the input processor (100100) performs scrambling on the data (i.e., bit stream) within the BB frame (S100505).

The BICM encoder (100200) adds redundancy to the output of the input processor (100100), so that any error occurring within the transmission channel can be corrected, and then, the BICM encoder (100200) performs interleaving (S100506).

The frame builder (100300) maps the multiple PLPs being outputted from the BICM encoder (100200) to the transmission frame in cell units in accordance with the scheduling information, thereby completing the transmission frame (NGH frame) structure (S100507). The OFDM generator (100400) performs OFDM modulation on the data within the transmission frame, thereby transmitting the OFDM-modulated data to the antenna (S100508).

Figure 8:
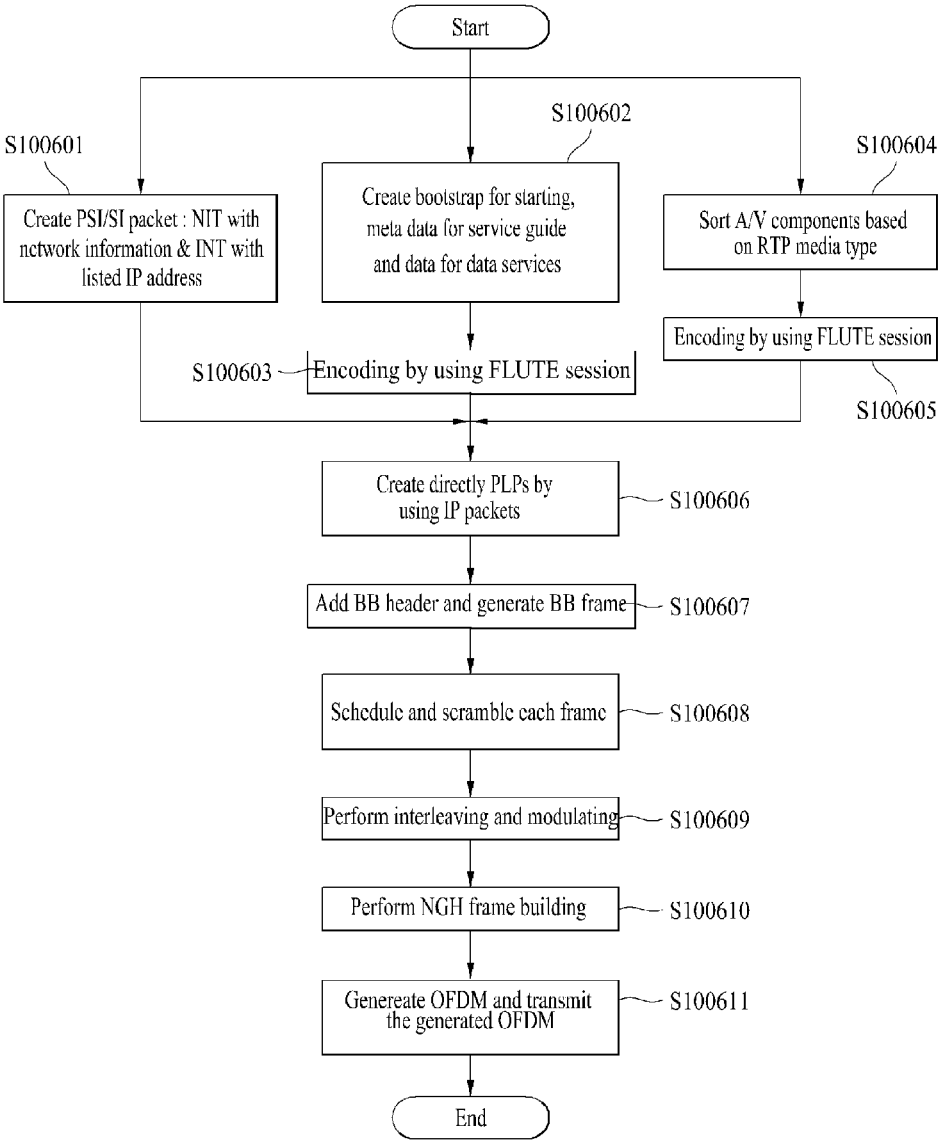
FIG. 8 illustrates a flow chart showing a method of transmitting a IP-based broadcast signal according to an embodiment of the present invention.

FIG. 8 illustrates a flow chart of a method for receiving an IP stream in an IP packet unit, sorting (or categorizing) the received IP stream with respect to each component, and transmitting the sorted (or categorized) IP stream in component PLP units.

In order to do so, IP packets including IP service information are created (or generated) (S100601). The IP service information may include an NIT, which signals network information, and may include an INT, which includes a listed IP address. The IP service information may correspond to a binary type, and FLUTE encoding or RTP encoding may be omitted. The IP service information is transmitted to a common PLP.

After creating (or generating) bootstrap information for initiation, meta data for service guide, and data for data services (S100602), the created information and data are encoded by using a FLUTE session, thereby being outputted in an IP packet format (S100603). Thereafter, the audio/video (A/V) components are sorted (or differentiated) based upon the RTP media type (S100604), then each of the differentiated (or sorted) components is encoded by using a FLUTE session or an RTP session, thereby being outputted in an IP packet format (S100605).

The process steps S100601~S100605 may be performed by the input pre-processor (100000), or may be performed in another block (not shown) and then delivered to the input pre-processor (100000).

The input processor (100100) may create PLPs by directly using IP packets that are FLUTE encoded or RTP encoded, or by directly using IP packets bypassing the FLUTE encoding or RTP encoding processes (S100606). More specifically, by omitting the GSE encapsulating process, the overhead may be reduced.

Subsequently, the input processor (100100) slices each IP stream into a predetermined number of bit units, so as to map the sliced bit units to a BB frame payload, and, then, the input processor (100100) inserts a BB header to the BB frame payload, so as to generate a BB frame (S100607).

Moreover, the input processor (100100) performs scheduling in order to map multiple PLPs to the transmission frame, and then the input processor (100100) performs scrambling on the data (i.e., bit stream) within the BB frame (S100505).

The BICM encoder (100200) adds redundancy to the output of the input processor (100100), so that any error occurring within the transmission channel can be corrected, and then, the BICM encoder (100200) performs interleaving (S100609).

The frame builder (100300) maps the multiple PLPs being outputted from the BICM encoder (100200) to the transmission frame in cell units in accordance with the scheduling information, thereby completing the transmission frame (NGH frame) structure (S100610). The OFDM generator (100400) performs OFDM modulation on the data within the transmission frame, thereby transmitting the OFDM-modulated data to the antenna (S100611).

Hereinafter, each block included in the broadcast signal transmitting apparatus of FIG. 6 will hereinafter be described in detail.

As described above, according to an embodiment of the present invention, the input pre-processor (100000) may categorize the data corresponding to the service to each component, and, then, the input pre-processor (100000) may perform data processing, so that the data corresponding to each component can be transmitted to a separate PLP.

The broadcasting signal transmitting apparatus according to the present invention may be transmitted to one or more services in PLP units. However, the components being included in one service may be separated and transmitted in PLP units. In this case, the broadcasting signal receiving apparatus may identify and process the PLPs including each component, so as to be capable of providing a single service. In order to do so, the input pre-processor (100000) according to the present invention processes data in component units.

In the following description of the present invention, an example of generating a PLP by receiving a stream having a TS format and an example of generating a PLP by receiving a stream having an IP format will be separately described.

Figure 9:
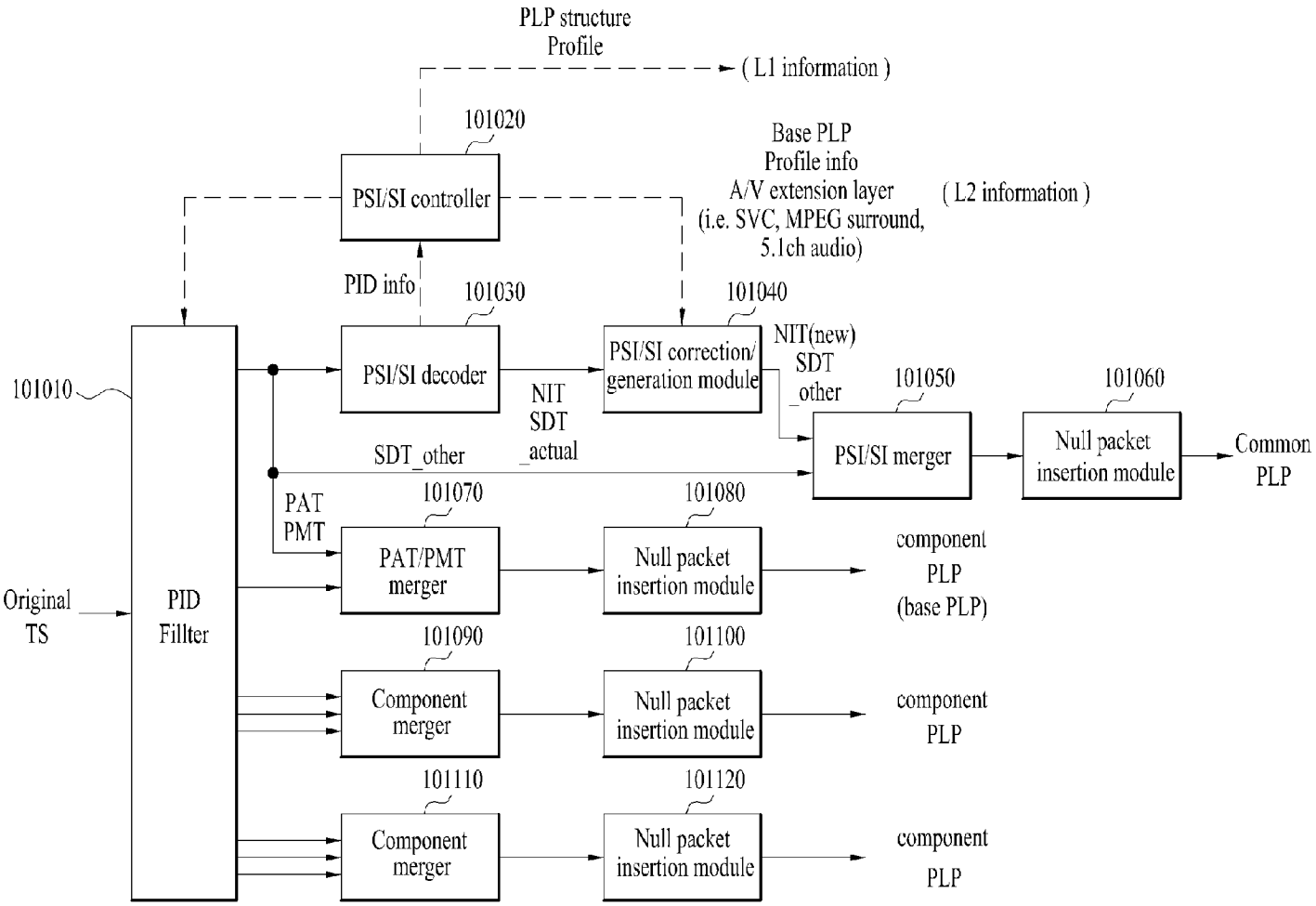
FIG. 9 illustrates a block diagram showing an input pre-processor according to an embodiment of the present invention.

FIG. 9 illustrates a block diagram of the present invention showing a structure of the input pre-processor receiving a stream having a TS format according to an embodiment of the present invention.

The input pre-processor of FIG. 9 includes a PID filter (101010), a PSI/SI controller (101020), a PSI/SI decoder (101030), a PSI/SI modifying/generating module (101040), a PSI/SI merger (101050), a PAT/PMT merger (101070), component mergers (101090, 101110), and null packet inserting modules (101060, 101080, 101100, 101120).

The input pre-processor differentiates the TS packets included in the TS for each component, and outputs each of the differentiated TS packets to a different PLP. Herein, each TS packet is configured of a header and a payload, and the header includes a Packet Identifier (PID) indicating the data to which the header data correspond. The payload may include any one of a video Elementary Stream (ES), an audio ES, a data ES, and a PSI/SI ES, which are to be transmitted. Additionally, information included in the common PLP may also be referred to as L2 signaling information or L2 information/data, and L1 signaling information may also be referred to as L1 information.

According to an embodiment of the present invention, when the video component is divided into a base layer video component and an enhancement layer video component, the PID of a TS packet including the base layer video component and the PID of a TS packet including the enhancement layer video component are different from one another.

More specifically, the PID filter (101010) filters the TS packets included in the TS by using the PID and then outputs the filtered TS packets through a corresponding PLP path. Since each TS packet is assigned with a PID, which can identify each TS packet, the PID filter (101010) may identify the TS packets corresponding to each component by using the PID and may then output the identified TS packets through a separate PLP path. However, since the PID information should be known in order to perform filtering as described above, the PID filter (101010) first filters the PSI/SI, which is included in the TS packet. The PSI/SI decoder (101030) decodes the PSI/SI information, which is filtered by the PID filter (101010), so as to acquire PID information. For example, a PAT having the PID fixed to '0' includes PID information of the PMT and PID information of the NIT, and the PMT includes PID information, such as video, audio, data ES, and so on, corresponding to each component.

Additionally, the PSI/SI controller (101020) may use the acquired PID information so as to control the PID filter (101010), thereby filtering the data corresponding to the wanted (or desired) component for each PID and outputting the filtered data. Since the PSI/SI included in the TS are transmitted by using a predetermined PID, the filtering and data processing procedures may be performed without setting up a separate PID filter (101010).

As described above, the PID filter (101010) filters the TS packet for each component and outputs each of the filtered TS packets through its respective PLP path. For example, a TS corresponding to the video component, a TS corresponding to the audio component, and a TS corresponding to the data component are each outputted to the respective component merger (101090, 101110). And, the component mergers (101090, 101110) merge the inputted TS packets so as to configure each component PLP. For example, the component merger (101090) may receive only the TS packets corresponding to a base layer video component, or may receive both the TS packets corresponding to a base layer video component and the TS packets corresponding to an enhancement layer video component. Then, the component merger (101090) may merge the received TS packets, so as to configure a single component PLP. Furthermore, TS packets including the PAT/PMT being filtered by and outputted from the PID filter (101010) are outputted to the PAT/PMT merger (101070), so as to be merged.

Thus, when configuring the PLP for each component as described above, even if the receiver scans a channel, the receiver may not be capable of searching all of the data corresponding to a single service. More specifically, unlike the method of configuring a PLP for each service and identifying the configured PLP by using the PSI/SI, since the PLP is configured for each component configuring a service in the present invention, a component PLP that does not include PSI/SI may exist. Accordingly, in the present invention, in order to locate component PLPs configuring a service, PSI/SI, such as a PAT/PMT is added to an arbitrary PLP among the component PLPs configuring the corresponding service, and a component PLP having service configuration information, such as the above-mentioned PAT/PMT will hereinafter be referred to as a base PLP (or anchor PLP or SI PLP). When the receiver scans and decodes the base PLP, since information on the remaining component PLPs for providing a service may be known, the above-described problem may be resolved.

The PSI/SI modifying/generating module (101040) modifies or generates PSI/SI that is to be modified or added, such as NIT, SDT, and so on, and then outputs the modified or generated PSI/SI. For example, in the above-described component PLP structure, since the base PLP includes information on the service configuration, such information on the service configuration or information on the base PLP is required to be signaled. The input pre-processor may signal the information on the base PLP to at least any one of L1 signaling information and L2 signaling information (common PLP). When signaling the information on the base PLP to the L2 signaling information, the PSI/SI modifying/generating module (101040) may signal the information on the base PLP to an NIT/SDT_other or a PAT/PMT. The information on the base PLP may include information for searching the base PLP, information required for extracting the base PLP and decoding the extracted base PLP, information on a PAT/PMT respective to the service configuration included in the base PLP. Additionally, according to the embodiment of the present invention, information on components for a service having high picture quality/high sound quality, such as SVC, MPEG surround, and so on, is signaled to the L1 signaling information.

The SDT may be indicated as SDT_actual and SDT_other, and the EIT may be indicated as EIT_actual and EIT_other. Herein, the SDT_actual/EIT_actual may each indicate that the service/event indicated by the respective information corresponds to service/event included in the current frame or TS, and the SDT_other/EIT_other may each indicate that the service/event corresponds to service/event included in another frame or TS. In case the PSI/SI extracted from the TS includes a common PLP, the PSI/SI modifying/generating module (101040) may also modify the SDT_actual to an SDT_other or may modify the EIT_actual to an EIT_other.

The PSI/SI merger (101050) merges the signaling information being outputted from the PSI/SI modifying/generating module (101040) and the signaling information being outputted from the PID filter (101010).

The null packet inserting modules (101060, 101080, 101100, 101120) respectively insert a null packet to a place (or positions) where another component has been located, so that each component can maintain synchronization within the TS. Accordingly, a common PLP is outputted from null packet inserting module (101060), and a base PLP is outputted from null packet inserting module (101080). Additionally, the corresponding component PLPs are outputted from null packet inserting modules (101100, 101120). Herein, the respective component may correspond to a video component, an audio component, a data component, and so on.

As shown in FIG. 9, the input pre-processor, among the inputted TS data, may output data including the PSI/SI such as NIT/SDT/EIT through a common PLP path, may output data corresponding to a component PLP, which includes service configuration information such as PAT/PMT, through a base PLP path, and may output data corresponding each of the other components through a corresponding component PLP path, and the data corresponding to each of the above-mentioned PLP path may also be referred to as PLP data or PLP.

The input pre-processor may signal the information on the components, which are configured as described above, to the L1 signaling information, so that components can be extracted in PLP units in accordance with the receiver type. In other words, when a service type is selected in accordance with the receiver type, the receiver shall process the components corresponding to the selected service. In the present invention, since the PLP is configured for each component, information on such PLP structure should be included in the L1 signaling information, so that the receiver can extract and process the components corresponding to the service. Therefore, the input pre-processor may perform control operations enabling information on the component PLP structure to be signaled to the L1 signaling information.

Hereinafter, the input pre-processor processing data having an IP stream format will hereinafter be described in detail.

In case of an IP stream, unlike the description presented above, the data corresponding to the component may be divided in IP packet units. And, the PSI/SI included in the TS may correspond to service information, and the IP service information may include ESG (Electronic Service Guide; ESG) information, provider information, bootstrap information, and so on. The ESG information may include IP address information, port number information, and so on of the service component and it may be referred to as meta data. According to the embodiment of the present invention, the IP stream may be inputted/outputted in GSE (Generic Stream Encapsulation) stream units.

Figure 10:
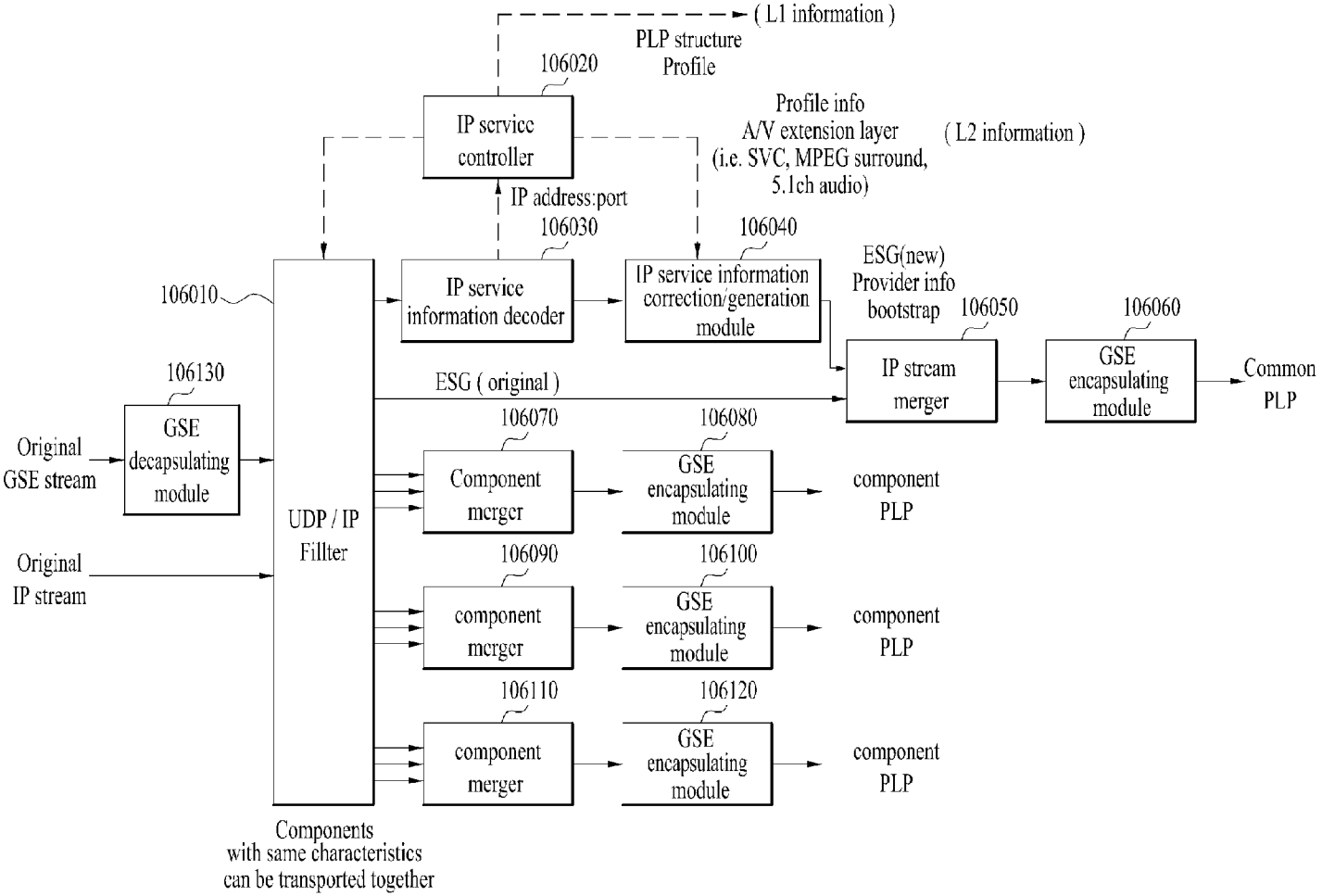
FIG. 10 illustrates a block diagram showing an input pre-processor according to another embodiment of the present invention, (a), (b) and (c) of FIG. 11 illustrate another example of configuring a PLP in component units in an input pre-processor according to the present invention.

FIG. 10 illustrates a block diagram showing the structure of an input pre-processor receiving a stream having an IP format according to an embodiment of the present invention.

The input pre-processor (100000) of FIG. 10 includes a UDP/IP filter (106010), an IP service controller (106020), an IP service information decoder (106030), an IP service information modifying/generating module (106040), an IP stream merger (106050), GSE encapsulating modules (106060, 106080, 106100, 106120), component mergers (106070, 106090, 106110), and a GSE decapsulating module (106130).

The input pre-processor (100000) of FIG. 10 receives a GSE stream or IP stream and differentiates the data included in the received stream for each component, thereby outputting the differentiated data to a different PLP. At this point, a PLP including IP service information may be referred to as a common PLP, and the common PLP may also be referred to as L2 signaling information or L2 information/data. The L1 signaling information may also be referred to as L1 information.

In the present invention, the GSE stream is inputted to the GSE decapsulation module (106130), and the IP stream is inputted to the UDP/IP filter (106010). The GSE decapsulation module (106130) performs GSE decapsulation on the GSE stream, so as to extract an IP stream, thereby outputting the extracted IP stream to the UDP/IP filter (106010).

The UDP/IP filter (106010) may use a UDP port number and an IP address, and so on, so as to perform filtering on the IP packets, which are included in the IP stream, for each component, thereby outputting the filtered IP packets. Since a UDP port number and an IP address are assigned (or allocated) to each of the IP packets for each component, which are included in the IP stream, the UDP/IP filter (106010) may use the UDP port number and IP address so as to identify the IP packet corresponding to each component, thereby outputting each of the identified IP packets to a separate PLP path. Hereinafter, such UDP port number and IP address may also be collectively referred to as an address or address information.

However, since a UDP port number and an IP address should be known in order to perform such filtering process, the UDP/IP filter (106010) first filters the IP service information included in the IP stream. Then, the IP service information decoder (106030) decodes the IP service information, which is filtered by the UDP/IP filter (106010), so as to acquire address information. At this point, the address information may be acquired from the ESG information among the IP service information. Additionally, the IP service controller (106020) may use the address information, which is acquired from the IP service information decoder (106030), so as to control the UDP/IP filter (106010) and to filter the IP packet corresponding to a desired component for each address, thereby outputting the filtered IP packet. Since the IP service information, which is included in the IP stream, is transmitted to a predetermined address, an immediate filtering process may be performed without any separate settings of the UDP/IP filter (106010).

The UDP/IP filter (106010) first filters the IP packets included in the IP stream for each component and then outputs the filters IP packets to a respective component merger through each PLP path. For example, IP packets corresponding to the video component are outputted to the component merger (106070), IP packets corresponding to the audio component are outputted to the component merger (106090), and IP packets corresponding to the data component are outputted to the component merger (106110). The component mergers (106070, 106090, 106110) merge the IP packets of the corresponding component. If the stream being inputted to the input pre-processor corresponds to a stream having a GSE format, the output of the component mergers (106070, 106090, 106110) is outputted as a GSE stream, after being GSE encapsulated by each GSE encapsulating module. And, if the corresponding stream has an IP format, the GSE encapsulating process may be omitted.

When configuring the PLP for each component as described above, the receiver may not be capable of searching all of the data corresponding to a single service, even when the channel is scanned. More specifically, unlike the method of configuring a PLP for each service and identifying the configured PLP as IP service information, since the PLP is configured for each component configuring a service, a component PLP that does not include any IP service information may exist in the present invention. Therefore, in the present invention, service configuration information is added to the IP service information so that the component PLPs corresponding to a service can be located and found.

The IP service information modifying/generating module (106040) may modify or generate IP service information that should be modified or added, such as ESG information, service provider information, bootstrap information, and so on and may, then, output the modified or generated IP service information. For example, service configuration information configuring a PLP for each component may be signaled to the ESG information.

The IP stream merger (106050) merges IP service information modified/generated by the IP service information modifying/generating module (106040) and IP service information, such as supplemental information, which does not require any modification, thereby outputting the merged IP service information to a common PLP path.

According to the embodiment of the present invention, since an IP address and a UDP port number are each assigned (or allocated) in IP packet units to the IP stream, the null packet inserting modules shown in FIG. 9 may be omitted. At this point, unlike in the TS-based broadcasting, in the IP-based broadcasting, a PLP is directly configured without performing null packet inserting or deleting processes. This is because a null packet is not required in the IP stream.

As shown in FIG. 10, the input pre-processor may receive an IP stream (or GSE stream) and may output data including IP service information to a common PLP path and may output data corresponding to each component to a component PLP path. Accordingly, as described above, the data corresponding to each PLP path may also be referred to as PLP data or PLP.

The input pre-processor may signal information on the components, which are configured as described above, to the L1 signaling information, so that components can be extracted in PLP units in accordance with the receiver type. More specifically, when a service type is selected in accordance with the receiver, the receiver shall process the components corresponding to the selected service. In the present invention, since a PLP is configured for each component, the information on such PLP configuration is signaled to the L1 signaling information, thereby allowing the receiver to extract the components corresponding to the selected service and to process the extracted components. Accordingly, the input pre-processor may generate information on the PLP configuration, so as to perform control operations enabling the generated information to be included in the L1 signaling information.

Figure 11:
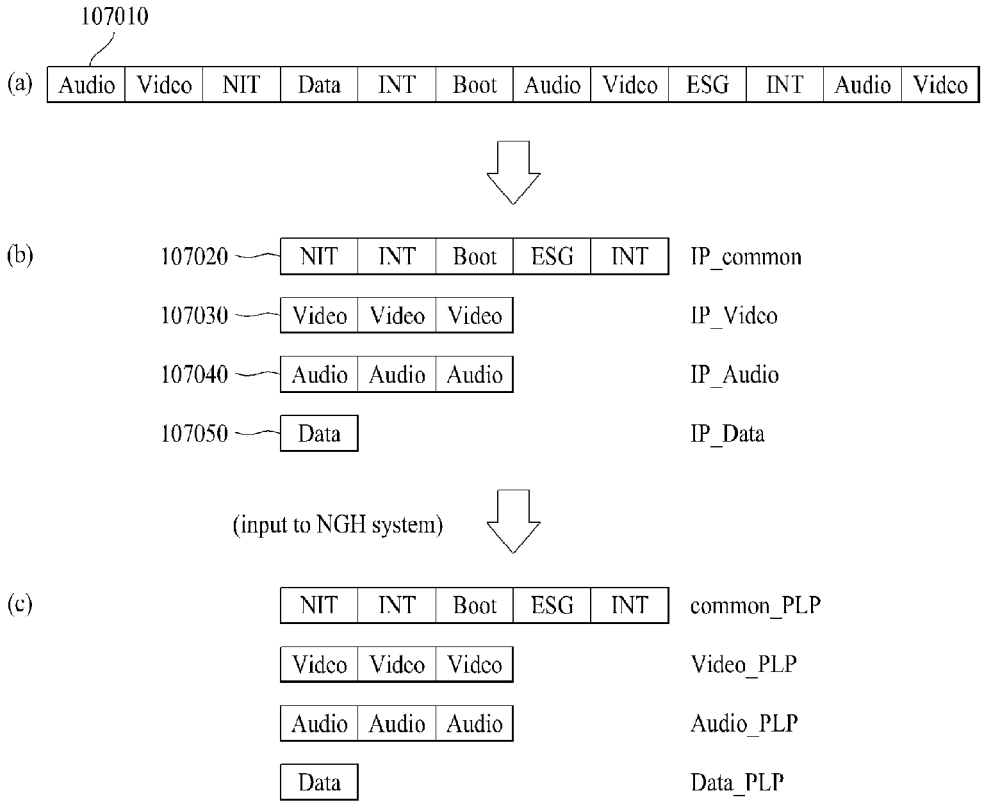

FIG. 11 illustrates an example of configuring a PLP in component units in an input pre-processor according to another embodiment of the present invention.

In FIG. 11, an IP stream (107010) being configured of IP packets indicates an IP stream being inputted to the UDP/IP filter (106010) of the input pre-processor shown in FIG. 10. And, each IP packet includes one of audio component data, video component data, data component data, and IP service information component data.

The input pre-processor of FIG. 11 performs the above-described pre-processing procedure on the IP packets included in the IP stream (107010), so as to differentiate the pre-processed IP packets for each component, thereby outputting each of the differentiated IP packets through a different PLP path.

For example, in (b) of FIG. 11, IP packets including NIT, INT, bootstrap, ESG information are outputted through a common PLP path, thereby configuring a common IP (107020, IP_Common), and IP packets including data of the video component are outputted through a video component PLP path, thereby configuring a video component IP (107030, IP_Video). Additionally, the IP packets including data of the audio component are outputted through an audio component PLP path, thereby configuring an audio component IP (107040, IP_Audio), and the IP packets including data of the data component are outputted through a data component PLP path, thereby configuring a data component IP (107050, IP_Data). In another example, IP packets including data of 2 or more components may be outputted through a single PLP path, so as to configure a single IP. In yet another example, IP packets including data of a specific component respective to multiple services may be outputted through a single PLP path, so as to configure a single IP. At this point, unlike in the TS-based broadcasting, in the IP-based broadcasting, a PLP is directly configured without performing null packet inserting or deleting processes. This is because a null packet is not required in the IP stream.

For simplicity in the description of the present invention, a common IP stream (107020) as shown in (c) of FIG. 11 may be referred to as a common PLP (or PLP data), and a video component IP stream (107030) may be referred to as a video component PLP (or PLP data). Additionally, an audio component IP stream (107040) may be referred to as an audio component PLP (or PLP data), and a data component IP stream (107050) may be referred to as a data component PLP (or PLP data).

Based upon the characteristics of the IP streams, the IP streams of each PLP path of FIG. 11 are not required to maintain the same synchronization or order.

The output of the input pre-processor (100000) is outputted to the input processor (100100).

In the description of the present invention, TS or IP or GSE streams may be converted to n+1 number of streams that can be independently processed through the input pre-processor (100000) or the input processor (100100). At this point, the stream that is to be independently processed may correspond to a complete (or whole) TS stream including a plurality of service components, and may also correspond to a TS stream of a minimum unit including only one service component (e.g., video or audio, and so on). Similarly, the stream that is to be independently processed may correspond to a complete (or whole) GSE stream including a plurality of service components or a GSE stream including only one service component. Furthermore, the stream that is to be independently processed may also correspond to a complete (or whole) IP stream including a plurality of service components or an IP stream including only one service component.

Figure 12:
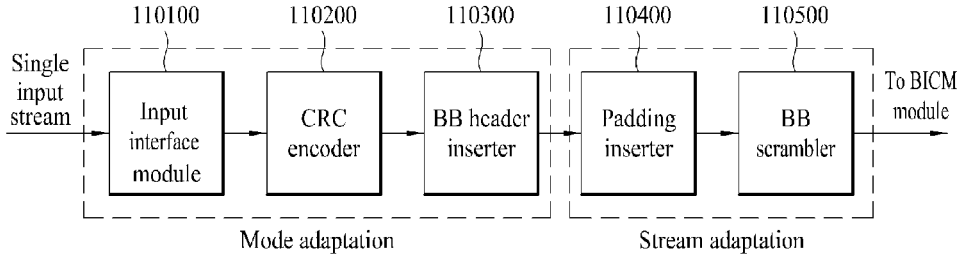
FIG. 12 illustrates a block diagram showing an input processor according to an embodiment of the present invention.

FIG. 12 illustrates a block diagram showing an exemplary structure of an input processor (100100) according to an embodiment of the present invention.

Herein, FIG. 12 shows an exemplary embodiment of an input processor (100100), wherein the number of input streams is equal to 1. When the number of input streams is equal to 1, the input processor (100100) may include an input interface module (110100), a CRC-8 encoder (110200), a BB header inserter (110400), a padding inserter (110400), and a BB scrambler (110500). In the description of FIG. 12, the input interface module (110100), the CRC-8 encoder (110200), and the BB header inserter (110400) will be collectively referred to as a mode adaptation module, and the padding inserter (110400) and the BB scrambler (110500) will be collectively referred to as a stream adaptation module.

The input interface module (110100) maps an input stream in internal logical-bit format for performing FEC (BCH/LDPC) encoding in a BICM encoder (100200). More specifically, the interface module (110100) slices the input stream to bit units corresponding to a number of bits required for generating a BB (Base Band or Broadband) frame, so as to map into a BB frame payload. The CRC-8 encoder (110200) performs CRC encoding on the BB frame payload outputted from the interface module (110100), and the BB header inserter (110300) inserts a header having a fixed size to a fore-end portion of the BB frame payload, which is processed with CRC encoding, to generate a BB frame.

In case a data size of the inputted bit stream is smaller than a BB frame designated to FEC, the padding inserter (110400) may insert a padding bit to the BB frame, in order to configure the BB frame. The BB scrambler (110500) may perform a bitwise XOR (Exclusive OR) operation on a bit stream of the BB frame by using a PRBS (Pseudo Random Binary Sequence), so as to perform randomization. The operations of the BB scrambler (110500) may reduce PAPR (Peak-to-Average Power Ratio) of an OFDM modulation signal transmitted finally.

Figure 13:
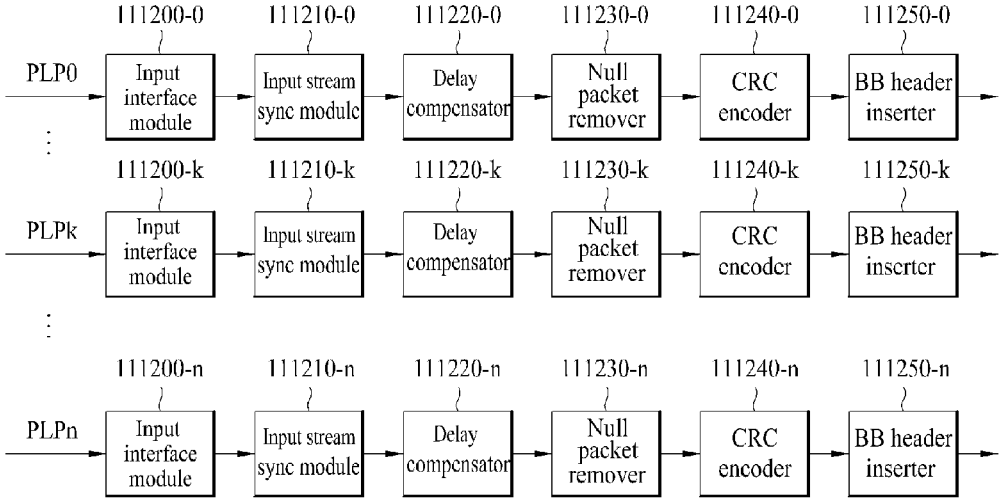
FIG. 13 illustrates a block diagram showing a mode adaptation module of an input processor according to an embodiment of the present invention.

FIG. 13 illustrates a block diagram showing an exemplary structure of a mode adaptation module of an input processor (100100) respective to a multi PLP input according to another embodiment of the present invention. More specifically, FIG. 13 shows an embodiment of a mode adaptation module of the input processor (100100) processing a plurality of PLPs when a type of input stream is a TS format.

The mode adaptation module may include n+1 number of input interface modules (111200-0~n), n+1 number of input stream sync modules (111210-0~n), n+1 number of delay compensators (111220-0~n), n+1 number of null packet deleters (111230-0~n), n+1 number of CRC (Cyclic Redundancy Check) encoders (111240-0~n), and n+1 number of BB header inserters (111250-0~n) operating in parallel to perform mode adaptation on each PLP of the plurality of PLPs.

According to the broadcast signal transmitting apparatus of the present invention, by including signaling information that can be commonly applied to multiple PLPs, such as a transport layer signal of an MPEG-TS, in a single PLP, and by transmitting the processed PLP, the transmission efficiency may be increased. As shown in FIG. 13, the PLP0 performs such function, and, in the description of the present invention, such PLP is referred to as a common PLP. The remaining P number of PLPs excluding the PLP-0, shown in FIG. 13, may be used for performing data transmission. And, in the description of the present invention, such PLP is referred to as a data PLP. Herein, the example given in FIG. 13 is merely exemplary, and, therefore, a plurality of common PLPs, such as PLP0 of FIG. 13, may be used in the present invention.

The input interface modules (111200-0~n) may slice the input stream of the corresponding PLP to a number of bits required for generating the BB frame (Base Band frame), so as to map into a BB frame payload.

The input stream sync modules (111210-0~n) generate sync timing information required to recovery TS or GS streams in a receiver and insert the sync timing information into a BB frame payload. Furthermore, when the receiver performs service recovery, the input stream sync modules (11210-0~n) may generate sync timing information based upon all delays that may occur in the respective channels and transmission processed, so that the corresponding service can be recovered to the initial timing. Herein, the sync timing information may correspond to an ISCR (Input Stream Clock Reference) information. Moreover, the input stream sync modules (111210-0~n) synchronize in the receiver by adding a sync byte.

When multiple PLPs exist, the delay compensators (111220-0~n) may compensate the delay difference between each PLP, so that the frame can be efficiently configured. More specifically, based upon the sync timing information inserted by the input stream sync modules (111210-0~n), the delay compensators (111220-0~n) may delay data on PLPs of group units so as to synchronize the PLPs.

In case of a VBR (variable bit rate) service, the null packet deleters (111230-0~n) may delete the inserted null packets, so as to increase the transmission efficiency. At this point, a number of deleted null packets (DNPs) may be inserted in the deleted positions, so as to be transmitted.

The CRC encoders (111240-0~n) performs CRC encoding on the corresponding frame, in order to enhance the transmission reliability of the BB frame payload, thereby adding CRC data.

The BB header inserters (111250-0~n) inserts a header having a fixed size on a fore-end portion of the corresponding BB frame payload, so that the format of the data field can be identified. Herein, the header may include diverse information, such as Mode Adaptation Type information indicating whether the stream type the of corresponding stream corresponds to a TS, an IP, or a GS, User Packet Length information, Data Field Length information, User Packet Sync Byte information, start address information of a User Packet Sync Byte included in the data field, a high efficiency mode indicator, an input stream sync field, and so on.

FIG. 13 shows an exemplary case when the input stream type corresponds to a TS, and if the input stream type corresponds to an IP stream or a GSE stream, the delay compensators (111220-0~n) and the null packet removers (111230-0~n) may be omitted. For example, since the IP packet is buffered and reproduced in the receiver in accordance with a time stamp, the data are not required to be delayed, and the null packet is not required to be added/deleted. Furthermore, in accordance with the characteristics of the IP streams, the IP streams of each PLP path are not required to maintain synchronization or the same order. Therefore, input stream sync modules (111210-0~n) may be omitted. And, since each of the IP streams has its own CRC, CRC bytes are not required to be added to the IP streams. Thus, CRC encoders (111240-0~n) may also be omitted. Accordingly, in the operations of the input processor of FIG. 13, the input stream sync modules (111210-0~n), the delay compensators (111220-0~n), the null packet removers (111230-0~n), and CRC encoders (111240-0~n) may be omitted, or, in case of the IP stream or GSE stream, the blocks may be bypassed.

Figure 14:
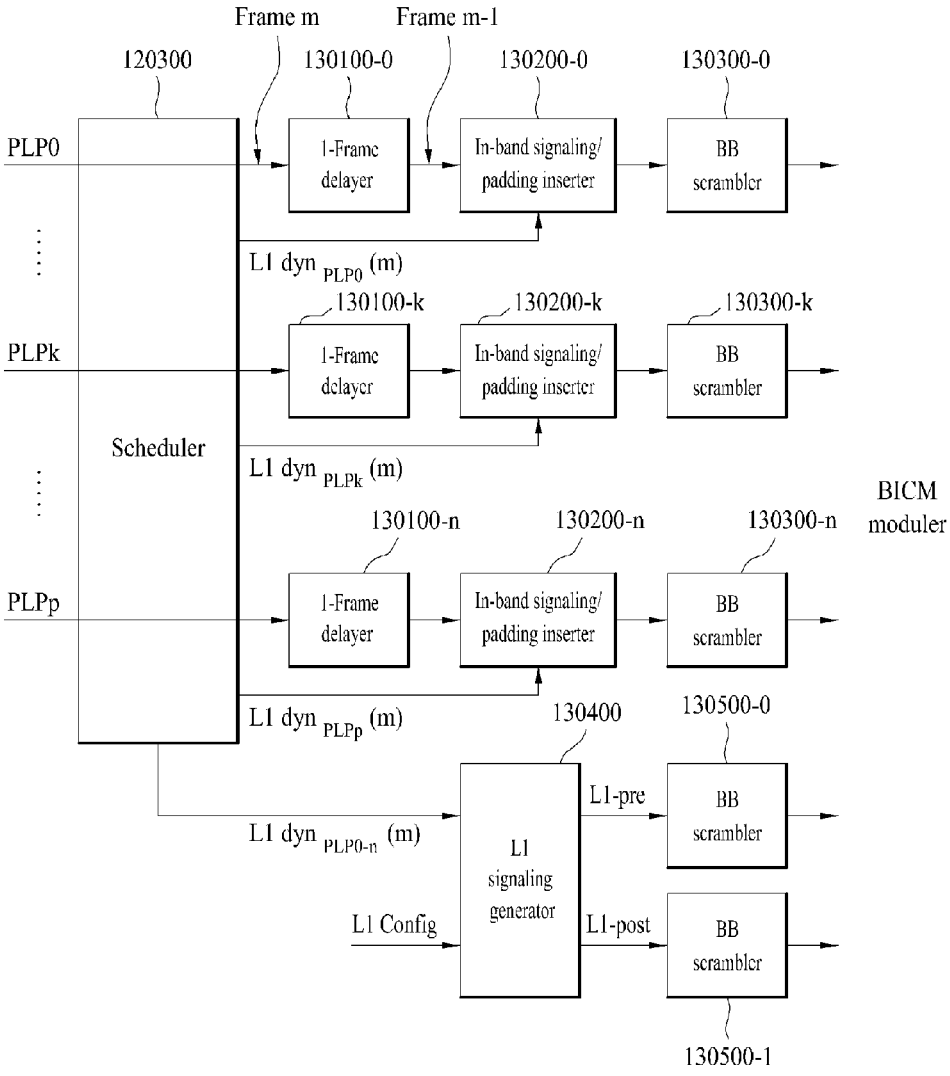
FIG. 14 illustrates a block diagram showing a stream adaptation module of an input processor according to an embodiment of the present invention.

FIG. 14 illustrates an exemplary structure of a stream adaptation module of an input processor (100100) respective to a multi PLP input according to another embodiment of the present invention.

The stream adaptation module may include a scheduler (120300), n+1 number of frame delayers (130100-0~n), n+1 number of in-band signaling/padding inserters (130200-0~n), and n+1 number of BB scramblers (130300-0~n). Furthermore, the stream adaptation module may include L1 signaling generator (130400), two BB scramblers (130500-0, 130500-1) for processing L1 signaling information.

The scheduler (120300) may perform scheduling in order to allocate multiple PLPs to each slot of a transmission frame.

In case the system uses a MIMO method, the scheduler (120300) may include a scheduler for dual polarity MIMO. More specifically, the scheduler (120300) may generate parameters that can be used by a DEMUX, a cell interleaver, a time interleaver of the BICM encoder (100200). Herein, examples of such parameters may include parameters related to a polarity path, such as an H-path and a V-path. Furthermore, the scheduler (120300) enables a cell mapper to map input cells according to scheduling by outputting L1-dynamic signaling information on a current frame, apart from in-band signaling.

The frame delayers (130100-0~n) may delay input data by one transmission frame, so that scheduling information respective to a next frame can be transmitted through a current frame, in order to perform in-band signaling.

The in-band signaling/padding inserters (130200-0~n) insert the non-delayed L1-dynamic signaling information to the data being delayed by one transmission frame. In this case, if surplus space exists within the input data, a padding bit may be inserted in the surplus space, or in-band signaling information may be inserted in the surplus space.

In order to minimize the correlation between transmission bit sequences, the BB scramblers (130300-0~n) perform XOR operation on the input bit stream and PRBS, which are outputted from the in-band signaling/padding inserters (130200-0~n), so as to randomize the input bit stream. After performing the scrambling procedure, the PAPR of the OFDM modulation signal, which is finally transmitted, may be reduced.

Additionally, in addition to in-band signaling, the scheduler (120300) may transmit L1-dynamic signaling information of the current frame to the cell mapper of the frame builder. The cell mapper uses the inputted information, so as to map the input cells to the transmission frame.

In addition to the in-band signaling information, the L1 signaling generator (130400) generates L1 signaling information, which is transmitted through a preamble symbol of the transmission frame or a data symbol, which is being spread. Such L1 signaling information includes L1-pre-signaling information and L1-post-signaling information. The L1 signaling generator (130400) outputs each of the L1-pre-signaling information and the L1-post-signaling information. At this point, the L1-pre-signaling information may be scrambled by the BB scrambler (130500-0), and the L1-post-signaling information may be scrambled by the BB scrambler (130500-1), both by performing XOR operation with the PRBS. According to another embodiment of the present invention, the L1 signaling generator (130400) may output the L1 signaling information, which includes the L1-pre-signaling information and the L1-post-signaling information, and one BB scrambler may also scramble the outputted L1 signaling information.

A stream adaption module respective to multi PLP input of FIG. 14 is different from a stream adaptation module respective to a single PLP input of FIG. 12 in that a scheduler (120300), n+1 number of frame delayers (130100-0~n), n+1 number of in-band scheduling/padding inserters (130200-0~n), and so on are added to the stream adaption module respective to multi PLP input of FIG. 14.

Meanwhile, in the present invention, the MISO method may be independently applied for each set of PLP data, and the MIMO method may also be applied.

According to an embodiment of the present invention, the BICM encoder may perform MIMO encoding on the MIMO PLP data that are to be transmitted by using the MIMO method, and the OFDM generator may perform MISO encoding on the MISO PLP data that are to be transmitted by using the MISO method. According to another embodiment of the present invention, the BICM encoder may perform MIMO encoding on the MIMO PLP data that are to be transmitted by using the MIMO method, and the BICM encoder may also perform MISO encoding on the MISO PLP data that are to be transmitted by using the MISO method. In this case, the MISO encoding process may be omitted in the OFDM generator.

Figure 15:
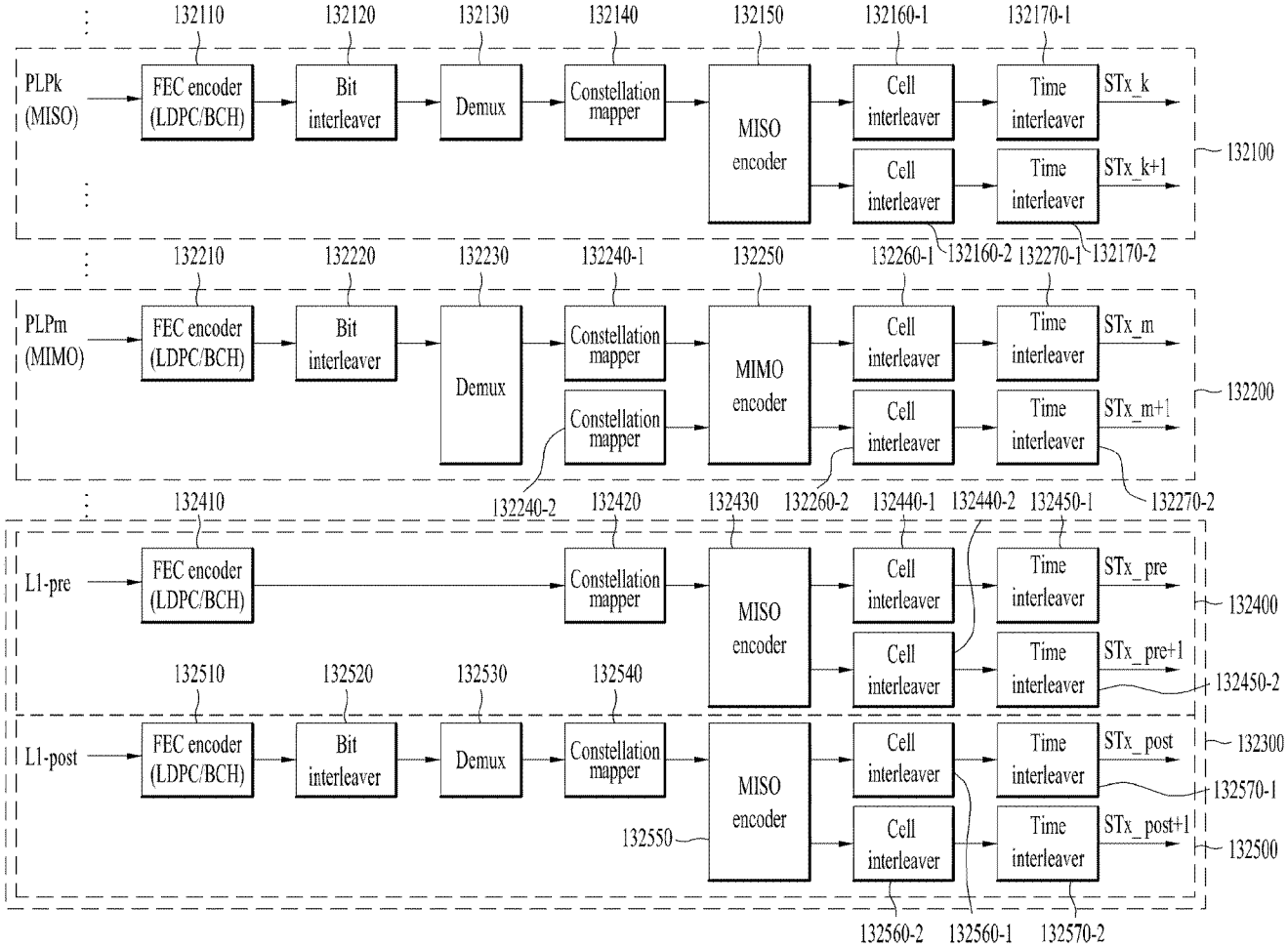
FIG. 15 illustrates a block diagram showing a BICM encoder according to an embodiment of the present invention.

FIG. 15 illustrates a BICM encoder according to a first exemplary embodiment of the present invention.

The BICM encoder according to the first exemplary embodiment of the present invention may perform bit-interleaving and encoding for error correction on a plurality of input-processed PLP data, L1 pre-signaling information and L1 post-signaling information.

Additionally, the BICM encoder according to the first exemplary embodiment of the present invention may independently adopt the MISO method on each PLP data, or may adopt the MIMO method. Also, the BICM encoder according to the first exemplary embodiment of the present invention may perform MISO encoding and MIMO encoding after constellation mapping.

More specifically, the BICM encoder of FIG. 15 may include a first BICM encoding block (132100) processing PLP data by using the MISO method, a second encoding block (132200) processing PLP data by using the MIMO method, and a third encoding block (132300) processing signaling information by using the MISO method. The third encoding block (132300) may also process signaling information by using the MIMO method. However, since the signaling information include information required for the receiver to recover the PLP data included in a signal frame, a stronger robustness between the transmission and reception is required as compared to the case of processing PLP data. Therefore, according to the exemplary embodiment of the present invention, the third encoding block (132300) shall process the signaling information by using the MISO method. Hereinafter, the data processing method of each block will be described in detail.

Firstly, the first BICM encoding block (132100) may include an FEC (Forward Error Correction) encoder (132110), a bit interleaver (132120), a first DEMUX (132130), a constellation mapper (132140), a MISO encoder (132150), a cell interleaver (132160-1, 132160-2), and a time interleaver (132170-1,132170-2).

The FEC encoder (132110) may perform BCH encoding and LDPC encoding, which add redundancy, so that the receiver can correct any error occurring over a transmission channel (or transport channel) with respect to the input-processed PLP data. The bit interleaver (132120) performs bit-interleaving in a single FEC block unit with respect to FEC-encoded PLP data, so as to gain robustness against any burst error that may occur during transmission. In this case, the bit interleaver may perform bit-interleaving by using two FEC block units. As described above, when performing bit-interleaving by using two FEC block units, cells that respectively form a pair in the frame builder, which will be described in detail later on, may each be generated from different FEC blocks. Accordingly, by ensuring diversity, the broadcast signal receiver may enhance its receiving performance.

The first DEMUX (132130) may perform demultiplexing on the bit-interelaved PLP data in a single FEC block unit. In another example, the first DEMUX (132130) may perform demultiplexing by using two FEC block units. As described above, when performing demultiplexing by using two FEC block units, cells that respectively form a pair in the frame builder, which will be described in detail later on, may each be generated from different FEC blocks. Accordingly, by ensuring diversity, the broadcast signal receiver may enhance its receiving performance.

The constellation mapper (132140) may map the demultiplexed bit-unit PLP data on a constellation in symbol units. In this case, the constellation mapper (132140) may rotate the constellation by a predetermined angle depending upon the modulation type. The rotated constellations may be expressed with I-phase (In-phase) elements and Q-phase (Quadrature-phase) elements, and, herein, the constellation mapper (132140) may delay only the Q-phase element by an arbitrary (or random) value. Subsequently, the constellation mapper (132140) may use the In-phase element and the delayed Q-phase element, so as to remap the demultiplexed PLP data to a new constellation.

The MISO encoder (132150) may perform MISO encoding on the PLP data, which are mapped to the constellation, by using an MISO encoding matrix, so as to output MISO-encoded PLP data to 2 paths (STx_k, STx_k+1). Thus, transmission diversity (or transport diversity) may be gained. According to the present invention, an example of the MISO encoding method may include OSTBC (Orthogonal Space-Time Block Code)/OSFBC (Orthogonal Space Frequency Block Code/Alamouti code).

The cell interleaver (132160-1, 132160-2) may respectively perform interleaving on the PLP data being outputted to 2 paths in cell units, and the time interleaver (132170-1, 132170-2) may perform interleaving in time units on the cell-interleaved PLP data being outputted to each path. In this case, the time interleaver (132170-1, 132170-2) may perform interleaving by using 2 FEC blocks. By performing this procedure, since cells that respectively form a pair in the frame builder, which will be described in detail later on, may each be generated from different FEC blocks, by ensuring diversity, the broadcast signal receiver may enhance its receiving performance.

The second BICM encoding block (132200) may include an FEC encoder (132210), a bit interleaver (132220), a second DEMUX (132230), a first constellation mapper (132240-1), a second constellation mapper (132240-2), a MIMO encoder (132250), a first cell interleaver (132260-1), a second cell interleaver (132260-2), a first time interleaver (132270-1), and a second time interleaver (132270-2).

The FEC encoder (132210) and the bit interleaver (132220) may perform the same functions as the FEC encoder (132110) and the bit interleaver (132120) of the MISO method.

The second DEMUX (132230) may perform the same functions as the first DEMUX (132130) of the MISO method and may also demultiplex the PLP data, so as to output the demultiplexed PLP data to 2 paths, which are required for the MIMO transmission. In this case, the transmission characteristic of the data being transmitted through each path may be different from one another. Therefore, the second DEMUX (132230) may randomly allocate the bit-interleaved PLP data to each input path.

The first constellation mapper (132240-1) and the second constellation mapper (132240-2) may perform the same functions as the constellation mapper (132140) of the MISO method.

The MISO encoder (132250) may perform MISO encoding on the inputted PLP data of the 2 paths by using an MIMO encoding matrix, so as to output the MIMO-encoded PLP data to 2 paths (STx_m, STx_m+1). The MIMO encoding matrix according to the present invention may include spatial multiplexing, GC (Golden code), Full-rate full diversity code, Linear dispersion code, and so on.

Among the PLP data being inputted through each of the two paths, the first cell interleaver (132260-1) and the second cell interleaver (132260-2) may perform cell-interleaving only on PLP data having a size corresponding to half the size of the cell included in an FEC block. Accordingly, cell-interleaving performed by the first cell interleaver (132260-1) and the second cell interleaver (132260-2) may have the same effect of that of a single cell interleaver. Additionally, it is advantageous in that, in order to process data of multiple paths, cell-interleaving can be performed by using memory settings of a single cell interleaver without having to allocate additional memory to the first cell interleaver (132260-1) and the second cell interleaver (132260-2).

The first time interleaver (132270-1) and the second time interleaver (132270-2) may perform the same functions as the time interleaver (132170-1, 132170-2) of the MISO method. In this case, the first time interleaver (132270-1) and the second time interleaver (132270-2) may perform time-interleaving by using the same method as that used on the PLP data, which are inputted to each path, or may perform time-interleaving by using another method.

The L1-signaling information may include L1 pre-signaling information and L1 post-signaling information, and the MISO method may be independently applied to each of L1 pre-signaling information and L1 post-signaling information.

Therefore, the third BICM encoding block (132300) may include a first encoding block (132400) for processing L1 pre-signaling information and a second encoding block (132500) for processing L1 post-signaling information.

The first encoding block (132400) may include an FEC encoder (132410), a constellation mapper (132420), a MISO encoder (132430), a cell interleaver (132440-1, 132440-2), and a time interleaver (132450-1, 132450-2). Additionally, the second encoding block (132500) may include an FEC encoder (132510), a bit interleaver (132520), a DEMUX (132530), a constellation mapper (132540), a MISO encoder (132560), a cell interleaver (132560-1. 132560-2), and a time interleaver (132570-1. 132570-2).

The L1 pre-signaling information may include information required for decoding L1 post-signaling information, and the L1 post-signaling information may include information required by the receiver for recovering data transmitted from the transmitter.

More specifically, in order to decode the L1 -signaling information and data, the receiver is required to accurately and swiftly decode L1 pre-signaling information. Therefore, according to an exemplary embodiment of the present invention, bit-interleaving and demultiplexing are not performed on the L1 pre-signaling information, so that the receiver can perform swift decoding on the L1 pre-signaling information.

Hereinafter, the functions of each block included in the first encoding block (132400) and the second encoding block (132500) are identical to the functions of the blocks included in the first BICM encoding block (132100), and, therefore, detailed description of the same will be omitted for simplicity.

As a result, the first encoding block (132400) for processing the L1 pre-signaling information may perform MISO encoding on the L1 pre-signaling information, so as to output the processed L1 pre-signaling information to 2 paths (STx_pre, STx_pre+1). Additionally, the second encoding block (132500) for processing the L1 post-signaling information may perform MISO encoding on the L1 post-signaling information, so as to output the processed L1 post-signaling information to 2 paths (STx_post, STx_post+1).

As shown in FIG. 15, when each of the MISO encoder and the MIMO encoder are located between the constellation mapper and the cell interleaver, the respective BICM decoder of the broadcast signal receiver performs MISO/MIMO decoding after performing all of the time-deinterleaving and cell-interleaving processes in symbol units. In this case, since the bit-unit data, which are processed with MISO/MIMO decoding, are processed with constellation demapping, separate information related to symbol mapping is not required. Therefore, when the MISO/MIMO encoders are located after (or behind) the constellation mapper, memory complexity in the receiver may be more decreased as compared to when the MISO/MIMO encoders are located after (or behind) the time interleaver.

Figure 16:
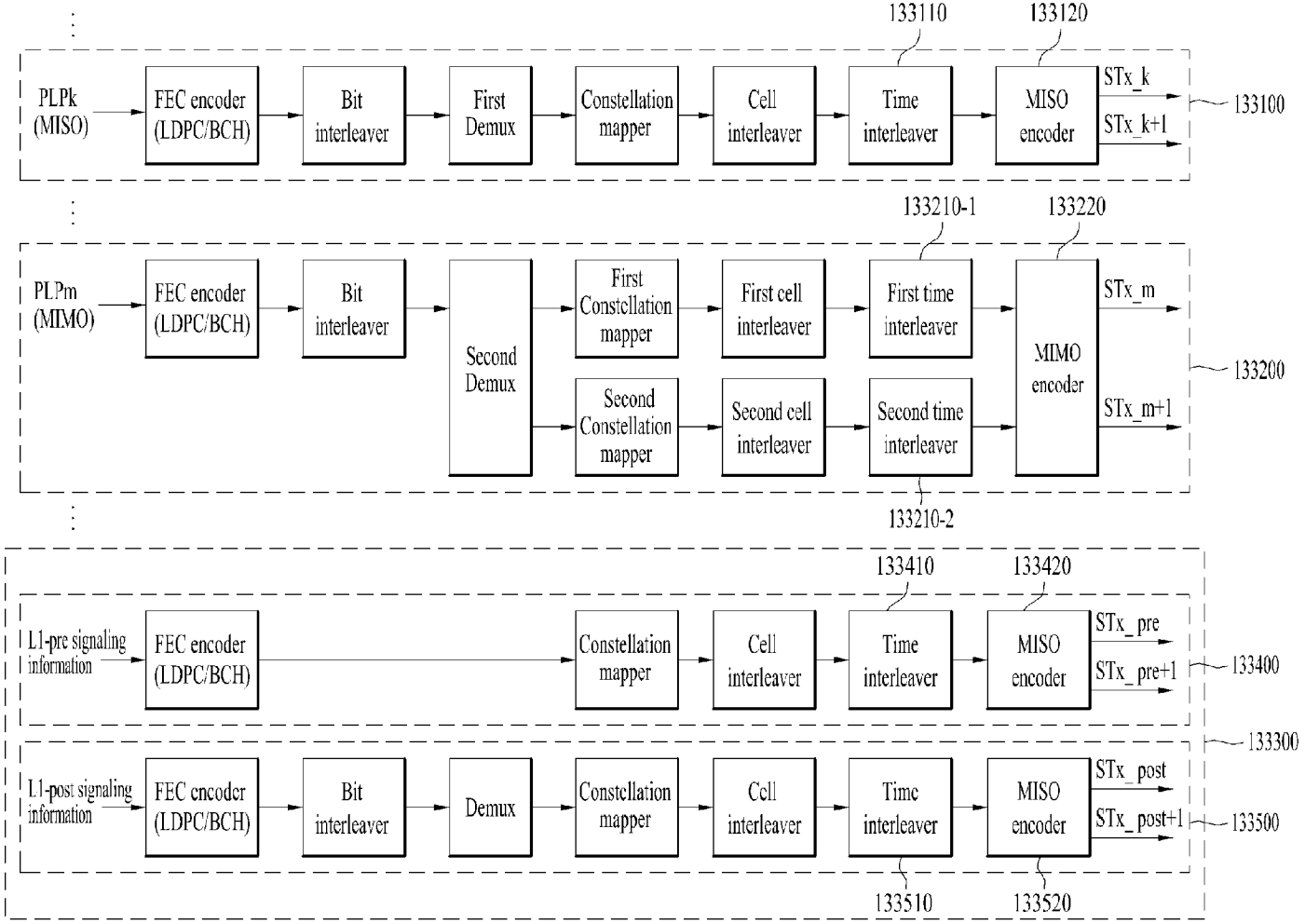
FIG. 16 illustrates a block diagram showing a BICM encoder according to another embodiment of the present invention.

FIG. 16 illustrates a BICM encoder according to a second exemplary embodiment of the present invention.

The BICM encoder according to the second exemplary embodiment of the present invention may perform bit-interleaving and encoding for error correction on a plurality of input-processed PLP data, L1 pre-signaling information and L1 post-signaling information.

Additionally, the BICM encoder according to the second exemplary embodiment of the present invention may independently adopt the MISO method on each PLP data, or may adopt the MIMO method.

As shown in FIG. 16, the BICM encoder may include a first BICM encoding block (133100) processing PLP data by using the MISO method, a second encoding block (133200) processing PLP data by using the MIMO method, and a third encoding block (133300) processing signaling information by using the MISO method.

Since the BICM encoding blocks according to the second exemplary embodiment of the present invention shown in FIG. 16 perform the same functions as the BICM encoding blocks according to the first embodiment of the present invention, detailed description of the same will be omitted for simplicity. However, the difference between the BICM encoding blocks according to the first embodiment of the present invention and the BICM encoding blocks according to the second embodiment of the present invention is that the MISO encoders (133120, 133420,133520) and the MIMO encoder (133220) of the BICM encoding blocks according to the second embodiment of the present invention are located after (or behind) the time interleavers (133110, 133210-1, 133210-2, 133410 and 133510).

As shown in FIG. 16, when each of the MISO encoder and the MIMO encoder are located at the outputting end of the time interleaver, the respective BICM decoder of the broadcast signal receiver first performs MISO decoding or MIMO decoding on each set of data, so as to output the data processed with MISO decoding or MIMO decoding in bit units. At this point, the data being outputted from the MISO decoder or the MIMO decoder correspond to bit-unit likelihood information (or probability information). Accordingly, although the BICM decoder of the broadcast signaling receiver can perform time de-interleaving and cell de-interleaving processes on the MISO-decoded or MIMO-decoded data, since data being outputted in bit units are inputted, information related to symbol units is also required. Therefore, since the broadcast signal receiver is required to store information related to symbol mapping of the input bits required for the de-interleaving process, the memory complexity of the broadcast signal receiver may be increased.

Although it is not shown in the drawing, the BICM encoder according to the third embodiment of the present invention may include a first encoding block processing MISO PLP data that are to be MISO-encoded, a second encoding block processing MIMO PLP data that are to be MIMO-encoded, and a third BICM encoding block processing signaling information that is to be MISO-encoded. Since the BICM encoding blocks according to the third embodiment of the present invention perform the same functions as the BICM encoding blocks according to the first exemplary embodiment of the present invention shown in FIG. 15, detailed description of the same will be omitted for simplicity. However, the difference between the BICM encoding blocks of the third exemplary embodiment of the present invention and the BICM encoding blocks of the first exemplary embodiment of the present invention is that the BICM encoding blocks of the third exemplary embodiment of the present invention do not include the MISO encoder and the MIMO encoder.

Furthermore, the BICM encoder according to a fourth exemplary embodiment of the present invention is almost identical to the third exemplary embodiment of the present invention. However, the BICM encoder according to the fourth embodiment of the present invention is different from the BICM encoder according to the third embodiment of the present invention in that the BICM encoder according to the fourth embodiment of the present invention performs MIMO encoding on the MIMO PLP data that are to be processed by using the MIMO method. More specifically, the BICM encoder according to the fourth exemplary embodiment of the present invention may include a first BICM encoding block processing MISO PLP data that are to be MISO-encoded, a second BICM encoding block processing MIMO PLP data that are to be MIMO-encoded, and a third BICM encoding block processing signaling information that is to be MISO-encoded, and the third BICM encoding block may include a first encoding block for processing L1 pre-signaling information and a second encoding block for processing L1 post-signaling information. Most particularly, the first BICM encoding block according to the fourth exemplary embodiment of the present invention may not include any MISO encoders, and the second BICM encoding block according to the fourth exemplary embodiment of the present invention may include a MIMO encoder. In this case, the MIMO encoder may be located after (or behind) the time interleaver as shown in the first embodiment of the present invention, or the MIMO encoder may be located after (or behind) the constellation mapper as shown in the second embodiment of the present invention. This may be varied in accordance with the intentions of the system designer.

The first BICM encoding block of FIG. 15 or FIG. 16 outputs MISO-encoded PLP data through 2 different paths (STX_k, STX_k+1), and the second BICM encoding block outputs MIMO-encoded PLP data through 2 different paths (STX_m, STX_m+1). Additionally, the third BICM encoding block outputs MISO-encoded signaling data through 2 different paths (STX_pre, STX_pre+1 and STX_post, STX_post+1) with respect to the L1 pre-signaling information and the L1 post-signaling information. Hereinafter, the path corresponding to STX_k, STX_m, STX_pre, and STX_post will be referred to as a first path, and the path corresponding to STX_k+1, STX_m+1, STX_pre+1, and STX_post+1 will be referred to as a second path, for simplicity.

Figure 17:
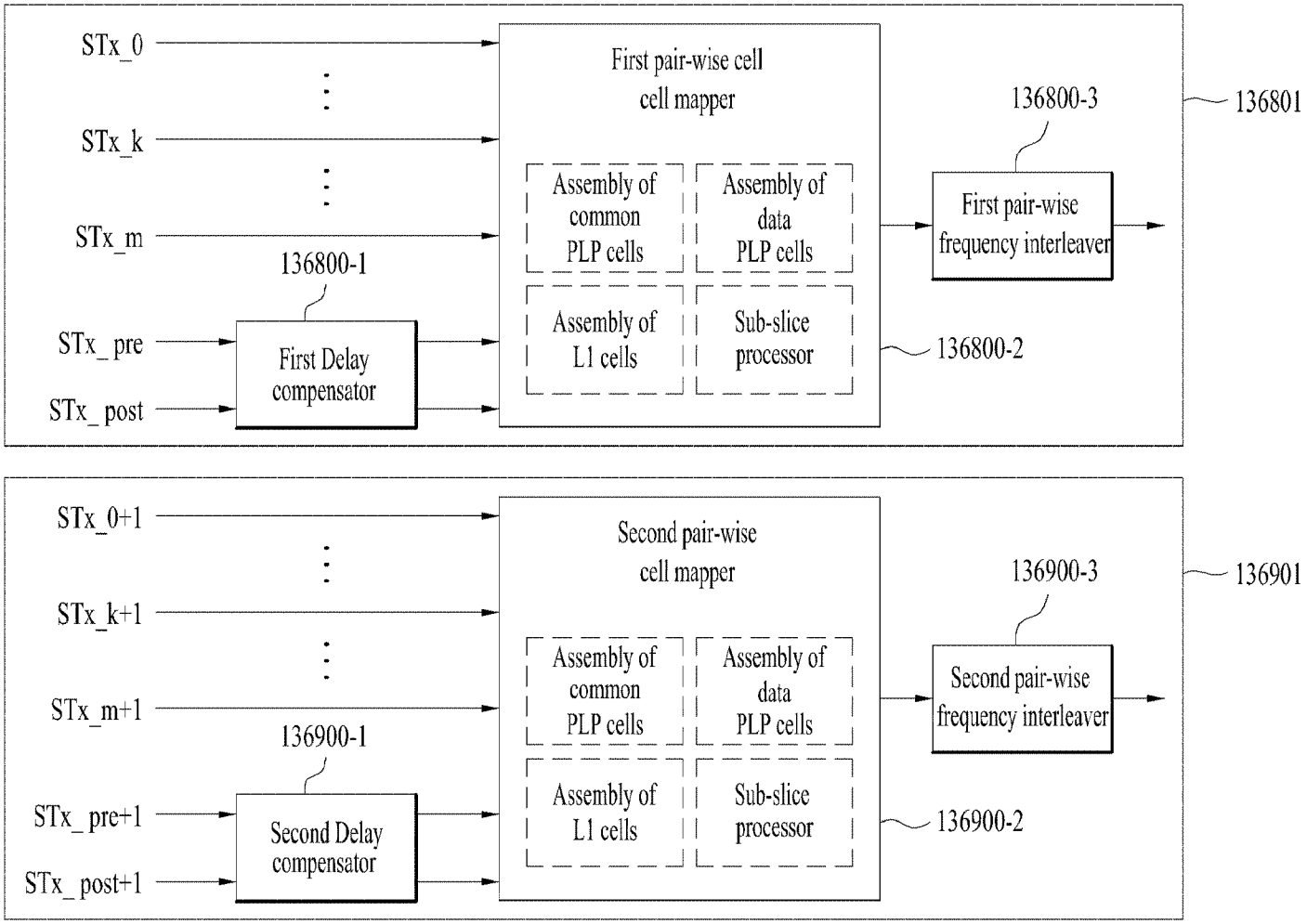
FIG. 17 illustrates a block diagram showing a frame builder according to another embodiment of the present invention.

FIG. 17 illustrates a block diagram showing a structure of a frame builder according to another embodiment of the present invention, which is adequate for processing the output of the BICM encoder shown in FIG. 15.

The frame builder of FIG. 17 comprises a first frame building block (136801) receiving the MISO encoded PLP data, the MIMO encoded PLP data, the MISO encoded L1-pre-signaling information, and the MISO encoded L1-post-signaling information of the first path (STX_k, STX_m, STX_pre, STX_post), and a second frame building block (136901) receiving the MISO encoded PLP data, the MIMO encoded PLP data, the MISO encoded L1-pre-signaling information, and the MISO encoded L1-post-signaling information of the second path (STX_k+1, STX_m+1, STX_pre+1, STX_post+1). The data of the first path processed in the first frame building block (136801) are transmitted through a first antenna (Tx_1) after being processed with a modulation process in the OFDM generator, and the data of the second path processed in the second frame building block (136901) are transmitted through a second antenna (Tx_2) after being processed with a modulation process in the OFDM generator.

The first frame building block (136801) may include a first delay compensator (136800-1), a first pair-wise cell mapper (136800-2), and a first pair-wise frequency interleaver (136800-3), and the second frame building block (136901) may include a second delay compensator (136900-1), a second pair-wise cell mapper (136900-2), and a second pair-wise frequency interleaver (136900-3) for processing the data being inputted through the second path.

The first pair-wise cell mapper (136800-2) and the first pair-wise frequency interleaver (136800-3) and the second pair-wise cell mapper (136900-2) and the second pair-wise frequency interleaver (136900-3) may be identically operated with respect to each of the first path and the second path and may also be independently operated.

Hereinafter, the data processing method of the blocks included in each of the first frame building block (136801) and the second frame building block (136901) will be described in detail.

The first delay compensator (136800-1) and the second delay compensator (136900-1) compensates for both the delay by one transmission frame applied to the L1-pre-signaling data or L1-post-signaling data and the delay caused by the encoding process of the BICM encoder. The L1 signaling information may include the information on the current transmission frame as well as the information on the next transmission frame. Therefore, during the above-described input processing procedure, the L1 signaling information is delayed by one frame as compared to the PLP data, which are currently being inputted. By performing this procedure, one transmission frame may be capable of transmitting the L1 signaling information including information on the current transmission frame and information on the next transmission frame.

The first pair-wise cell mapper (136800-2) and the second pair-wise cell mapper (136900-2) map respectively map the symbol unit PLP data and the L1 signaling data, which are inputted through each path, in cell units to the subcarrier of the OFDM symbol within the transmission frame.

In this case, the PLP data being inputted through each path may include common PLP data and MISO-MIMO-encoded PLP data. And, a sub-slice processor may perform sub-slicing on the PLP data cells and map the sub-sliced PLP data cells to the transmission frame, so as to gain diversity.

Additionally, the first pair-wise cell mapper (136800-2) and the second pair-wise cell mapper (136900-2) may pair 2 consecutive input cells and may map the paired cells to the transmission frame.

In order to increase the MISO signal recovery performance of the receiver, when performing MISO encoding, the MISO transmission channel is required to ensure coherence between the channels. Accordingly, in order to ensure coherence between the channels, the first pair-wise cell mapper (136800-2) and the second pair-wise cell mapper (136900-2) may respectively pair cells, which are generated from the same PLP data, and may map the paired cells to the subcarrier of the OFDM modulation, thereby maximizing the coherence between the channels. In other words, according to the embodiment of the present invention, since the MISO encoder is located in the BICM encoder of the frame builder, the frame structure may be configured by the frame builder in pair units based upon such MISO encoding.

Moreover, as described above, when bit interleaving or time interleaving is performed by the bit interleaver and the time interleaver of the BICM encoder by using two FEC blocks, since the two input cells that are grouped to form a pair may be generated from different FEC blocks, the receiver may be capable of ensuring diversity and may gain high reception performance.

The first pair-wise frequency interleaver (136800-3) and the second pair-wise frequency interleaver (136900-3) may perform frequency interleaving in cell units on the data being inputted through each path. Then, the first pair-wise frequency interleaver (136800-3) and the second pair-wise frequency interleaver (136900-3) may output the frequency interleaved data to the OFDM generator through each path.

In this case, the first pair-wise frequency interleaver (136800-3) and the second pair-wise frequency interleaver (136900-3) may group 2 consecutive input cells in pairs and may process each cell pair as a single interleaving unit, thereby performing frequency interleaving. This is for maximizing the coherence between the channels.

Figure 18:
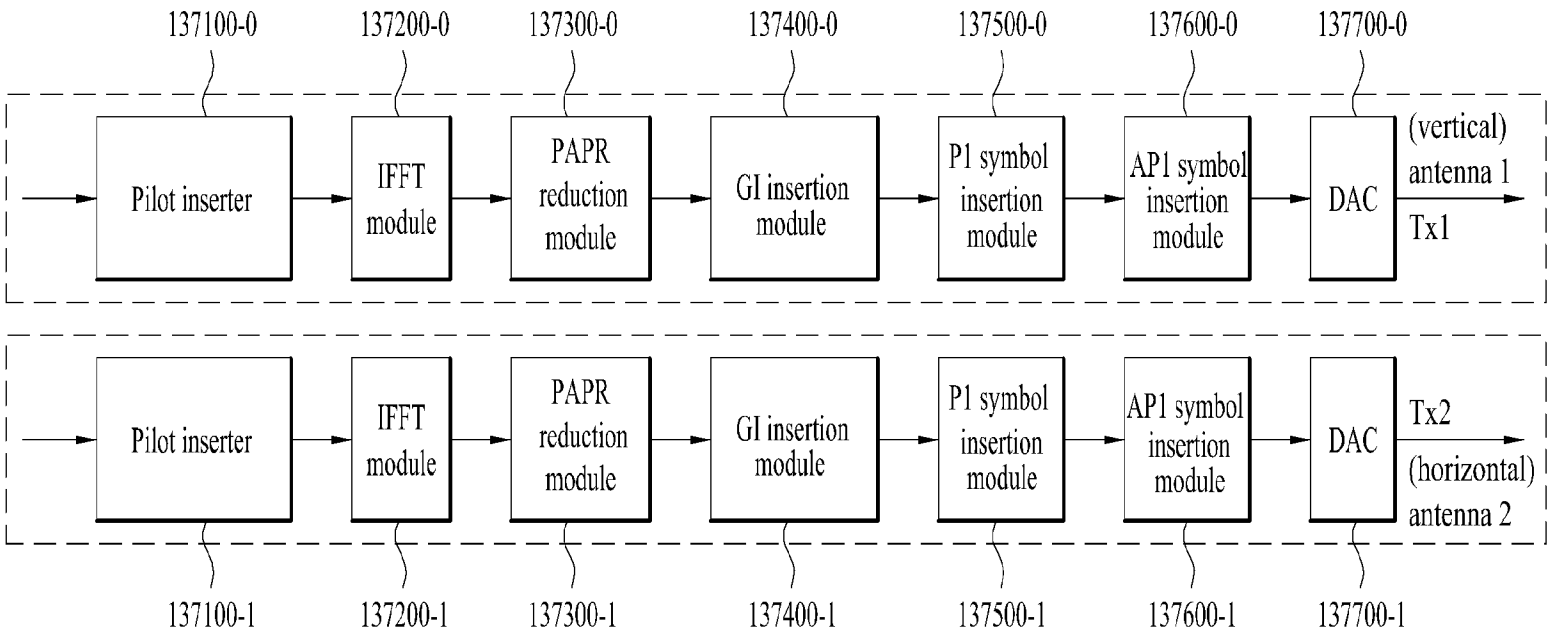
FIG. 18 illustrates a block diagram showing an OFDM generator according to another embodiment of the present invention.

FIG. 18 illustrates a block view shown in the structure of an OFDM generator according to an exemplary embodiment of the present invention. Most particularly, FIG. 18 corresponds to an example of a broadcast signal being transmitted through 2 transmission antennae (or transport antennae). According to the exemplary embodiment of the present invention, a polarity multiplexing MIMO method will be used.

The OFDM generator of FIG. 18 consists of 2 pilot inserters (137100-0,137100-1), 2 IFFT modules (137200-0, 137200-1), 2 PAPR reduction modules (137300-0,137300-1), 2 GI insertion modules (137400-0,137400-1), 2 P1 symbol insertion modules (137500-0,137500-1), 2 AP1 symbol insertion modules (137600-0,137600-1), and 2 DACs (137700-0,137700-1). In the present invention, a block modulating a broadcast signal that is to be transmitted through a first transmission antenna (Tx1) will hereinafter be referred to as a first transmitting unit, and a block modulating a broadcast signal that is to be transmitted through a second transmission antenna (Tx2) will hereinafter be referred to as a second transmitting unit. The first transmitting unit includes pilot inserter (137100-0), an IFFT module (137200-0), a PAPR reduction module (137300-0), a GI insertion module (137400-0), a P1 symbol insertion module (137500-0), an AP1 symbol insertion module (137600-0), and a DAC (137700-0). The second transmitting unit includes a pilot inserter (137100-1), an IFFT module (137200-1), a PAPR reduction module (137300-1), a GI insertion module (137400-1), a P1 symbol insertion module (137500-1), an AP1 symbol insertion module (137600-1), and a DAC (137700-1).

The pilot inserter (137100-0, 137100-1) inserts a pilot signal having a specific pilot pattern in a respective location within a signal frame, which is being inputted to each path and outputs the processed signal to the IFFT module (137200-0, 137200-1), so that the receiver can perform transport channel (or transmission channel) estimation and time/frequency synchronization. At this point, the pilot pattern information may either be signaled to the AP1 signaling information or may be signaled to the L1 signaling information. Alternatively, the pilot pattern information may be signaled to both the AP1 signaling information and the L1 signaling information.

The IFFT module (137200-0, 137200-1) converts each signal having the pilot inserted therein to a time domain by performing inverse fast fourier conversion, thereby outputting the processed signal to the PAPR reduction module (137300-0, 137300-1).

The PAPR reduction module (137300-0, 137300-1) reduces the PAPR of the time domain signals and then outputs the processed signal to the GI insertion module (137400-0, 137400-1). The PAPR reduction module (137300-0, 137300-1) reduces the PAPR from the modulated OFDM symbol by using at least one of an ACE (Active Constellation Extension) method or a Tone Reservation method. Additionally, with respect to a PAPR reduction algorithm, the required information may be fed-back to the pilot inserter (137100-0, 137100-1).

The GI insertion module (137400-0, 137400-1) inserts a guard interval in the form of a cyclic prefix by copying an end portion of an effective OFDM symbol at a starting portion (or beginning) of the corresponding OFDM symbol, thereby outputting the processed signal to the P1 symbol insertion module (137500-0, 137500-1). The GI information is signaled to the L1 pre-signaling information. Additionally, a portion of the GI information is signaled to the P1 signaling information.

The P1 symbol insertion module (137500-0, 137500-1) inserts a P1 symbol at a starting portion (or beginning) of each signal frame, thereby outputting the processed signal to the AP1 symbol insertion module (137600-0, 137600-1).

The AP1 symbol insertion module (137600-0, 137600-1) inserts an AP1 symbol after the P1 symbol and then outputs the processed signal to the DAC (137700-0, 137700-1). Herein, the insertion of the P1 symbol and the AP1 symbol may be performed by the P1 symbol insertion module (137500-0, 137500-1), and, in this case, the AP1 symbol insertion module (137600-0, 137600-1) may be omitted.

The DAC (137700-0, 137700-1) converts each signal frame having the AP1 symbol inserted therein to an analog signal and then transmits the processed signal through the corresponding transmission antenna (Tx1, Tx2).

Figure 19:
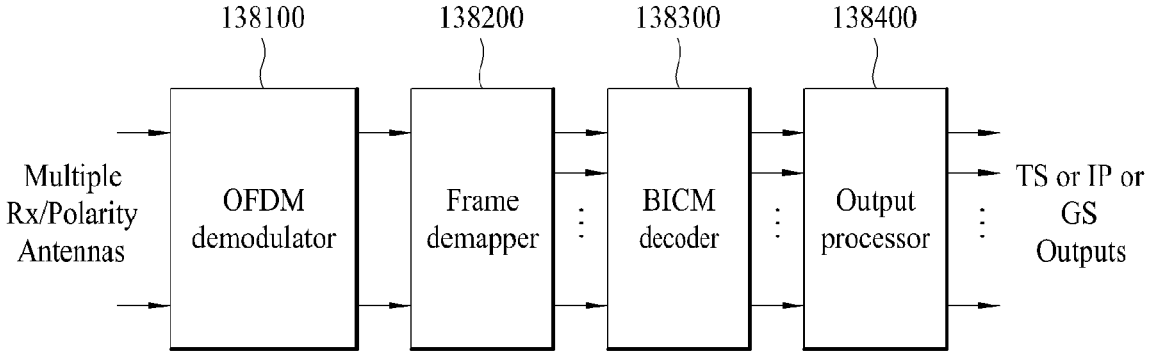
FIG. 19 illustrates a block diagram showing a broadcast signal receiving apparatus according to an embodiment of the present invention.

FIG. 19 illustrates a block diagram showing an exemplary structure of a broadcast signal receiving apparatus according to an embodiment of the present invention.

The broadcast signal receiving apparatus according to the present invention may include an OFDM demodulator (138100), a frame demapper (138200), a BICM decoder (138300), and an output processor (138400).

The frame demapper (138200) may also be referred to as a frame parser. The OFDM demodulator (138100) converts time domain signals to frequency domain signals. Herein, the time domain signals correspond to signals being received through multiple reception antennae and then being converted to digital signals. Among the signals being converted to frequency domain signals, the frame demapper (138200) outputs the PLPs designated to required services. The BICM decider (138300) corrects errors that occur due to the transmission channel, and the output processor (138300) performs procedures required for generating an output TS or IP or GS stream.

Figure 20:
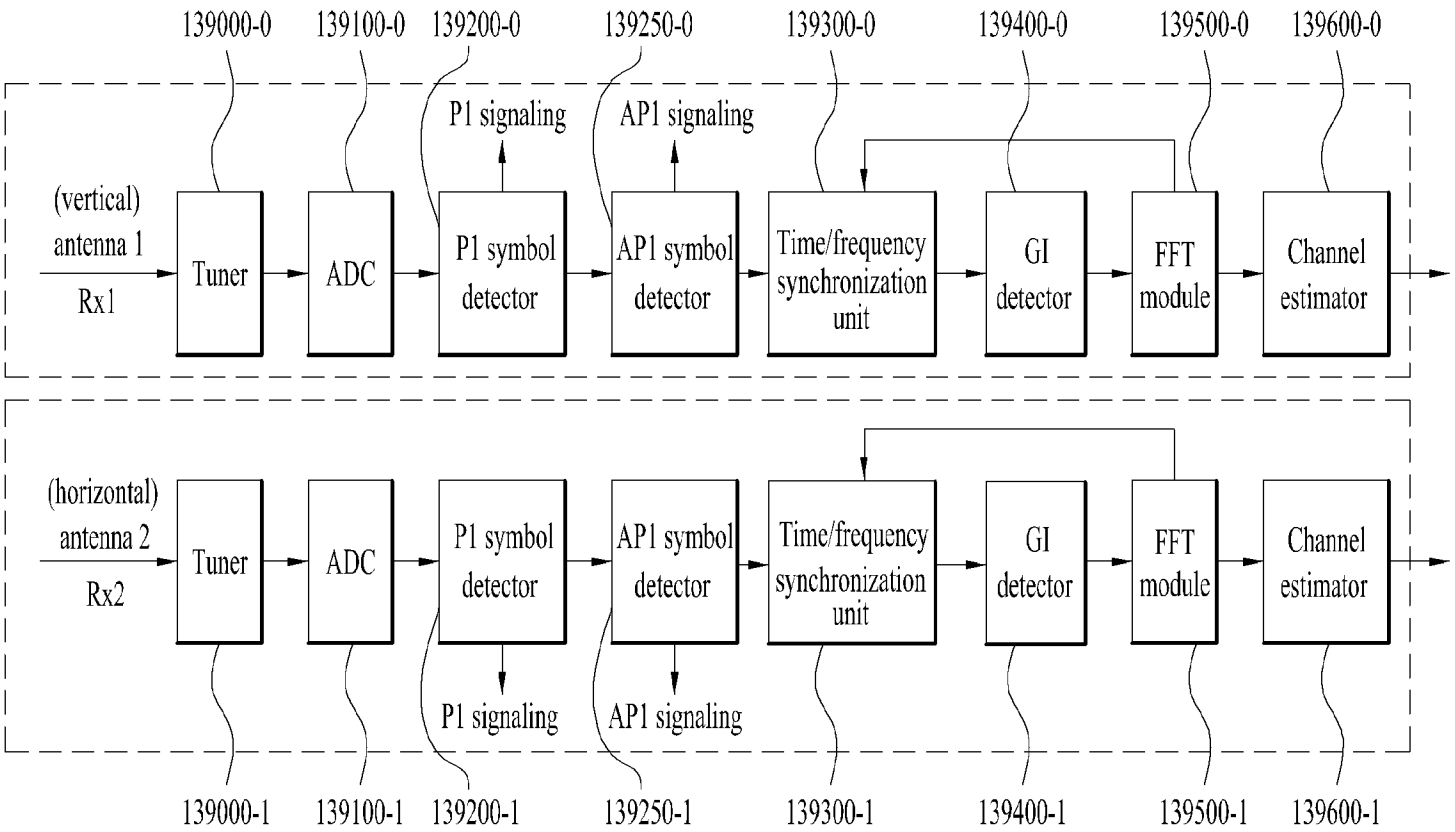
FIG. 20 illustrates a block diagram showing an OFDM demodulator according to an embodiment of the present invention.

FIG. 20 illustrates a block diagram showing an exemplary structure of an OFDM demodulator (131800) of the broadcast signal receiving apparatus. More specifically, the OFDM demodulator of FIG. 20 performs an inverse process of the OFDM generator of FIG. 18. According to the embodiment of the present invention, in order to receive a broadcast signal, which is transmitted by using a MIMO or MISO, two reception antennae (Rx1, Rx2) are used. An embodiment according to the present invention according uses a polarity multiplexing MIMO method.

The OFDM demodulator (138100) of FIG. 20 includes a first receiving unit configured to perform OFDM demodulation on a signal, which is received through the first reception antenna (Rx1), and a second receiving unit configured to perform OFDM demodulation on a signal, which is received through the second reception antenna (Rx2).

The first receiving unit may include a tuner (139000-0), an ADC (139100-0), a P1 symbol detector (139200-0), an AP1 symbol detector (139250-0), a time/frequency synchronization unit (139300-0), a GI remover (139400-0), an FFT module (139500-0), and a channel estimator (139600-0). And, the second receiving unit may include a tuner (139000-1), an ADC (139100-1), a P1 symbol detector (139200-1), an AP1 symbol detector (139250-1), a time/frequency synchronization unit (139300-1), a GI remover (139400-1), an FFT module (139500-1), and a channel estimator (139600-1). And, since the operations of the blocks included in the second receiving unit are identical to those of the blocks included in the first receiving unit, the detailed description of the same will be omitted for simplicity.

The tuner (139000-0) of the first receiving unit may select only a signal of a desired (or wanted) frequency band. Also, according to the embodiment of the present invention, in order to be applied to the TFS system, the tuner (139000-0) may have an FH (Frequency Hopping) function. The ADC (139100-0) converts the analog broadcasting signal, which is inputted through a first path (e.g., V-path), to a digital broadcasting signal.

The P1 symbol detector (139200-0) detects a P1 symbol from the digital broadcast signal, and the P1 symbol detector (139200-0) then uses P1 signaling information, which is carried by the P1 symbol, so as to determine the frame structure of the currently received signal. The AP1 symbol detector (139250-0) may detect and decode an AP1 symbol, which transmits the AP1 signaling information included in the digital broadcasting signal, so as to gain pilot pattern information of the current signal frame. Herein, the detection and decoding of the P1 symbol and the AP1 symbol may be performed by the P1 symbol detector (139200-0), and, in this case, the AP1 symbol detector (139250-0) may be omitted.

The time/frequency synchronization unit (139300-0) uses at least one of the P1 signaling information and the AP1 signaling information so as to perform GI extraction and time synchronization and carrier frequency synchronization.

The GI remover (139400-0) removes the GI from the synchronized signal, and the FFT module (139500-0) converts the GI-removed signal to a frequency domain signal.

The channel estimator (139600-0) uses a pilot signal being inserted in the frequency domain signal, so as to estimate a transmission channel starting from a transmission antenna to a reception antenna. The channel estimator (139600-0) performs channel equalization compensating for a distortion in a transmission channel based on the estimated transmission channel. The channel equalization is optional.

Figure 21:
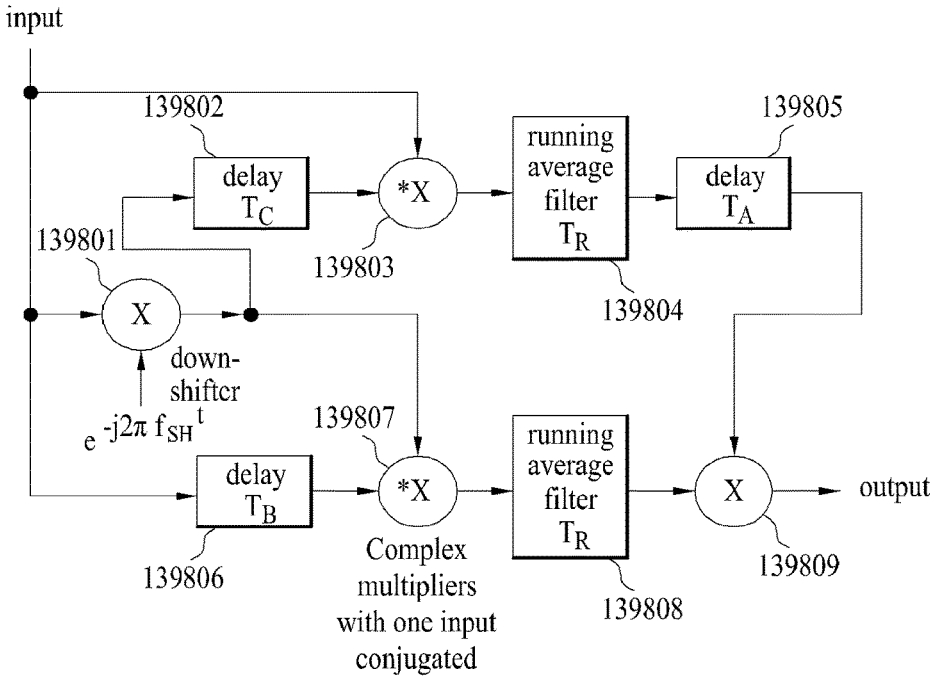
FIG. 21 illustrates a block diagram showing a P1 symbol detector according to an embodiment of the present invention.

FIG. 21 illustrates an exemplary structure of any one of the P1 symbol detectors (139200-0, 139200-1) according to an embodiment of the present invention. Herein, the P1 symbol detectors (139200-0, 139200-1) may also be referred to as a C-A-B preamble detector.

The present invention will describe the P1 symbol detector (139200-0) of the first receiving unit. An operation description of the P1 symbol detector (139200-1) of the second receiving unit refers to that of the P1 symbol detector (139200-0) of the first receiving unit.

More specifically, the signal that is converted to a digital signal from the ADC (139100-0) may be inputted to a down shifter (139801), a $1^{st}$ conjugator (139803), and a $2^{nd}$ delayer (139806) of the P1 symbol detector (139200).

The down shifter (139801) performs inverse modulation by multiplying $$e^{-j2\pi f_{SH}t}$$

by the input signal. When inverse modulation is performed by the down shifter (139801), the signal being frequency-shifted and inputted is recovered to the original signal. The inverse modulated signal may be outputted to a $1^{st}$ delayer (139802) and a $2^{nd}$ conjugator (139807).

The $1^{st}$ delayer (139802) delays the inverse-modulated signal by a length of part C ($T_C$) and then outputs the delayed signal to the $1^{st}$ conjugator (139803). The $1^{st}$ conjugator (139803) performs complex-conjugation on the signal, which is delayed by a length of part C ($T_C$). Then, the $1^{st}$ conjugator (139803) multiplies the input signal by the complex-conjugated signal, thereby outputting the processed signal to a $1^{st}$ filter (139804). The $1^{st}$ filter (139804) uses a running average filter having the length of $T_R=T_A$, so as to remove (or eliminate) any excessively and unnecessarily remaining modulation elements, thereby outputting the processed signal to a $3^{rd}$ delayer (139805). The $3^{rd}$ delayer (139805) delays the filtered signal by a length of part A (i.e., effective (or valid) symbol) ($T_A$), so as to output the delayed signal to a multiplier (139809).

The $2^{nd}$ delayer (139806) delays the input signal by a length of part B ($T_B$) and then outputs the delayed signal to the $2^{nd}$ conjugator (139807). The $2^{nd}$ conjugator (139807) performs complex-conjugation on the signal, which is delayed by a length of part B ($T_B$). Then, the 2nd conjugator (139807) multiplies the complex-conjugated signal by an inverse-modulated signal, thereby outputting the processed signal to a $2^{nd}$ filter (139808). The $2^{nd}$ filter (139808) uses a running average filter having the length of $T_R=T_A$, so as to remove (or eliminate) any excessively and unnecessarily remaining modulation elements, thereby outputting the processed signal to the multiplier (139809).

The multiplier (139809) multiplies the output of the $2^{nd}$ filter (139809) by a signal, which is delayed by a length of part A ($T_A$). Thus, a P1 symbol may be detected from each signal frame of the received broadcast signal.

Herein, the length of part C ($T_C$) and the length of part B ($T_B$) may be obtained by applying Equation 11 shown above.

Figure 22:
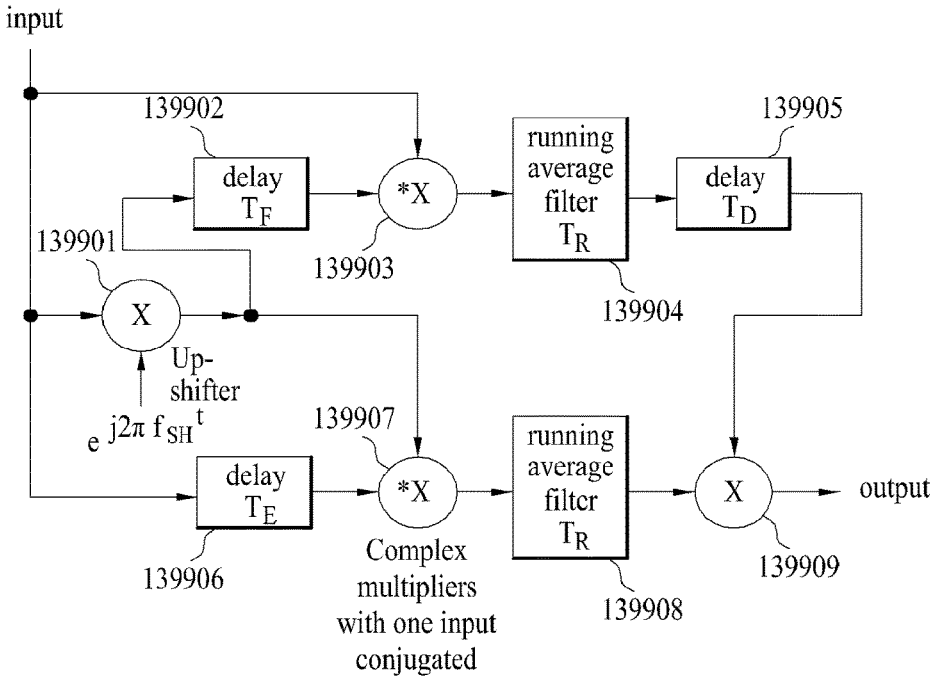
FIG. 22 illustrates a block diagram showing an AP1 symbol detector according to an embodiment of the present invention.

FIG. 22 illustrates an exemplary structure of any one of the AP1 symbol detectors (139250-0, 139250-1) according to an embodiment of the present invention. Herein, the AP1 symbol detectors (139250-0, 139250-1) may also be referred to as an F-D-E preamble detector.

The present invention will describe the AP1 symbol detector (139250-0) of the first receiving unit. An operation description of the AP1 symbol detector (139250-1) of the second receiving unit refers to that of the AP1 symbol detector (139250-0) of the first receiving unit.

More specifically, the signal that is converted to a digital signal from the ADC (139100-0) or a signal that is outputted from the P1 symbol detector (139200) may be inputted to an up-shifter (139901), a $1^{st}$ conjugator (139903), and a $2^{nd}$ delayer (139906) of the AP1 symbol detector (139250-0).

The up-shifter (139901) performs inverse modulation by multiplying $$e^{j2\pi f_{SH}t}$$

by the input signal. When inverse modulation is performed by the up-shifter (139901), the signal being frequency-shifted and inputted is recovered to the original signal. More specifically, the up-shifter (139901) of FIG. 22 has the same structure as the down-shifter (139801) of the P1 symbol detector (139200). However, the frequency direction of each inverse modulation process is completely opposite to one another. The signal that is inverse modulated by the up-shifter (139901) may be outputted to a $1^{st}$ delayer (139902) and a $2^{nd}$ conjugator (139907).

The $1^{st}$ delayer (139902) delays the inverse-modulated signal by a length of part F ($T_E$) and then outputs the delayed signal to the $1^{st}$ conjugator (139903). The $1^{st}$ conjugator (139903) performs complex-conjugation on the signal, which is delayed by a length of part F ($T_F$). Then, the $1^{st}$ conjugator (139903) multiplies the input signal by the complex-conjugated signal, thereby outputting the processed signal to a $1^{st}$ filter (139904). The $1^{st}$ filter (139904) uses a running average filter having the length of $T_R=T_D$, so as to remove (or eliminate) any excessively and unnecessarily remaining modulation elements, thereby outputting the processed signal to a $3^{rd}$ delayer (139905). The $3^{rd}$ delayer (139905) delays the filtered signal by a length of part D (i.e., effective (or valid) symbol) ($T_D$), so as to output the delayed signal to a multiplier (139909).

The $2^{nd}$ delayer (139906) delays the input signal by a length of part E ($T_E$) and then outputs the delayed signal to the $2^{nd}$ conjugator (139907). The $2^{nd}$ conjugator (139907) performs complex-conjugation on the signal, which is delayed by a length of part E ($T_E$). Then, the $2^{nd}$ conjugator (139907) multiplies the complex-conjugated signal by an inverse-modulated signal, thereby outputting the processed signal to a $2^{nd}$ filter (139908). The $2^{nd}$ filter (139908) uses a running average filter having the length of $T_R=T_D$, so as to remove (or eliminate) any excessively and unnecessarily remaining modulation elements, thereby outputting the processed signal to the multiplier (139909).

The multiplier (139909) multiplies the output of the $2^{nd}$ filter (139909) by a signal, which is delayed by a length of part D ($T_D$). Thus, an AP1 symbol may be detected from each signal frame of the received broadcast signal. Herein, the length of part F ($T_F$) and the length of part E ($T_E$) may be obtained by applying Equation 11 shown above.

Figure 23:
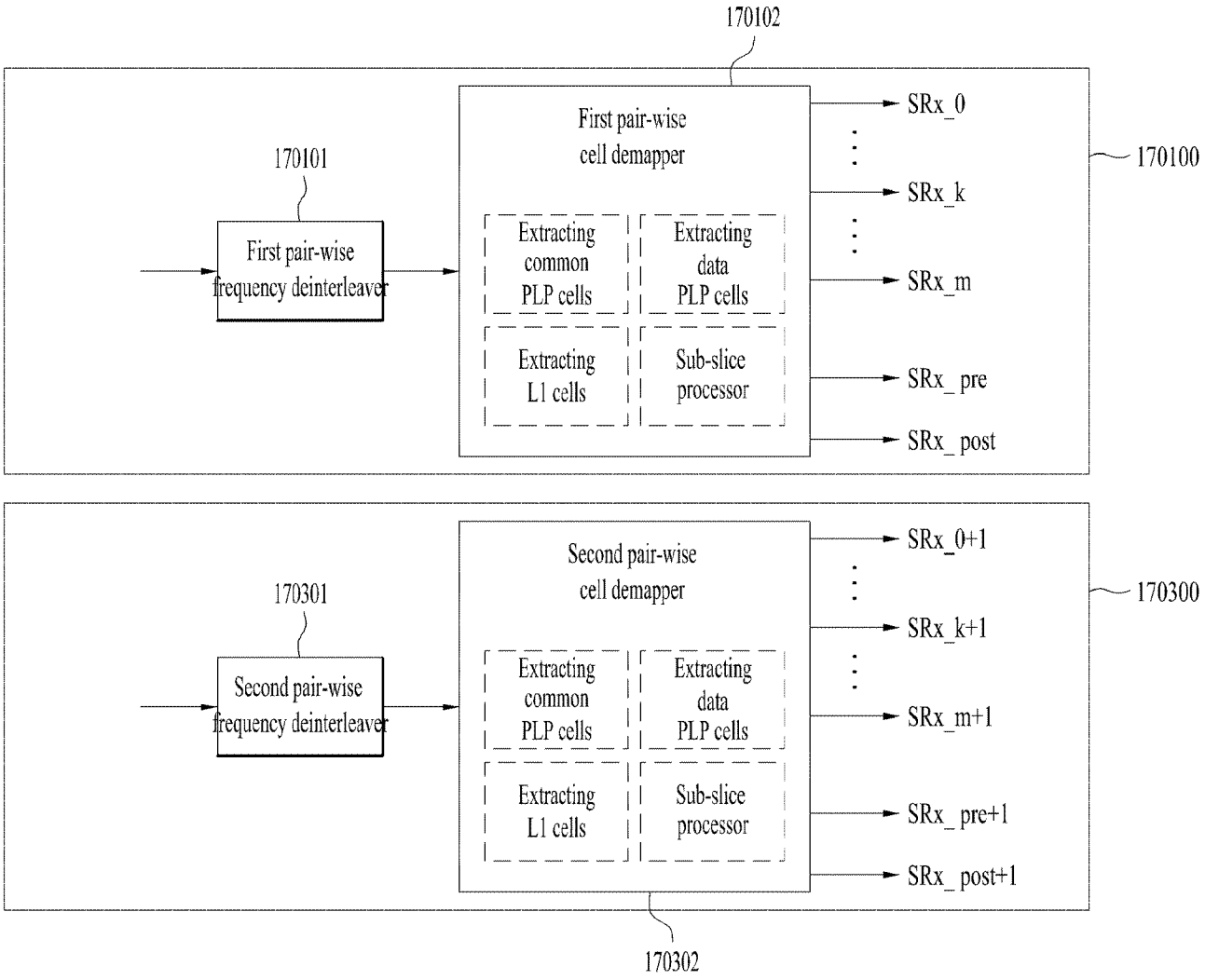
FIG. 23 illustrates a block diagram showing a frame demapper according to an embodiment of the present invention.

FIG. 23 illustrates an exemplary frame demapper (138200) of the broadcasting signal receiving apparatus according to an embodiment of the present invention.

According to the embodiment of the present invention, the frame demapper (138200) performs an inverse process of the frame builder (100300) of the broadcasting signal transmitting apparatus shown in FIG. 17.

The frame demapper of FIG. 23 includes a first frame demapping block (170100) for processing data that are inputted through a first path, and a second frame demapping block (170300) for processing data that are inputted through a second path. The first frame demapping block (170100) includes a first pair-wise frequency deinterleaver (170101) and a first pair-wise cell demapper (170102), and the second frame demapping block (170300) includes a second pair-wise frequency deinterleaver (170301) and a second pair-wise cell demapper (170302).

Additionally, the first pair-wise frequency deinterleaver (170101) and the first pair-wise cell demapper (170102) and the second pair-wise frequency deinterleaver (170301) and the second pair-wise cell demapper (170302) may perform the same operations with respect to the first path and the second path and may also independently perform the respective operations.

The data processing method of the blocks included in each of the first frame demapping block (170100) and the second frame demapping block (170300) will hereinafter be described in detail.

The first pair-wise frequency deinterleaver (170101) and the second pair-wise frequency deinterleaver (170301) performs deinterleaving on the data being respectively inputted through the first path and the second path in cell units and in the respective frequency domain. In this case, the first pair-wise frequency deinterleaver (170101) and the second pair-wise frequency deinterleaver (170301) groups 2 consecutive cells in pairs, thereby processing each pair of cells as a single deinterleaving unit and performing frequency deinterleaving. The deinterleaving procedure may be performed as an inverse process of the interleaving procedure performed by the transmitting unit. And, the frequency deinterleaved data are recovered by the initial data order, thereby being outputted.

The first pair-wise cell demapper (170102) and the second pair-wise cell demapper (170302) may extract common PLP data, PLP data, and L1 signaling information in cell units from the deinterleaved data. The extracted PLP data may include MISO PLP data, wherein the MISO method is to be applied, and MIMO PLP data, wherein the MIMO method is to be applied. And, the extracted L1 signaling information may include information on the current transmission frame and information on the next transmission frame. Additionally, if sub-slicing has been performed on the PLP data by the transmitter, the first pair-wise cell demapper (170102) and the second pair-wise cell demapper (170302) may merge the sub-sliced PLP data, so as to generate a single stream.

Moreover, the first pair-wise cell demapper (170102) and the second pair-wise cell demapper (170302) may group 2 consecutive cell in pairs and may then perform extraction.

The data being processed with cell demapping by the first pair-wise cell demapper (170102) may be inputted to the BICM decoder through a first path (from SRx_0 to SRx_post), and the data being processed with cell demapping by the second pair-wise cell demapper (170302) may be outputted to the BICM decoder through a second path (from SRx_0+1 to SRx_post+1).

Figure 24:
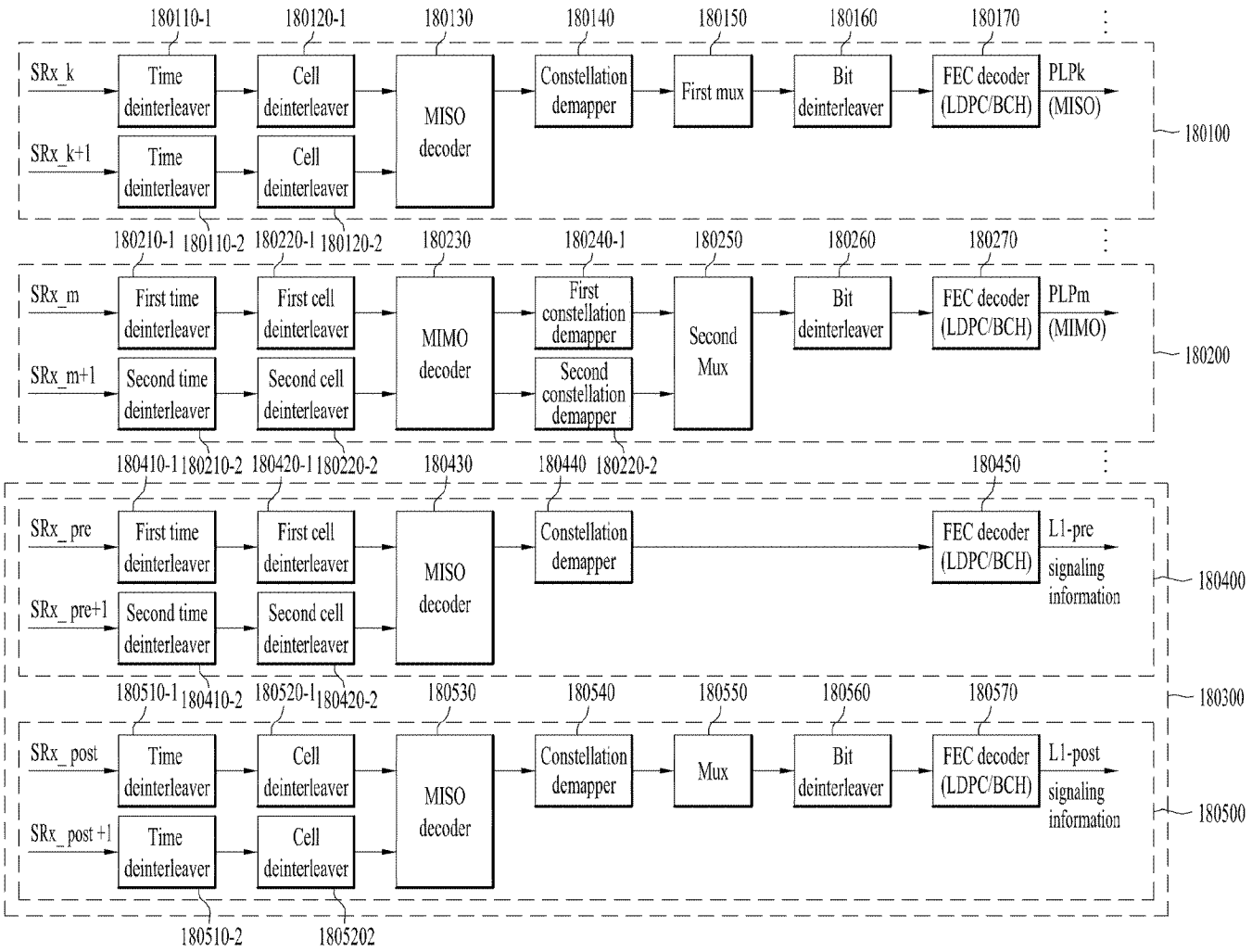
FIG. 24 illustrates a block diagram showing a BICM decoder according to an embodiment of the present invention.

FIG. 24 illustrates a BICM decoder according to a first exemplary embodiment of the present invention.

The BICM decoder according to the first embodiment of the present invention receives data being outputted from the frame demapper through a first path (SRx_0~SRx_post) and data being outputted from the frame demapper through a second path (SRx_0+1~SRx_post+1) and then performs BICM decoding on the received data.

Additionally, the BICM decoder according to the first embodiment of the present invention may independently adopt the MISO method or the MIMO method on the data being inputted from each path.

More specifically, the BICM decoder of FIG. 24 may include a first BICM decoding block (180100) receiving MISO PLP data through 2 paths (SRx_k, SRx_k+1) and processing the received data, a second BICM decoding block (180200) receiving MIMO PLP data through 2 paths (SRx_m, SRx_m+1) and processing the received data, and a third BICM decoding block (180300) receiving signaling data through 4 paths (SRx_pre, SRx_pre+1 and SRx_post, SRx_post+1) and processing the received data.

Additionally, the BICM decoder according to the first embodiment of the present invention may perform inverse process of the BICM encoder according to the first embodiment of the present invention shown in FIG. 15.

The data processing method of each block will hereinafter be described in detail.

First of all, the first BICM decoding block (180100) may include a time de-interleaver (180110-1, 180100-2), a cell de-interleaver (180120-1, 180120-2), a MISO decoder (180130), a constellation demapper (180140), a first MUX (180150), a bit de-interleaver (180160), and an FEC decoder (180170).

The time de-interleaver (180110-1,180100-2) performs time domain de-interleaving (or time de-interleaving) on the inputted data, so as to return (or recover) the corresponding data to the initial location, and the cell de-interleaver (180120-1, 180120-2) performs de-interleaving in cell units on the time de-interleaved data.

The MISO decoder (180130) performs MISO decoding on the MISO PLP data. The MISO decoder (180130) according to the present invention may perform 4 different operations. Each operation will hereinafter be described in detail.

Firstly, when the channel estimator (139600-0,139600-1) included in the OFDM demodulator, which is described with reference to FIG. 20, does not perform channel equalization, the MISO decoder (180130) may calculate the LLR value after applying a channel estimation effect on all reference points available for transmission. Accordingly, the same effect as channel equalization may be gained.

Secondly, the MISO decoder (180130) may perform the following operations in accordance with the operations of the constellation mapper (132140), which is included in the BICM encoder of the broadcast signal transmitter shown in FIG. 15. When the constellation mapper (132140), which is included in the BICM encoder of the broadcast signal transmitter, rotates the constellation by a predetermined angle and delays only the Q-phase element of the constellation by an arbitrary (or random) value, the MISO decoder (180130) may delay only the I-phase element of the constellation by an arbitrary (or random) value and may then calculate a 2D-LLR value based upon the rotation angle of the constellation.

If the constellation mapper (132140), which is included in the BICM encoder of the broadcast signal transmitter, does not rotate the constellation and does not delay only the Q-phase element of the constellation by an arbitrary (or random) value, the MISO decoder (180130) may calculate the 2-D LLR value based upon a normal QAM.

Thirdly, the MISO decoder (180130) may select a decoding matrix, so that an inverse process can be performed in accordance with the encoding matrix used in the MISO encoder (132150), which is included in the BICM encoder of the broadcast signal transmitter, and, then, the MISO decoder (180130) may perform MISO decoding.

Finally, the MISO decoder (180130) may combine the signals that are inputted through two reception antennae. The signal combining method according to the present invention may include maximum ratio combining, equal gain combining, selective combining, and so on, and, by maximizing the SNR of the combined signals, the MISO decoder (180130) may gain a diversity effect.

Additionally, the MISO decoder (180130) may perform MISO decoding on a signal being processed with signal combining, and, after performing MISO decoding respective to the input of the two antennae, the MISO decoder (180130) may combine the MISO-decoded signals.

The constellation demapper (180140) may perform the following functions in accordance with the operation of the MISO decoder (180130).

First of all, when the MISO decoder (180130) performs only MISO decoding and does not directly output any LLR value, the constellation demapper (180140) may calculate the LLR value. More specifically, this will hereinafter be described in more detail. When the constellation mapper (132140), which is included in the BICM encoder of the broadcast signal transmitter shown in FIG. 15, performs constellation rotation and Q-phase element delay, the constellation demapper (180140) may calculate the LLR value after delaying the I-phase element. If the constellation mapper (132140), which is included in the BICM encoder of the broadcast signal transmitter, does not perform constellation rotation and Q-phase element delay, the constellation demapper (180140) may calculate the LLR value based upon a normal QAM.

A method for calculating the LLR value may include a method for calculating a 2-D LLR and a method for calculating a 1-D LLR. In case of calculating the 1-D LLR value, any one of the input through the first path and the input through the second path may be performed, thereby reducing the complexity in the LLR calculation.

The first MUX (180150) may recover the demapped data to a bit stream format.

The bit deinterleaver (180160) may perform deinterleaving on the inputted bit stream, and the FEC decoder (180170) may perform FEC decoding on the data, which are processed with deinterleaving, so as to correct any error occurring within the transmission channel (or transport channel), thereby outputting the MISO PLP data.

The second BICM decoding block (180200) may include a first time deinterleaver (180210-0) and a second time deinterleaver (180210-1), a first cell deinterleaver (180220-0) and a second cell deinterleaver (180220-1), a MIMO decoder (180230), a first constellation demapper (180240-0) and a second constellation demapper (180240-1), a second MUX (180250), a bit deinterleaver (180260), and an FEC decoder (180270).

The first time deinterleaver (180210-0) and the second time deinterleaver (180210-1) perform time domain deinterleaving on the input data in cell units, thereby recovering the original (or initial) data. In this case, among the data being inputted through each path, the first time deinterleaver (180210-0) and the second time deinterleaver (180210-1) may perform cell deinterleaving only on the data corresponding to half the size of the cell included in an FEC block. As a result, cell de-interleaving process performed by the first time deinterleaver (180210-0) and the second time deinterleaver (180210-1) may have the same effect as the deinterleaving process of a deinterleaver using a single FEC block.

The MIMO decoder (180230) may perform MIMO decoding on cell-interleaved data, which are received through 2 paths (SRx_m, SRx_m+1). With the exception for the fourth operation, i.e., the signal combining operation, among the above-described 4 different operations of the MISO decoder (180110), the MIMO decoder (180230) may perform the same operations as the MISO decoder (180110). At this point, the MIMO decoder (180210) may perform decoding by using the above-described MIMO decoding matrix.

The first constellation demapper (180240-0), the second constellation demapper (180240-1), the second MUX (180250), the bit deinterleaver (180260), and the FEC decoder (180270) may perform the same functions as the above-described MISO method.

The third BICM decoding block (180300) may include a first decoding block (180400) for processing L1 pre-signaling data and a second decoding block (180500) for processing L1 post-signaling data. The first decoding block (180400) may include a time deinterleaver (180410-1, 180410-2), a cell deinterleaver (180420-1, 180420-2), a MISO decoder (180430), a constellation demapper (180440), and an FEC decoder (180450), and the second decoding block (180500) may include a time deinterleaver (180510-1, 180510-1), a cell deinterleaver (180520-1, 180520-2), a MISO decoder (180530), a constellation demapper (180540), a MUX (180550), a bit deinterleaver (180560), and an FEC decoder (180570).

Hereinafter, since the functions of each block included in the first decoding block (180400) and the second decoding block (180500) are identical to the functions of each block included in the first BICM decoding block (180100), detailed description of the same will be omitted for simplicity.

As a result, the first BICM decoding block (180100) may output PLP data, which are processed with BICM decoding including MIMO decoding, to an output processor, and the second BICM decoding block (180200) may output PLP data, which are processed with BICM decoding including MIMO decoding, to an output processor.

Additionally, the first decoding block (180400), which is included in the third BICM decoding block (180300), may perform MISO decoding on L1 pre-signaling data, so as to output L1 pre-signaling information. Also, the second decoding block (180500), which is included in the third BICM decoding block (180300), may perform MISO decoding on L1 post-signaling data, so as to output L1 post-signaling information.

As described above, in the BICM decoder according to the first embodiment of the present invention, since the MISO/MIMO decoder is located between the cell deinterleaver and the first and second constellation demappers, by performing MISO/MIMO decoding after performing all of the time deinterleaving and cell deinterleaving processes in symbol units, the memory complexity in the broadcast signal receiver may be reduced.

Figure 25:
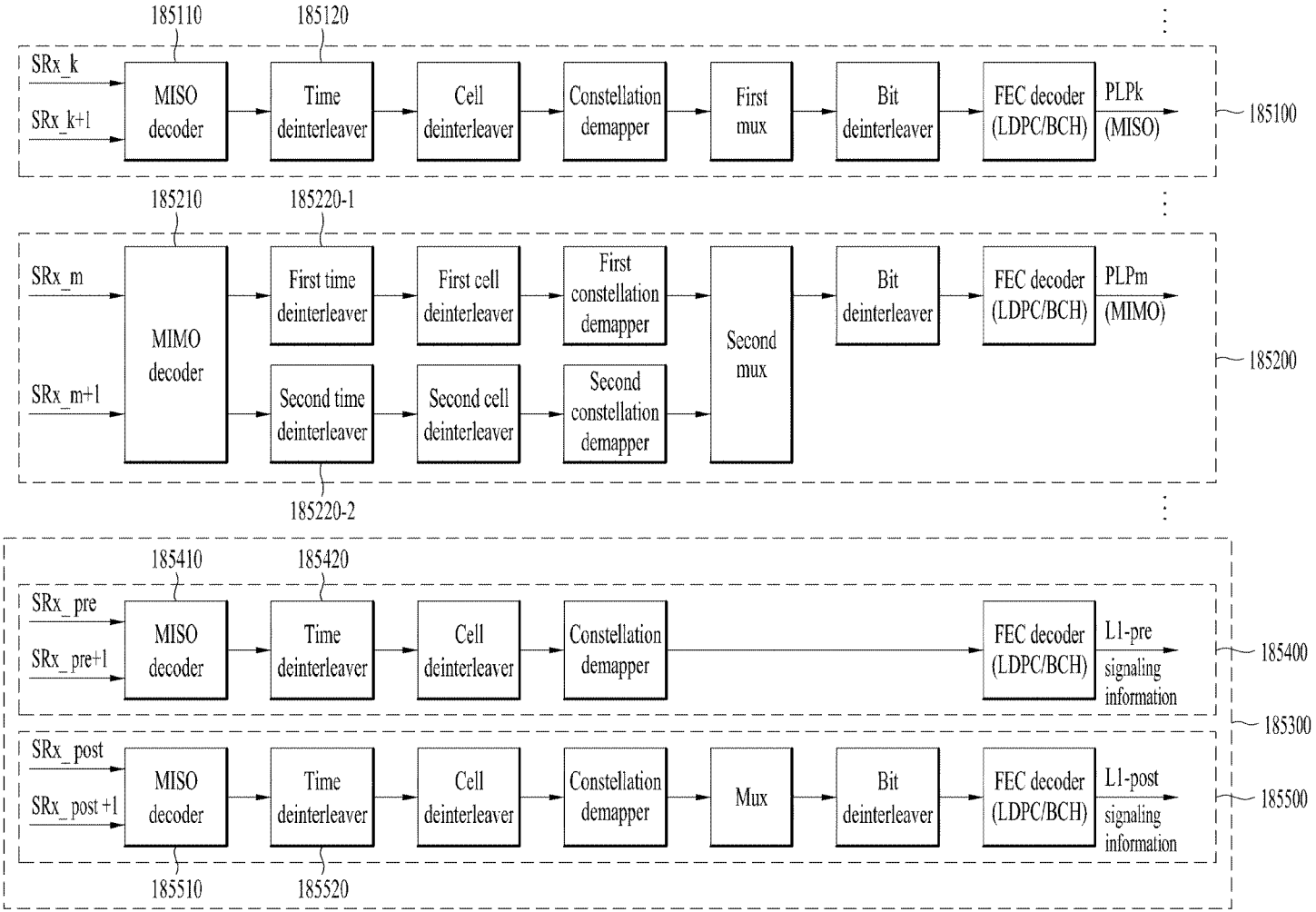
FIG. 25 illustrates a block diagram showing a BICM decoder according to another embodiment of the present invention.

FIG. 25 illustrates a BICM decoder according to a second exemplary embodiment of the present invention.

The BICM decoder according to the second embodiment of the present invention receives data being outputted from the frame demapper through a first path (SRx_0~SRx_post) and data being outputted from the frame demapper through a second path (SRx_0+1~SRx_post+1) and then performs BICM decoding on the received data. Additionally, the BICM decoder according to the second embodiment of the present invention may independently adopt the MISO method or the MIMO method on the data being inputted from each path.

More specifically, the BICM decoder of FIG. 25 may include a first BICM decoding block (185100) receiving MISO PLP data that are to be MISO-decoded through 2 paths (SRx_k, SRx_k+1) and processing the received data, a second BICM decoding block (185200) receiving MIMO PLP data that are to be MIMO-decoded through 2 paths (SRx_m, SRx_m+1) and processing the received data, and a third BICM decoding block (185300) receiving signaling data that are to be MISO-decoded through 4 paths (SRx_pre, SRx_pre+1 and SRx_post, SRx_post+1) and processing the received data.

Additionally, the third BICM decoding block (185300) may include a first decoding block (185400) for processing L1 pre-signaling data and a second decoding block (185500) for processing L1 post-signaling data.

Furthermore, the BICM decoder according to the second exemplary embodiment of the present invention may perform inverse processes of the BICM encoder according to the second exemplary embodiment of the present invention, which is shown in FIG. 16.

Since the BICM decoding blocks according to the second embodiment of the present invention perform the same operations as the BICM decoding blocks according to the first embodiment of the present invention, detailed description of the same will be omitted for simplicity. However, the difference between the BICM decoder according to the second embodiment of the present invention is different from the BICM decoder of the first embodiment of the present invention in that the MISO decoders (185110, 185410,185510) and the MIMO decoder (185210) according to the second embodiment of the present invention are located before (or in front of) the time deinterleaver (185120, 185220-1, 185220-2, 015420, 185520).

As described above, the PLP data or signaling data in the broadcast signal transmitter may be processed in symbol units after being mapped to the constellation. Additionally, the broadcast signal receiver may perform BICM decoding on the received data inverse processes respective to the BICM encoding blocks according to the first or second embodiment of the present invention. In this case, the MISO decoder, MIMO decoder, time deinterleaver, and cell deinterleaver of the broadcast signal receiver may process the received data in symbol units. However, since the BICM decoder of the broadcast signal receiver according to the second embodiment of the present invention may first perform MISO decoding or MIMO decoding on each set of data before performing any other processes, each set of data are outputted in bit units. Thereafter, the BICM decoder of the broadcast signal receiver may perform time deinterleaving and cell deinterleaving processes. However, information respective to the symbol units of the data, which are outputted in bit units, is required. Therefore, the broadcast signal receiver may store information on symbol mapping of the input bits required for the deinterleaving process.

As a result, the first BICM decoding block of FIG. 24 or FIG. 25 outputs the PLP data, which are processed with MISO decoding, error correction, and so on, to an outer processor, and the second BICM decoding block outputs the PLP data, which are processed with MIMO decoding, error correction, and so on, to an output processor. Additionally, the third BICM decoding block outputs L1 pre-signaling data and L1 post-signaling data, which are processed with MISO decoding, error correction, and so on, to an output processor.

Although it is not shown in the drawing, the BICM decoder according to the third embodiment of the present invention may include a first decoding block receiving MISO-decoded MISO PLP data through one path and processing the received data, a second decoding block receiving MIMO-decoded MIMO PLP through 2 paths and processing the received data, and a third BICM decoding block receiving MISO-decoded L1 -signaling data through 2 paths and processing the received data. Additionally, the third BICM decoding block may include a first decoding block for processing L1 pre-signaling data and a second decoding block for processing L1 post-signaling data.

The BICM decoding blocks according to the third embodiment of the present invention perform the same functions as the BICM decoding blocks according to the first exemplary embodiment of the present invention shown in FIG. 24. However, the difference between the BICM decoding blocks of the third exemplary embodiment of the present invention and the BICM decoding blocks of the first exemplary embodiment of the present invention is that the BICM decoding blocks of the third exemplary embodiment of the present invention do not include the MISO decoder and the MIMO decoder.

Moreover, the BICM encoder according to the fourth exemplary embodiment of the present invention may include a first BICM decoding block processing MISO PLP data through 1 path, a second BICM decoding block receiving and processing MIMO PLP data through 2 paths, and a third BICM decoding block receiving and processing MISO-decoded L1 -signaling data through 2 paths.

Additionally, the third BICM decoding block may include a first decoding block for processing L1 pre-signaling data and a second decoding block for processing L1 post-signaling data.

The first BICM decoding and the third decoding block according to the fourth embodiment of the present invention perform the same operations as the BICM decoding blocks shown in FIG. 24.

However, the second BICM decoding block according to the fourth embodiment of the present invention is different from that of the third embodiment of the present invention in that the second BICM decoding block of the fourth embodiment of the present invention includes an MIMO decoder. In this case, the transmission characteristic of the MIMO PLP data, which are inputted to the MIMO decoder through 2 paths, may either be identical or may be different. If a modulation order of the MIMO PLP data, which are being inputted through 2 paths, is the same, the second time deinterleaver, the second cell deinterleaver, and the second constellation demapper may not be used. Therefore, after merging the 2 sets of MIMO PLP data as a single input and inputting the merged input to the first time deinterleaver, the processed data may be inputted to the second MUX after passing through the first cell deinterleaver and the first constellation mapper. Additionally, the MIMO decoder may be located in front of the time deinterleaver, as shown in the first embodiment of the present invention, or the MIMO decoder may be located in front of the constellation demapper, as shown in the second embodiment of the present invention.

Figure 26:
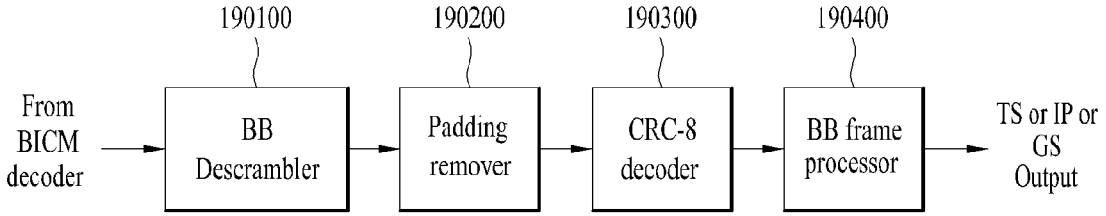
FIG. 26 illustrates a block diagram showing an output processor according to an embodiment of the present invention.

FIG. 26 illustrates an exemplary output processor (138300) of the broadcasting signal receiving apparatus according to an embodiment of the present invention.

FIG. 26 shows an exemplary embodiment of the output processor (138300) corresponding to a case when 1 output stream is used (or when 1 PLP input is used), wherein the output processor (138300) performs the inverse processes of the input processor (100100) and the input pre-processor (100000).

When 1 output stream is used, the output processor may include a BB descrambler (190100), a padding remover (190200), a CRC-8 decoder (190300), and a BB frame processor (190400).

The BB descramble (190100) descrambles the inputted bit stream. More specifically, the BB descrambler (190100) performs an XOR operation of the bit stream, which is identically generated as the PRBS processed by the BB scrambler (110500) shown in FIG. 12, and an input bit stream, thereby performing descrambling. When required, the padding remover (190200) removes the padding bit, which is inserted by the broadcasting signal transmitting apparatus. The CRC-8 decoder (190300) performs CRC decoding on the inputted bit stream, and the BB frame processor may first decode the information included in the BB frame header. Then, the CRC-8 decoder (190300) may use the decoded information, so as to recover the TS/IP/GS stream and output the recovered stream.

Figure 27:
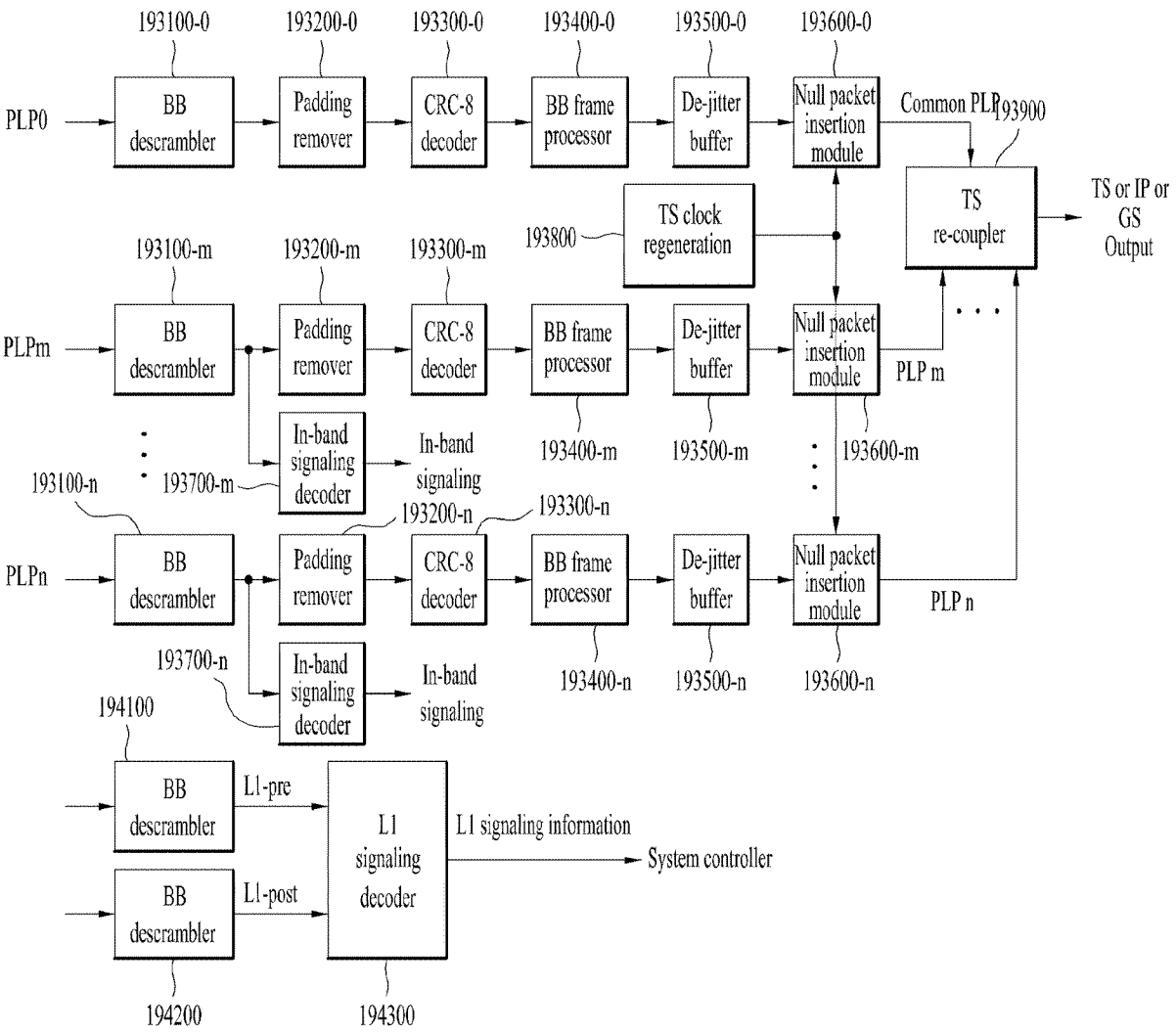
FIG. 27 illustrates a block diagram showing an output processor according to another embodiment of the present invention.

FIG. 27 illustrates an exemplary output processor (138300) of the broadcasting signal receiving apparatus according to another embodiment of the present invention.

FIG. 27 illustrates an example of an output processor (138300) according to an embodiment of the present invention corresponding to a case when multiple output streams are used, i.e., when multiple PLPs are received. Herein, the output processor shown herein is similar to the inverse process of the input processor (100100) of FIG. 13 and FIG. 14 and the input pre-processor (100000) of FIG. 9. When components configuring a service are each received by a different PLP, the output processor (138300) of FIG. 27 is adequate for configuring a single service by extracting the components from each PLP.

The output processor include a PLP output processing block for processing PLP data and a signaling processing block for processing signaling data.

The PLP output processing block may include n+1 number of BB descramblers (193100-0~n) for processing n number of PLPs, n+1 number of padding removers (193200-0~n), n+1 number of CRC-8 decoders (193300-0~n), n+1 number of BB frame processors (193400-0~n), n+1 number of De-jitter buffers (193500-0~n), n+1 number of null packet inserters (193600-0~n), n-m+1 number of in-band signaling decoders (193700-m~n), a TS clock regenerator (193800), and a TS re-coupler (193900).

If the output stream corresponds to an IP stream or a GSE stream, the CRC-8 decoders (193300-0~n) and the n+1 number of null packet inserters (193600-0~n) may be omitted from the block diagram of FIG. 27, or the corresponding blocks may be bypassed. For example, since the IP packet is buffered to best-fit a time stamp, so as to be reproduced by the receiver, the transmitter is not required to delay the corresponding data, and a null packet is not required to be added/deleted.

Since the operations of each of the BB descramblers (193100-0~n), the padding removers (193200-0~n), the CRC-8 decoders (193300-0~n), and the BB frame processors (193400-0~n) are identical to the operations of the respective blocks shown in FIG. 26, reference may be made to FIG. 26 for the detailed description of the corresponding blocks and, therefore, detailed description of the same will be omitted herein. In the description of FIG. 27, only the portions that are different from the structure shown in FIG. 26 will be described herein.

The de-jitter buffers (193500-0~n) compensates for the delays, which are arbitrarily inserted by the transmitting end for the synchronization between the multiple PLPs, in accordance with a TTO (time to output parameter).

The null packet inserters (193600-0~n) may refer to DNP (deleted null packet) information, which indicate information on the number of deleted null packets, so as to insert the null packets, which are removed by the transmitting end, in the respective positions of the corresponding TS. At this point, the TS clock regenerator (193800) may recover detailed time synchronization of the output packet based upon the ISCR (Input Stream Time Reference).

The TS coupler (193900) may also be referred to as a TS merger and, as described above, the TS coupler (193900) may recover the common PLP, and data PLPs, which are recovered as described above, to the initial TS or IP or GSE stream, and may then output the recovered stream. According to the present invention, TTO, DNP, ISCR information are all included in the BB frame header and transmitted. The in-band signaling decoders (193700-m~n) may recover the in-band signaling information, which is being transmitted through the data PLP, and may then output the recovered information.

For example, it will be assumed herein that a service is configured of a common PLP, a video component PLP, an audio component PLP, and data component PLP through the input pre-processor (100000) the input processor (100100) of the transmitter. Accordingly, the de jitter buffers (193500-0~n) of FIG. 27 may output multiple PLPs to the null packet inserters (193600-0~n), and the null packet inserters (193600-0~n) may refer to DNP information, so as to insert the null packets, which are removed by the transmitting end, in the respective positions of the corresponding TS. Accordingly, a common TS, a video component TS, an audio component TS, and a data component TS, each having the null packets inserted therein may be outputted to the TS coupler (193900). When the TS coupler (193900) merges the valid packets of the common TS, the video component TS, the audio component TS, and the data component TS, a TS configuring a singled service may be outputted.

Meanwhile, the signaling output processing block may include two BB descramblers (194100, 194200) and an L1 signaling decoder (194300).

The BB descrambler (194100) may descramble data corresponding to L1-pre-signaling information and the BB descrambler (194200) may descramble data corresponding to L1-post-signaling information. Moreover, data corresponding to L1 signaling information may be descrambled in a single BB descrambler.

The L1 signaling decoder (194300) decodes the descrambled L1-pre-signaling information and L1-post-signaling information, so as to recover the L1 signaling information. The recovered L1 signaling information includes L1-pre-signaling information and L1-post-signaling information. Additionally, the L1-post-signaling information includes configurable L1-post-signaling information and dynamic L1-post-signaling information.

The L1 signaling information, which is recovered by the L1 signaling decoder (194300) may be delivered to the system controller, so as to provide parameters, which are required by the broadcasting signal receiver for performing operations, such as BICM (Bit Interleaved Coding and Modulation) decoding, frame demapping, OFDM (Orthogonal Frequency Division Multiplex) demodulation, and so on.

Figure 28:
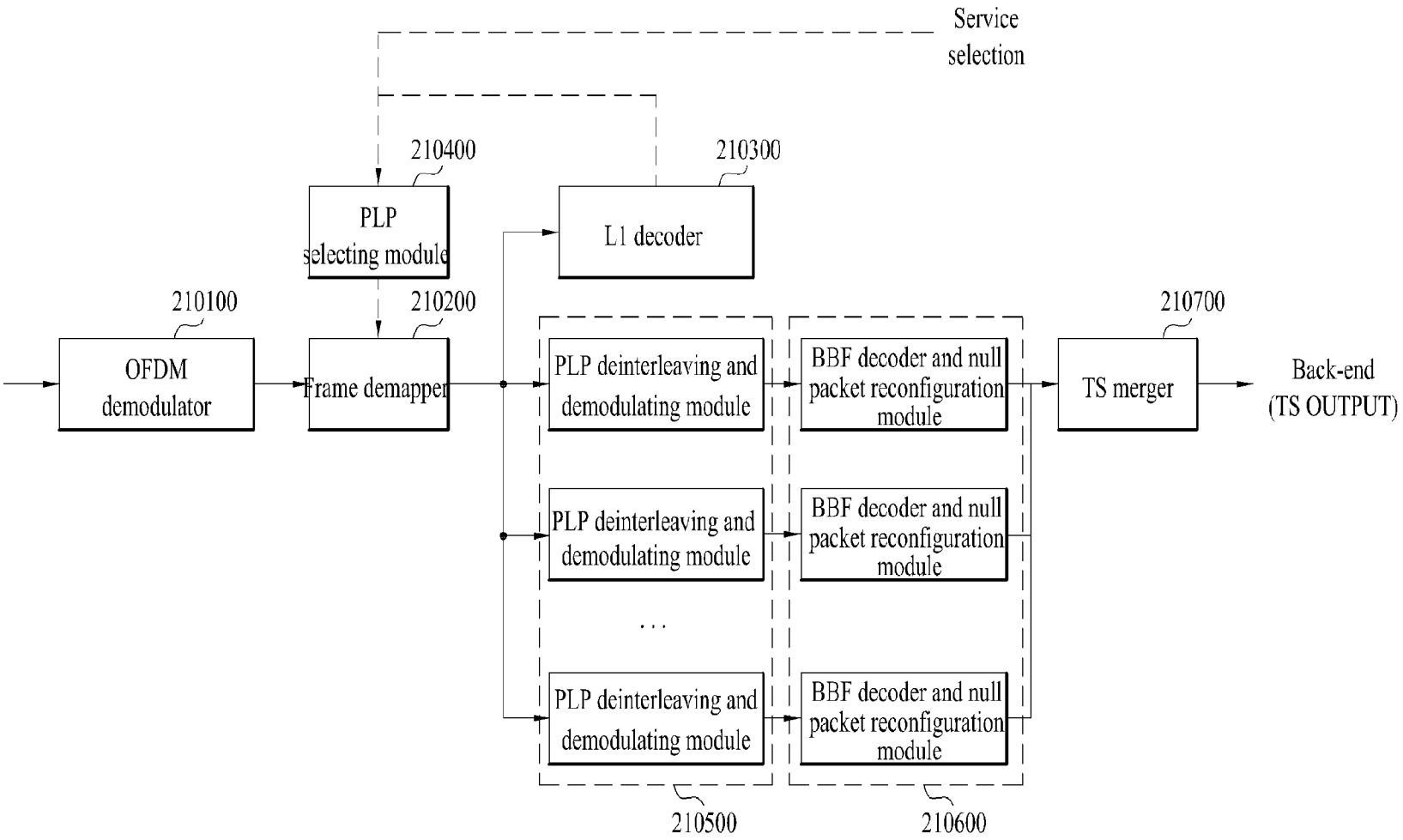
FIG. 28 illustrates a block diagram showing a broadcasting signal receiving apparatus according to another embodiment of the present invention.

FIG. 28 illustrates a block diagram showing a structure of a broadcasting signal receiving apparatus according to yet another embodiment of the present invention. Herein, FIG. 28 corresponds to a block diagram showing the structure of the broadcasting signal receiving apparatus, when the stream type being inputted to the input pre-processor of the transmitter corresponds to the TS format. In case of receiving each of the components configuring a single service through a different PLP, the broadcasting signal receiving apparatus of FIG. 28 is adequate for extracting the components from each PLP, thereby configuring a single service.

In FIG. 28, for the detailed description on the operations of the OFDM demodulator (210100) and the frame demapper (210200), reference may be made to the detailed description on the operations of the above-described OFDM demodulator (138100) and frame demapper (138200), and, therefore, detailed description of the same will be omitted herein.

In FIG. 28, the multiple PLP deinterleaving and demodulator modules (210500), which perform deinterleaving and demodulation on each of the multiple PLPs, perform similar operations as the above-described BICM decoder (138300). And, multiple BBF decoders and null packet reconstruction modules (210600), which output TS by performing BBF (BaseBand Frame) decoding and null packet reconstruction operations, and the TS merger (210700) perform operations that are similar to the operations of the above-described output processor (138400). The L1 decoder (210300) corresponds to the above-described L1 signaling decoder.

In FIG. 28, when a service is selected, the PLP selecting module (210400) controls the frame demapper (210200), so that only the PLP of the components configuring the selected service can be outputted from the frame demapper (210200). Herein, the service selection may be realized by a user's request, or may be automatically realized in the system.

More specifically, the OFDM demodulator (210100) decodes the P1/AP1 signaling information, and the L1 decoder (210600) decodes L1/L2 signaling information, so as to acquire information on a transmission frame structure and information on PLP configuration. According to an embodiment of the present invention, the components configuring a service are received by multiple PLPs. In this case, since PLP information or service information on the component structure is included in the L1 signaling information, the broadcasting receiver may be capable of knowing to which PLPs the components, which configure a service, are included. Accordingly, when a service is selected, the PLP selecting module (210400) controls the frame demapper (210200), and the frame demapper (210200) outputs multiple sets of PLP data including the corresponding components to the selected service. The multiple sets of PLP data are processed with deinterleaving/demodulation processes by the corresponding deinterleaving and demodulator module. And, after the BBF decoding/null packet reconstruction processes are processed by the BBF decoder and null packet reconstruction module, the TS merger (210700) merges the processed data to configure a TS respective to the selected service.

For example, it will be assumed herein that a service is configured of a common PLP, a video component PLP, an audio component PLP, and data component PLP through the input pre-processor (100000) the input processor (100100) of the transmitter. Accordingly, the BBF decoders of FIG. 28 may output multiple PLPs to the null packet reconstruction modules, and the null packet reconstruction modules may refer to DNP information, so as to insert the null packets, which are removed by the transmitting end, in the respective positions of the corresponding TS. Accordingly, a common TS, a video component TS, an audio component TS, and a data component TS, each having the null packets inserted therein may be outputted to the TS merger (210700). When the TS merger (210700) merges the valid packets of the common TS, the video component TS, the audio component TS, and the data component TS, a TS configuring a singled service may be outputted.

Figure 29:
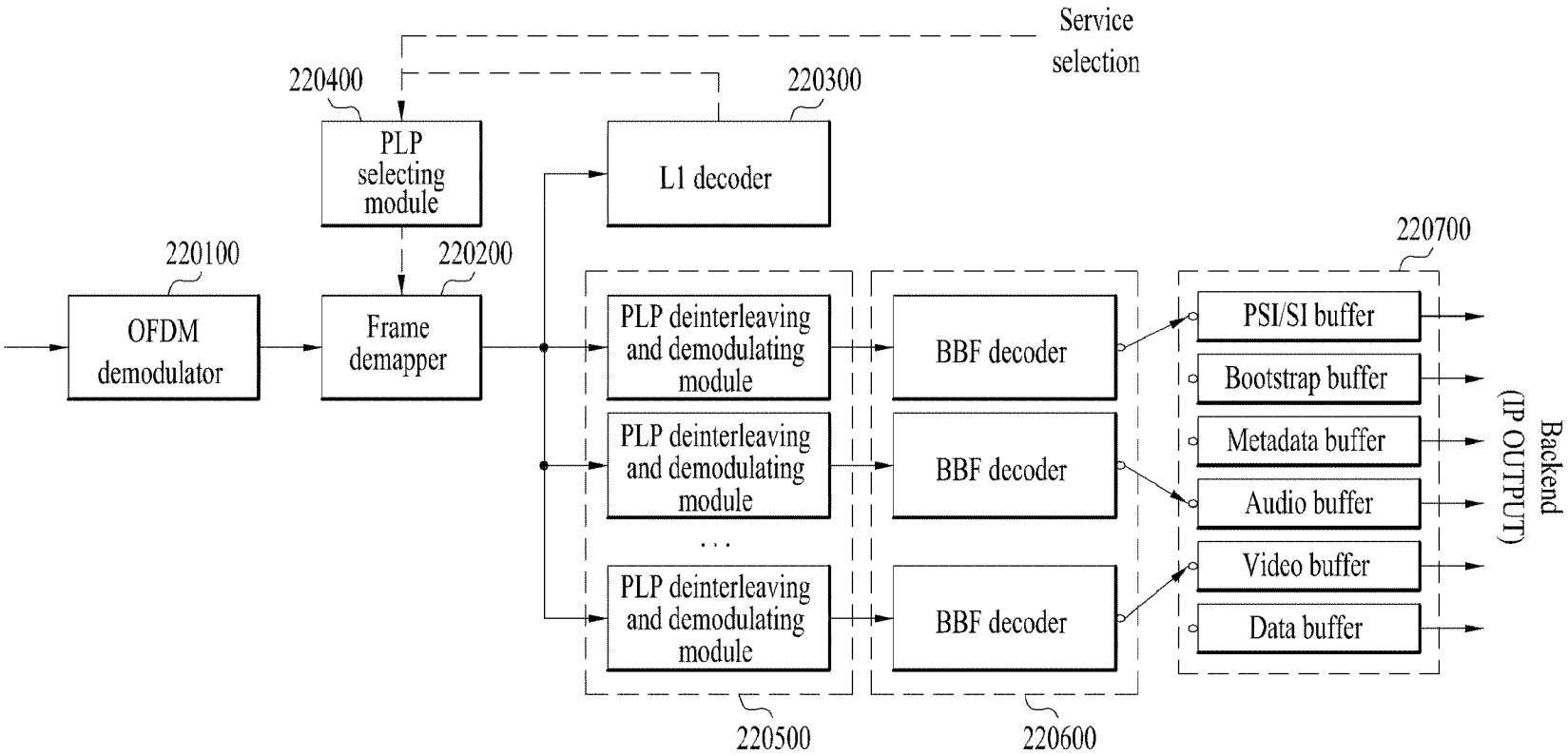
FIG. 29 illustrates a block diagram showing a broadcasting signal receiving apparatus according to another embodiment of the present invention.

FIG. 29 illustrates a block diagram showing a structure of the broadcasting signal receiving apparatus according to yet another embodiment of the present invention. Herein, FIG. 29 corresponds to a block diagram showing the structure of the broadcasting signal receiving apparatus, when a stream type inputted to the input pre-processor of the transmitter correspond to an IP stream format or a GSE stream format. The broadcasting signal receiving apparatus of FIG. 29 is adequate for configuring a service, by extracting components from each PLP, when the components configuring a service are included in each PLP.

The broadcasting signal receiving apparatus of FIG. 29 may include an OFDM demodulator (220100), a frame demapper (220200), an L1 decoder (220300), a PLP selecting module (220400), multiple PLP deinterleaving and demodulator module (220500), multiple BBF decoder (220600), and a buffer unit (220700). The buffer unit (220700) may include a PSI/SI (IP service information) buffer, a bootstrap buffer, a metadata buffer, an audio buffer, a video buffer, and a data buffer depending upon the data type.

For the detailed description on the operations of the OFDM demodulator (220100) and the frame demapper (220200) shown in FIG. 29, reference may be made to the detailed description on the operations of the above-described OFDM demodulator (138100) and frame demapper (138200), and, therefore, detailed description of the same will be omitted herein.

The multiple PLP deinterleaving and demodulator module (220500) performing deinterleaving and demodulation on each of the multiple PLPs in FIG. 29 performs operations that are similar to the operations of the above-described BICM decoder (138300), and the multiple BBF decoders (220600), which perform BBF decoding on each of the multiple PLPs, so as to output an IP stream, also perform operations that are similar to the operations of the above-described output processor (138400). The L1 decoder (220300) corresponds to the above-described L1 signaling decoder.

In FIG. 29, when a service is selected, the PLP selecting module (220400) controls the frame demapper (220200) so that only the PLPs of the components configuring the selected service can be outputted from the frame demapper (220200). Herein, the service selection may be realized by a user's request, or may be automatically realized in the system.

More specifically, the OFDM demodulator (220100) decodes the P1/AP1 signaling information, and the L1 decoder (220600) decodes L1/L2 signaling information, so as to acquire information on a transmission frame structure and information on PLP configuration. According to an embodiment of the present invention, the components configuring a service are received by multiple PLPs. In this case, since PLP information or service information on the component structure is included in the L1 signaling information, the broadcasting receiver may be capable of knowing to which PLPs the components, which configure a service, are included.

Accordingly, when a service is selected, the PLP selecting module (220400) controls the frame demapper (220200), and the frame demapper (220200) outputs multiple sets of PLP data including the corresponding components to the selected service. The multiple sets of PLP data are processed with deinterleaving/demodulation processes by the corresponding deinterleaving and demodulator module. And, after the BBF decoding process is processed by the BBF decoder, the processed data are outputted to the corresponding buffer, among a PSI/SI (IP service information) buffer, a bootstrap buffer, a metadata buffer, an audio buffer, a video buffer, and a data buffer of the buffer unit (220700) by a switching process. Then, the PSI/SI (IP service information) buffer, the bootstrap buffer, the metadata buffer, the audio buffer, the video buffer, and the data buffer may temporarily store PLP data, which are inputted from any one of the multiple BBF decoders (220600), thereby outputting the stored PLP data. The present invention may further include a stream merger and a component splitter between the multiple BBF decoders (220600) and the buffer unit (220700).

More specifically, an IP stream of the multiple sets of PLP data, which are BBF decoded and outputted from the multiple BBF decoders (220600) corresponding to the components of the selected service, after being processed with BBF decoding by the multiple BBF decoders (220600), may be merged by the stream merger, so as to be outputted as a single IP stream corresponding to the selected service. At this point, the stream merger may refer to an IP address and a UDP port number, so as to merge the multiple IP streams to a single IP stream corresponding to a single service.

The component splitter may divide (or separate) the data included in the IP stream, which is merged to a service and outputted by the stream merger, for each component, and may then output the data for each component to the buffer unit (220700). The component splitter may use address information, such as the IP address and the UDP port number, so as to switch to a buffer corresponding to each component included in the buffer unit, thereby outputting the data corresponding to each component. The buffer unit (220700) may buffer the data corresponding to each component in accordance with the output order of the IP stream.

Meanwhile, according to the embodiment of the present invention, at least one of the components configuring a service may be divided into a base layer and an enhancement layer and then may be transmitted.

According to the embodiment of the present invention, by encoding video component by using the SVC method, the component may be divided into base layer data and enhancement layer data. The base layer data correspond to data for images having basic picture quality. Herein, although the base layer data are robust against the communication environment, the picture quality of the base layer data is relatively low. And, the enhancement layer data correspond to additional data for images having higher picture quality. And, although the enhancement layer data can provide high picture quality images, the enhancement layer data are more or less resilient to the communication environment.

In the present invention, video data for terrestrial broadcasting may be divided into base layer data and enhancement layer data. And, in order to allow the video data for mobile broadcasting to flexibly respond to the mobile broadcasting communication environment, the video data for mobile broadcasting may be divided into base layer data and enhancement layer data. The receiver may receive and decode only the base layer video data, so as to acquire images having basic image quality. And, the receiver may also receive and decode both the base layer video data and the enhancement layer video data, so as to acquire images having a higher picture quality. For example, the mobile receiver, such as a mobile phone, a movable TV, and so on, may decode only the base layer data, so as to provide images having basic picture quality, and a fixed-type receiver, such as a general household TV, may decode both the base layer data and the enhancement layer data, so as to provide images having high picture quality.

At this point, the base layer data and the enhancement layer data may be transmitted through a single PLP, or may be transmitted through different PLPs.

Figure 30:
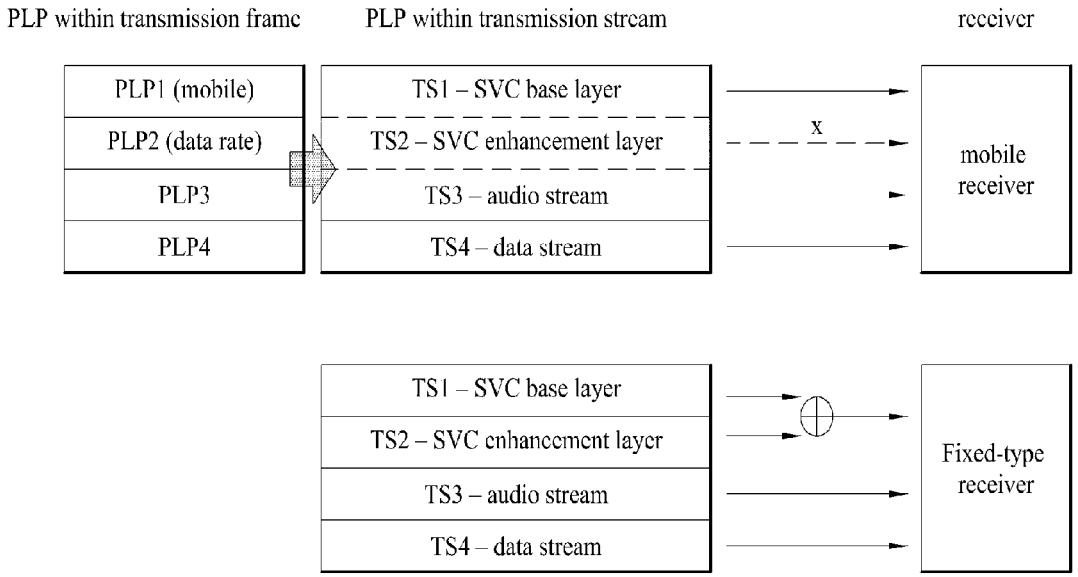
FIG. 30 illustrates a block diagram showing the process of the broadcasting signal receiver for receiving a PLP best fitting its purpose according to an embodiment of the present invention.

FIG. 30 illustrates a block diagram showing the process of the broadcasting signal receiver for receiving a PLP best fitting its purpose according to an embodiment of the present invention.

FIG. 30 shows an example of receiving a transmission frame, which includes a service configured of multiple PLPs, i.e., PLP1 to PLP4.

Herein, it will be assumed that PLP1 transmits SVC encoded base layer data, that PLP2 transmits SVC encoded enhancement layer data, that PLP3 transmits an audio stream, and that PLP4 transmits a data stream.

In the present invention, by adjusting and controlling the physical parameters in accordance with the characteristics of the data included in each PLP, the mobile reception performance or data communication performance may be differently set up, so that the receiver can selectively receive the required PLPs based upon the characteristics of receiver. Hereinafter, a detailed example will be described.

As shown in FIG. 30, since the PLP1 transmitting the base layer data should be capable of being received by a general fixed-type receiver as well as a mobile receiver, the broadcasting signal transmitting apparatus may set up physical parameters for ensuring high reception performance respective to PLP1 and may then transmit the set up parameters.

Additionally, the PLP2 transmitting the enhancement layer data have a lower reception performance as compared to the PLP1. Accordingly, even if the mobile receiver is incapable of receiving PLP2, in order to allow a fixed-type receiver, which is required to receive high picture quality broadcasting programs having high resolution, the broadcasting signal transmitting apparatus may set up and transmit physical parameters of PLP2.

Accordingly, as shown in FIG. 30, the mobile receiver may decode PLP1 transmitting a video stream of the base layer, and may decode PLP3 and PLP4 transmitting audio and data streams, so as to provide a service having general (or standard) resolution.

Alternatively, the fixed-type receiver may decode all of PLP1 transmitting a video stream of the base layer, PLP2 transmitting a video stream of the enhancement layer, and PLP3 and PLP4 transmitting audio and data streams, so as to provide a service having high picture quality.

However, this is merely exemplary, and, therefore, the mobile receiver may also decode all of PLP1 transmitting a video stream of the base layer, PLP2 transmitting a video stream of the enhancement layer, PLP3 transmitting an audio stream, and PLP4 transmitting a data stream, so as to provide a service having high picture quality.

Meanwhile, according to an embodiment of the present invention, after performing SVC decoding on the video data, the broadcasting signal transmitting apparatus according to the present invention may transmit base layer data by using a non-MIMO method, and the broadcasting signal transmitting apparatus may transmit enhancement layer data by using a MIMO method. In the present invention, a broadcasting signal transmitting system supporting the MIMO method will be referred to as a MIMO transmitting system.

Hereinafter, diverse embodiments of the MIMO transmitting system using SVC will be described in detail.

Figure 31:
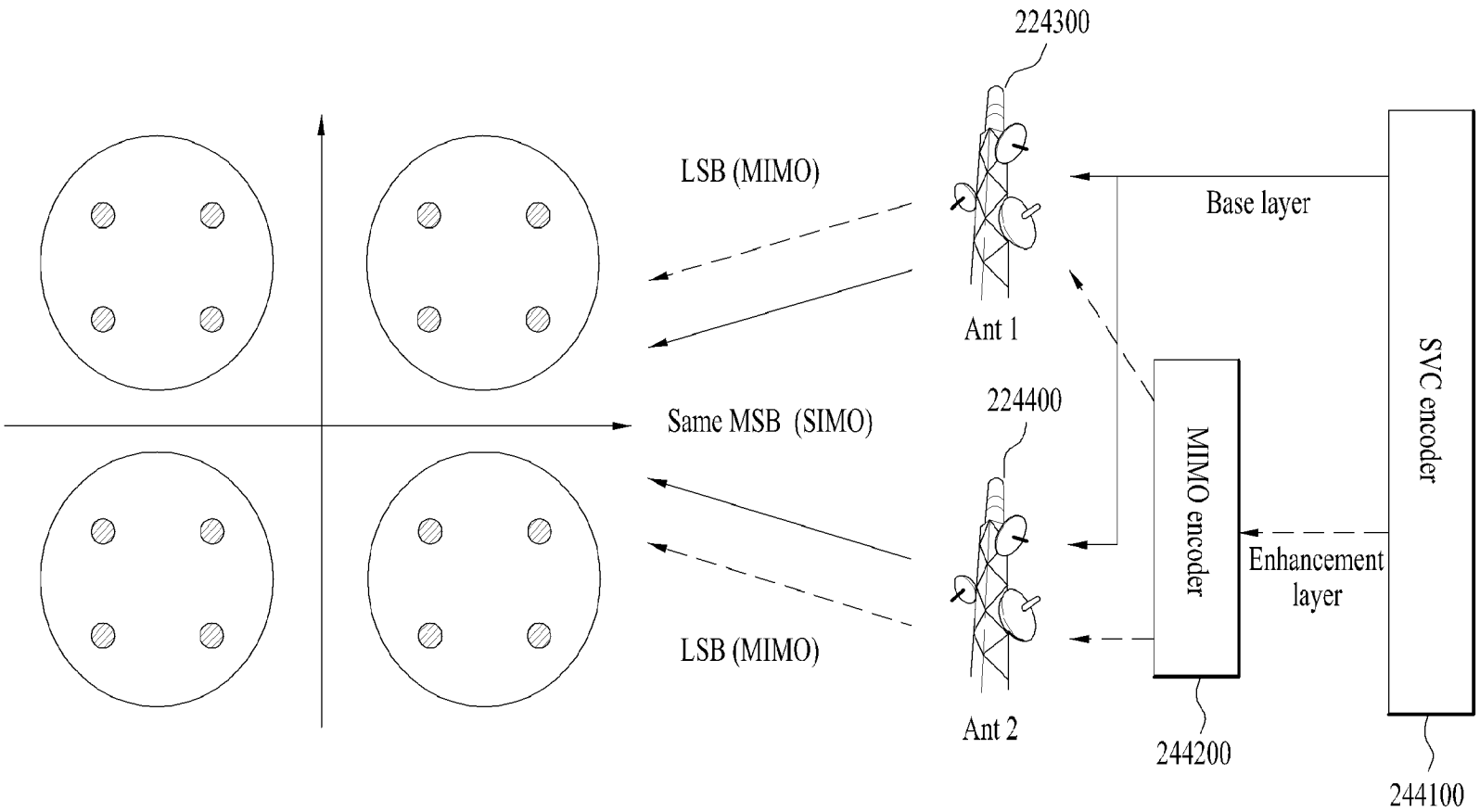
FIG. 31 illustrates a MIMO transmission system and a broadcast signal transmitting method using an SVC according to an embodiment of the present invention.

FIG. 31 illustrates a MIMO transmission system using an SVC and a broadcast signal transmitting method according to an embodiment of the present invention.

As shown in FIG. 31, the MIMO transmitting system may include an SVC encoder (244100), which encodes broadcasting data by using the SVC method, and a MIMO encoder (244200), which distributes data by using a spatial diversity or spatial multiplexing method, so that the data can be transmitted to multiple antennae. Hereinafter, the MIMO encoder may also be referred to as a MIMO processor.

FIG. 31 shows an exemplary broadcast signal transmitting apparatus, which uses a Hierarchical modulation method.

The SVC encoder (244100) performs SVC encoding on the broadcast data and outputs the SVC-encoded data as the base layer data and the enhancement layer data. The base layer data are equally transmitted from a $1^{st}$ transmission antenna (Tx1; 244300) and a $2^{nd}$ transmission antenna (Tx2; 244400). And, the enhancement layer data are processed with MIMO encoding by the MIMO encoder (244200), thereby being respectively outputted through the $1^{st}$ transmission antenna (244300) and the $2^{nd}$ transmission antenna (244400) as identical data or as different data. In this case, the constellation mapper of the transmitting system perform symbol mapping on the corresponding symbol in accordance with the modulation type, as shown on the left-side drawing. For example, the constellation mapper may perform layer modulation, so as to map bits corresponding to the base layer to an MSB (Most Significant Bit) portion of the corresponding symbol, and to map bits corresponds to the enhancement layer to an LSB (Least Significant Bit) portion of the corresponding symbol.

The receiving system may use a constellation demapper, so as to separate the base layer data and the enhancement layer data from the demodulated bit information and to acquire the separated data. The enhancement layer data may be processed with MIMO decoding, so as to be acquired by using bit information of a final SVC. In case the bit information corresponding to the MIMO cannot be separated, the receiver may use only the bit information corresponding to the SISO or the MISO, so as to acquire the base layer data and to provide the respective service.

Figure 32:
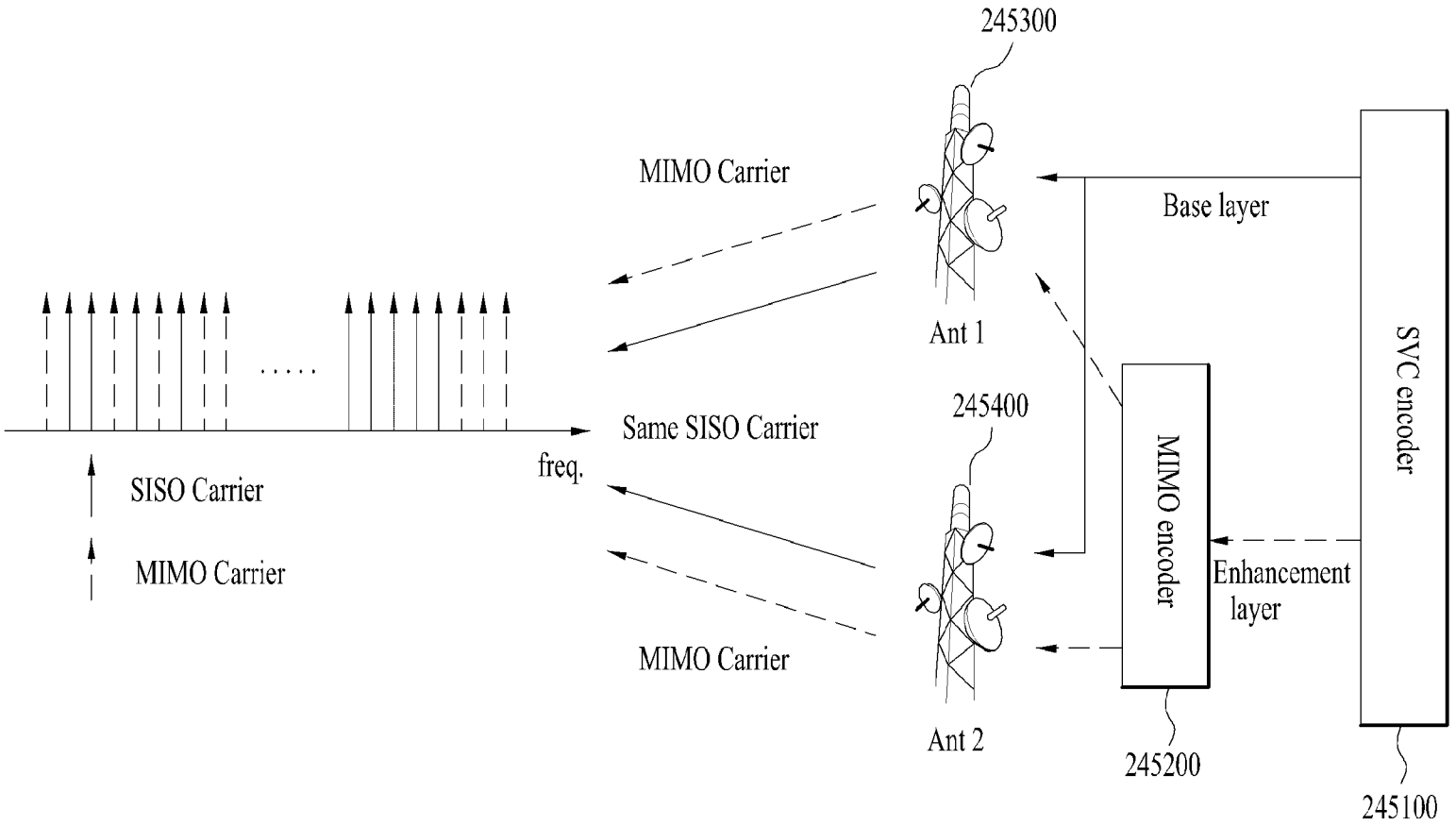
FIG. 32 illustrates a MIMO transmission system and a broadcast signal transmitting method using an SVC according to other embodiment of the present invention.

FIG. 32 illustrates a MIMO transmission system using an SVC and a broadcast signal transmitting method according to another embodiment of the present invention.

As shown in FIG. 32, the MIMO transmitting system may include an SVC encoder (245100), which encodes broadcasting data by using the SVC method, and a MIMO encoder (245200), which distributes data by using a spatial diversity or spatial multiplexing method, so that the data can be transmitted to multiple antennae. FIG. 32 illustrates an exemplary transmitting system using a hybrid modulation method or an FDM (Frequency Division Multiplexing) method.

The SVC encoder (245100) performs SVC encoding on the broadcast data and outputs the SVC-encoded data as the base layer data and the enhancement layer data. The base layer data are equally transmitted from a $1^{st}$ transmission antenna (Tx1; 245300) and a $2^{nd}$ transmission antenna (Tx2; 245400). And, the enhancement layer data are processed with MIMO encoding by the MIMO encoder (245200), thereby being respectively outputted through the $1^{st}$ transmission antenna (245300) and the $2^{nd}$ transmission antenna (245400) as identical data or as different data.

At this point, in order to enhance data transmission efficiency, the MIMO transmitting system of FIG. 32 may process data by using the FDM method. Most particularly, by using the OFDM method, the MIMO transmitting system may transmit data through multiple subcarriers. As described above, the transmitting system using the OFDM method may allocate subcarriers as a subcarrier used for transmitting SISO/MISO signals and as a subcarrier used for transmitting an MIMO signal, thereby being capable transmitting each signal. The base layer data being outputted from the SVC encoder (245100) may be equally transmitted from multiple antennae through the SISO/MISO carrier, and the enhancement layer data being processed with MIMO encoding may be transmitted from multiple antennae through the MIMO carrier.

The receiving system receives an OFDM symbol. Then, the receiving system performs SISO/MISO decoding on the data corresponding to the SISO/MISO carrier, so as to acquire the base layer data. And, the receiving system performs MIMO decoding on the data corresponding to the MIMO carrier, so as to acquire the enhancement layer data. Thereafter, based upon the channel status and the receiving system, when the MIMO decoding process cannot be performed, the decoding process may be performed by using only the base layer data. Alternatively, when the MIMO decoding process can be performed, the decoding process may be performed by using both the base layer data and the enhancement layer data. Thus, a corresponding service may be provided. In case of the second embodiment of the present invention, since the MIMO processing may be performed after mapping the bit information of the service to a symbol, the MIMO encoder (245200) may be positioned after the constellation mapper. Accordingly, the structure of the receiving system may be more simplified as compared to the structure of the receiving system shown in FIG. 31.

Figure 33:
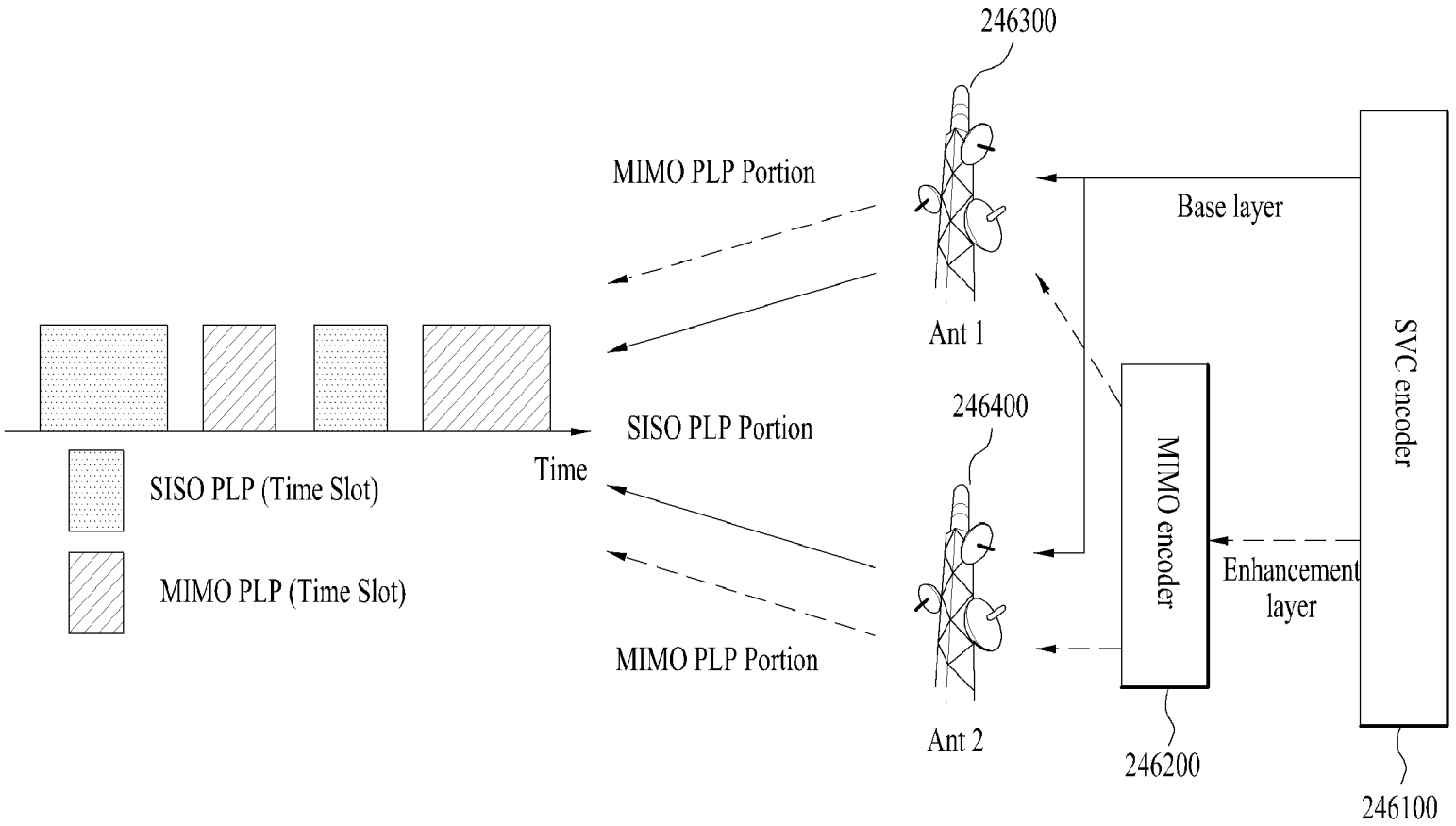
FIG. 33 illustrates a MIMO transmission system and a broadcast signal transmitting method using an SVC according to another embodiment of the present invention, (a) to (c) of FIG. 34 illustrate a signal frame for transmitting data of a base layer and an enhancement layer according to embodiments of the present invention.

FIG. 33 illustrates a MIMO transmission system using an SVC and a broadcast signal transmitting method according to yet another embodiment of the present invention.

As shown in FIG. 33, the MIMO transmitting system may include an SVC encoder (246100), which encodes broadcasting data by using the SVC method, and a MIMO encoder (246200), which distributes data by using a spatial diversity or spatial multiplexing method, so that the data can be transmitted to multiple antennae. FIG. 33 illustrates an exemplary transmitting system using a layer PLP method or a TDM method.

In the embodiment shown in FIG. 33, the transmitting system may respectively transmit SVC-encoded base layer data and SVC-encoded enhancement layer data through an SISO/MISO slot and a MIMO slot. This slot may correspond to a time unit slot or a frequency unit slot of the transmission signal. And, in the embodiment shown in FIG. 33, the slot is illustrated as a time unit slot. Furthermore, this slot may also correspond to a PLP.

The receiving system may determine the slot type of the slot that is being received. And, the receiving system may receive base layer data from the SISO/MISO slot, and the receiving system may receive enhancement layer data from the MIMO slot. And, as described above, based upon the channel and the receiving system, when the MIMO decoding process cannot be performed, the decoding process may be performed by using only the base layer data. Alternatively, when the MIMO decoding process can be performed, the decoding process may be performed by using both the base layer data and the enhancement layer data. Thus, a corresponding service may be provided.

In the present invention, the base layer data and the enhancement layer data may be transmitted by using one PLP. And, each of the base layer data and the enhancement layer data may be respectively transmitted by using different PLPs.

According to an embodiment of the present invention, the base layer data may be transmitted through a T2 frame (i.e., a terrestrial broadcasting frame), and the enhancement layer data may be transmitted through an FEF part.

According to another embodiment of the present invention, the base layer data and the enhancement layer data may only be transmitted through the FEF part.

In the description of the present invention, the FEF part, which transmits the base layer data and the enhancement layer data, will be referred to as a MIMO broadcasting frame for simplicity. Herein, the MIMO broadcasting frame will be used in combination with a signal frame or a transmission frame.

Also, in the description of the present invention, the base layer data and the enhancement layer data will be collectively referred to as MIMO broadcasting data for simplicity.

Hereinafter, in the following description of the present invention, the MIMO broadcasting data may be generated by any one of the $1^{st}$ method to $3^{rd}$ method, which will be described as presented below, thereby being transmitted. Alternatively, the MIMO broadcasting data may also be generated and transmitted by a combination of at least one or more of the $1^{St}$ method to $3^{rd}$ method described below.

(1) Method for Transmitting MIMO Broadcasting Data to a Specific PLP

In the present invention, a method for including MIMO broadcasting data to a specific PLP and transmitting the specific PLP, after differentiating the specific PLP from a PLP including the terrestrial broadcasting (e.g., T2 broadcasting) data may be used. In this case, the specific PLP may be used in order to transmit the MMO broadcasting data. And, at this point, additional information on the specific PLP may be signaled, so as to prevent any malfunction in the conventional receiving system from occurring. Hereinafter, the specific PLP including the MMO broadcasting data may be referred to as a MIMO broadcasting PLP, and the PLP including the terrestrial broadcasting data may be referred to as a terrestrial broadcasting PLP.

Since the conventional terrestrial broadcasting signal receiving apparatus may not be capable of processing the MIMO broadcasting data, additional information for identifying the terrestrial broadcasting PLP and the MIMO broadcasting PLP is required to be signaled. At this point, the signaling of the information for identifying the PLP type may use a reserved field included in the L1 signaling information. For example, in order to identify the PLP type, a PLP_TYPE field of the L1-post-signaling information may be used. At this point, the MIMO broadcasting PLP may be indicated by using any one of the values ranging from 011~111 as the PLP_TYPE field value.

When transmitting the PLP, in order to acquire a more enhanced robustness, a new modulation method and a new coding rate of the error correction code may be used. In this case, in order to identify such modulation method and coding rate of the error correction code, the L1-post-signaling information may be used. According to an embodiment of the present invention, the present invention may use a PLP_COD field of the L1-post-signaling information in order to indicate the coding rate of the MIMO broadcasting PLP. For example, in order to identify the coding rate of the MIMO broadcasting PLP, any one of 110 or 111 may be used as the PLP_COD field value.

Furthermore, according to an embodiment of the present invention, the present invention may use a PLP_MOD field of the L1-post-signaling information in order to indicate a modulation method of the MIMO broadcasting PLP. For example, in order to identify the modulation method of the MIMO broadcasting PLP, any one of values 100 to 111 may be used as the PLP_MOD field value.

At this point, the base layer data and the enhancement layer data configuring the MIMO broadcasting data may be collectively transmitted to a single PLP, or may be separately transmitted to each PLP. For example, when the base layer data are transmitted to the PLP of the base layer, and when the enhancement layer data are transmitted to the PLP of the enhancement layer, the receiving apparatus may use a PLP_PROFILE field, so as to indicate whether the current PLP corresponds to the base layer PLP or to the enhancement layer PLP.

(2) Method for Transmitting MIMO Broadcasting Data to a Specific Frames

In the present invention, a method for including MIMO broadcasting data to a specific frame and transmitting the specific frame, after differentiating the specific frame from a frame including the conventional terrestrial broadcasting data may be used. In this case, the specific frame may be used in order to transmit the MMO broadcasting data. And, at this point, additional information on the specific frame may be signaled, so as to prevent any malfunction in the conventional receiving system from occurring. Hereinafter, the specific frame including the MMO broadcasting data may be referred to as a MIMO broadcasting frame, and the frame including the terrestrial broadcasting data may be referred to as a terrestrial broadcasting frame. Additionally, in case the specific frame including the MIMO broadcasting frame corresponds to an FEF, the FEF may be referred to as an MIMO broadcasting frame.

The present invention may differentiate the terrestrial broadcasting data from the MIMO broadcasting data in frame units and may transmit the differentiated data accordingly. And, at this point, by identifying a frame by using the L1 signaling information, and by ignoring (or disregarding) the MIMO broadcasting frame, the convention terrestrial broadcasting receiving apparatus may be prevented from malfunctioning.

(3) Method for Transmitting a MIMO Broadcasting PLP to a Terrestrial Broadcasting Frame and a MIMO Broadcasting Frame The present invention may transmit a PLP including the MIMO broadcasting data through a terrestrial broadcasting frame and a MIMO broadcasting frame. For example, the base layer data may be transmitted through the terrestrial broadcasting frame, and the enhancement layer data may be transmitted through the MIMO broadcasting frame. In this case, unlike the above-described embodiments of the present invention, since a MIMO broadcasting PLP also exists in the terrestrial broadcasting frame, a relation between interconnected PLPs existing in the terrestrial broadcasting frame and in the MIMO broadcasting frame, is required to be signaled. In order to do so, the L1 signaling information should also be included in the MIMO broadcasting frame, and the information on the MIMO broadcasting PLP, which exists within the frame, may be transmitted along with the L1 signaling information of the terrestrial broadcasting frame.

Fields respective to the PLP being included in the L1-post-signaling information of each frame may be used for the connection between the MIMO broadcasting PLPs existing in different frames. For example, the receiving system may use at least one of a PLP_ID field, a PLP_TYPE field, a PLP_PAYLOAD_TYPE field, and a PLP_GROUP_ID field, which are included in the L1 -post-signaling information, so as to verify the interconnection relation of the MIMO broadcasting PLPs included in different frames. Then, desired MIMO broadcasting PLPs may be consecutively decoded, so as to acquire a service.

The terrestrial broadcasting PLP existing in the conventional terrestrial broadcasting frame (i.e., T2frame) may be pre-defined by the terrestrial broadcasting system, so as to be transmitted to a supported transmission mode. Also, as described above, the terrestrial broadcasting PLP may be transmitted in a new transmission mode supporting the MIMO system. For example, as described above, a MIMO broadcasting PLP being included in the terrestrial broadcasting frame may be transmitted in a transmission mode of terrestrial broadcasting as a base layer by using the MISO or SISO method, and a MIMO broadcasting PLP being included in the MIMO broadcasting frame may be transmitted as an enhancement layer by using the MIMO method.

FIG. 34(a) illustrates an exemplary super frame structure according to another embodiment of the present invention. Herein, FIG. 34(a) shows an example of transmitting a base layer PLP through a terrestrial broadcasting frame and transmitting an enhancement layer PLP through a MIMO broadcasting frame (i.e., FEF part). At this point, a PLP including base layer data may be transmitted by using an SISO method or a MISO method. And, a PLP including enhancement layer data may be transmitted by using an SISO method, a MISO method, or a MIMO method.

FIG. 34(b) illustrates an exemplary super frame structure according to yet another embodiment of the present invention. Herein, FIG. 34(b) shows an example of transmitting both a base layer PLP and an enhancement layer PLP through a MIMO broadcasting frame (i.e., FEF part).

At this point, a base layer PLP including base layer data may be transmitted by using an SISO method or a MISO method. And, an enhancement layer PLP including enhancement layer data may be transmitted by using an SISO method, a MISO method, or a MIMO method. As described above, the ratio between the base layer PLP and the enhancement layer PLP within the MIMO broadcasting frame may vary within a range of 0~100%.

FIG. 34(c) illustrates an exemplary super frame structure according to yet another embodiment of the present invention. Herein, FIG. 34(c) shows an example of transmitting both base layer data and enhancement layer data through a MIMO broadcasting frame (i.e., FEF part). However, unlike in the example shown in FIG. 34(b), in the example shown in FIG. 34(c), the base layer and the enhancement layer are transmitted by being differentiated as carriers, instead of being differentiated as PLPs. More specifically, the data corresponding to the base layer and the data corresponding to the enhancement layer may respectively be allocated to each separate subcarrier, so as to be processed with OFDM modulation, thereby being transmitted.

Hereinafter, a signaling method of the signaling method according to the present invention will be described in detail. The signal frame according to the present invention may be divided into a preamble region and a data region, and the preamble region may be configured of a P1 symbol and one or more P2 symbols, and the data region may be configured of multiple data symbols. At this point, the preamble region may further include an AP1 symbol after the P1 symbol. And, in this case, the P1 symbol and the AP1 symbol may be consecutively transmitted.

Herein, the P1 symbol transmits P1 signaling information, the AP1 symbol transmits AP1 signaling information, and the one or more P2 symbol each transmits L1 signaling information and signaling information included in the common PLP (i.e., L2 signaling information). The signaling information being included in the common PLP may be transmitted through a data symbol. Therefore, in light of a signal frame over a physical layer, the preamble region may include a P1 signaling information region to which the P1 signaling information is signaled, an L1 signaling information region to which the L1 signaling information is signaled, and an entire portion or a partial portion of a common PLP region to which the L2 signaling information is signaled. Herein, the common PLP region may also be referred to as an L2 signaling information region. If a signal frame includes an AP1 symbol, the preamble region includes the P1 signaling information region, the AP1 signaling information region, the L1 signaling information region, and an entire portion or a partial portion of the common PLP region.

The L1 signaling information includes L1 -pre-signaling information and L1-post-signaling information. The L1-post-signaling information then includes Configurable L1-post-signaling information, Dynamic L1 -post-signaling information, Extension L1-post-signaling information, and CRC information, and may further include L1 padding data.

Figures 34, 35, 36:
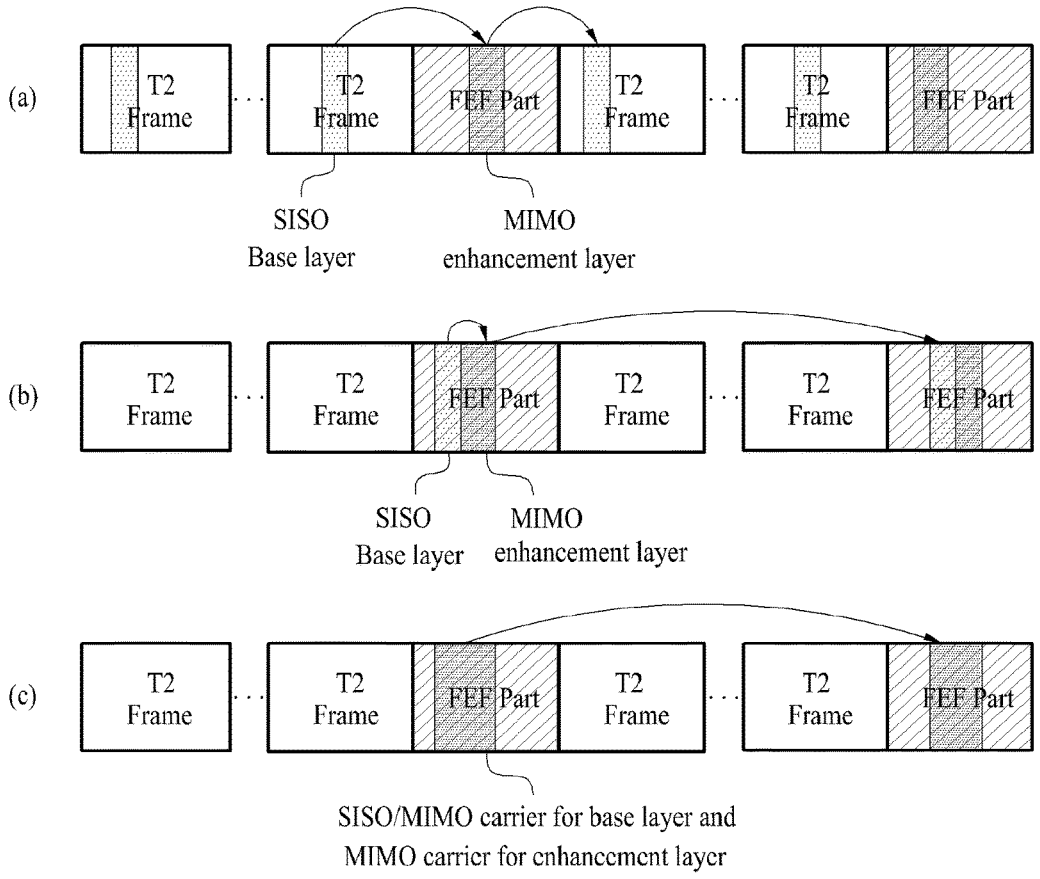
FIG. 35 illustrates an exemplary syntax structure of P1 signaling information according to an embodiment of the present invention.
FIG. 36 illustrates an exemplary syntax structure of AP1 signaling information according to an embodiment of the present invention.

FIG. 35 illustrates an exemplary syntax structure of P1 signaling information according to an embodiment of the present invention.

According to the embodiment of the present invention, in FIG. 35, the P1 signaling information is assigned with 7 bits and includes a 3-bit S1 field and a 4-bit S2 field. In the S2 field, among the 4 bits, the first 3 bits are described as S2 field1 and the 1 bit is described as S2 field2.

The S1 field signals a preamble format. For example, when the S1 field value is equal to 000, this indicates that the preamble corresponds to a T2 preamble, and that data are transmitted in an SISO format (T2_SISO). When the S1 field value is equal to 001, this indicates that the preamble corresponds to a T2 preamble, and that data are transmitted in an MISO format (T2_MISO). When the S1 field value is equal to 010, this indicates that the preamble corresponds to a non-T2 preamble.

The S2 field signals FFT size information. According to the embodiment of the present invention, the FFT size may correspond to 1 k, 2 k, 4 k, 8 k, 16 k, and the GI size may correspond to $1/128$, $1/32$, $1/16$, $19/256$, $1/8$, $19/128$, $1/4$. The FFT size signifies a number of subcarriers configuring a single OFDM symbol. When the S2 field2 value is equal to 0, this indicates that, in the current transmission, all preambles are being transmitted as the same type, and when the field value is equal to 1, this indicates that the preambles are each transmitted as different types.

FIG. 36 illustrates an exemplary syntax structure of AP1 signaling information according to an embodiment of the present invention.

According to the embodiment of the present invention, in FIG. 36, the AP1 signaling information is assigned with 7 bits and includes a 4-bit PILOT_PATTERN field and a 3-bit L1_PRE_SPREAD_LENGTH field.

The PILOT_PATTERN field indicates a pilot pattern of the corresponding signal frame. In the present invention, by transmitting pilot pattern information through the AP1 symbol, even when the P2 symbol is not transmitted, and even when the L1 signaling information is spread to data symbols of the data region, the receiver may be aware of the pilot pattern prior to decoding the L1 signaling information of the data region.

The L1_PRE_SPREAD_LENGTH field indicates a length of a section within the data region in which the L1-pre-signaling information is spread. More specifically, among the data symbols of the signal frame, this field indicates a number of data symbols included in a section to which the L1-pre-signaling information is being spread. In the present invention, the section to which the L1-pre-signaling information is being spread will be referred to as an L1 pre spread section. If the L1_PRE_SPREAD_LENGTH field value is equal to '000', this indicates that the L1 signaling information is not spread in the data region of the corresponding signal frame.

In FIG. 36, since the fields included in the AP1 signaling information and significance of the values of each field are merely examples given to facilitate the understanding of the present invention, and since the fields that can be included in the AP1 signaling information and the significance of the respective field values may be easily modified by anyone skilled in the art, the present invention will not be limited only to the examples given herein.

FIG. 37 illustrates an exemplary syntax structure of L1-pre-signaling information according to an embodiment of the present invention. The L1-pre-signaling information includes information required for decoding the L1 -post-signaling information.

The fields being included in the L1-pre-signaling information of FIG. 37 will hereinafter be described in detail.

A TYPE field may be assigned with 8 bits and may indicate the type of an input stream being transmitted in a super frame. More specifically, the input stream may correspond to TS, GS, TS+GS, IP, and so on, and such identification may use the TYPE field.

A BWT_EXT field is assigned with 1 bit and may indicate whether or not a bandwidth extension of an OFDM symbol is to be performed.

An S1 field is assigned with 3 bits and performs the same role as the S1 field included in the P1 signaling information of FIG. 35. An S2 field is assigned with 4 bits and performs the same role as the S2 field included in the P1 signaling information of FIG. 35. According to the embodiment of the present invention, an L1_REPETITION_FLAG field is assigned with 1 bit and may indicate whether or not L1-post-signaling information related to the current frame is signaled to the P2 symbol. If the L1 signaling information of the next signal frame is configured to have a structure to which the data symbols of the current signal frame are spread, the L1_REPETITION_FLAG field may also be used in order to indicate whether or not the L1 signaling information of the next signal frame has been spread to the current signal frame. For example, when the L1_REPETITION_FLAG field is equal to 1, this indicates that the L1 signaling information has been spread to the current signal frame, and when the corresponding field is equal to 0, this indicates that the L1 signaling information has not been spread to the current signal frame.

A GUARD_INTERVAL field is assigned with 3 bits and indicates a GI size of the current transmission frame. The GI size indicates an occupation ratio of the GI within a single OFDM symbol. Accordingly, the OFDM symbol length may vary depending upon the FFT size and the GI size.

A PAPR field is assigned with 4 bits and indicates a PAPR reduction method. The PAPR method used in the present invention may correspond to an ACE method or a TR method.

An L1_MOD field is assigned with 4 bits and may indicate a QAM modulation type of the L1-post-signaling information.

An L1_COD field is assigned with 2 bits and may indicate a code rate of the L1-post-signaling information.

An L1_FEC_TYPE field is assigned with 2 bits and may indicate an FEC type of the L1-post-signaling information.

An L1_POST_SIZE field is assigned with 18 bits and may indicate the size of the coded and modulated L1 -post-signaling information.

An L1_POST_INFO_SIZE field is assigned with 18 bits and may indicate the size of the L1-post-signaling information in bit units.

A PILOT_PATTERN field is assigned with 4 bits and may indicate a distributed pilot pattern that is inserted in the current signal frame.

A TX_ID_AVAILABILITY field is assigned with 8 bits and may indicate a transmitting apparatus identification capability within the current geographical cell range.

A CELL_ID field is assigned with 16 bits and may indicate an identifier identifying a geographical cell within a network for mobile broadcasting (NGH).

A NETWORK_ID field is assigned with 16 bits and may indicate an identifier identifying the current network.

A SYSTEM_ID field is assigned with 16 bits and may indicate an identifier identifying the system.

A NUM_NGH_FRAMES field is assigned with 8 bits and may indicate a number of NGH frame within the current super frame.

A NUM_T2_FRAMES field is assigned with 8 bits and may indicate a number of T2 frame within the current super frame. This field is useful for determining the super frame structure and may be used for calculating the information for directly hopping to the next NGH frame.

A L1_POST_SPREAD_LENGTH field is assigned with 12 bits and may indicate the length of a section within the data region to which the L1-post-signaling information is being spread. More specifically, among the data symbols of the signal frame, this field may indicate the number of data symbols being included in the section to which the L1-post-signaling information is being spread. In the present invention, the section to which the L1-post-signaling information is being spread will be referred to as an L1 post spread section. If all of the L1_POST_SPREAD_LENGTH field value is equal to 0, this signifies that the L1-post-signaling information is not spread to the data region of the corresponding signal frame.

A NUM_DATA_SYMBOLS field is assigned with 12 bits and may indicate a number of data symbols included in the current signal frame, with the exception for the P1, AP1, P2 symbols.

A NUM_MISO_SYMBOLS field is assigned with 12 bits and may indicate a number of MISO symbols among the diverse data symbols.

A MIMO_SYMBOL_INTERVAL field is assigned with 12 bits and may indicate a number of MISO symbols between two MIMO symbol parts.

A MIMO_SYMBOL_LENGTH field is assigned with 12 bits and may indicate a number of MIMO symbols in one MIMO symbol part.

A REGEN_FLAG field is assigned with 3 bits and may indicate and may indicate a number of signal regeneration performed by the repeater.

An L1_POST_EXTENSION field is assigned with 1 bit and may indicate whether or not an extension field exits in the L1-post-signaling information.

A NUM_RF field is assigned with 3 bits and may indicate a number of RFs within the current system.

A CURRENT_RF_IDX field is assigned with 3 bits and may indicate an index of the current RF channel.

A RESERVED field is assigned with 10 bits and corresponds to a field that is reserved for future usage.

A CRC-32 field is assigned with 32 bits and may indicate a CRC error extraction code of the 32 bits.

In FIG. 37, since the fields included in the L1-pre-signaling information and significance of the values of each field are merely examples given to facilitate the understanding of the present invention, and since the fields that can be included in the L1-pre-signaling information and the significance of the respective field values may be easily modified by anyone skilled in the art, the present invention will not be limited only to the examples given herein.

FIG. 38 illustrates an exemplary syntax structure of configurable L1-post-signaling information according to an embodiment of the present invention. The configurable L1-post-signaling information may include parameters required by the receiver for decoding a PLP and, more particularly, configurable L1-post-signaling information may include diverse information that can be equally applied during a signal frame.

The fields being included in the configurable L1-post-signaling information of FIG. 38 will hereinafter be described in detail.

A SUB_SLICES_PER_FRAME field is assigned with 15 bits and may indicate a number of sub-slices included in a signal frame.

A NUM_PLP field is assigned with 8 bits and may indicate a number of PLPs within the current super frame.

A NUM_AUX field is assigned with 4 bits and may indicate a number of auxiliary streams.

An AUX_CONFIG_RFU field is assigned with 8 bits and corresponds to a region reserved for a future usage.

Subsequently, a for loop (hereinafter referred to as a frequency loop), which is repeated as many times as the number of RFs within the current system, is signaled. The NUM_RF field is signaled to the L1-pre-signaling information.

Hereinafter, fields being included in the frequency loop will be described in detail.

An RF_IDX field is assigned with 3 bits and may indicate an index of each frequency within an RF channel.

A FREQUENCY field is assigned with 32 bits and may indicate a center frequency of the RF channel.

An FEF_TYPE field, an FEF_LENGTH field, and an FEF_INTERVAL field, which are shown below, correspond to fields that are used only when the LSB of the S2 field is equal to 1, i.e., when the S2 field is expressed as S2='xxx1'.

The FEF_TYPE field is assigned with 4 bits and may indicate an FEF (Future extension frame) type.

The FEF_LENGTH field is assigned with 22 bits and may indicate a number of elementary periods of a related FEF part.

The FEF_INTERVAL field is assigned with 8 bits and may indicate a number of T2 frames existing between two FRF parts.

A NEXT_NGH_SUPERFRAME field is assigned with 8 bits and may indicate a number of super frames existing between the current super frame and the next super frame, which includes the next NGH frame.

A RESERVED_2 field is assigned with 32 bits and corresponds to a field that is reserved for a future usage.

Subsequently, a for loop (hereinafter referred to as an auxiliary stream loop), which is repeated as many times as the number of auxiliary streams (NUM_AUX field value-1), is signaled, a 32-bit AUX_RFU field, which is reserved for a future usage, is included herein.

Subsequently, a for loop (hereinafter referred to as a PLP loop), which is repeated as many times as the number of PLPs within the current super frame (NUM_PLP field value-1), is signaled.

Hereinafter, fields being included in the PLP loop will be described in detail.

A PLP_ID field is assigned with 8 bits and may indicate an identifier identifying the corresponding PLP.

A PLP_TYPE field is assigned with 3 bits and may indicate whether the corresponding PLP corresponds to a common PLP, a Type1 data PLP, or a Type2 data PLP. Additionally, the PLP_TYPE field may indicate whether the corresponding PLP corresponds to a PLP being included in a plurality of PLP groups, or to a group PLP being included in a single PLP group.

A PLP_PAYLOAD_TYPE field is assigned with 5 bits and may indicate the type of a PLP payload. More specifically, the data included in the payload of the PLP may correspond to GFPS, GCS, GSE, TS, IP, and so on, and such identification may use the PLP_PAYLOAD_TYPE field.

The PLP_PROFILE field is assigned with 2 bits and may indicate a profile of the corresponding PLP. More specifically, this field indicates whether the corresponding field is a mandatory (or required) PLP or an optional (or selective) PLP. For example, when the PLP of the video data is identified as a PLP for transmitting a base layer and a PLP for transmitting an enhancement layer, the PLP transmitting the base layer becomes the mandatory PLP, and the PLP transmitting the enhancement layer becomes the optional PLP. Additionally, the common PLP corresponds to a mandatory PLP. More specifically, depending upon the receiver characteristic, such as a mobile receiver, a fixed-type receiver, and so on, the receiver may use the PLP_PROFILE field so as to verify by which receiver the component of the broadcast service being transmitted to the current PLP may be used, and depending upon the receiver characteristic, the receiver may determine whether or not to receive the current PLP.

An FF_FLAG field is assigned with 1 bit and, when 2 or more RF channels are being used, this field may indicate a fixed frequency mode.

A FIRST_RF_IDX field is assigned with 3 bits and may indicate an RF index of a first signal frame of the corresponding PLP.

A FIRST_FRAME_IDX field is assigned with 8 bits and may indicate a frame index of the first signal frame of the corresponding PLP.

A PLP_GROUP_ID field is assigned with 8 bits and may indicate an identifier identifying a PLP group related to the corresponding PLP.

A PLP_COD field is assigned with 3 bits and may indicate the code rate of the corresponding PLP. In the present invention, any one of the code rates of 1/4, 1/3, 2/5, 1/2, 3/5, 2/3, 3/4, 4/5, 5/6 may be used in the corresponding PLP.

A PLP_MOD field is assigned with 3 bits and may indicate a constellation size (i.e., modulation format) of the corresponding PLP. In the present invention, any one of the modulation formats (or modulations types) of BPSK, QPSK, 16QAM, 64QAM, 256QAM may be used.

A PLP_MIMO_TYPE field is assigned with 2 bits and may indicate whether the corresponding PLP corresponds to a MIMO type or a MISO type.

For example, a PLP_MOD field value, i.e., the constellation size may be decided by a combination with the PLP_MIMO_TYPE field. If the PLP_MIMO_TYPE field value indicates the MISO, the PLP_MOD field may be used for symbol re-mapping. If the PLP_MIMO_TYPE field value indicates the MIMO, after performing MIMO processing, the PLP_MOD field may be interpreted as a constellation size having a spectrum effect, as a result of the MIMO processing.

A PLP_ROTATION field is assigned with 1 bit and may indicate whether or not constellation rotation and re-mapping of the PLP has been used.

A PLP_FEC_TYPE field is assigned with 2 bits and may indicate an FEC type of the corresponding PLP.

A PLP_NUM_BLOCKS_MAX field is assigned with 10 bits and may indicate a maximum number of PLPs included in the FEC blocks.

A FRAME_INTERVAL field is assigned with 8 bits and may indicate a T2 frame interval within a super frame, when inter-frame interleaving is applied.

A TIME_IL_LENGTH field is assigned with 8 bits and may indicate a time interleaver length (or depth).

A TIME_IL_TYPE field is assigned with 1 bit and may indicate the time interleaver type.

An IN_BAND_FLAG field is assigned with 1 bit and may indicate whether or not in-band signaling exists.

A RESERVED_1 field is assigned with 16 bits and corresponds to a field that is reserved in the PLP loop for a future usage.

The PLP loop may further include a PLP_COMPONENT_ TYPE field. The PLP_COMPONENT_TYPE field is assigned with 8 bits and may indicate the type of data (or service component) being transmitted through the corresponding PLP. Therefore, based upon the PLP_COMPONENT_TYPE field, the receiver may be capable of determining whether the type of the component being transmitted through the corresponding PLP corresponds to base layer video component, an enhancement layer video component, an audio component, or a data component.

According to an embodiment of the present invention, the PLP group may also be referred to as an LLP (Link-Layer-Pipe), and the PLP_GROUP_ID field may also be referred to as an LLP_ID field. Most particularly, an NIT, which is to be described later on, includes a PLP_GROUP_ID field, which is identical to the PLP_GROUP_ID field included in the L1 signaling information. And, the NIT may also include a transport_stream_id field for identifying a transmission stream related to the PLP group. Therefore, by using the NIT, the receiver may be capable of knowing to which PLP group a specific stream is related. More specifically, in order to simultaneously decode streams (e.g., TSs) being transmitted through PLPs having the same PLP_GROUP_ID, the streams that are indicated by the transport_stream_id field of the NIT may be merged, thereby being capable of recovering a single service stream.

Therefore, when the broadcasting signal is being transmitted in a TS format, the receiver may merge the PLPs having the same PLP_GROUP_ID field, so as to recover the initial (or original) TS.

If the broadcasting signal is transmitted in an IP format, the receiver may use the PLP_GROUP_ID field, so as to locate and find the service components related to a single service. And, by merging such service components, a single service may be recovered. Accordingly, the receiver should be capable of simultaneously receiving PLPs having the same PLP_GROUP_ID.

In FIG. 38, since the fields included in the configurable L1-post-signaling information and significance of the values of each field are merely examples given to facilitate the understanding of the present invention, and since the fields that can be included in the configurable L1 -post-signaling information and the significance of the respective field values may be easily modified by anyone skilled in the art, the present invention will not be limited only to the examples given herein.

FIG. 39 illustrates an exemplary syntax structure of dynamic L1-post-signaling information according to an embodiment of the present invention. The dynamic L1-post-signaling information may include parameters required by the receiver for decoding a PLP and, more particularly, the dynamic L1-post-signaling information may include characteristic information corresponding to a signal frame that is currently being transmitted. Additionally, the dynamic L1-post-signaling information may also be signaled to an in-band, so that that the receiver can efficiently process slicing.

The fields being included in the dynamic L1-post-signaling information of FIG. 39 will hereinafter be described in detail.

A FRAME_IDX field is assigned with 8 bits and may indicate an index of a current signal frame within the super frame. For example, an index of the first signal frame within the super frame may be set to 0.

A SUB_SLICE_INTERVAL field is assigned with 22 bits and may indicate a number of OFDM cell existing between two sub-slices within the same PLP.

A TYPE_2_START field is assigned with 22 bits and may indicate a starting position among the OFDM cells of the Type2 data PLPs.

An L1_CHANGE_COUNTER field is assigned with 8 bits and may indicate a number of super frame that remain before the L1 configuration (e.g., contents of the fields included in the L1 pre signaling or content of a configurable part in the L1 post signaling).

A START_RF_IDX field is assigned with 3 bits and may indicate a start RF index of a next signal frame.

A RESERVED_1 field is assigned with 8 bits and corresponds to a field that is reserved for a future usage.

A NEXT_NGH_FRAME field is assigned with 8 bits and corresponds to a field that is used only when the LSB of the S2 field is equal to 1, i.e., when the S2 field is expressed as S2='xxx1'. A NEXT_NGH_SUPERFRAME field indicates a number of T2 or FEF frames existing between the first T2frame within the next super frame, which includes an NGH frame, and the next NGH frame. The NEXT_NGH_FRAME field and the NEXT_NGH_SUPERFRAME field may be used by the receiver for calculating a hopping amount for hopping to the next NGH frame. More specifically, the NEXT_NGH_FRAME field and the NEXT_NGH_SUPERFRAME field provide an efficient hopping mechanism, when a large number of T2 frames are mixed with the FEF, and when not all of the FEFs are used only for the NGH frames. Most particularly, the receiver may perform hopping to the next NGH frame without having to detect the P1 signaling information of all signal frames existing in the super frame and to decode the detected P1 signaling information.

Subsequently, a for loop (hereinafter referred to as a PLP loop), which is repeated as many times as the number of PLPs existing within the current super frame (NUM_PLP field value-1), is signaled.

A PLP_ID field, a PLP_START field, and a PLP_NUM_BLOCKS field are included in the PLP loop. And, the corresponding field will hereinafter be described in detail.

The PLP_ID field is assigned with 8 bits and may indicate an identifier identifying a PLP.

The PLP_START field is assigned with 22 bits and may indicate a starting position of OFDM cells of the current PLP.

The PLP_NUM_BLOCKS field is assigned with 10 bits and may indicate a number of FEC blocks related to the current PLP.

A RESERVED_2 field is assigned with 8 bits and corresponds to a field included in the PLP loop that is reserved for a future usage.

A RESERVED_3 field is assigned with 8 bits and corresponds to a field that is reserved for a future usage.

Field included in an auxiliary stream loop will hereinafter be described.

Subsequently, a for loop (hereinafter referred to as an auxiliary stream loop), which is repeated as many times as the number of auxiliary streams (NUM_AUX field value-1), is signaled, and a 48-bit AUX_RFU field is included herein for a future usage.

In FIG. 39, since the fields included in the dynamic L1-post-signaling information and significance of the values of each field are merely examples given to facilitate the understanding of the present invention, and since the fields that can be included in the dynamic L1-post-signaling information and the significance of the respective field values may be easily modified by anyone skilled in the art, the present invention will not be limited only to the examples given herein.

Meanwhile, the present invention proposes a method for reducing an overhead of a data packet, when IP based data are transmitted based. According to the embodiment of the present invention, by compressing and transmitting the header of a data packet, the present invention may reduce the overhead of a data packet. Additionally, according to the embodiment of the present invention, whether or not compression is being applied to the header of the data packet may be signaled to at least one of the L1 signaling information and the L2 signaling information. Furthermore, according to the embodiment of the present invention, when the data packet header is compressed, the compression information of the data packet header, which is required by the receiver for performing decompression on the header of the compressed data packet, is signaled to at least one of L1 signaling information and L2 signaling information.

According to the embodiment of the present invention, among the header compression methods, the header of a data packet is compressed by using a RoHC (Robust Header Compression) method. The RoHC method is merely an example given to facilitate the understanding of the present invention. And, therefore, any other method for compressing a header may be applied herein.

Most particularly, according to the embodiment of the present invention, among the compressed data packet header information, a portion of the corresponding information may be transmitted to a common PLP.

In the present invention, a data packet is largely configured of a header and a payload. Herein, the header includes information required for transmitting the data packet (e.g., transmitter information, receiver information, port number, data size, error correction code, and so on), and the payload include data that are to be actually transmitted. At this point, depending upon the type of data being transmitted to the payload, and a protocol being used for packetization, the header of the data packet may be configured of an IP header or an IP header and a UDP header, and the header of the data packet may also be configured of an IP header, a UDP (or TCP) header, and an RTP header.

For example, if a UDP packet is packetized in accordance with an IP method, after the data being transmitted to the payload (e.g., A/V data) have been packetized by using the RTP method, and after the RTP packet has been packetized once again by using the UDP method, the data packet is configured of an IP header, a UDP header, an RTP header, and a payload. However, this is merely an example, and other types of header configurations may be applied to the present invention. In the description of the present invention, the data packet may also be referred to as an IP packet.

FIG. 40 illustrates an IP header configuring a header of a data packet according to an embodiment of the present invention.

The IP header includes an IP version field indicating an IP protocol version, such as IPv4, IPv6, and so on, an Internet Header Length (IHL) field indicating the length of an IP header, a TOS (Type of Service) field indicating priority information respective to the service type, a Total Length field indicating a total length of the corresponding data packet, a packet identifier (Identification) field, an IP fragment flags (IP Flags) field indicating information on data segments (or fragments) of an IP layer, a Fragment Offset field indicating a relative position of the segmented (or divided) packets, a TTL (Time to Live) field indicating time information up to when the data are deleted, a higher layer Protocol field indicating a protocol (TCP, UDP, and so on) that is used in the higher layer, a Header Checksum field checking for an error in the header, a source IP address field indicating an IP address of a source device, and a destination (or target) IP address field indicating an IP address of a destination (or target) device.

Figure 41:
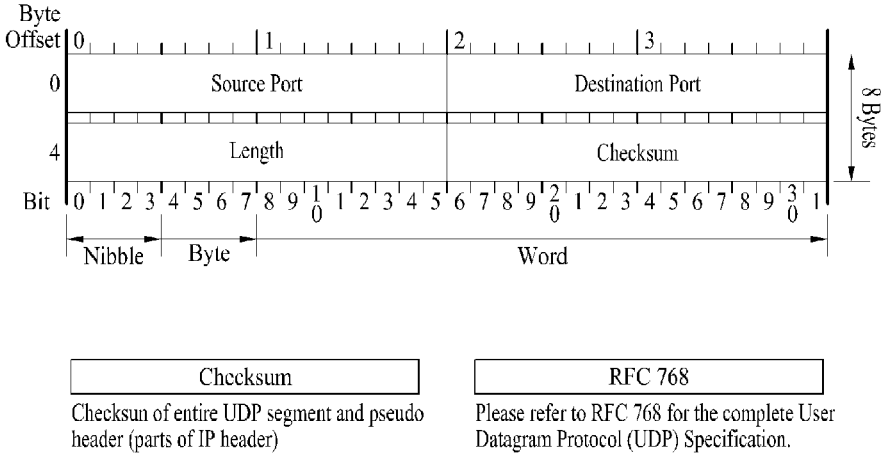
FIG. 41 illustrates a UDP header configuring of a header of a data packet according to an embodiment of the present invention, (a) and (b) of FIG. 42 illustrate a RoHC compression method according to an embodiment of the present invention.

FIG. 41 illustrates an UDP header configuring a header of a data packet according to an embodiment of the present invention.

The UDP header includes a source port number field indicating a port number of a source device, a destination (or target) port number field indicates a port number of a destination (or target) device, a field length indicating a total length of the corresponding data field, and a checksum filed for certifying the reliability of the corresponding data packet.

For example, when the header part of the data packet includes an IP header, a UDP header, and an RTP header, and when the IP version corresponds to IPv4, the overhead of the header included in the data packet becomes equal to 40 bytes. However, such an overhead may cause a critical problem in a wireless system, wherein the bandwidth is limited. At this point, when the header of the data packet is compressed by using the RoHC method, the overhead may be reduced to 1 byte or 3 bytes. More specifically, the transmitting end compresses and transmits at least one of the IP/UDP/RTP headers within the data packet, and the receiver decompressed the header of the received data packet, thereby recovering the IP/UDP/RTP headers prior to being compressed.

Figure 42:
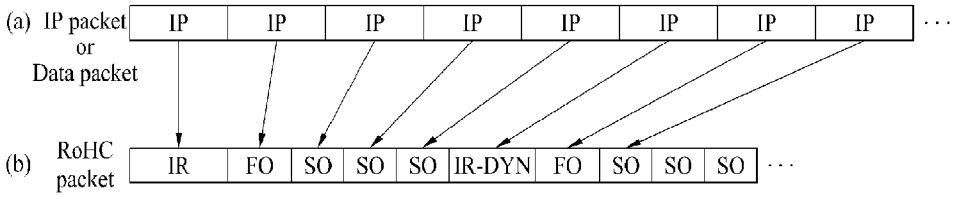

(a) and (b) of FIG. 42 illustrates conceptual diagrams of an RoHC compression algorithm according to the present invention. Herein, (a) of FIG. 42 shows an example of the data packets prior to being compressed and (b) of FIG. 42 shows an example of the data packets being compressed by using the RoHC method. Although a payload exists in each packet in (a) and (b) of FIG. 42, the present invention will only describe the header of the data packets.

For simplicity in the description of the present invention, the packet prior to being compressed will hereinafter be referred to as a data packet, and the packet being compressed by using the RoHC method will hereinafter be referred to as an RoHC packet (or header-compressed data packet).

In the RoHC compression method, the overall headers of the data packet configuring the IP stream, which is identified by the IP address information, may be indicated by a single context identifier (Context ID). Herein, at the beginning of the transmission, the overall header is transmitted. Then, as the transmission progresses, the compression process is processed by using a method of remaining only the Context ID and the essential information and omitting the non-varying parts.

According to an embodiment of the present invention, when performing IP streaming, among the information included in the IP header and the UDP header of FIG. 40 and FIG. 41, IP version, source IP address, destination IP address, IP fragment flag, source port number, destination port number, and so on, hardly varies (or changes) during the streaming process. In the description of the present invention, the fields transmitting information that hardly changes during the streaming process, as described above, will be referred to as static fields. Furthermore, information transmitted in the static field will be referred to as static information. According to the present invention, the static information has the same meaning as static chain information.

In the RoHC compression method, such static information is transmitted only once and is not additionally transmitted for a predetermined period of time. This is referred to as an Initialization and Refresh (hereinafter referred to as IR) state, and a data packet having the static field information transmitted to the header is referred to as an IP packet. Moreover, dynamic information, which consistently changes yet maintains the same state for a predetermined period of time, are separately scheduled to performed additional transmission. The dynamic information is transmitted through a dynamic field. According to the present invention, the dynamic information has the same meaning as dynamic chain information.

Herein, a data packet having the dynamic information transmitted to its header is referred to as an IR-DYN packet. According to the embodiment of the present invention, the IR packet also includes dynamic information. Since the IR packet and the IR-DYN packet carry all information of the conventional header, the IR packet and the IR-DYN packet have a similar size as the conventional header. More specifically, among the header information of the data packet, the static information may be transmitted at the beginning through the IR packet, and the dynamic information is transmitted each time the information is updated through the IR-DYN packet.

In addition to the IR packet and the IR-DYN packet, the data packet having its header compressed may further include a first order (FO) and a second order (SO). The FO packet and the SO packet are configured only of 1-2 byte information. The FO packet compresses and transmits all static information and most of the dynamic information, and the SO packet periodically compresses and transmits all of the dynamic information.

As described above, in the RoHC compression method, IR packets including the static and dynamic information are transmitted only when required, and, in the remaining cases, the FO packets or SO packets, which are configured only of the 1-2 byte information, are transmitted. Thus, 30 bytes or more of the overhead may be reduced for each data packet. According to the present invention, the IR packet, the IR-DYN packet, the FO packet and the SO packet will be referred to as an RoHC packet.

However, when such RoHC compression method is adopted, in a broadcasting network that does not have any return channels, the receiver is incapable of knowing at which point the IP stream is to be received. And, a general receiver may not be capable of recognizing the herder-compressed data packet.

In order to resolve such problems, the present invention transmits compression information of the data packet header by signaling the corresponding compression information to the L1 signaling information and the L2 signaling information. According to the embodiment of the present invention, the present invention signals and transmits the compression information to the L2 signaling information. The L2 signaling information corresponds to the signaling information being transmitted to the common PLP.

According to the embodiment of the present invention, the compression information being signaled to the L2 signaling information includes at least one of information indicating a compression method of the data packet header, context profile information, and context identifier information.

The information indicating a compression method of the data packet header will also be referred to as a header compression type (header_compression_type). According to the present invention, when the header_compression_type field value is equal to 0, this may signify that the header of the data packet is not compressed (no compression), and, when the header_compression_type field value is equal to 1, this may signify that the header of the data packet is compressed by using the RoHC method.

According to the embodiment of the present invention, the context profile information will be referred to as a context profile (context_profile) field, which indicates up to which protocol (or which layer) the compression has been performed, when performing compression on the header of the data packet. According to the embodiment of the present invention, when the context_profile field value is equal to 0, this may indicate that the data packet has an RoHC compression packet yet that the actual header information has not been compressed. And, when the context_profile field value is equal to 1, this may indicate that the header of the data packet has been compressed by using the RoHC method up to the RTP, up to the UDP, when the context_profile field value is equal to 2, up to the ESP, when the context_profile field value is equal to 3, and up to the IP, when the context_profile field value is equal to 4.

The context identifier information will also be referred to as a context identifier (context_id) field, which represents a context identifier identifying that the header of the data packet has been compressed. In other words, the context identifier information represents an identifier for identifying an IP stream using the IP header compression. When the receiver groups and processes the header-compressed data packets having the same context identifier, an IP stream may be configured.

Most particularly, according to the embodiment of the present invention, among the L2 signaling information being transmitted to the common PLP, the compression information is signaled to the IP information table. The compression information may be included in a field format within the IP information table, and may also be included in a specific descriptor of the IP information table. The compression information may be included in a field format even when being included in the specific descriptor. The IP information table may correspond to an INT (IP/MAC notification table), which signals IP-PLP mapping (or link) information, and may correspond to another table. Additionally, an IP information table may be divided into section units, and the compression information may be signaled to one section.

According to another embodiment of the present invention, the present invention may signal the compression information to a service association section, which is included in the L2 signaling information being transmitted to the common PLP.

At this point, according to the embodiment of the present invention, the IP information table or service association section transmits the compression information as binary type information.

According to the embodiment of the present invention, the service association section is also signaled with IP-PLP mapping (or link) information. According to the embodiment of the present invention, the IP-PLP mapping information includes a URI (Uniform Resource Identifier) or IP address/port number of a specific stream and PLP information matching with an IP stream, which is transmitted (or delivered) to the URI or IP address/port number. According to the embodiment of the present invention, the PLP information includes a PLP identifier (plp_id). The PLP information may further include at least one of a PLP profile (plp_profile), a system identifier (system_id), and a PLP group identifier (plp_group_id). A URL (Uniform Resource Locator) may also be used instead of the URI.

According to the embodiment of the present invention, the header information of an IR packet is transmitted through a data PLP or a common PLP. At this point, the header information of the IR packet may be transmitted to all common PLP, or only a portion of the header information may be transmitted to the common PLP and the remaining portion of the header information may be transmitted to the data PLP. For example, among the header information of the IR packet, static information may be transmitted to the common PLP, and dynamic information may be transmitted to the data PLP. Additionally, according to the embodiment of the present invention, the header information of the IR-DYN packet is also transmitted through the data PLP or the common PLP. The data PLP will hereinafter be referred to as a component PLP.

Figure 43:
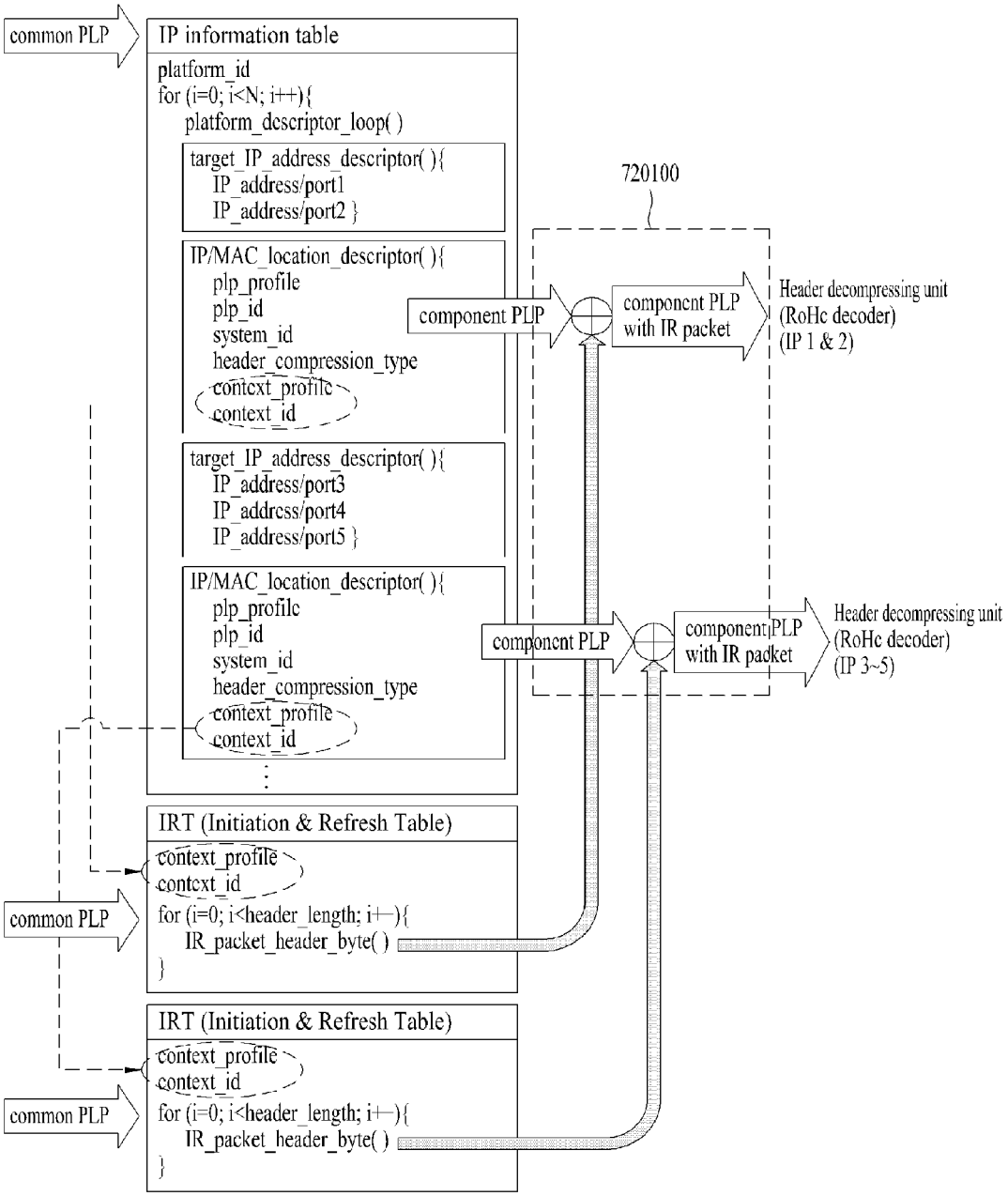
FIG. 43 illustrates an example of IP-PLP mapping information and compression information being signaled to an IP information table according to the present invention.

FIG. 43 shows an example of the compression information being signal to an IP/MAC_location_descriptor( ) of the IP information table. Additionally, the IP/MAC_location_descriptor( ) signals PLP information that matched with an IP stream, which is delivered to an IP address/port number being signals to a target_IP_address_descriptor( ). According to the embodiment of the present invention, the PLP information includes at least one of a PLP profile (plp_profile), a PLP identifier (plp_id), and a system identifier. The PLP information may further include a PLP group identifier (plp_group_id).

Herein, since a target_IP_address_descriptor( ) and an IP/MAC_location_descriptor( ) of the IP information table in FIG. 43 form a pair, by using this descriptor pair, the receiver may be capable of knowing to which PLP a specific IP stream is associated, and the descriptor pair may also gain compression information of the specific IP stream. Furthermore, based upon the acquired (or gained) compression information, the descriptor pair may perform decompression of the specific IP stream.

The IP information table is repeated as many times as the number of the platform and includes a platform identifier to identify each platform. That is, the platform identifier represents a platform space on an IP stream transmitted.

According to the embodiment of the present invention, the IP/MAC_location_descriptor( ) includes a plp_profile field, a plp_id field, a system_id field, a header_compression_type field, a context_profile field, and a context_id field.

The plp_profile field and the plp_id field are identical to the plp_profile field and the plp_id field included in the L1 signaling information of FIG. 38. More specifically, the plp_profile field and the plp_id field correspond to mapping (or link) information for connected the L1 signaling information and the L2 signaling information. A plp_profile field indicates whether the corresponding PLP is a mandatory PLP or an optional PLP. The receiver may use the plp_profile field so as to determine in which receiver the component being transmitted to the current PLP is to be transmitted, based upon the receiver characteristic, such as mobile receiver, fixed-type receiver, and so on. And, then the receiver may determine whether or not to decode the current PLP based upon the receiver characteristic.

The plp_id field indicates an identifier for identifying the corresponding PLP.

The system_id field corresponds to a field that is used for identifying a broadcasting network specific system.

The header_compression_type field indicates whether or not the header has been compressed. According to the embodiment of the present invention, when the header_compression_type field value is equal to 0, this indicates that compression has not been performed on the header (no compression), and, when the header_compression_type field value is equal to 1, this indicates the header has been compressed by using the RoHC method.

The context_profile field indicates up to which protocol (or which layer) the compression has been performed, when performing compression on the header of the data packet. According to the present invention, when the context_profile field value is equal to 0, this may indicate that the data packet has an RoHC compression packet yet that the actual header information has not been compressed. And, according to the embodiment of the present invention, when the context_profile field value is equal to 1, this may indicate that the header of the data packet has been compressed by using the RoHC method up to the RTP, up to the UDP, when the context_profile field value is equal to 2, up to the ESP, when the context_profile field value is equal to 3, and up to the IP, when the context_profile field value is equal to 4.

The context_id field indicates a context identifier for identifying that the header of the data packet has been compressed.

As described above, the header information of the IR packet may be transmitted to the common PLP. At this point, the header information of the IR packet may be collectively signaled and transmitted to an IP information table to which compression information is being transmitted, or the header information of the IR packet may be signaled and transmitted to another table.

When the header information of the IR packet is signaled to a table other than the IP information table, the corresponding table will be referred to as an IRT (Initiation & Refresh Table).

As shown in FIG. 43, the IRT according to the present invention includes an IR_packet_header_byte( ) field, which is repeated as many times as the values of the context_profile field, the context_id field, and the header_length field, so as to transmit the header information of the IR packet.

The context_profile field and the context_id field are respectively assigned with the same values of each of the context_profile field and the context_id field, which are signaled to the IP/MAC_location_descriptor( ) of the IP information table. More specifically, the context profile and the context identifier correspond to mapping (i.e., link) information connecting the IP information table to the IRT. Therefore, the receiver may use the context profile and the context identifier, so as to be capable of acquiring compression information of a specific IP stream from the IP information table and acquiring IR packet header information from the IRT. The present invention may also use only the context identifier, so as to connect the IP information table and the IRT.

The header information of the IR packet being transmitted to the IR_packet_header_byte( ) field may include both the static information and the dynamic information, or may include any one of the static information and the dynamic information. For example, the static information may be transmitted to the IR_packet_header_byte( ) field and the dynamic information may be transmitted to the corresponding data PLP. According to an embodiment of the present invention, the header information of the IR-DYN packet is transmitted to the corresponding data PLP.

Figure 44:
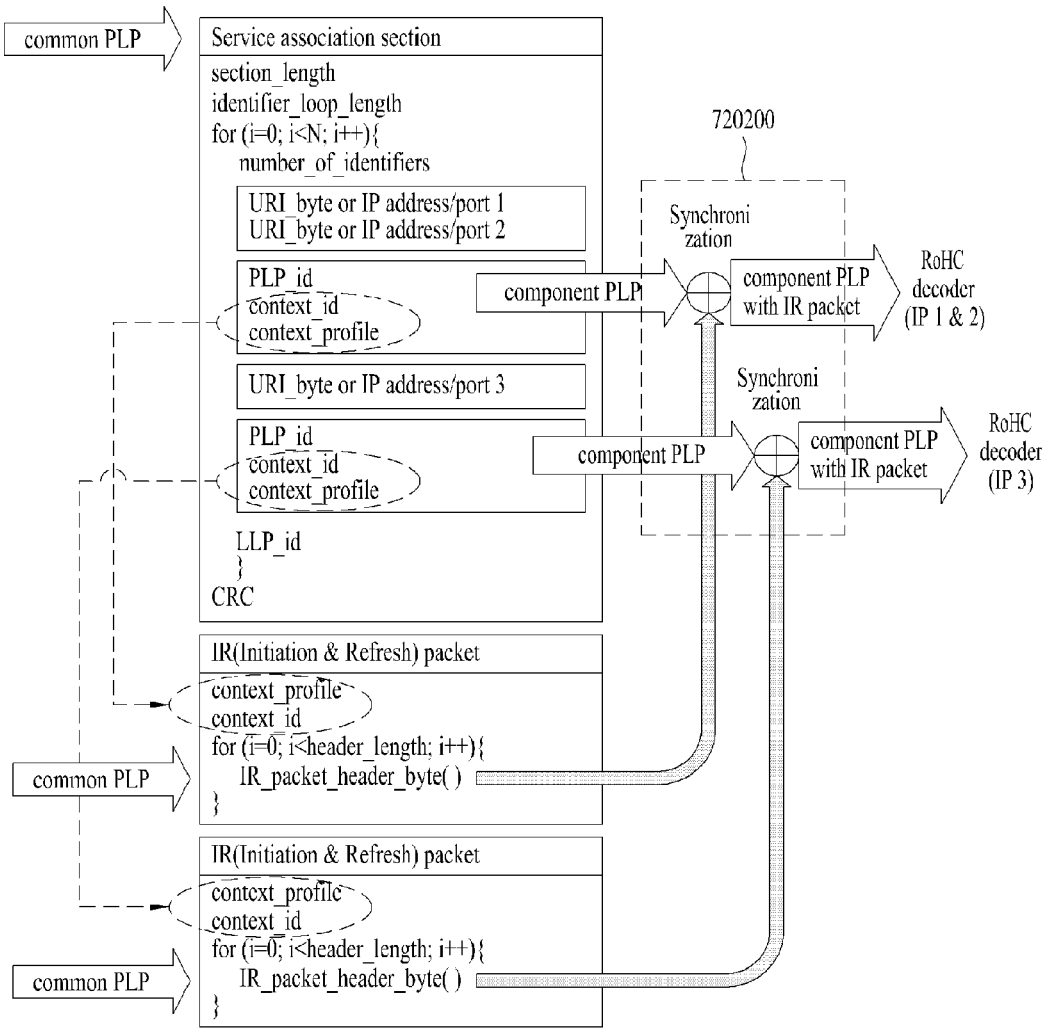
FIG. 44 illustrates an example of IP-PLP mapping information and compression information being signaled to a service association section according to the present invention.

FIG. 44 illustrates an example of the compression information being signaled to a binary type service association section. Additionally, the service association section is signaled with a URI or IP address/port number of a specific stream and PLP information matching with an IP stream, which is transmitted (or delivered) to the URI or IP address/port number of the specific IP stream. According to the embodiment of the present invention, the PLP information includes a PLP identifier (plp_id). The PLP information may further include at least one of a PLP profile (plp_profile), a system identifier (system_id), and an LLP identifier (LLP_id). The LLP_id corresponds to an identifier for identifying a Link Layer Pipe (LLP), wherein one or more PLPs are bundled as a single logical entity. More specifically, the LLP_id corresponds to an identifier for uniquely (or solely) identifying a single LLP within a network, which is identified by a network identifier. In the description of the present invention, the PLP group may be referred to as an LLP (Link-Layer-Pipe), and a PLP_GROUP_ID field may be referred to as an LLP_ID field. The receiver may be aware of the specific PLP to which the specific IP stream is related, based upon the IP-PLP mapping information, which is signaled to the service association section, and the receiver may perform decompression of the specific IP stream based upon the compression information of the specific IP stream.

According to the embodiment of the present invention, the compression information includes context profile (context_profile) information, and a context identifier (context_id). The context profile (context_profile) information and the context identifier (context_id) may be used to have the same significance as the context profile (context_profile) information and context identifier (context_id), which are included in the IP information table of FIG. 43. Therefore, since reference may be made to FIG. 43, detailed description of the same will be omitted for simplicity.

In FIG. 44, according to the embodiment of the present invention, the header information of the IR header is signaled to an IR (Initiation & Refresh) packet, thereby being transmitted through a common PLP. Herein, since the information included in the IR packet shown in FIG. 44 is identical to the IRT of FIG. 43, reference may be made to FIG. 43, and, therefore, detailed description of the same will be omitted for simplicity. At this point, the data being included in the payload of the IP packet is transmitted through the corresponding data PLP, and, therefore, illustration and description of the same will be omitted for simplicity.

At this point, the context_profile field and context_id field have the same values as the context_profile field and context_id field, which are signaled to the service association section. More specifically, the context profile information and context identifier correspond to mapping (i.e., link) information connecting (or linking) the service association section and the IR packet. Therefore, the receiver uses the context profile information and context identifier, thereby being capable of acquiring compression information of a specific IP stream from the service association section within the L2 signaling information and being capable of acquiring IR packet header information from the IR packet within the L2 signaling information. The present invention may use only the context identifier, so as to connect (or link) the service association section and the IR packet.

The header information of the IR packet being transmitted to the IR_packet_header_byte( ) field may either include both the static information and the dynamic information, or may include any one of the static information and the dynamic information. For example, the static information may be transmitted to the IR_packet_header_byte( ) field, and the dynamic information may be transmitted through the corresponding data PLP. At this point, according to the embodiment of the present invention, the header information of the IR-DYN packet is also transmitted to the common PLP.

Meanwhile, the header information of the IR packet may be signaled to the IP information table along with the compression information. At this point, among the header information of the IR packet, only the static information may be signaled to the IP information table, thereby being transmitted, and the dynamic information may be transmitted through the corresponding data PLP or may be transmitted through another table.

Figure 45:
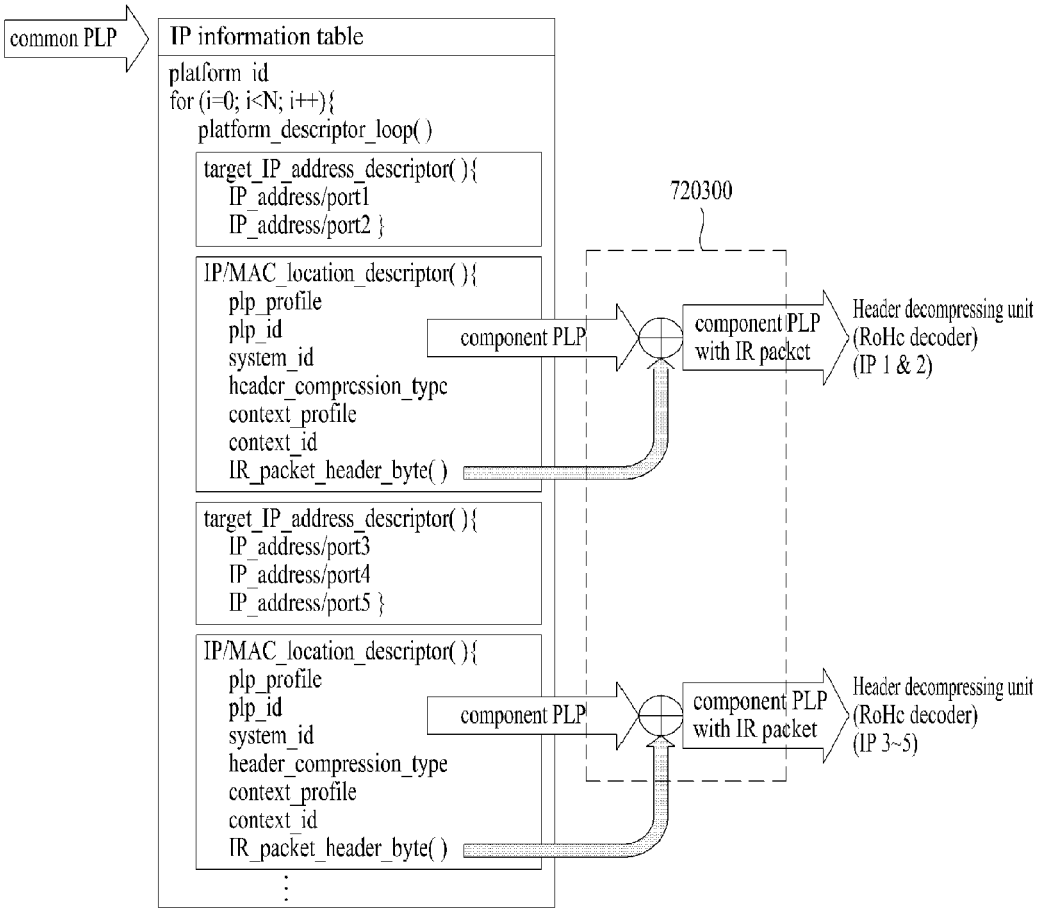
FIG. 45 illustrates another example of IP-PLP mapping information and compression information being signaled to an IP information table according to the present invention.

As another embodiment of the present invention, FIG. 45 illustrates a syntax structure of an IP information table having header information of an IR packet be signaled along with compression information. According to the embodiment of the present invention, the IP/MAC_location_descriptor( ) of the IP information table shown in FIG. 45 includes a plp_profile field, a plp_id field, a system_id field, a header_compression_type field, a context_profile field, a context_id field, and an IR_packet_header_byte( ) field. More specifically, header information of the IR packet exists in each context.

For the description of each field shown in FIG. 45, reference may be made to the description of the fields having the same title shown in FIG. 43. Therefore, the detailed description of the same will be omitted for simplicity.

As shown in FIG. 45, if the compression information and the header information of the IR packet are collectively transmitted through the IP information table, the receiver is not required to additionally search for the header information of the IR Packet. However, the size of the IP information table may become larger.

Herein, an IR_packet_header_byte( ) field, which is repeated as many times as the value of the header length (header_length) field, so as to transmit header information of 65 the IR packet, is added to the IP/MAC_location_descriptor( ) shown in FIG. 43. With the exception for such addition of the IR_packet_header_byte( )field, the IP/MAC_location_ descriptor( ) of FIG. 45 is identical to the IP/MAC_location_descriptor( ) shown in FIG. 43.

According to another embodiment of the present invention, the header information of the IR packet may be signaled to a service association section with the compression information. At this point, among the header information of the IR packet, only static information may be signaled and transmitted to the service association section and dynamic information may be transmitted in a corresponding data PLP or a common PLP in a packet form.

The present invention may signal compression information to the L1 signaling information by the transmitter, so that the receiver can respond to the compressed IP stream.

At this point, the compression information may be signaled to the L1 signaling information by adding a new field in the L1 signaling information.

According to an embodiment of the present invention, a PLP_PAYLOAD_TYPE field, which indicates the type of a PLP payload, is used for additionally signaling the compression information. For example, IP compressed and GSE compressed modes are added to the PLP_PAYLOAD_TYPE field, so that the receiver can identify whether the type of the data included in the PLP payload corresponds to any one of GFPS, GCS, GSE, TS, IP, IP compressed, and GSE compressed, by referring to the PLP_PAYLOAD_TYPE field. By performing such signaling, the receiver may be capable of identifying whether or not a stream, which is extracted during the decoding of the PLP, has been compressed, thereby being capable of determining whether or not a header decompressing unit (or RoHC decoder) should be applied. The header decompressing unit is included in the output processor of the broadcast signal receiving apparatus according to an embodiment of the present invention.

According to the embodiment of the present invention, the above-described compression of the header included in the data packet is performed by the input pre-processor of the broadcast signal transmitting apparatus. In the description of the present invention, a block that is used for compressing the header of the data packet will be referred to as a header compressing unit (or RoHC encoder).

If the header compressing unit is applied to the input pre-processor shown in FIG. 10, the header compressing unit may be provided at the inputting end of the UDP/IP filter (106010), or may be provided at the outputting end of the UDP/IP filter (106010). In case the header compressing unit is provided at the inputting end of the UDP/IP filter (106010), an IP stream corresponding to a service is inputted to the header compressing unit, wherein the header included in each data packet configuring the IP stream is compressed. Thereafter, the header-compressed data packets are inputted to the UDP/IP filer (106010), so as to be filtered for each component. At this point, if the broadcast receiving apparatus of FIG. 29 is used, the header decompressing (or decompression) unit, which performs decompressing on the header-compressed data packets, may be provided at the outputting end of the buffer unit (220700). Herein, the header decompressing unit includes an RoHC decoder.

In another example, if the header compressing unit is provided at the outputting end of the UDP/IP filter (106010), the header compressing unit performs header compression on the data packets, which are filtered for each component. In this case, the header decompressing unit of the broadcast receiving apparatus may be provided between the BBF decoder (220600) and the buffer unit (220700) of FIG. 29.

At this point, among the data packets that are header-compressed by the header compressing unit, the header information of the FO packet, and the SO packet is transmitted through the corresponding data PLP. Conversely, among the compressed packets, at least a portion of the header information included in the IR packet is transmitted through a common PLP. At this point, the data included in the payload of the IR packet may be transmitted through the corresponding data PLP. If only a portion of the header information included in the IR packet is transmitted to the common PLP, the remaining header information may be transmitted through the corresponding data PLP. And, the compression information is transmitted through the common PLP. In addition, the header information of the IR-DYN packet is transmitted through any one of a common PLP and a corresponding data PLP.

Figure 46:
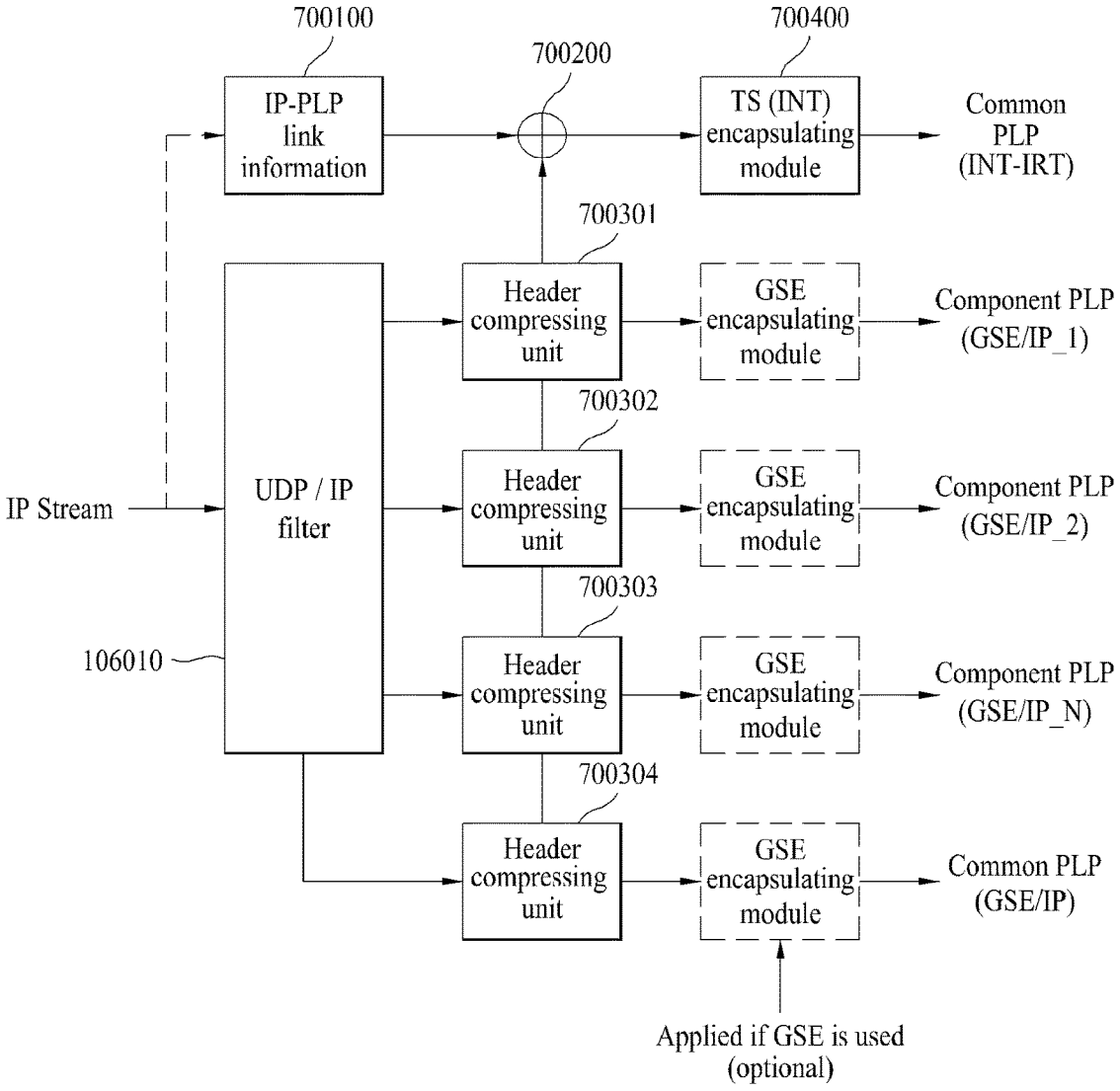
FIG. 46 illustrates a block diagram showing a structure of a portion of an input-pre-processor including a header compressing unit, which is used for compressing data packets, according to an embodiment of the present invention.

FIG. 46 illustrates a block diagram showing the structure of a portion of an input-pre-processor including a header compressing unit, which is used for compressing data packets, according to an embodiment of the present invention. Herein, FIG. 46 shows an example wherein a header compressing unit is provided as the outputting end of the UDP/IP filter (106010). The header information of the IR packet in FIG. 46 is transmitted through a common PLP and the header information of the IR-DYN packet is transmitted through the corresponding data PLP. Herein, the data PLP corresponds to a component PLP.

Referring to FIG. 46, a number of header compressing units (700301~700304) corresponding to the number of common PLPs and component PLPs is provided as the outputting end of the UDP/IP filter (106010), so that compression may be performed on the header of the corresponding data packet, which is being filtered from the UDP/IP filter (106010), by using the RoHC method.

At this point, each of the header compressing units (700301~700304) outputs header information of the IR packet and compression information to an information merger (700200), and, then, each of the header compressing units (700301~700304) outputs header information of the IR_DYN, FO, and SO packets to the respective GSE encapsulating module, so that the corresponding header information can be transmitted to the respective component PLP. Herein, the GSE encapsulating module is optional. And, a component merger may be further included at the inputting end or the outputting end of each of the header compressing units (700301~700304). Reference may be made to FIG. 10 for the detailed description of the component merger, and, therefore, a detailed description of the same will be omitted herein.

Furthermore, an IP service controller, an IP service information decoder, an IP service information correcting/generating module, and an IP stream merger are also provided in FIG. 46. However, the corresponding blocks are not shown in the drawing. Reference may be made to FIG. 10 for the detailed description of each block.

At this point, an IP-PLP link information generating unit (700100) generates IP-PLP mapping information, which includes URI or an IP address/port number transmitting each IP stream and PLP information matching with the IP stream. The information merger (700200) merges the IP-PLP mapping information, which is generated by the IP-PLP link information generating unit (700100), with the compression information being outputted from each header compressing unit (700301~700304) and the header information of the IR packet. Thereafter, the information merger (700200) outputs the merged information to the TS encapsulating module (700400), thereby signaling the merged information to at least one table (or section) of the L2 signaling information.

Herein, the compression information and the header information of the IR packet may each be signaled to the IP information table and the IRT, as shown in FIG. 43, or may be all signaled to the IP information table (or service association section), as shown in FIG. 45. If each of the compression information and the header information of the IR packet is signaled to a different table (or service association section and IR packet), as shown in FIG. 43 and FIG. 44, at least one of a context profile information and a context identifier may be used as link information for connecting the two different tables (or service association section and IR packet).

If the header compressing unit according to the present invention is applied to the broadcasting signal transmitting apparatus shown in FIG. 10, the IP-PLP link information generating unit (700100) and the information merger (700200) may be separately provided, or the functions of the IP-PLP link information generating unit (700100) and the information merger (700200) may be performed by at least one of an IP service controller (106020), an IP service information decoder (106030), an IP service information correcting/generating module (106040), and an IP stream merger (106050).

Meanwhile, if the data packets having the respective header compressed by performing the above-described header compression procedure are transmitted, after passing through the input processor (100100), the BICM module (100200), the frame builder (100300), and the OFDM generator (100400), the broadcasting signal receiving apparatus may perform header decompression based upon the IP-PLP mapping information, the compression information, and so on, which are included in the L2 signaling information, the L2 signaling information being transmitted through the L1 signaling information, the common PLP, and so on.

If the broadcasting signal receiving apparatus is identical to that shown in FIG. 19, the header decompression of the data packets is performed by the output processor (138400). And, if the broadcasting signal receiving apparatus is identical to that shown in FIG. 29, the decompression of the data packets is performed at the outputting end of the BBF decoder (220600) or the outputting end of the buffer unit (220700).

At this point, among the compressed data packets, since the header information of the IR packet are received by the common PLP, and since the header information of the remaining packets are received by the corresponding component PLP, the header information of the IR packet should be merged with the corresponding component PLP prior to performing decompression on the data packets.

Whether or not the header of the data packets being transmitted to the component PLP has been compressed may be known by using at least one of the L1 signaling information and the L2 signaling information. For example, whether or not the header of the data packets being transmitted to the corresponding component PLP may be verified based upon the PLP_PAYLOAD_TYPE field value of the L1 signaling information and/or the header_compression_type field value of the L2 signaling information.

At this point, the component PLP, which is to be merged with the header information of the IR packet, may be selected based upon the IP-PLP mapping information, which is signaled to the IP information table (or service association section) of the L2 signaling information. More specifically, when the IP-PLP mapping information is signaled and transmitted to the IP information table, as shown in FIG. 43, an IP stream having an IP address/port number, which is signaled to the target_IP_address_descriptor( ) may be known by using the PLP information of the IP/MAC_location_descriptor( ) i.e., PLP profile information and PLP identifier, which is paired with the target_IP_address_descriptor( ).

Header information of the IR packet, which is received by the common PLP is merged with a component PLP, which is selected based upon the IP-PLP mapping information. Then, decompression is performed on the header of the data packets, which is included in the component PLP being merged with the header information of the IR packet, thereby recovering the data packets to their initial states prior to being compressed. The decompression is performed based upon compression information, which is signaled to and received by the IP information table (or service association section) of the common PLP.

FIG. 43 shows an example of a merger (720100) of gaining header information of the IR packet from an IRT of the common PLP having the same value as the context profile information and context identifier of the IP information table of the common PLP, so as to merge the gained header information with the corresponding component PLP, when the IP-PLP mapping information and compression information are signaled to and received by the IP information table, and when the header information of the IR packet is signaled to and received by the IRT. Herein, the component PLP is selected based upon the IP-PLP mapping information. Moreover, the merger (720100) may either be included in the header decompressing unit of the broadcast signal receiving apparatus or may be separately configured.

When IP-PLP mapping information and the compression information are signaled to the service association section of the common PLP, thereby being received, and when the header information of an IR packet is signaled to the IR packet of the common PLP, thereby being received, the merger (720200) of FIG. 44 shows an example of extracting header information from the IR packet having the same value as the context profile information and context identifier of the service association section and, then, merging the header information of the IR packet to the corresponding component PLP based upon the SN included in the header information. Herein, the component PLP is selected based upon the IP-PLP mapping information. The merger (720200) includes a process of replacing the IR packet header with an SO packet header within the component PLP based upon the SN. The merger (720200) may either be included in the header decompressing unit of the broadcast signal receiving apparatus or may be configured separately.

When IP-PLP mapping information, compression information, and header information of the IR packet are all signaled to an IP information table, thereby being received, the merger (720300) of FIG. 45 shows an example of merging the header information of the IR packet to the corresponding component PLP. At this point, the header information of the IR packet is not required to be searched and found. Similarly, the component PLP is selected based upon the IP-PLP mapping information. The merger (720300) may either be included in the header decompressing unit of the broadcast signal receiving apparatus or may be configured separately.

According to the embodiment of the present invention, in FIG. 43 to FIG. 45, the process of merging the header information of the IR packet to the corresponding component PLP is performed by a header decompressing unit. Additionally, according to the embodiment of the present invention, the header decompressing unit further includes an RoHC decoder performing decompression on the data packets of the component PLP, which is merged with the header information of the IR packet, by using an inverse method of the RoHC compressing method.

Figure 47:
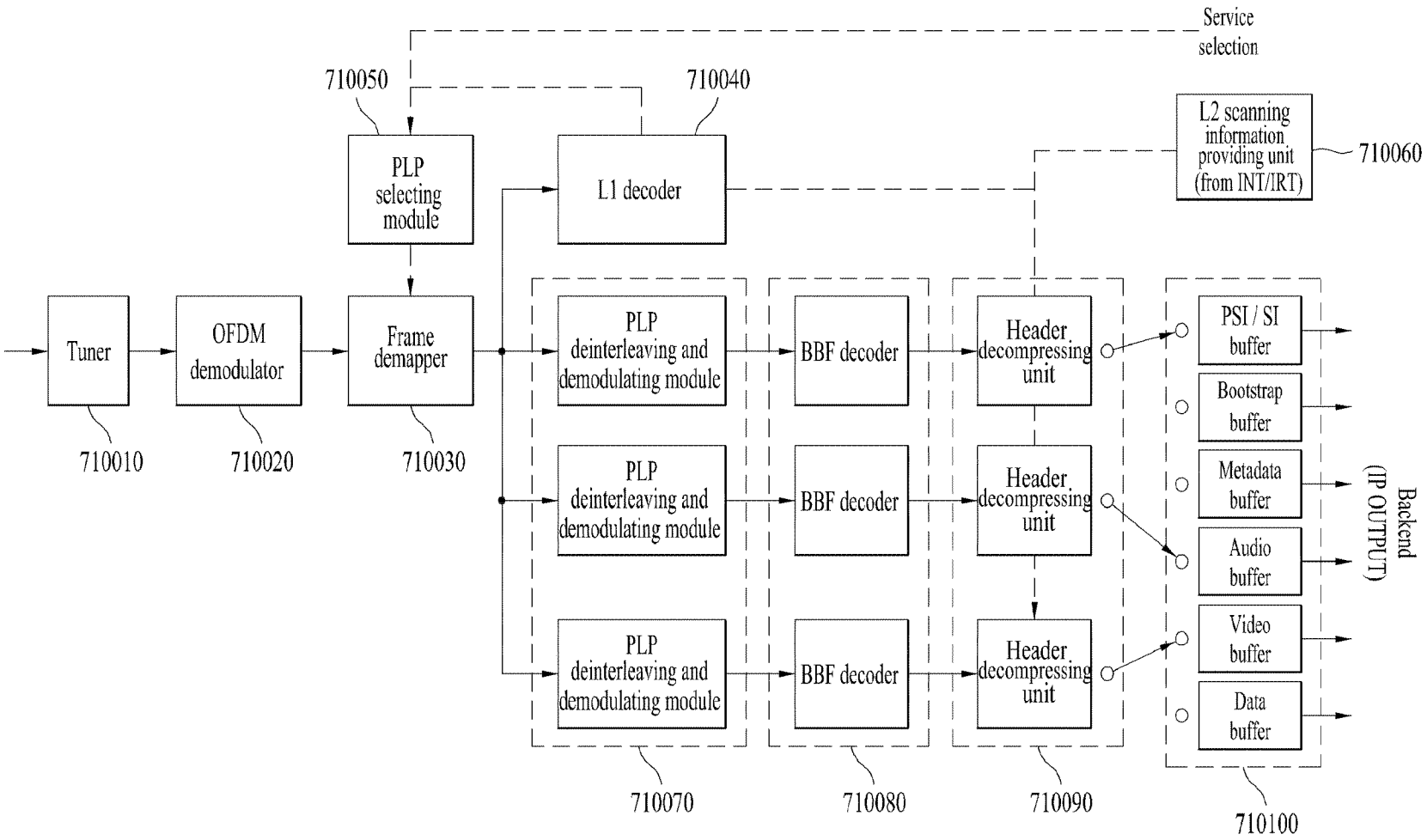
FIG. 47 illustrates a block diagram showing a broadcast signal receiving apparatus according to another embodiment of the present invention, (a) to (c) of FIG. 48 illustrate an example of transmitting header information of an IR packet and header information of an IR-DYN packet through a common PLP according to the present invention, (a) to (f) of FIG. 49 illustrate an example of a header of an SO packet or an FO packet generated based on a header of an IR packet and a header of an IR-DYN packet having a sequence number according to the present invention, (a) to (c) of FIG. 50 illustrate an example of restoring an IR packet and an IR-DYN packet based on a sequence number from a data PLP and a common PLP in a broadcast signal receiving apparatus according to the present invention.

FIG. 47 illustrates a block diagram showing the structure of the broadcasting signal receiving apparatus according to yet another embodiment of the present invention, wherein a header decompressing unit (710090) is provided between a BBF decoder (710080) and a buffer unit (710100). More specifically, FIG. 47 corresponds to an exemplary embodiment of the present invention respective to when a header compressing unit of the broadcasting signal transmitting apparatus is provided at the outputting end of the UDP/IP filter (106010). If the header compressing unit is provided at the inputting end of the UDP/IP filter (106010), the header decompressing unit (710090) is provided at the outputting end of the buffer unit (710100).

Referring to FIG. 47, with the exception for an L2 scanning information generating unit (710060) and a header decompressing unit (710090), the operation processes of the remaining blocks are identical to those of the identical blocks included in the broadcasting signal receiving apparatus shown in FIG. 29. Therefore, detailed description of the same will be omitted for simplicity.

The L2 scanning information generating unit (710060) extracts IP-PLP mapping information and compression information from the L2 signaling information, which is received by the common PLP, and then outputs the extracted information to the header decompressing unit (710090). Additionally, the L2 scanning information generating unit (710060) outputs the header information of the IR packet, which is received by the common PLP, to the header decompressing unit (710090). For example, if the IP-PLP mapping information and the compression information are signaled to and received by the IP information table, and if the header information of the IR packet is signaled to and received by the IRT, header information of the IR packet is extracted from an IRT having the same values as the context profile information and context identifier of the IP information table, thereby being outputted. Furthermore, when the IP-PLP mapping information and the compression information are signaled and received to the service association section and the header information of the IR packet is signaled and received to the IR packet, the header information of the IR packet is extracted from the IR packet having the same values as the context profile information and the context identifier of the service association section, and then is outputted, as shown in FIG. 44, The header decompressing unit (710090) selects a component PLP that is to be merged with the header information of the IR packet based upon the inputted IP-PLP mapping information. Then, the header decompressing unit (710090) merges the header information of the IR packet to the selected component PLP. Thereafter, the header decompressing unit (710090) performs decompression on the header of each data packet included in the component PLP, which is merged with the header information of the IR packet, based upon the compression information, thereby recovering the data packets to a state prior to being processed with compression.

Then, among the PSI/SI (IP service information) buffer, the bootstrap buffer, the metadata buffer, the audio buffer, the video buffer, and the data buffer of the buffer unit (710100), the PLP data that are decompressed by the header decompressing unit (710090) are outputted to any one of the corresponding buffer via switching. Reference may be made to the description of FIG. 29 for the processing of the PLP data, wherein header compression is not performed.

Meanwhile, according to the embodiment of the present invention, when the header information is separated from the IR packet and transmitted to the common PLP, as shown in FIG. 43 to FIG. 45, the header of the corresponding IR packet, which is being transmitted to the component PLP (i.e., data PLP), may be replaced with the header of an SO or FO packet. Additionally, according to the embodiment of the present invention, even when the header information of the IR-DYN packet is being transmitted to the common PLP, the header of the corresponding IR-DYN packet, which is being transmitted to the data, may be replaced with the header of an SO or FO packet. According to the embodiment of the present invention, the present invention replaces the header of the IR packet and the header of the IR-DYN packet both being transmitted to the data PLP with the header of an SO packet. More specifically, among the compressed data packets, the IR packet is converted (or shifted) to an FO or SO packet and transmitted to the corresponding data PLP, and the header information of the IR packet is transmitted to the common PLP. At this point, in order to merge the header information of the IR packet, which is being received through the common PLP, with the payload of the corresponding IR packet, which is being received through the data PLP, so as to completely recover the IR Packet, sync information is required. According to the embodiment of the present invention, a sequence number (SN) is used as the sync information. More specifically, according to the embodiment of the present invention, the header of the IR packet and the header of the SO packet, which is to replace the header of the IR packet, may have the same sequence number. If the header information of the IR-DYN packet is transmitted to the common PLP, the same may be applied to the IR-DYN packet.

Figure 48:
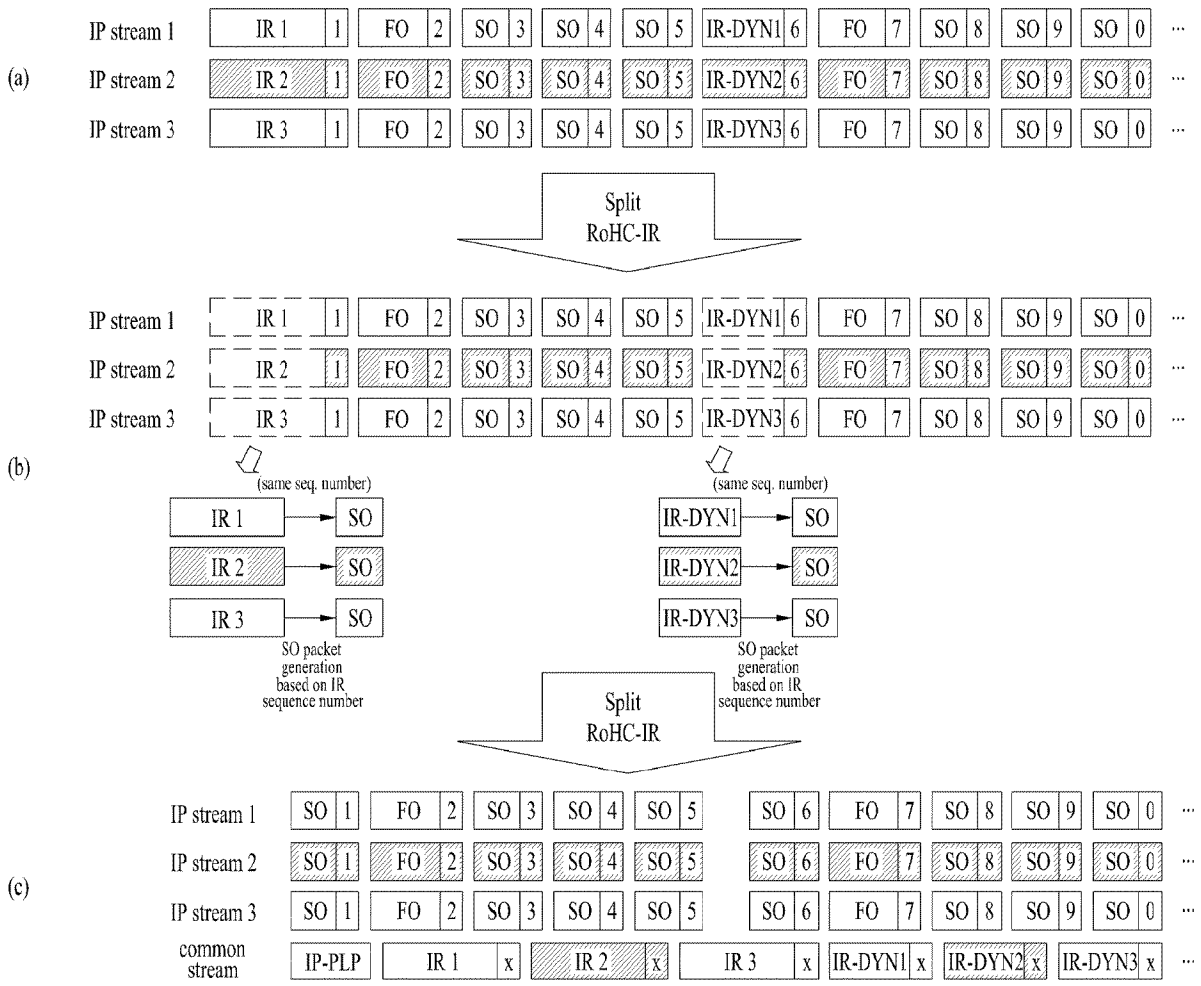

(a) to (c) of FIG. 48 illustrate examples of separating the header information of the IR Packet and the header information of the IR-DYN packet, which occupy a large number of bytes in the IP header compression, and transmitting the processed information to a common stream. More specifically, the drawings show an example of transmitting the initial (or original) IR packet header information and IR-DYN packet header information, which were respectively included in the IR packet and the IR-DYN packet, to a stream after respectively replacing the IR packet header and IR-DYN packet header with the header of the SO packet in the IR packet and the IR-DYN packet. At this point, the common stream is transmitted through a common PLP.

(a) of FIG. 48 shows an example of compressing each of 3 IP streams (IP stream 1, IP stream 2, IP stream 3) by using the RoHC compression method. In this case, each of the 3 IP streams has a different context identifier. In the first to third IP streams (IP stream 1, IP stream 2, IP stream 3), the numbers 1~0 correspond to the payload sections (or portions) to which actual data are transmitted.

(b) of FIG. 48 shows an example of generating each SO packet header based upon a sequence number included in the IR packet header and the IR-DYN packet header of the first to third IP streams (IP stream 1, IP stream 2, IP stream 3). For this, the IR packet and IR-DYN packet are detected from each IP stream based upon the RoHC header information.

Thereafter, a 1-byte SO packet header is generated for each stream based upon the sequence number included in the detected IR packet and the IR-DYN packet. Regardless of the type, since the SO packet header includes SN information, the SO packet header may be arbitrarily generated. At this point, according to the embodiment of the present invention, the sequence number included in a specific IR packet and the sequence number included in the SO packet header, which is generated based upon the sequence number of the IR packet header, are identical. Additionally, according to the embodiment of the present invention, the sequence number included in a specific IR-DYN packet and the sequence number included in the SO packet header, which is generated based upon the sequence number of the IR-DYN packet header, are also identical. For example, the sequence number included in the SO packet header, which is generated based upon IR packet 1 (IR1) of the first IP stream (IP stream 1) is identical to the sequence number included in the header of IR packet 1 (IR1).

(c) of FIG. 48 replaces each SO packet header generated in (b) of FIG. 48 with the corresponding IR packet header or the corresponding IR-DYN packet header and transmits the replaced header to the corresponding IP stream and, then, transmit the IR packet, which consists of the IR packet header and a null payload, or the IR-DYN packet, which consists of the IR-DYN packet header and a null payload, to a common stream. More specifically, in each IP stream, the IR packet and the IR-DYN packet are converted to the SO packet and then transmitted. Herein, each IP stream is transmitted through each data PLP, and the common stream is transmitted through a common PLP. In the common stream of (c) of FIG. 48, x of the IR packet or IR-DYN packet corresponds to the payload portion (or section), which is configured of null data. Essentially, SN corresponds to information existing in RTP. However, in case of the UDP, the transmitting end may arbitrarily generate and use the SN.

More specifically, the header of the IR packet included in the IP stream, which is being transmitted to the data PLP, is replaced with the header of an SO packet having the same sequence number, and the header of the IR-DYN packet is replaced with the header of an SO packet having the same sequence number, and, at this point, the data existing in the payload remains unchanged. Thereafter, the IR packet included in the common stream, which is transmitted through the common PLP, is configured of header information of the IR packet prior to being replaced with the SO packet header and a null payload, and the IR-DYN packet is configured of header information of the IR-DYN packet prior to being replaced with the SO packet header and a null payload. Therefore, the IR packet of FIG. 44 is configured of an IR packet header and a null payload.

At this point, IP-PLP mapping information (IP-PLP) and compression information are included in the common stream and then transmitted. For example, as shown in FIG. 44, the IP-PLP mapping information and the compression information are transmitted through the service association section. According to the embodiment of the present invention, the service association section is included in the L2 signaling information.

Figure 49:
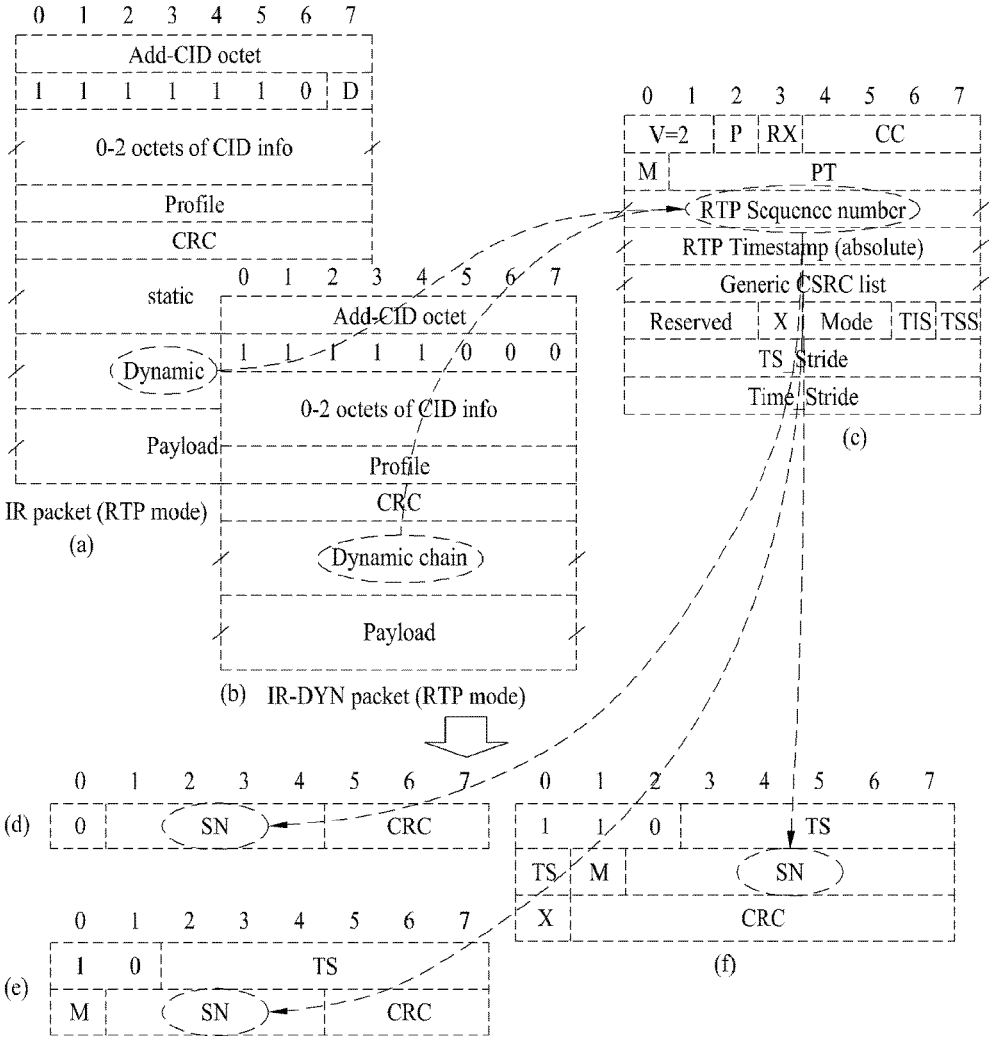

(a) to (f) of FIG. 49 illustrate examples of an SO or FO packet header generated based upon an IR packet header and an IR-DYN packet header each having a sequence number.

First of all, (a) of FIG. 49 shows an example of the header information of the IR packet, which is compressed by using the RoHC method in the RTP mode, and (b) of FIG. 49 shows an example of the header information of the IR-DYN packet, which is compressed by using the RoHC method in the RTP mode. (c) of FIG. 49 shows an example of information being included in a dynamic chain of (a) of FIG. 49 or (b) of FIG. 49.

More specifically, the IR packet include static information (or static chain information) and dynamic information (or dynamic chain information), and the IR-DYN packet includes dynamic information (or dynamic chain information). At this point, the dynamic information includes a sequence number, as shown in (c) of FIG. 49.

In the IR packet header of (a) of FIG. 49, a first octet is signaled with information (Add-CID) notifying that a context identifier is being added, and a second octet is signaled with information identifying the header as the IR packet header. For example, according to the embodiment of the present invention, the information for identifying the header as the IR packet header corresponds to 1111110D. Thereafter, among 3 octets, at least one octet is signal with a context identifier, and a next octet is signaled with context profile information. Then, CRC, static information (or static chain information), dynamic information (or dynamic chain information) are sequentially signaled.

In the IR-DYN packet header of (b) of FIG. 49, a first octet is signaled with information (Add-CID) notifying that a context identifier is being added, and a second octet is signaled with information identifying the header as the IR-DYN packet header. For example, according to the embodiment of the present invention, the information for identifying the header as the IR-DYN packet header corresponds to 11111000. Thereafter, among 3 octets, at least one octet is signal with a context identifier, and a next octet is signaled with context profile information. Then, CRC, static information (or static chain information), dynamic information (or dynamic chain information) are sequentially signaled.

The dynamic information of (a) of FIG. 49 or (b) of FIG. 49 includes a sequence number, as shown in (c) of FIG. 49.

(d) to (f) of FIG. 49 show examples of an SO packet header or an FO packet header having the same sequence number as the sequence number of (c) of FIG. 49. More specifically, as header information of the IR/IR-DYN packet is transmitted to a common stream, the header of the corresponding packet is replaced with an SO packet header or an FO packet header and then transmitted to a data PLP. Herein, the sequence number is used for indicating the header that is being replaced. Since both headers have a sequence number, the receiver may use the sequence number, so as to recover the IR/IR-DYN packet. Moreover, time stamp information may also be additionally used for the sync.

Figure 50:
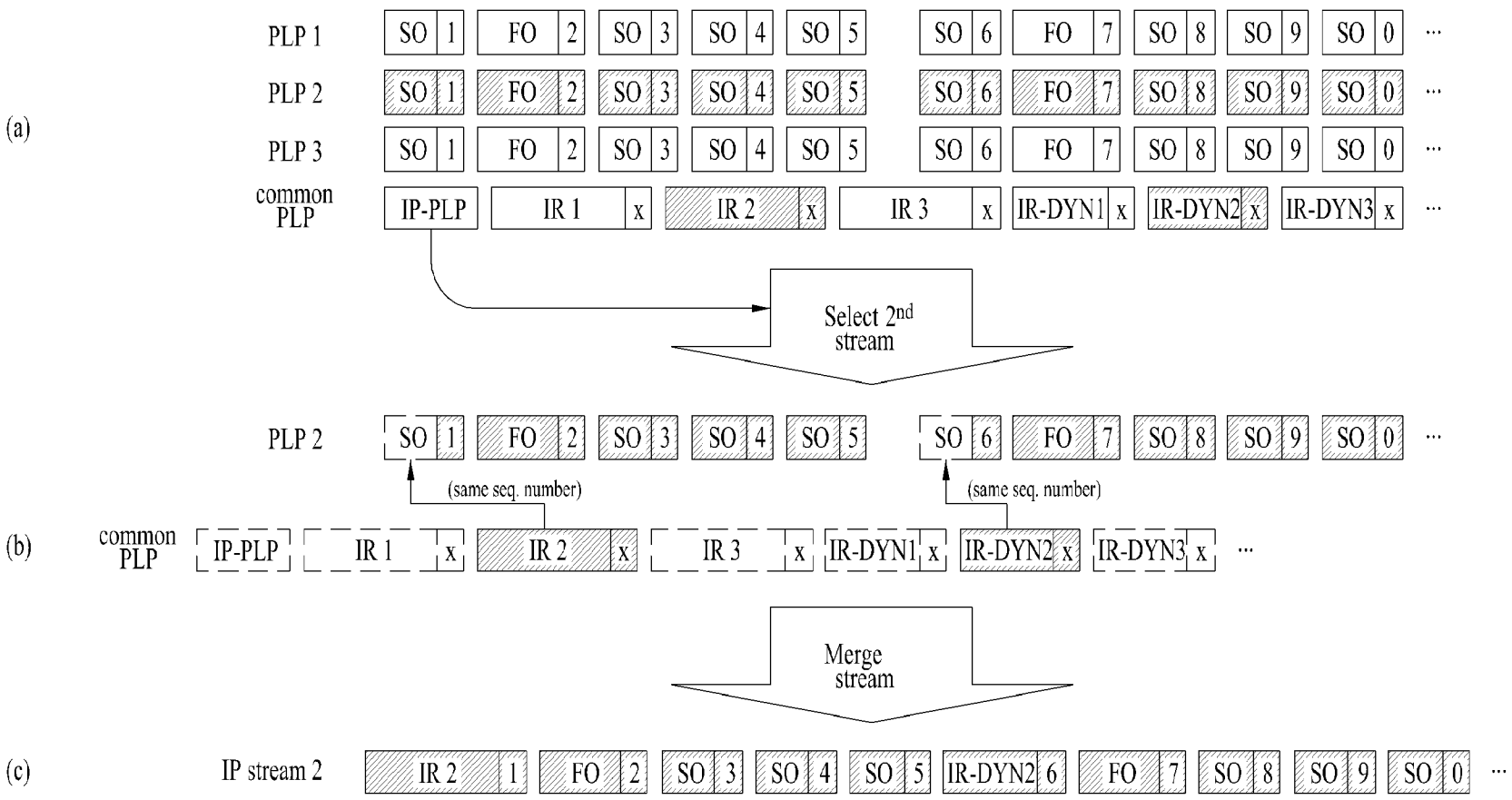

(a) to (c) of FIG. 50 illustrate an exemplary process of having the broadcast receiver recover an IR packet and an IR-DYN packet from the data PLP and the common PLP based upon the sequence number.

(a) of FIG. 50 shows an example of SO packets and FO packets being received through 3 data PLPs (PLP1, PLP2, PLP3), and IR packets including IR packet header information and IR-DYN packets including IR-DYN packet header information through a common PLP. At this point, the numbers 1~0 in the 3 data PLPs correspond to payload sections (or portions) to which data are actually transmitted, and x in the common PLP corresponds to a payload section (or portion) configured of null data.

(b) of FIG. 50 shows an example of selecting a second data PLP (PLP2) among the first to third data PLPs (PLP1, PLP2, PLP3) of (a) of FIG. 50 and re-replacing the SO packet header of the selected second data PLP (PLP2) and the IR packet header or IR-DYN packet header of the second data PLP (PLP2), which is received through a common PLP based upon the sequence number included in each header. For example, an SO packet header having the same sequence number as the sequence number included in the header of IR packet 2 (IR 2) of the second data PLP (PLP2), which is received through the common PLP, is detected from the second data PLP, and, then, the 2 headers replace one another, thereby recovering the SO packet of the second data PLP to the initial (or original) IR packet. The remaining IR packets or IR-DYN packets are also recovered by using the same method. At this point, the selection of the second data PLP and the detection of the IR/IR-DYN packets of the second data PLP, which is received through the common PLP, are realized and performed based upon the IP-PLP mapping information, which is received through the common PLP. According to the embodiment of the present invention, the IP-PLP mapping information is signaled to a binary type service association section, thereby being received through the common PLP.

(c) of FIG. 50 shows an example of an IP stream of the second data PLP having the IR packets and IR-DYN packets, which are recovered by performing such procedure, included therein. Thereafter, based upon the compression information, which is received through the common PLP, RoHC decoding is performed, so as to decompress the recovered IR packets and IR-DYN packets.

Figure 51:
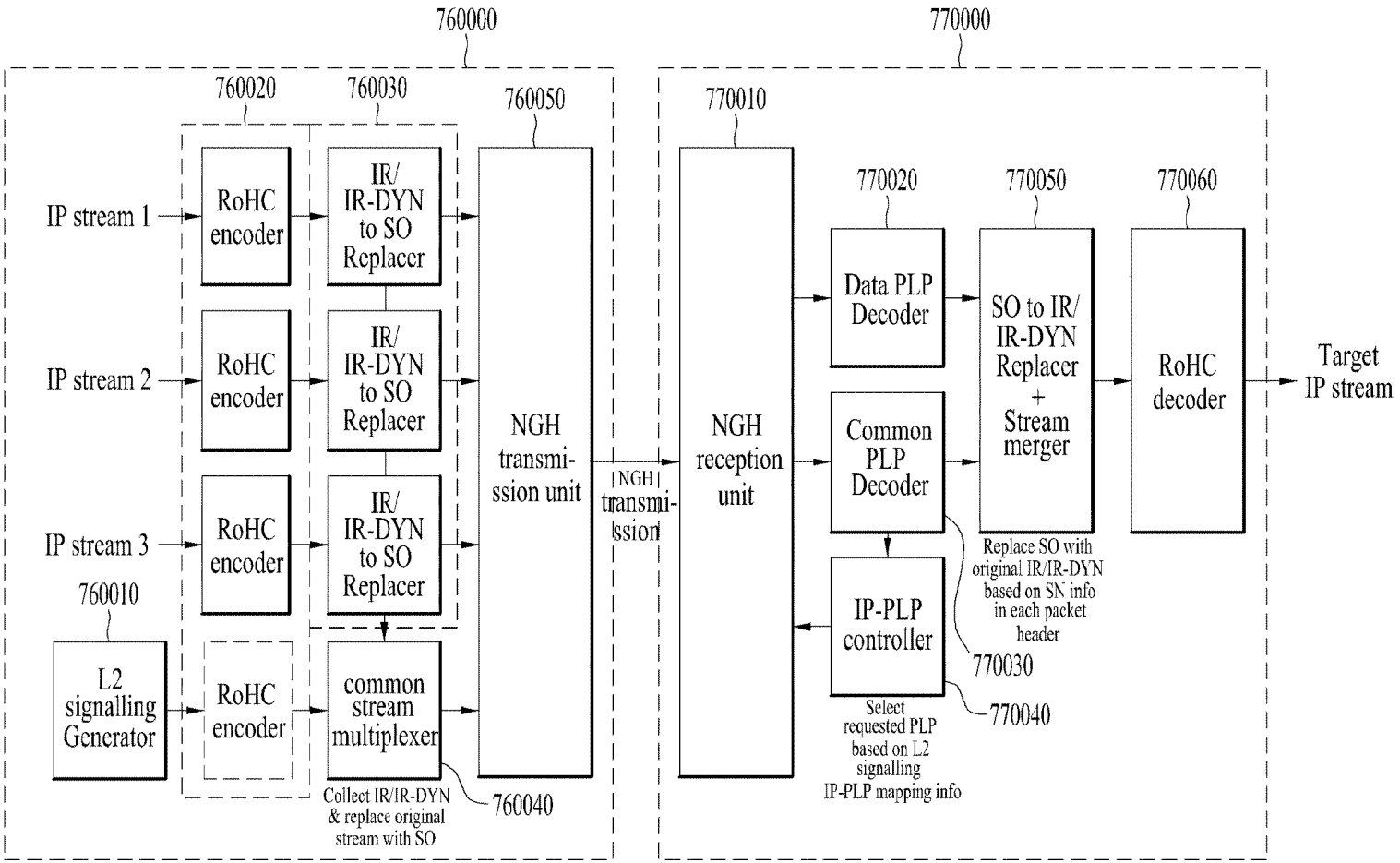
FIG. 51 illustrates a block diagram showing a broadcast signal transmitting apparatus and a broadcast signal receiving apparatus according to another embodiment of the present invention.

FIG. 51 illustrates a block view showing the structure of a broadcast signal transmitting apparatus and a broadcast signal receiving apparatus according to another embodiment of the present invention. The broadcast signal transmitting apparatus and the broadcast signal receiving apparatus of FIG. 51 are configured to compress and transmit IP streams and to receive and decompress the compressed IP streams, as shown in FIG. 48 to FIG. 50.

In FIG. 51, the broadcast signal transmitting apparatus (760000) includes an L2 signaling generator (760010) generating L2 signaling information, which is to be transmitted through the common PLP, a plurality of RoHC encoders (760020) receiving each IP stream and performing RoHC-encoding on the received IP streams, a plurality of transmission replacers (760030) replacing each IR packet header and/or IR-DYN packet header being RoHC-encoded and outputted from the plurality of transmission replacers (760030) with an SO packet header, which is generated based upon a sequence number, a common stream multiplexer (760040) multiplexing the L2 signaling information and the IR packet header information and/or IR-DYN packet header information to the common stream and then outputting the multiplexed information through the common PLP, and an NGH transmission unit (760050) receiving the output of the plurality of transmission replacers (760030) and the common stream multiplexer (760040), so as to perform FEC encoding for error correction, signal frame generation, OFDM modulation, and so on.

If the broadcast signal transmitting apparatus (760000) is applied to FIG. 6, the L2 signaling generator (760010), the plurality of RoHC encoders (760020), and the plurality of transmission replacers (760030) correspond to part of the input pre-processor (100000). And, the NGH transmission unit (760050) includes the input processor (100100), the BICM encoder (100200), the frame builder (100300), and the OFDM generator (100400). Additionally, in the broadcast signal transmitting apparatus (760000), the RoHC encoder provided at an outputting end of the L2 signaling generator (760010) is optional. When using the broadcast signal transmitting apparatus of FIG. 46, the transmission replacer may be included in the header compressing unit or may be provided at the outputting end of the header compressing unit. Moreover, the broadcast signal transmitting apparatus of FIG. 46 may be further equipped with a common stream multiplexer, and, among the already-existing blocks, at least one block may be used to perform the functions of a common stream multiplexer.

For example, in FIG. 48, data packets included in the first to third IP streams (IP stream 1, IP stream 2, IP stream 3) are inputted to the RoHC encoder (760020) of FIG. 51, thereby compressing each header of the data packets by using the RoHC method, as shown in (a) of FIG. 48. At this point, each of the compressed IP stream may also be referred to as an RoHC stream, and each RoHC stream is configured of RoHC packets. In the description of the present invention, the IR packets, IR-DYN packets, SO packets, and FO packets will each be referred to as an RoHC packet. Herein, each packet includes a sequence number, which is configured of multiple bits. Each IP stream having its packet header compressed by the RoHC encoder (760020) is outputted to the transmission replacer (760030).

The transmission replacer (760030) detects an IR packet and IR-DYN packet from each compressed IP stream and replaces the detected IR packet header and IR-DYN packet header with the header of an SO packet having the same sequence number, as shown in (b) of FIG. 48. At this point, each IP stream being configured of the FO packets and SO packets is outputted to the NGH transmission unit (760050) through each data PLP. Additionally, the replacer (760030) outputs the initial (or original) IR packet header information and the initial (or original) IR-DYN packet header information to the common stream multiplexer (760040).

The L2 signaling generator (760010) configures L2 signaling information, which includes reception information, such as IP-PLP mapping information, system parameter, frequency, and so on, and outputs the generated L2 signaling information to the corresponding RoHC encoder in an IP packet format. The RoHC encoder compresses each header of the IP packets including the L2 signaling information by using the RoHC method and outputs the compressed headers to the common stream multiplexer (760040). Herein, the RoHC compression of the IP packet header including the L2 signaling information may be omitted.

The common stream multiplexer (760040) configures an IR packet by adding a null payload to the IR packet header information, which is outputted from the transmission replacer (760030), and configures an IR-DYN packet by adding a null payload to the IR-DYN packet header information. Then, the common stream multiplexer (760040) multiplexes the IR packet, IR-DYN packet, L2 signaling information compressed by using the RoHC method, and other common data to a common stream, and outputs the multiplexed data to the NGH transmission unit (760050) through the common PLP. Herein, the IR packet that is to be transmitted to the common PLP includes context profile information and a context identifier, as shown in FIG. 44. The context profile information and the context identifier are configured to link IP-PLP mapping information, which is transmitted to a service association section. Herein, the same context profile information and context identifier are included in the service association section along with the corresponding IP-PLP mapping information, thereby being transmitted. This may be identically applied to an IR-DYN packet.

The NGH transmission unit (760050) performs FEC encoding for error correction, signal frame generation, OFDM modulation, and so on, on each data PLP, which is configured of SO packets and FO packets after being processed with header replacement in the transmission replacer (760030), and on a common PLP being outputted from the common stream multiplexer (760040). A broadcast signal including the OFDM-modulated signal frame is transmitted to the broadcast signal receiving apparatus (770000).

Meanwhile, the broadcast signal receiving apparatus (770000) includes an NGH reception unit (770010) receiving a broadcast signal being transmitted from the NGH transmission unit (760050) of the broadcast signal transmitting apparatus (760000) and performing OFDM demodulation, signal frame parsing, FEC decoding on the received signal, thereby dividing the processed signal into a data PLP, a common PLP, and so on, a data PLP decoder (770020) decoding the data PLP, which is outputted from the NGH reception unit (770010), a common PLP decoder (770030) decoding the common PLP, which is outputted from the NGH reception unit (770010), a controller (770040) extracting IP-PLP mapping information, compression information, and so on, from a common stream of the decoded common PLP, so as to control PLP selection, a reception replacer (770050) replacing the SO packet header, which is received through the data PLP, with the IR packet header and/IR-DYN packet header, which is/are received through the common PLP, based upon the respective sequence number, thereby recovering the initial (or original) IP packet or IR-DYN packet, and an RoHC decoder (770060) performing RoHC decoding on the RoHC packets including the IR packets and IR-DYN packets, which are outputted from the reception replacer (770050).

If the broadcast signal receiving apparatus of FIG. 51 is applied to FIG. 19, the NGH reception unit includes the OFDM demodulator (138100), the frame demapper (138200), and the BICM decoder (138300). And, the data PLP decoder (770020), common PLP decoder (770030), controller (770040), reception replacer (770050), and the RoHC decoder (770060) correspond to part of the output processor (138400). If the broadcast signal receiving apparatus of FIG. 47 is used, the reception replacer may be included in a header decompressing or may be equipped at an inputting end of the header decompressing unit. The header compressor includes an RoHC encoder.

The NGH reception unit (770010) of FIG. 51 receives the broadcast signal being transmitted from the NGH transmission unit (760050) of the broadcast signal transmitting apparatus (760000) and performs OFDM demodulation, signal frame parsing, and FEC decoding on the received broadcast signal, thereby dividing the processed signal into data PLP, common PLP, and so on. At this point, when multiple data PLPs exist, at least one data PLP is selected in accordance with the control of the controller (770040) and then transmitted to the data PLP decoder (770020). For example, as shown in (a) of FIG. 50, first to third IP streams (IP stream 1, IP stream 2, IP stream 3) are compressed and received, and, among the received IP streams, when the second IP stream (IP stream 2) is selected, the second data PLP (PLP2) including the compressed second IP stream (IP stream 2) is selected and then outputted to the data PLP decoder (770020). Additionally, the common PLP is outputted to the common PLP decoder (770030).

The data PLP decoder (770020) performs decoding on the inputted second data PLP (PLP2), so as to output the FO/SO packets, which are included in the IP stream of the second data PLP, to the reception replacer (770050). The common PLP decoder (770030) decodes the inputted common PLP, so as to extract the IP-PLP mapping information, compression information, and so on, which are included in the common stream of the common PLP, and then to output the extracted information to the controller (770040). Additionally, the common PLP decoder (770030) extracts the IR packet header information and IR-DYN packet header information of the data PLP, which is requested to be selected, from the common stream and outputs the extracted information to the reception replacer (770050).

The controller (770040) controls the NGH reception unit (770010) so that the data PLP, which is requested to be selected, can be selected with reference to the IP-PLP mapping information, and so on.

Among the SO packets being outputted from the data PLP decoder (770020), the reception replacer (770050) extracts an SO packet having the same SN as the IR/IR-DYN packet being transmitted to the common PLP, and, then, the reception replacer (770050) replaces the header of the extracted SO packet with the IR packet header or IR-DYN packet header of the common PLP having the same SN, as shown in (b) of FIG. 50. Accordingly, as shown in (c) of FIG. 50, the IR packet header information and IR-DYN packet header information, which are received in the common PLP, are merged to the second IP stream, which is received in the second data PLP. According to the embodiment of the present invention, if the header information of the IR packet is signaled and transmitted, as shown in FIG. 44, the reception replacer (770050) performs the function of the merger (or merging unit) (720200) shown in FIG. 44. The second IP stream, i.e., the RoHC stream including IR packets, IR-DYN packets, FO packets, and SO packets, is decoded by the RoHC decoder (770060) using the RoHC decoding method, thereby being recovered to the second IP stream prior to being compressed.

Figure 52:
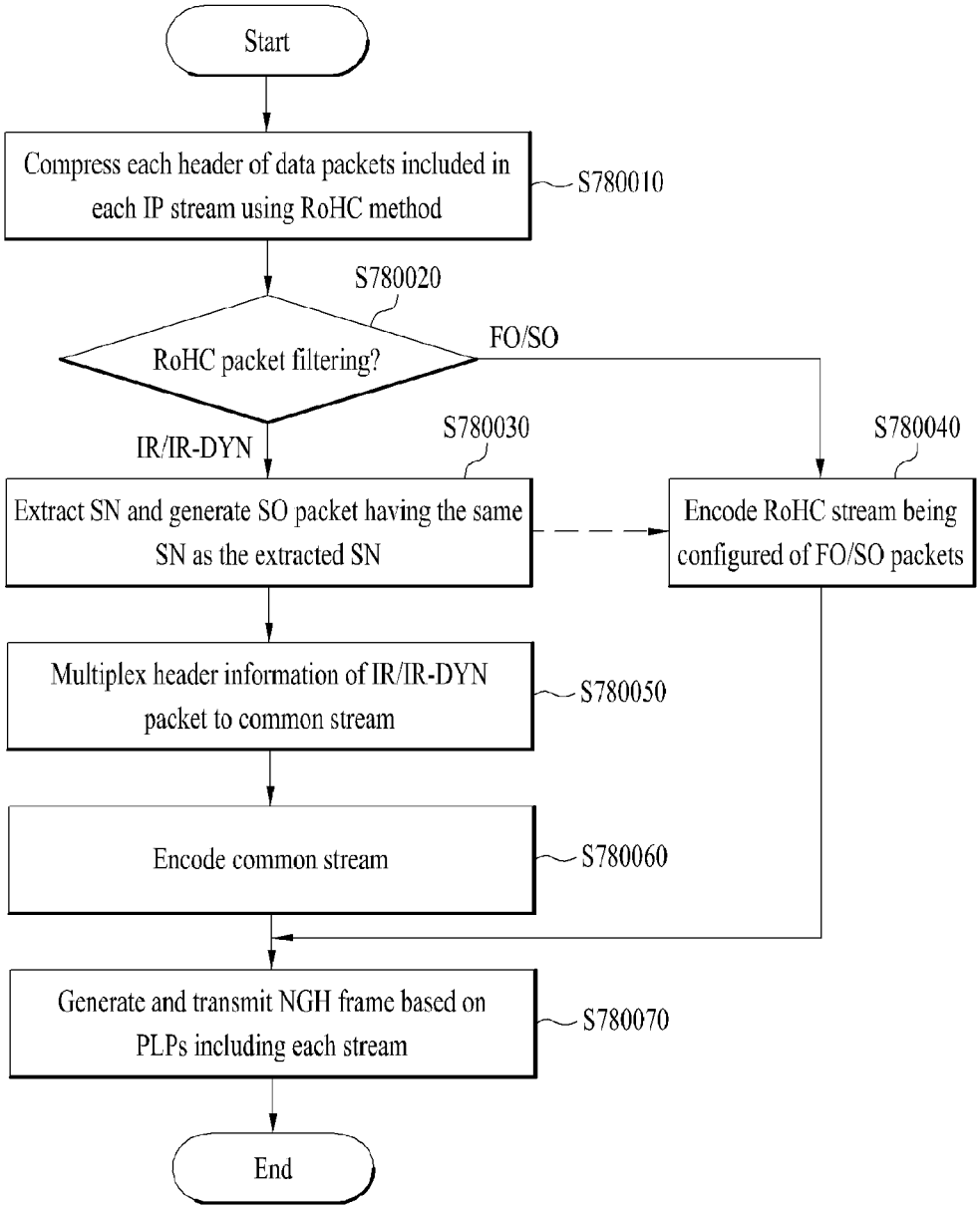
FIG. 52 illustrates a flow chart showing a method for compressing and transmitting a data packet header based upon the broadcast signal transmitting apparatus according to an exemplary embodiment of the present invention.

FIG. 52 illustrates a flow chart showing a method for compressing and transmitting a data packet header based upon the broadcast signal transmitting apparatus (760000) of FIG. 51 according to an exemplary embodiment of the present invention. First of all, each header of the data packets included in each IP stream and each header of the data packets being included in the common stream, which includes L2 signaling information, are compressed by the RoHC encoder (760020) using the RoHC method, thereby being outputted as an RoHC stream (S780010). The transmission replacer (760030) filters the RoHC packets being included in each of the RoHC streams, which are compressed by the RoHC encoder (760020) using the RoHC method. The RoHC packets signify the IR packets, the IR-DYN packets, the SO packets, and the FO packets. At this point, the FO/SO packets are directly outputted from the transmission replacer (760030) to the NGH transmission unit (760050). Thereafter, among the RoHC packets, the transmission replacer (760030) extracts an SN from an IR packet header and, then, generates an SO packet header having the same SN as the extracted SN (S780030). This is equally applied to the IR-DYN packet. Subsequently, after replacing the header of the IR packet and the header of the IR-DYN packet with the header of the respective SO packet having the same sequence number, the replaced SO packets are outputted to the NGH transmission unit (760050). The NGH transmission unit (760050) performs encoding for error correction on each RoHC stream being configured of FO packets and SO packets (S780040).

Additionally, the transmission replacer (760030) outputs the initial (or original) IR packet header information and the initial (or original) IR-DYN packet header information to the common stream multiplexer (760040). The common stream multiplexer (760040) adds a null payload to the IR packet header information being outputted from the transmission replacer (760030), so as to configure an IR packet, and adds a null payload to the IR-DYN packet header information being outputted from the transmission replacer (760030), so as to configure an IR-DYN packet, and, then, the common stream multiplexer (760040) multiplexes the configured packets to a common stream, which includes L2 signaling information being compressed by using the RoHC method, thereby outputting the processed data to the NGH transmission unit (760050) through the common PLP (S780050). The NGH transmission unit (760050) performs encoding for error correction on the common stream including the L2 signaling information, the IR packet header information, and the IR-DYN packet header information (S780060). Furthermore, after generating a signal frame (e.g., NGH frame) from each RoHC stream and common stream being encoded for error correction, and after performing OFDM modulation on the generated signal frame, the NGH transmission unit (760050) transmits a broadcast signal including the OFDM-modulated signal frame through an OFDM carrier.

Figure 53:
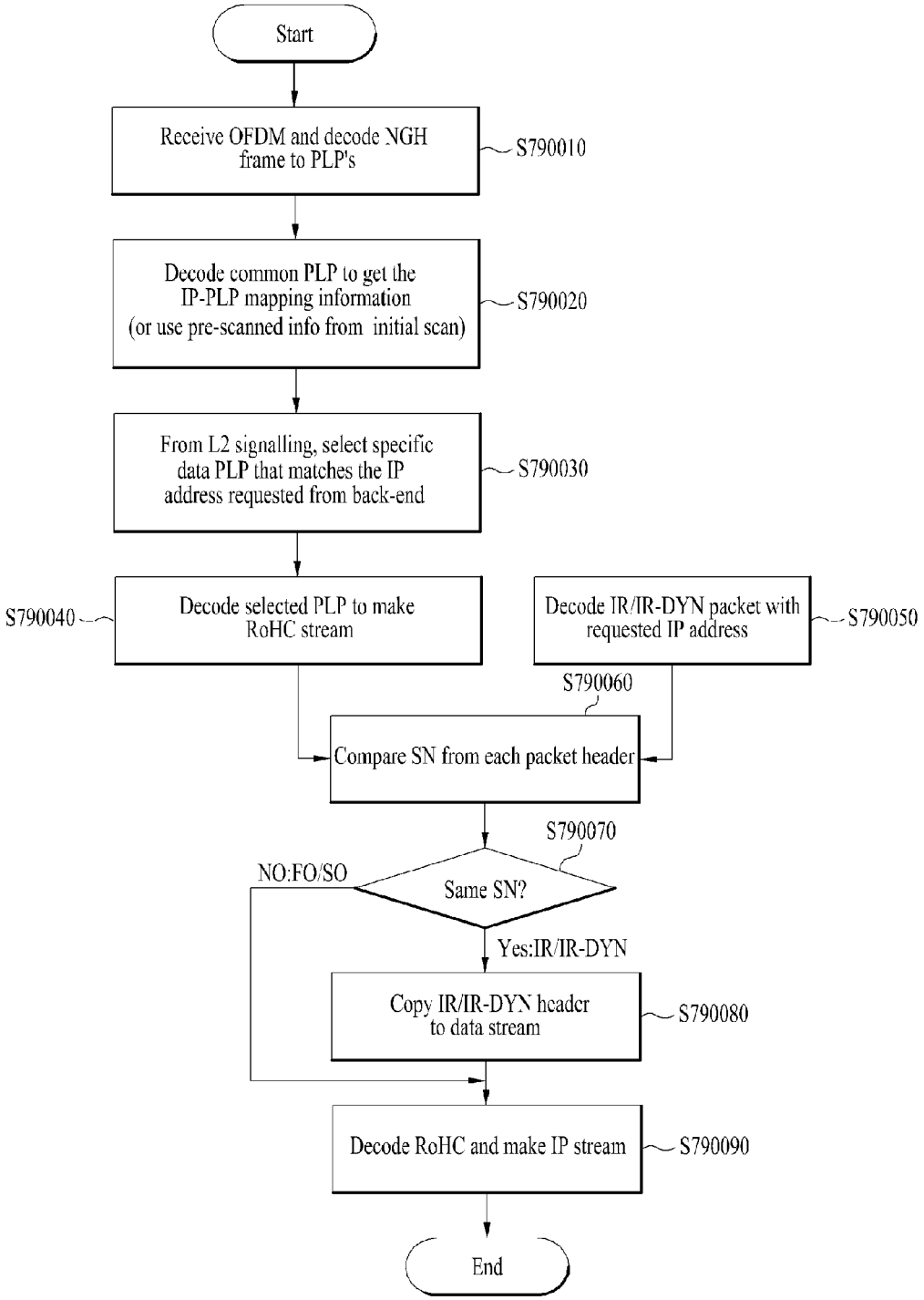
FIG. 53 illustrates a flow chart showing a method of performing header decompression on a data packet based upon the broadcast signal receiving apparatus according to an embodiment of the present invention.

FIG. 53 illustrates a flow chart showing a method of performing decompression on a data packet based upon the broadcast signal receiving apparatus of FIG. 51 according to an embodiment of the present invention.

More specifically, the NGH reception unit (770010) receives a broadcast signal including a signal frame frame (e.g., NGH frame) and then performs OFDM modulation, signal frame parsing, and FEC decoding on the received signal, thereby dividing the processed signal into a data PLP, a common PLP, and so on (S790010). At this point, when multiple data PLPs exists, at least one data PLP is selected, based upon the control of the controller (770040), and then outputted to the data PLP decoder (770020). Additionally, the common PLP is outputted to the common PLP decoder (770030).

The common PLP decoder (770030) decodes the inputted common PLP, so as to extract IP-PLP mapping information, compression information, and so on from the L2 signaling information, which is included in a common stream of the common PLP, thereby outputting the processed information to the controller (770040) (S790020).

The controller (770040) controls the NGH reception unit (770010), so that a specific data PLP matching with an IP address, which is requested from a back-end, based upon the L2 signaling information including the IP-PLP mapping information (S790030).

The data PLP decoder (770020) performs decoding on the inputted data PLP and then outputs the FO/SO packets, which are included in the IP stream of the data PLP, to the reception replacer (770050) (S790040). The common PLP decoder (770030) extracts IR packet header information and IR-DYN packet header information having the request IP address and outputs the extracted information to the reception replacer (770050) (S790050).

The reception replacer (770050) compares the SN of the SO packets being outputted from the data PLP decoder (770020) with the SN of IR packets or IR-DYN packets being outputted from the common PLP (S790060). If an SO packet and an IR packet or IR-DYN packet having the same SN are detected (S790070), the headers of the two detected packets are replaced (S790080). This procedure is performed on all packets of a specific data PLP, so as to replace the IR packet header and IR-DYN packet header, which are received in the common PLP with respective SO packet headers of a specific data PLP. Accordingly, the IR packet header information and IR-DYN packet header information, which are received in the common PLP, are merged to an IP stream, which is received in the specific data PLP. More specifically, the IP stream is recovered to a RoHC stream, which is configured of IR packets consisting of initial (or original) IR packet header and payload, IR-DYN packets consisting of initial (or original) IR-DYN packet header and payload, SO packets, and FO packets. The RoHC stream is decoded by the RoHC decoder (770060) using the RoHC decoding method, thereby being recovered to the second IP stream prior to being compressed (S790090).

Figure 54:
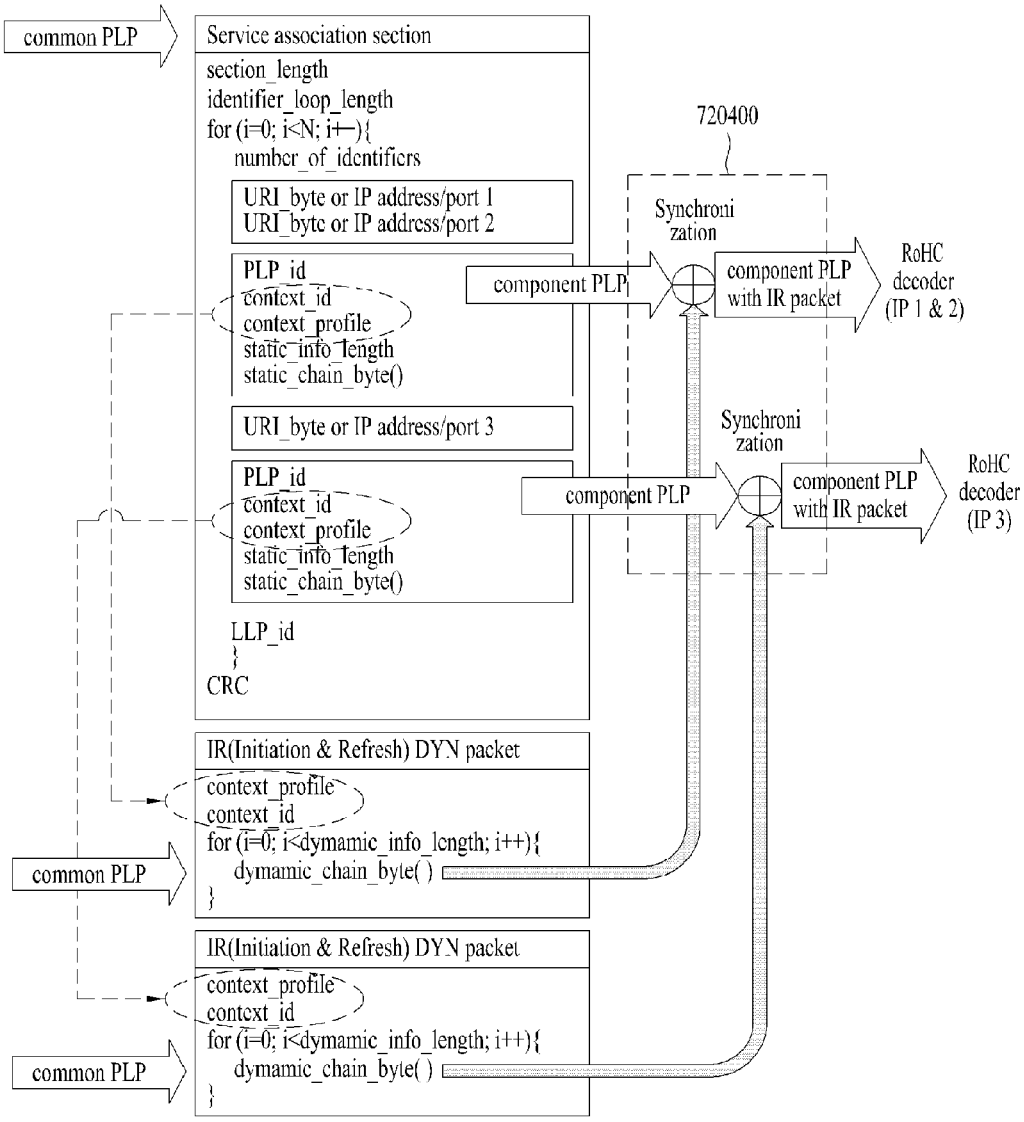
FIG. 54 illustrates IP-PLP mapping information and compression information being signaled to a service association section according to yet another embodiment of the present invention, FIG. 55 (a) to FIG. 55 (c) illustrate examples of transmitting header information of the IR packet and header information of the IR-DYN packet to a common PLP, FIG. 56 (a) to FIG. 56 (c) show examples of a process of having the broadcast signal receiving apparatus recovering an IR packet and an IR-DYN packet from a data PLP and a common PLP based upon a sequence number.

FIG. 54 illustrates compression information being signaled to a binary type service association section according to yet another embodiment of the present invention.

Herein, the difference between FIG. 44 and FIG. 54 is that, in FIG. 54, static information within the IR packet header is included in the service association section, thereby being transmitted to the common PLP. More specifically, in FIG. 54, the static information within the IR packet header is transmitted by using a static_chain_byte( ) field within the service association section. Therefore, with the exception for the static_chain_byte( ) field, reference may be made to FIG. 44 for the detailed description of the remaining fields. Herein, the static_chain_byte( ) field is iterated (or repeated) as many times as the value of a static_info_length field, so that, among the header information of the IR packet, static information can be transmitted.

According to the embodiment of the present invention, in FIG. 54, dynamic information or IR-DYN packet header information within the IR packet is signaled to an IR-DYN packet having a null payload, thereby being transmitted to the common PLP. At this point, also, data included in the IR packet payload or data included in the IR-DYN packet payload are transmitted through the corresponding data PLP, and, herein, the corresponding drawings and detailed description will be omitted for simplicity.

In FIG. 54, a context_profile field and a context_id field within the IR-DYN packet have the same values as the context_profile field and the context_id field, which are signaled to the service association section. More specifically, the context profile information and the context identifier correspond to mapping (i.e., link) information connecting (or linking) the service association section and the IR-DYN packet. Therefore, the receiver uses the context profile information and context identifier, so as to be capable of acquiring compression information of a specific IP stream and static information within the IR packet header from the service association section and capable of acquiring dynamic information within the IR packet header and IR-DYN packet header information from the IR-DYN packet. The present invention may use only the context identifier, so as to connect (or link) the service association section and the IR-DYN packet.

In the IR-DYN packet of FIG. 54, a dynamic_chain_byte( ) field is iterated (or repeated) as many times as the value of a dynamic_info_length field, so as to transmit dynamic information among the IR packet header information, or to transmit IR-DYN packet header information.

Among the IR packet header information, the merger (720400) of FIG. 54 extracts static information from the service association section of the common PLP, and the merger (720400) then extracts header information from an IR-DYN packet of a common PLP having the same context profile information and context identifier values as those belonging to the service association section, so as to configure IR packet header information by using both header information. Thereafter, the merger (720400) merges the header information of the IR packet to the corresponding data PLP based upon the SN, which is included in the IR packet header information. Herein, the component PLP is selected based upon the IP-PLP mapping information. The merger (720400) includes a process of replacing the IR packet header with an SO packet header within the data PLP based upon the SN. The merger (720400) may either be included in the header decompressing unit of the broadcast signal receiving apparatus or may be configured separately.

Figure 55:
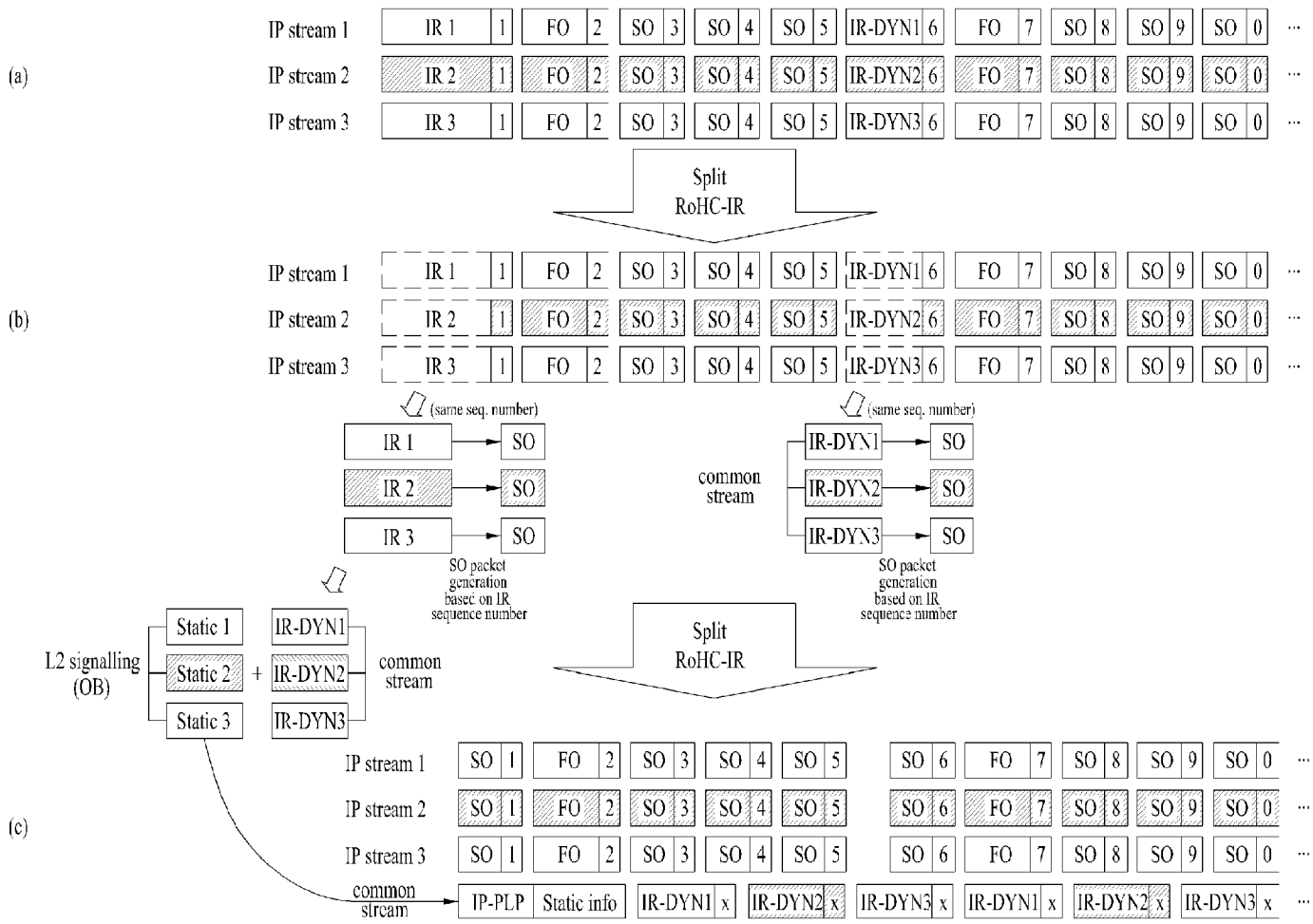

(a) to (c) of FIG. 55 illustrate examples of transmitting the header information of the IR packet and the header information of the IR-DYN packet, which occupy a large number of bytes in the IP header compression, as shown in FIG. 54, to a common PLP. More specifically, the drawings show an example of transmitting the initial (or original) IR packet header information and IR-DYN packet header information, which were respectively included in the IR packet and the IR-DYN packet, to a stream after replacing the IR packet header and IR-DYN packet header with the header of the SO packet in the IR packet and the IR-DYN packet. Most particularly, among the header information of the IR packet, the static information is signaled to the service association section, which is included in the L2 signaling information, thereby being transmitted to the common PLP.

With the exception for the static information within the IR packet header being included in the service association section and then transmitted, (a) to (c) of FIG. 55 are identical to (a) to (c) of FIG. 48. Therefore, reference may be made to (a) to (c) of FIG. 48 for the description of the parts that are not described in (a) to (c) of FIG. 55.

More specifically, as shown in (b) of FIG. 55, the header of the IR packet, which is included in each IP stream, is replaced with a header of an SO packet having the same sequence number as the sequence number included in the IR packet header, and the header of the IR-DYN packet is replaced with a header of an SO packet having the same sequence number as the sequence number included in the IR-DYN packet header. In other words, the IR packet and IR-DYN packet included in each IP stream are converted to SO packets. At this point, the data, which are included in the payload of the IR packet and the IR-DYN packet, are not changed.

Moreover, as shown in (c) of FIG. 55, among the header information of the IR packet, static information is included in the service association section, and dynamic information corresponds to header information of an IR-DYN packet having a null payload. Herein, the service association section and the IR-DYN packet having the null payload are both included in the common stream and are transmitted through the common PLP. At this point, IP-PLP mapping information and compression information are also transmitted through the service association section. According to the embodiment of the present invention, the service association section is included in the L2 signaling information.

As described above, by including the static information included in the IR packet header to the service association section having IP-PLP mapping information signaled thereto, and by periodically transmitting the static information, the static information may be searched and found and reused only during initial scanning.

Figure 56:
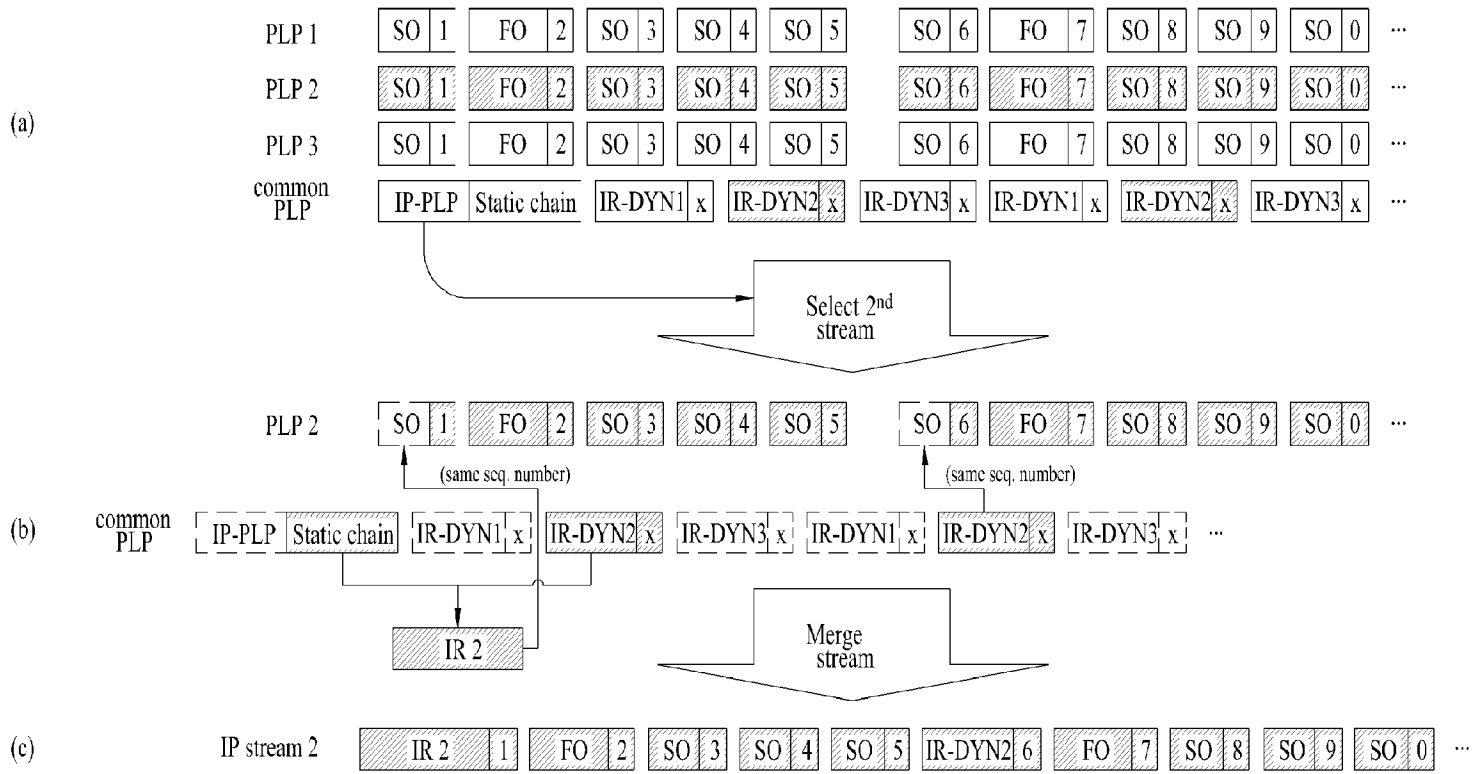

(a) to (c) of FIG. 56 show examples of a process of having the broadcast signal receiving apparatus recover an IR packet and an IR-DYN packet from an data PLP and a common PLP based upon a sequence number. With the exception for acquiring static information from the service association section, which is received in the common PLP, and acquiring dynamic information from the header of the IR-DYN packet, thereby configuring an IR packet and replacing the configured IR packet with an SO packet having the same sequence number of that being received in the data PLP, FIG. 56 is identical to (a) to (c) of FIG. 50. Therefore, reference may be made to (a) to (c) of FIG. 50 for the parts of (a) to (c) of FIG. 56 that have not been described in detail.

More specifically, as shown in (b) of FIG. 56, a header of an IR packet, which is to be merged to a specific data PLP (e.g., PLP2)), is configured of static information being included in the service association section and dynamic information being included in the IR-DYN packet, based upon at least one of IP-PLP mapping information, context profile information, and context identifier, which are included in the service association section.

Subsequently, after detecting an SO packet having the same sequence number as the sequence number, which is included in the IR packet header, from the second data PLP (PLP2), the two headers with one another, the SO packet of the second data PLP is recovered to the initial (or original) IR packet. The remaining IR packets or IR-DYN packets are also recovered by using the same method. At this point, the selection of the second data PLP and the detection of IR-DYN packets of the second data PLP, which is received by the common PLP, are performed based upon the IP-PLP mapping information, which is received by the common PLP. According to the embodiment of the present invention, the IP-PLP mapping information is signaled to a binary type service association section, thereby being received in the common PLP.

(c) of FIG. 56 shows an example of an IP stream of a second data PLP including IR packets and IR-DYN packets, which are recovered after processing the above-described procedure. Additionally, an RoHC decoding process decompressing the RoHC packets, which include the recovered IR packets and IR-DYN packets, is performed based upon the compression information received in the common PLP.

When FIG. 54 to FIG. 56 are applied to the broadcast signal transmitting apparatus of FIG. 51, the common stream multiplexer (760040) may further include a static information splitter splitting (or separating) static information and dynamic information from the initial (or original) IR packet header. The static information splitter receives IR packet header information from at least one RoHC encoder and splits (or divides) the received header information into static information and dynamic information. In this case, the common stream multiplexer (760040) includes the static information to the service association section and adds a null payload to the dynamic information, so as to configure the IR-DYN packet. Additionally, the common stream multiplexer (760040) adds a null payload to header information of the IR-DYN packet, which is outputted from at least one RoHC encoder, thereby configuring the IR-DYN packet. The L2 signaling information including the service association section, the IR-DYN packets, and other common data are multiplexed to the common stream, thereby being outputted to the NGH transmission unit (760050) through the common PLP. Herein, the IR-DYN packet that is to be transmitted to the common PLP includes context profile information and a context identifier, as shown in FIG. 54. The context profile information and context identifier are used for linking IP-PLP mapping information, which is being transmitted to the service association section, and, therefore, the same context profile information and context identifier are included in the service association section along with the corresponding IP-PLP mapping information, thereby being transmitted.

The NGH transmission unit (760050) performs FEC encoding for error correction, signal frame generation, OFDM modulation, and so on, on the data of each data PLP being configured of SO packets and FO packets, after having the header replacement process performed by the transmission replacer (760030), and on the data of the common PLP being outputted from the common stream multiplexer (760040). The broadcast signal including the OFDM-modulated signal frame (e.g., NGH frame) is transmitted to the broadcast signal receiving apparatus (770000). Herein, for the parts that are not described herein, reference may be made to the description of the broadcast signal transmitting apparatus (760000) of FIG. 51.

When FIG. 54 to FIG. 56 are applied to the broadcast signal receiving apparatus of FIG. 51, the common PLP decoder (770030) decodes the common PLP, which is being inputted from the NGH reception unit (770010), so as to extract IP-PLP mapping information, compression information, and so on, from the service association section, which is included in the L2 signaling information of the common PLP, thereby outputting the extracted information to the controller (770040). Additionally, among the IR packet header information of the data PLP, which is requested to be selected, the common PLP decoder (770030) extracts static information from the service association section and extracts dynamic information from the header of an IR-DYN packet, so as to configure header information of the IR packet including the both information, thereby outputting the configured header information to the reception replacer (770050). Moreover, header information of the IR-DYN packet of the data PLP, which is requested to be selected, is also extracted from the IR-DYN packet, thereby being outputted to the reception replacer (770050).

Among the SO packets being outputted from the data PLP decoder (770020), the reception replacer (770050) extracts an SO packet having the same SN as the header information of an IR packet or header information of an IR-DYN packet being outputted from the common PLP decoder (770030) and, then, replaces the header of the extracted SO packet with the header of the IR packet or the header of the IR-DYN packet having the same SN as the extracted SO packet. Accordingly, the header information of the IR packet and the header information of the IR-DYN packet, which are received in the common PLP, are merged to the IP stream of the selected data PLP. According to the embodiment of the present invention, if the header information of the IR packet is signaled and transmitted, as shown in FIG. 54, the reception replacer (770050) performs the function of the merger (720400) shown in FIG. 54. The IP stream, i.e., the RoHC stream including the IR packets, the IR-DYN packets, the FO packets, and the SO packets, is decoded by the RoHC decoder (770060) by using the RoHC method based upon the compression information, thereby being recovered as the IP stream prior to being compressed. For the parts that are not described herein, reference may be made to the description of the broadcast signal receiving apparatus (760000) of FIG. 51.

Figure 57:
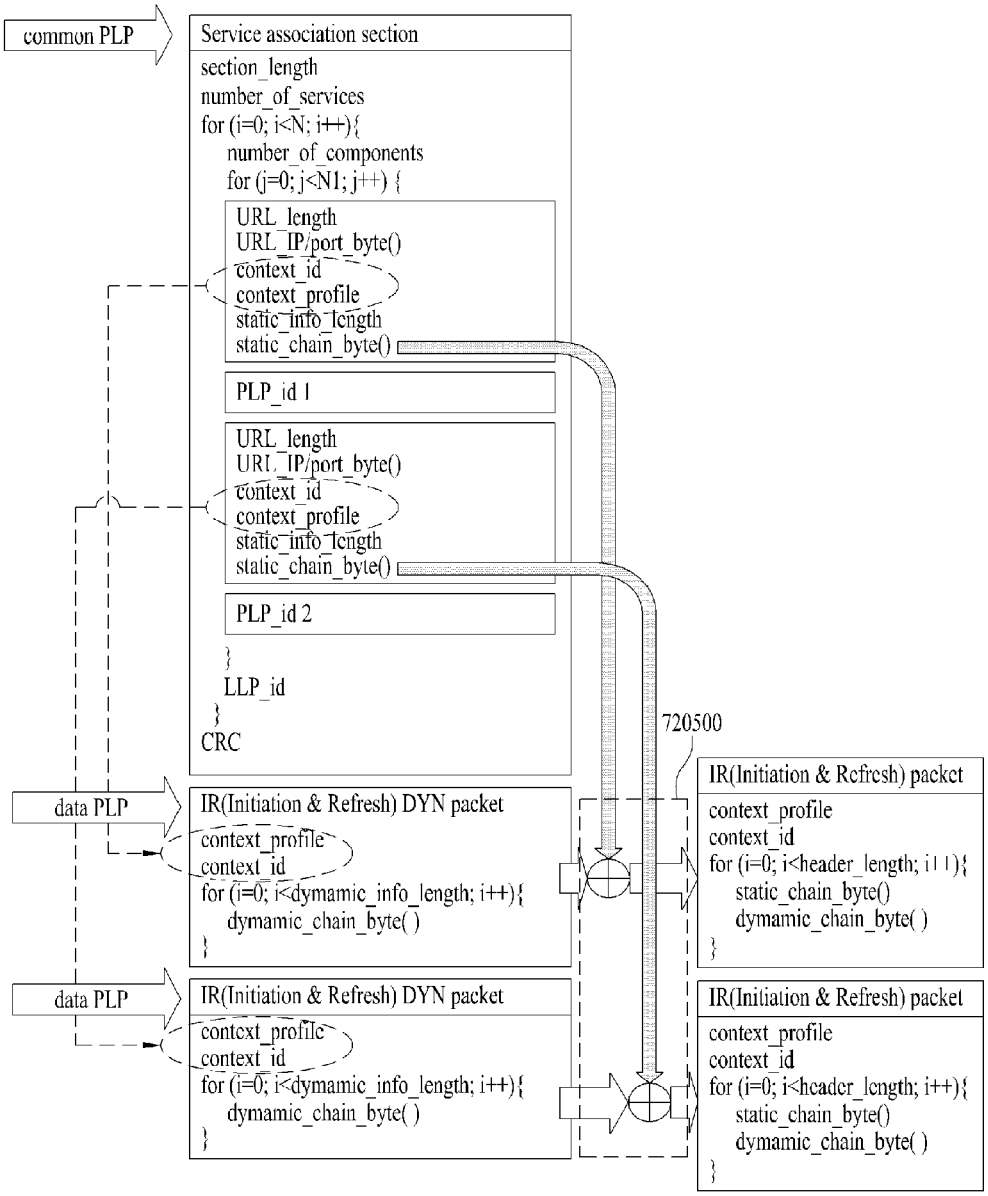
FIG. 57 illustrates IP-PLP mapping information and compression information being signaled to a service association section according to yet another embodiment of the present invention, FIG. 58 (a) to FIG. 58 (c) illustrate examples of transmitting static information, among header information of an IR packet to a common PLP, FIG. 59 (a) and FIG. 59 (b) show examples of the IR packet and the IR-DYN packet being inter-changed (or inter-shifted) in a broadcast transmitting/receiving apparatus according to the present invention, FIG. 60 (a) to FIG. 60 (c) illustrate an example of restoring an IR packet from a data PLP and a common PLP in the broadcast receiving apparatus according to the present invention.

FIG. 57 illustrates compression information being signaled to a binary type service association section according to yet another embodiment of the present invention.

In case of FIG. 57, among the header information of the IR packet of each IP stream, the static information is transmitted through the common PLP, and, among the header information of the IR packet, dynamic information is transmitted through the corresponding data PLP. Most particularly, according to the embodiment of the present invention, the static information is signaled to the service association section included in the L2 signaling information. At this point, according to the embodiment of the present invention, the header information of the IR-DYN packet of each IP stream is transmitted through the corresponding data PLP.

More specifically, in FIG. 57, a static_chain_byte( ) field within the service association section transmits static information within the IR packet header. At this point, a static_info_length field indicates the size of static information within the IR packet header being transmitted through the static_chain_byte( ) field. The static information is not required to be included in each transmission frame. Instead, the static information may be stored in the broadcast signal receiving apparatus during an initial scan and may, then, be reused for recovering the IR packet during each service access.

At this point, the dynamic information within the IR packet header is transmitted through the corresponding data PLP, and, therein, the RoHC packet transmitting the dynamic information within the IR packet header becomes the IR-DYN packet. More specifically, when static information is split (or separated) from the header of the IR packet, the IR packet is shifted (or converted) to the IR-DYN packet. When the IR packet is converted (or shifted) to the IR-DYN packet, the information for identifying the header of the IR packet is converted to information for identifying the header of the IR-DYN packet. The IR-DYN packet uses the dynamic_chain_byte( ) field, which is iterated (or repeated) as many times as the value of the dynamic_info_length field, so as to transmit dynamic information with the header of the IR packet.

As described above, the static information within the header of the IR packet is signaled to the L2 signaling information and then transmitted in order to reduce overhead of the data PLP, and the dynamic information within the IR packet header or header information of the IR-DYN packet is signaled to each IR-DYN packet, thereby being transmitted to the corresponding data PLP. In this case, the broadcast signal receiving apparatus adds static information, which is received by being included in the L2 signaling information, to a first IR-DYN packet, which is received by being included in the corresponding data PLP, so as to convert the IR-DYN packet to the IR packet, thereby using the corresponding information has the first IR packet header that can be RoHC decoded.

In FIG. 57, a context_profile field and a context_id field within the IR-DYN packet have the same values as the context_profile field and the context_id field, which are signaled to the service association section. More specifically, the context profile information and the context identifier correspond to mapping (i.e., link) information connecting (or linking) the service association section and the IR-DYN packet. Therefore, the receiver uses the context profile information and context identifier, so as to be capable of acquiring compression information of a specific IP stream and static information within the IR packet header from the service association section, which is included in the L2 signaling information of the common PLP, and capable of acquiring dynamic information within the IR packet header and IR-DYN packet header information of the corresponding data PLP from the IR-DYN packet. The present invention may use only the context identifier, so as to connect (or link) the service association section and the IR-DYN packet.

The merger (720500) of FIG. 57 extracts static information of the header information belonging an packet of the selected data PLP from the service association section of the common PLP, and the merger (720500) then extracts header information belonging to a first IR-DYN packet of the corresponding data PLP having the same context profile information and context identifier values as those belonging to the service association section, so as to configure IR packet header information by using both header information. Herein, the data PLP is selected based upon the IP-PLP mapping information. The merger (720500) may either be included in the header decompressing unit of the broadcast signal receiving apparatus or may be configured separately.

Figure 58:
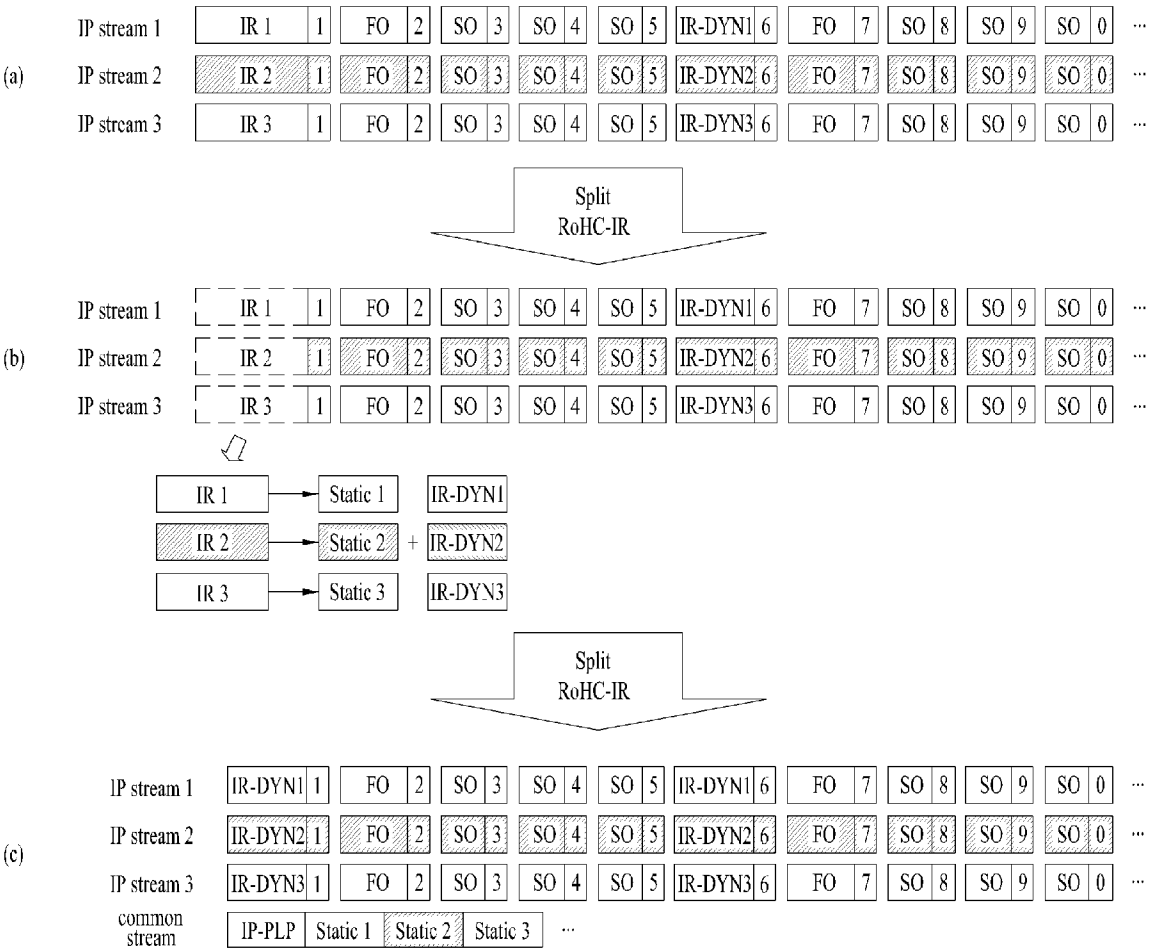

(a) to (c) of FIG. 58 illustrate examples of transmitting static information, among the header information of the IR packet, which occupies a large number of bytes in the IP header compression, as shown in FIG. 57, to a common PLP.

(a) of FIG. 58 shows an example of compressing each of 3 IP streams (IP stream 1, IP stream 2, IP stream 3) by using the RoHC compression method. In this case, each of the 3 IP streams has a different context identifier. In the 3 IP streams (IP stream 1, IP stream 2, IP stream 3), the numbers 1~0 correspond to the payload sections (or portions) to which actual data are transmitted.

(b) of FIG. 58 shows an example of splitting (or separating) static information from IR packets of the first to third IP streams (IP stream 1, IP stream 2, IP stream 3) and changing (or shifting) the remaining portion to IR-DYN packets. More specifically, the IR packet of each IP stream is replaced with an IR-DYB packet. Additionally, the split (or separated) static portion is signaled to a service association section of a common stream as shown in (c) of FIG. 58.

As described above, by including the static information included in the IR packet header to the service association section having IP-PLP mapping information signaled thereto, and by periodically transmitting the static information, the static information may be searched and found and reused only during initial scanning.

(a), (b) of FIG. 59 show examples of the IR packet and the IR-DYN packet being inter-changed (or inter-shifted) in the broadcast transmitting/receiving apparatus.

(a) of FIG. 59 shows an example of converting the IR packet to an IR-DYN packet in the broadcast signal transmitting apparatus. More specifically, the static portion is split (or separated) from the header information of the IR packet, so as to be signaled to the L2 signaling information and then transmitted through a common PLP, and the remaining portion is converted (or shifted) to an IR-DYN packet, thereby being transmitted through a data PLP.

As shown in the left drawing in (a) of FIG. 59, the header of the IR packet includes information (Add-CID) notifying that a context identifier is being added, information identifying the header as the IR packet header (also referred to as header identification information), context identifier, context profile information, CRC, static information (or static chain information), and dynamic information (or dynamic chain information). According to the embodiment of the present invention, the information for identifying the header as the IR packet header corresponds to 1111110D.

At this point, when the static information is separated (or split) from the IR packet, and when the information for identifying the IR packet header is converted to information for identifying the IR-DYN packet header, the IR packet is converted to the IR-DYN packet, as shown in the right drawing in (a) of FIG. 59. According to the embodiment of the present invention, the information for identifying the header as the IR-DYN packet header corresponds to 11111000. More specifically, with the exception for octet 1 byte header identification information and the static information, the IR packet header has the same information as the IR-DYN packet header. Therefore, by signaling only the static information to the L2 signaling information and transmitting the static information to the common PLP, thereby converting (or shifting or changing) the header identification information, the inter-change (or inter-shifting) between the IE packet and the IR-DYN packet may be more facilitated.

(b) of FIG. 59 shows an example of converting the IR-DYN packet to the IR packet, by having the broadcast signal receiving apparatus add static information of the IR packet to the IR-DYN packet and change the header identification information.

More specifically, as shown in the left drawing in (b) of FIG. 59, when static information of the IR packet, which is extracted from the L2 signaling information, is added to the IR-DYN packet, and when the information for identifying the IR-DYN packet header is changed (or shifted) to information for identifying the IR packet header, the IR-DYN packet is converted to the IR packet, as shown in the right drawing in (b) of FIG. 59. Herein, the IR-DYN packet is received through the data PLP, and the L2 signaling information is received through the common PLP.

Figure 60:
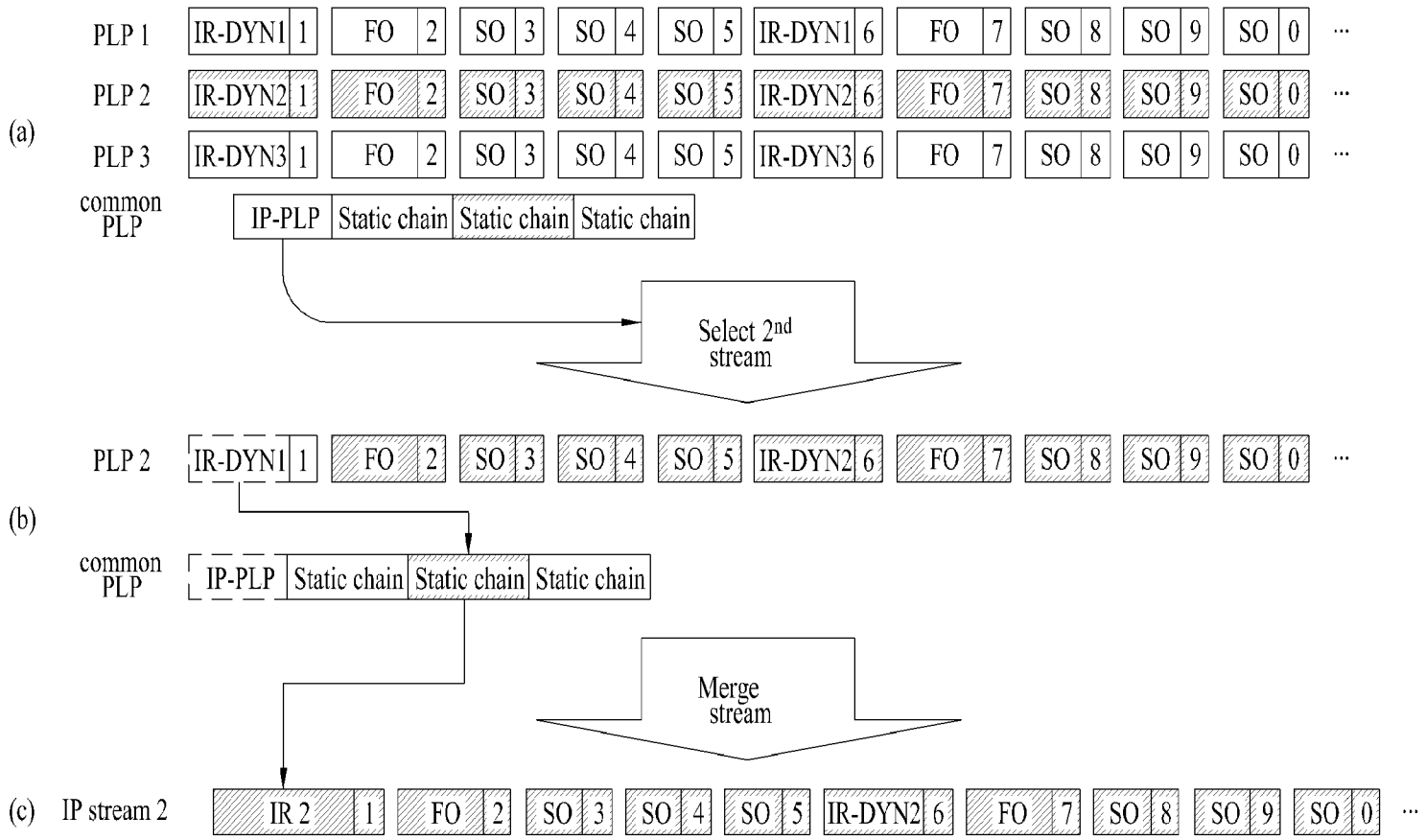

(a) to (c) of FIG. 60 illustrate an example of merging static information included in the IR packet, which is received in the common PLP, with the corresponding data PLP.

(a) of FIG. 60 shows an example of IR-DYN packets, SO packets, and FO packets being received through data PLPs (PLP1, PLP2, PLP3), and, among the header information of the IR packet, static information being received through the common PLP. At this point, the numbers 1~0 in the 3 data PLPs correspond to payload sections (or portions) to which data are actually transmitted.

(b) of FIG. 60 shows an example of selecting a data PLP including the IP stream that is to be received, based upon the IP-PLP mapping information, and extracting the static information included in the IR packet header of the selected data PLP from the common PLP. For example, (b) of FIG. 60 shows an example of selecting the second data PLP (PLP2), among the first to third data PLPs (PLP1, PLP2, PLP3) shown in (a) of FIG. 60, and detecting static information included in the IR packet header of the selected second data PLP (PLP2) from the common PLP. According to the embodiment of the present invention, the IP-PLP mapping information is signaled to a binary type service association section, thereby being received through the common PLP.

(c) of FIG. 60 shows an example of adding the static information, which is extracted from the common PLP, to the first IR-DYN packet of the second data PLP (PLP2), so as to configure an IR packet, and an example of an IP stream of the second data PLP including the IR packet. The IP stream corresponds to a RoHC stream, which is compressed by using the RoHC method, and RoHC decoding is performed on the RoHC packets included in the RoHC stream, based upon the compression information, which is received through the common PLP.

Figure 61:
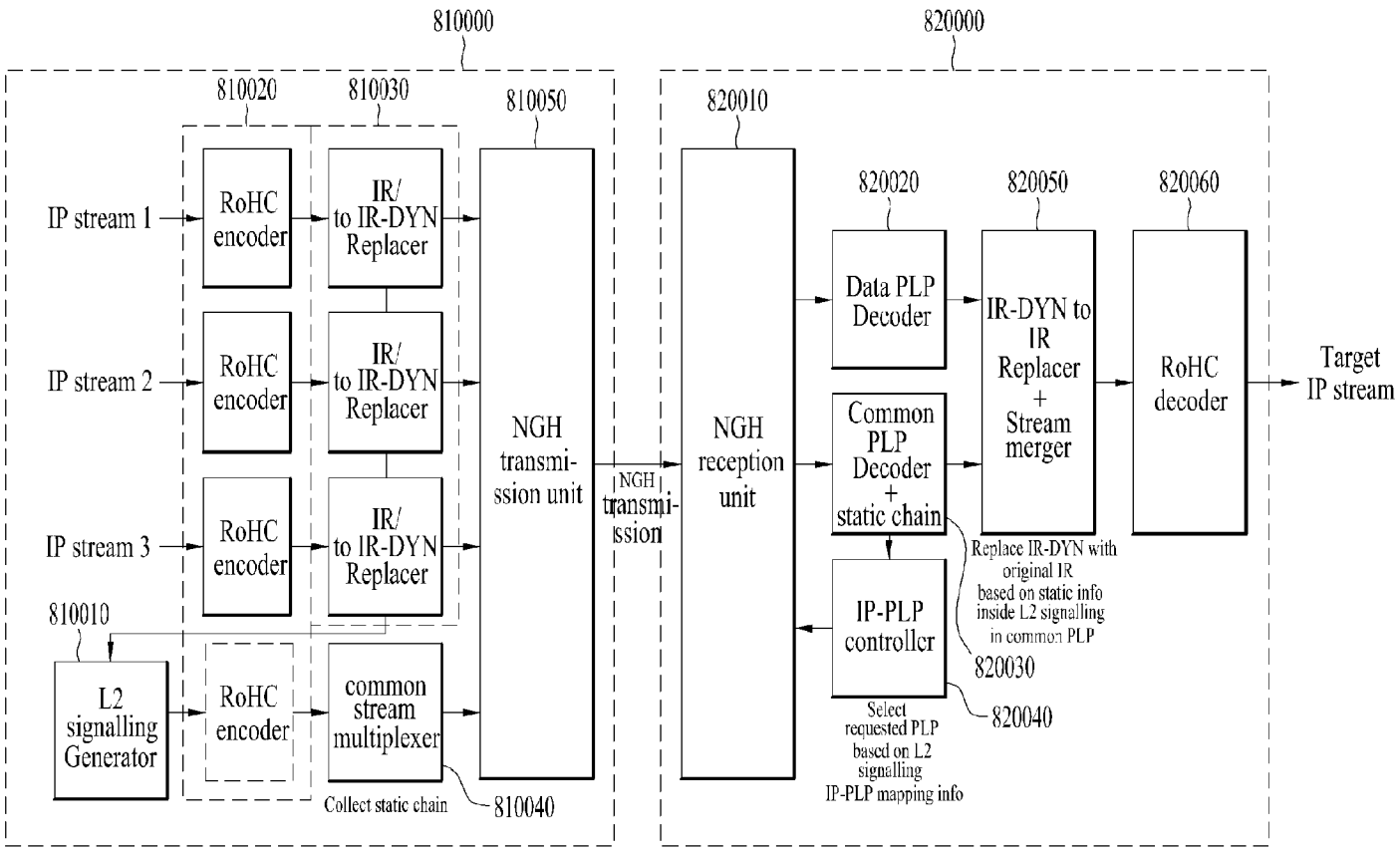
FIG. 61 illustrates a block diagram showing a structure of a broadcast signal transmitting apparatus and a broadcast signal receiving apparatus according to yet another embodiment of the present invention.

FIG. 61 illustrates a block view showing the structure of a broadcast signal transmitting apparatus and a broadcast signal receiving apparatus according to yet another embodiment of the present invention. The broadcast signal transmitting apparatus and the broadcast signal receiving apparatus of FIG. 61 are configured to compress and transmit IP streams and to receive and decompress the compressed IP streams, as shown in FIG. 57 to FIG. 60.

In FIG. 61, the broadcast signal transmitting apparatus (810000) includes an L2 signaling generator (810010) including static information included in the IR packet header to the L2 signaling information, a RoHC encoding unit (810020) receiving each IP stream and performing RoHC-encoding on the received IP streams, a transmission replacing unit (810030) splitting (or separating) the static information included in each IR packet header, which is outputted from each RoHC encoder of the RoHC encoding unit (810020), and outputting the split static information to the L2 signaling generator (810010) and converting the remaining portion to IR-DYN packet, a common stream multiplexer (810040) including the L2 signaling information to the common stream, and an NGH transmission unit (810050) receiving the output of each transmission replacer if the transmission replacing unit (810030) and receiving the output of the common stream multiplexer (810040), so as to perform FEC encoding for error correction, signal frame generation, OFDM modulation, and so on. Herein, the L2 signaling information includes a service association section, and the service association section includes IP-PLP mapping information, compression information, and static information included in each IR packet header. Additionally, in the broadcast signal transmitting apparatus (810000), the RoHC encoder provided at an outputting end of the L2 signaling generator (810010) is optional.

If the broadcast signal transmitting apparatus (810000) is applied to FIG. 6, the L2 signaling generator (810010), the RoHC encoding unit (810020), and the transmission replacing unit (810030) correspond to part of the input preprocessor (100000). And, the NGH transmission unit (810050) includes the input processor (100100), the BICM encoder (100200), the frame builder (100300), and the OFDM generator (100400). In case the broadcast signal transmitting apparatus of FIG. 46 is used, the transmission replacing unit may be included in the header compressing unit or may be provided at the outputting end of the header compressing unit. Moreover, the broadcast signal transmitting apparatus of FIG. 46 may be further equipped with a common stream multiplexer, and, among the already-existing blocks, at least one block may be used to perform the functions of a common stream multiplexer.

For example, in FIG. 58, data packets included in the first to third IP streams (IP stream 1, IP stream 2, IP stream 3) are inputted to the RoHC encoding unit (810020) of FIG. 61, thereby compressing each header by using the RoHC method, as shown in (a) of FIG. 58. At this point, each of the compressed IP stream may also be referred to as an RoHC stream, and each RoHC stream is configured of RoHC packets. In the description of the present invention, the IR packets, IR-DYN packets, SO packets, and FO packets will each be referred to as an RoHC packet. Each IP stream having its packet header compressed by each RoHC encoder of the RoHC encoding unit (810020) is outputted to the transmission replacing unit (810030).

The transmission replacing unit (810030) differentiates the IR packet from the RoHC packets of the corresponding IP stream, and splits (or separates) the static information included in the differentiated IR packet and outputs the split static information to the L2 signaling generator (810010), and the remaining portion is converted to an IR-DYN packet, which is then outputted to the NGH transmission unit (810050). Additionally, each transmission replacer of the transmission replacing unit (810030) directly outputs the FO packets, SO packets, and IR-DYN packets, among the RoHC packets of the corresponding IP stream, to the NGH transmission unit (810050).

The L2 signaling generator (810010) generates L2 signaling information, which includes reception information, such as IP-PLP mapping information, system parameter, frequency, and so on, and then includes static information, which is split and outputted from each transmission replacer of the transmission replacing unit (810030), to the L2 signaling information, and outputs the processed L2 signaling information to the corresponding RoHC encoder in an IP packet format. The RoHC encoder compresses each header of the IP packets including the L2 signaling information by using the RoHC method and outputs the compressed headers to the common stream multiplexer (810040). Herein, the RoHC compression of the IP packet header including the L2 signaling information may be omitted.

The common stream multiplexer (810040) includes the IP packet, which is compressed by using the RoHC method, in the common stream, and outputs the processed stream to the NGH transmission unit (810050) through the common PLP.

The NGH transmission unit (810050) performs FEC encoding for error correction, signal frame generation, OFDM modulation, and so on, on the output of each transmission replacer of the transmission replacing unit (810030) and on the output of the common stream multiplexer (810040). A broadcast signal including the OFDM-modulated signal frame is transmitted to the broadcast signal receiving apparatus (820000).

The broadcast signal receiving apparatus (820000) includes an NGH reception unit (820010) receiving a broadcast signal being transmitted from the NGH transmission unit (810050) of the broadcast signal transmitting apparatus (810000) and performing OFDM demodulation, signal frame parsing, FEC decoding on the received signal, thereby dividing the processed signal into a data PLP, a common PLP, and so on, a data PLP decoder (820020) decoding the data PLP, which is outputted from the NGH reception unit (820010), a common PLP decoder (820030) decoding the common PLP, which is outputted from the NGH reception unit (820010), a controller (820040) extracting IP-PLP mapping information, compression information, and so on, from a common stream of the decoded common PLP, so as to control PLP selection, a reception replacer (820050) adding static information, which is received through the common PLP, to the IR-DYN packet, which is received through the data PLP, so as to configure an IR packet, and an RoHC decoder (820060) performing RoHC decoding on the RoHC packets including the IR packets, IR-DYN packets, and FO/SO packets, which are outputted from the reception replacer (820050).

If the broadcast signal receiving apparatus of FIG. 61 is applied to FIG. 19, the NGH reception unit (820010) includes the OFDM demodulator (138100), the frame demapper (138200), and the BICM decoder (138300). And, the data PLP decoder (820020), common PLP decoder (820030), controller (820040), reception replacer (820050), and the RoHC decoder (820060) correspond to part of the output processor (138400). If the broadcast signal receiving apparatus of FIG. 47 is used, the reception replacer may be included in a header decompressing unit or may be equipped at an inputting end of the header decompressing unit.

The NGH reception unit (820010) of FIG. 61 receives the broadcast signal being transmitted from the NGH transmission unit (810050) of the broadcast signal transmitting apparatus (810000) and performs OFDM demodulation, signal frame parsing, and FEC decoding on the received broadcast signal, thereby dividing the processed signal into data PLP, common PLP, and so on. At this point, when multiple data PLPs exist, at least one data PLP is selected in accordance with the control of the controller (820040) and then transmitted to the data PLP decoder (820020). For example, as shown in (a) of FIG. 60, first to third IP streams (IP stream 1, IP stream 2, IP stream 3) are compressed and received, and, among the received IP streams, when the second IP stream (IP stream 2) is selected, the second data PLP (PLP2) including the compressed second IP stream (IP stream 2) is selected and then outputted to the data PLP decoder (820020). Additionally, the common PLP is outputted to the common PLP decoder (820030).

The data PLP decoder (820020) performs decoding on the inputted second data PLP (PLP2), so as to output the FO/SO packets, which are included in the IP stream of the second data PLP, to the reception replacer (820050). The common PLP decoder (820030) decodes the inputted common PLP, so as to extract the IP-PLP mapping information, compression information, and so on, which are included in the common stream of the common PLP, and then to output the extracted information to the controller (820040). Additionally, the common PLP decoder (820030) extracts the static information, which is split (or separated) from the IR packet of the second data PLP (PLP2) that is requested to be selected, from the common stream and then outputted to the reception replacer (820050).

The controller (820040) controls the NGH reception unit (820010) so that the data PLP, which is requested to be selected, can be selected with reference to the IP-PLP mapping information, and so on.

As shown in (c) of FIG. 60, the reception replacer (820050) adds static information, which is being outputted from the common PLP decoder (820030), to the first IR-DYN packet, which is included in the IP stream of the second data PLP being decoded by the data PLP decoder (820020), so as to configure the IR packet and then to merge the configured IR packet to the IP stream of the second data PLP (PLP2). The IP stream, i.e., the RoHC stream including IR packets, IR-DYN packets, FO packets, and SO packets, is decoded by the RoHC decoder (820060) using the RoHC decoding method, thereby being recovered to the second IP stream prior to being compressed.

Figure 62:
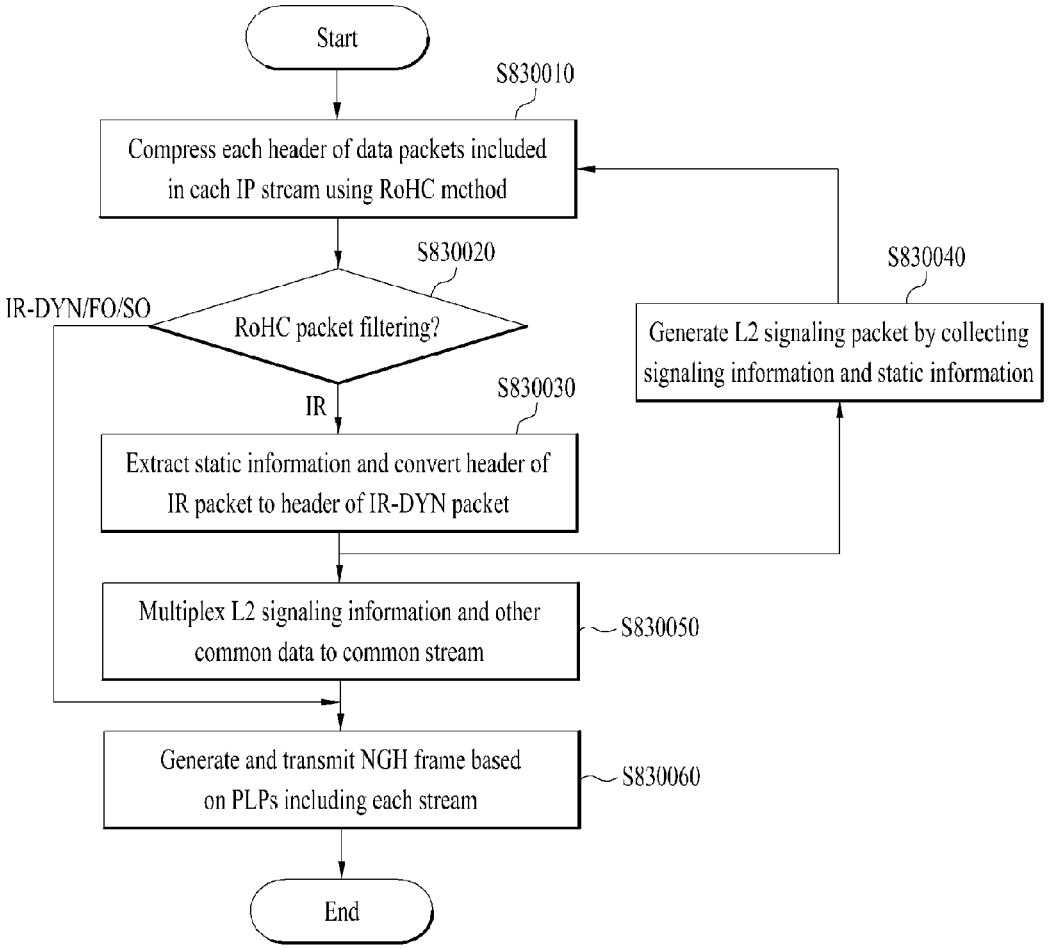
FIG. 62 illustrates a flow chart showing a method for compressing and transmitting a data packet header according to another embodiment of the present invention.

FIG. 62 illustrates a flow chart showing a method for compressing and transmitting a data packet header based upon the broadcast signal transmitting apparatus (810000) of FIG. 61 according to an exemplary embodiment of the present invention. First of all, each header of the data packets included in each IP stream and each header of the data packets being included in the common stream, which includes L2 signaling information, are compressed by each RoHC encoder of the RoHC encoding unit (810020) using the RoHC method, thereby being outputted as an RoHC stream (S830010). Each transmission replacer of the transmission replacing unit (810030) filters the RoHC packets being included in each of the RoHC streams. The RoHC packets signify the IR packets, the IR-DYN packets, the SO packets, and the FO packets. At this point, each transmission replacer directly outputs the IR-DYN packets and the FO/SO packet to the NGH transmission unit (810050). Thereafter, among the RoHC packets, the static information included in the header of the IR packet is separated and outputted to the L2 signaling generator (810010), and, then, the remaining portion of the header of the IR packet having the static information removed therefrom is converted to the IR-DYN packet header and then outputted to the NGH transmission unit (810050) (S830030).

At this point, the L1 signaling generator (810010) includes the static information belonging to the header of the IR packet to the L2 signaling information, which includes the compression information, and then outputs the processed information to the corresponding RoHC encoder in an IP packet format (S830040). According to the embodiment of the present invention, the IP-PLP mapping information, compression information, and static information are signaled to the service association section of the L2 signaling information.

The common stream multiplexer (810040) multiplexes the L2 signaling information and other common data to the common stream and then transmits the multiplexed data to the NGH transmission unit (810050) through the common PLP (S830050).

The NGH transmission unit (810050) performs encoding for error correction on a common PLP including a common stream, which is being outputted from the common stream multiplexer (810040) and on each data PLP including each RoHC stream, which is respectively outputted from each transmission replacer of the transmission replacing unit, thereby generating a signal frame (e.g., NGH frame). Thereafter, after performing OFDM modulation on the signal frame, a broadcast signal including the OFDM-modulated signal frame is transmitted through an OFDM carrier (S830060).

Figure 63:
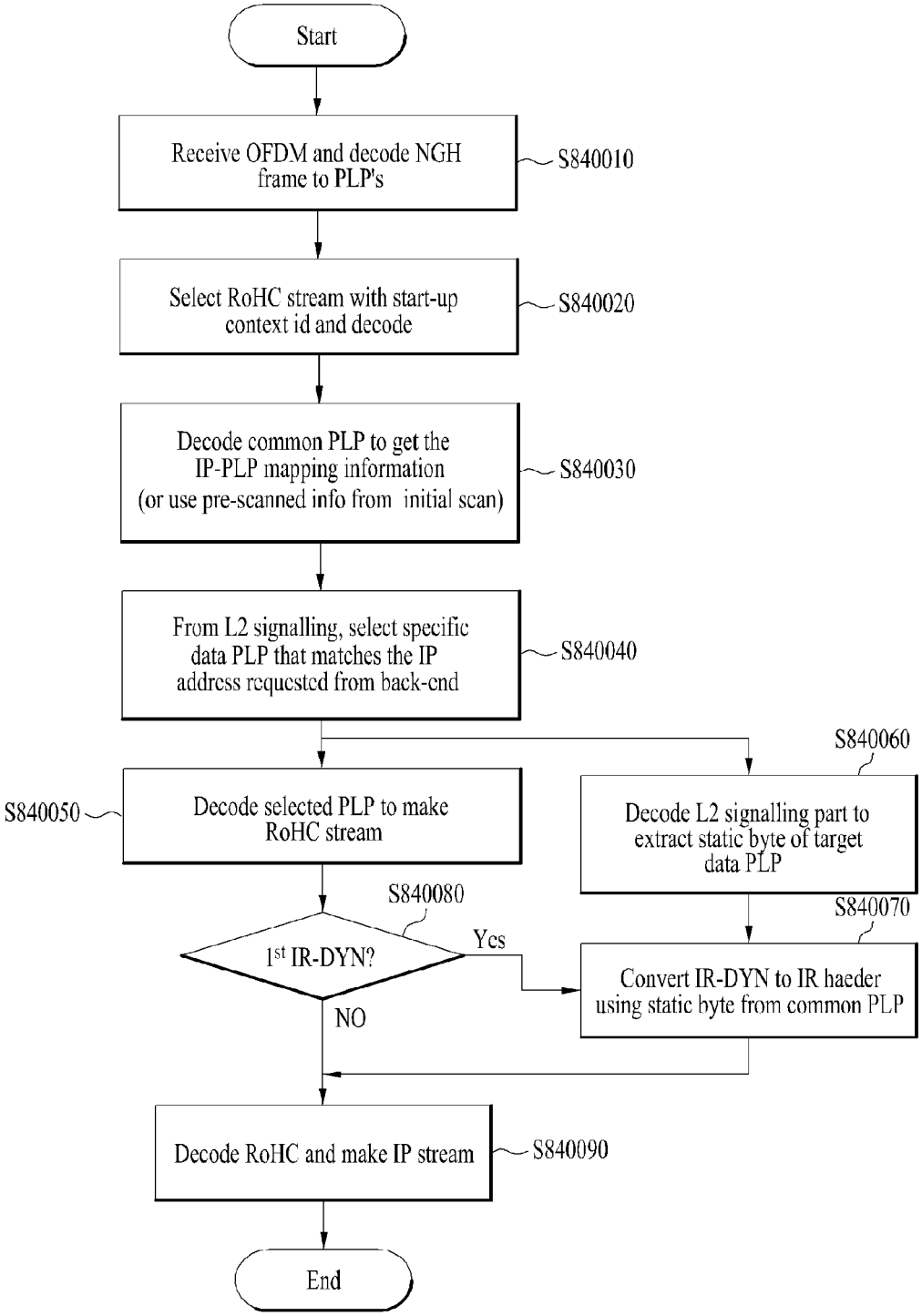
FIG. 63 illustrates a flow chart showing a method of performing decompression on a data packet according to an embodiment of the present invention.

FIG. 63 illustrates a flow chart showing a method of performing decompression on a data packet based upon the broadcast signal receiving apparatus (820000) of FIG. 61 according to an embodiment of the present invention.

More specifically, the NGH reception unit (820010) receives a broadcast signal including a signal frame (e.g., NGH frame) and then performs OFDM modulation, signal frame parsing, and FEC decoding on the received signal, thereby dividing the processed signal into a data PLP, a common PLP, and so on (S840010). At this point, when multiple data PLPs exists, at least one data PLP is selected, based upon the control of the controller (820040), and then outputted to the data PLP decoder (820020). Additionally, the common PLP is outputted to the common PLP decoder (820030). The common PLP is searched and found from the L1 signaling information.

If the packets being transmitted to the common PLP have been compressed by using the RoHC method, a startup context id of the RoHC stream indicating an L2 signaling stream is selected, so as to be RoHC decoded, thereby being outputted through the common PLP (S840020). For example, a stream having the context identifier value of 0 may be designated as a startup stream. Generally, the startup context profile follows a no compression profile. If the RoHC encoding process on an IP packet including L2 signaling information is omitted from the broadcast signal transmitting apparatus, step S840020 is also omitted.

The common PLP decoder (820030) decodes the inputted common PLP, so as to extract IP-PLP mapping information, compression information, and so on, from an service association section included in the L2 signaling information, thereby outputting the processed information to the controller (820040) (S840030). The compression information is also outputted to the ROHC decoder (820060).

The controller (820040) controls the NGH reception unit (820010), so that a specific data PLP matching with an IP address, which is requested from a back-end, based upon the L2 signaling information including the IP-PLP mapping information (S840040).

The data PLP decoder (820020) performs decoding on the data PLP being selected and outputted from the NGH reception unit (820010) and then outputs RoHC packets, which are included in the IP stream of the data PLP, to the reception replacer (820050) (S840050). Additionally, the common PLP decoder (820030) extracts static information of an IR packet header of the selected data PLP from the service association section, which is included in the L2 signaling information, and outputs the extracted static information to the reception replacer (820050) (S840060).

The reception replacer (820050) adds the extracted static information to the header of a first IR-DYN packet, among the RoHC packets included in the IP stream of the data PLP, which is decoded by the data PLP decoder (820020), so as to convert the processed packet to an IR packet, thereby outputting the converted IR packet to the RoHC decoder (820060). Additionally, among the RoHC packet included in the data PLP, which is decoded by the data PLP decoder (820020), with the exception for the first IR-DYN packet, the remaining packets are directly outputted to the RoHC decoder (820060) (S840080).

The RoHC decoder (820060) decodes the RoHC stream, which includes IR packets, IR-DYN packets, and FO/SO packets, by using the RoHC method, thereby recovering the stream to the IP stream prior to being compressed (S840090). Thereafter, the RoHC decoder (820060) transmits the recovered IP stream to a back-end, thereby initiating service.

FIG. 64 illustrates a syntax structure of a service association section being included in the L2 signaling information and received in a binary format according to a detailed embodiment of the present invention.

In FIG. 64, according to the embodiment of the present invention, a section_length field is assigned with bits and indicates the length of the remaining section after (or following) the corresponding field.

According to the embodiment of the present invention, a number_of_services field is assigned with 8 bits and indicates a number of services included in the transmitted signal frame.

According to the embodiment of the present invention, a number_of_components field is assigned with 8 bits and indicates the number of components included in the corresponding service.

According to the embodiment of the present invention, a URL_length field is assigned with 8 bits and indicates the length of a URL or IP address/port number indicating each component.

According to the embodiment of the present invention, a URL_byte or IP address+port number field is assigned with 8 bits and indicates a URL or IP address/port number indicating each component.

According to the embodiment of the present invention, a context_id field is assigned with 8 bits and, when the header of a data packet including the corresponding component is compressed, indicates a context identifier identifying an IP stream including the compressed data packet.

According to the embodiment of the present invention, a context_profile field is assigned with bits and indicates a method according to which the corresponding component has been compressed. More specifically, this field indicates up to which protocol (or up to which layer) the corresponding component has been compressed at the time of compressing the header of the data packet. According to the present invention, when the contect_profile field value is equal to 0, this may indicate that the data packet including the component has a RoHC compression format, yet this may also indicate that compression has not been performed on the actual header information. Moreover, according to the embodiment of the present invention, when the context_profile field value is equal to 1, this may indicate that compression has been performed up to the RTP, when the value is equal to 2, up to the UDP, when the value is equal to 3, up to the ESP, and when the value is equal to 4 up to the IP, by using the RoHC method.

According to the embodiment of the present invention, a static_info_length field is assigned with 8 bits and indicates the size of static information being transmitted to a static_chain_byte( ) field that follows.

According to the embodiment of the present invention, a static_chain_byte( ) field is assigned with 8 bits and transmits static information, which corresponds to non-changing information within the header of the IR packet.

According to the embodiment of the present invention, a PLP_id field is assigned with 8 bits and indicates an identifier of the PLP to which the corresponding component is transmitted.

According to the embodiment of the present invention, an LLP_id field is assigned with 8 bits and indicates an LLP identifier for notifying buffering information when transmitting a corresponding service.

According to the embodiment of the present invention, a CRC_byte field is assigned with 32 bits and transmits a CRC byte for certifying (or verifying) the presence or absence of any data damage within the entire section.

The description of the present invention will not be limited only to the above-described exemplary embodiments of the present invention. And, as it is shown in the appended claims of the present invention, it will be apparent to those skilled in the art that various modifications and variations can be made in the present invention, and that such modifications and variations cover the scope of the present invention.

MODE FOR CARRYING OUT THE PRESENT INVENTION

As described above, the present invention is described with respect to the best mode for carrying out the present invention.

INDUSTRIAL APPLICABILITY

As described above, the present invention may be fully (or entirely) or partially applied to digital broadcasting systems.

The invention claimed is:

[1. A method of processing broadcast data in a transmitter, the method comprising:

input processing at least one input stream to output one or multiple Physical Layer Pipes (PLPs) by an input processor, wherein each data packet of the at least one input stream has a header and a payload and the header is compressed;

Forward Error Correction (FEC) encoding PLP data of the one or multiple PLPs for each PLP by an encoder;

bit interleaving the FEC-encoded PLP data by a bit interleaver;

time interleaving the bit-interleaved PLP data by a time interleaver;

building a signal frame including the time-interleaved PLP data by a frame builder;

inserting pilot data into the built signal frame by an inserter; and modulating the signal frame having the pilot data by a modulator, wherein the signal frame further includes signaling data, and wherein the signaling data include type information for indicating a type of the input stream.]

[2. The method of claim 1, wherein when the type information indicates that the input stream is an IP stream, the each data packet is equal to an Internet Protocol (IP) packet.]

[3. The method of claim 1, further comprising:

frequency interleaving the time-interleaved PLP data.]

[4. The method of claim 1, wherein the signal frame further includes pilot data information related to pilot pattern information of the pilot data.]

[5. A transmitter for processing broadcast data, the transmitter comprising:

an input processor to process at least one input stream to output one or multiple Physical Layer Pipes (PLPs), wherein each data packet of the at least one input stream has a header and a payload and the header is compressed;

an encoder to Forward Error Correction (FEC) encode PLP data of the one or multiple PLPs for each PLP;

a bit interleaver to bit interleave the FEC-encoded PLP data;

a time interleaver to time interleave the bit-interleaved PLP data;

a frame builder to build a signal frame including the time-interleaved PLP data;

an inserter to insert pilot data into the built signal frame; and a modulator to modulate the signal frame having the pilot data, wherein the signal frame further includes signaling data, and wherein the signaling data include type information for indicating a type of the input stream.]

[6. The transmitter of claim 5, when the type information indicates that the input stream is an IP stream, the each data packet is equal to an Internet Protocol (IP) packet.]

[7. The transmitter of claim 5, further comprising:

a frequency interleaver to frequency interleave the time-interleaved PLP data.]

[8. The transmitter of claim 5, wherein the signal frame further includes pilot data information related to pilot pattern information of the pilot data.]

*9. A broadcast signal transmitting method comprising:*

*compressing headers of Internet Protocol (IP) packets included in an IP stream to generate an Initialization Refresh (IR) packet, a first IR dynamic (IR-DYN) packet, and compressed packets, wherein the IR packet includes static chain information, wherein the first IR-DYN packet includes first dynamic chain information, and wherein the IR packet further includes second dynamic chain information;*

*extracting the static chain information from the IR packet and converting the IR packet to a second IR-DYN packet including the second dynamic chain information; and*

*transmitting a broadcast signal including signaling data and service data,*

*wherein the signaling data include the static chain information and compression information and*

*wherein the service data are included in the first IR-DYN packet, the second IR-DYN packet and the compressed packets.*

*10. The method of claim 9,*

*wherein the signaling data are carried in a first Physical Layer Pipe (PLP), and*

*wherein the service data are carried in a second PLP.*

*11. The method of claim 10,*

*wherein the first PLP further carries IP-PLP mapping information for linking the IP stream with the second PLP.*

*12. The method of claim 9,*

*wherein the first dynamic information, the second dynamic information and headers of the compressed packets include a sequence number, respectively.*

*13. A broadcast signal receiving apparatus comprising:*

*a tuner to receive a broadcast signal including signaling data and service data, wherein the signaling data include static chain information and compression information for decompression, wherein the service data are included in a first IR dynamic (IR-DYN) packet having a header that includes first dynamic chain information, a second IR-DYN packet having a header that includes second dynamic chain information, and compressed packets,*

*a replacer to recover an IR packet based on the static chain information and the second IR-DYN packet; and*

*a Robust Header Compression (RoHC) decoder to perform decompressing based on the IR packet, the first IR-DYN packet, and the compressed packets to generate an Internet Protocol (IP) packet stream including IP packets.*

*14. The apparatus of claim 13,*

*wherein the signaling data are carried in a first Physical Layer Pipe (PLP), and*

*wherein the service data are carried in a second PLP.*

*15. The apparatus of claim 14, wherein the first PLP further carries IP-PLP mapping information for linking the IP stream with the second PLP.*

*16. The apparatus of claim 13, wherein the first dynamic information, the second dynamic information and headers of the compressed packets include a sequence number, respectively.*

*17. A broadcast signal transmitting method comprising:*

*compressing headers of Internet Protocol (IP) packets included in an IP stream to generate an Initialization Refresh (IR) packet, an IR dynamic (IR-DYN) packet, and compressed packets, wherein the IR packet includes static chain information and first dynamic chain information and wherein the IR-DYN packet includes second dynamic chain information;*

*extracting the static chain information and the first dynamic chain information from the IR packet and converting the IR packet to a first compressed packet, the first compressed packet having a sequence number that is matched with a sequence number in the first dynamic chain information;*

*extracting the second dynamic chain information from the IR-DYN packet and converting the IR-DYN packet to a second compressed packet, the second compressed packet having a sequence number that is matched with a sequence number in the second dynamic chain information; and*

*transmitting a broadcast signal including first Physical Layer Pipe (PLP) data carried in a first PLP and second PLP data carried in a second PLP,*

*wherein the first PLP data include the static chain information, the first dynamic chain information, the second dynamic chain information, and compression information, and*

*wherein the second PLP data include the first compressed packet, the second compressed packet and the generated compressed packets.*

*18. The method of claim 17, wherein the first PLP data further include IP-PLP mapping information for linking the IP stream with the second PLP.*

*19. The method of claim 18, wherein the IP-PLP mapping information includes access information of the IP stream and an identifier for identifying the second PLP.*

*20. The method of claim 17, wherein the compression information includes a context identifier (CID) of a compressed IP stream and profile information for identifying a range of protocols used to compress the IP stream.*

*21. A broadcast signal receiving apparatus comprising:*

*a receiver to receive a broadcast signal including first Physical Layer Pipe (PLP) data carried in a first PLP and second PLP data carried in a second PLP, wherein the first PLP data include static chain information and first dynamic chain information for recovering an Initialization Refresh (IR) packet and second dynamic chain information for recovering an IR dynamic (IR-DYN) packet, wherein the second PLP data include compressed packets, and the first PLP data further include compression information for decompression;*

*a replacer to recover the IR packet based on the static chain information and the first dynamic chain information and a first compressed packet of the compressed packets, the first compressed packet having a sequence number that is matched with a sequence number in the first dynamic chain information and recover the IR-DYN packet based on the second dynamic chain information and a second compressed packet of the compressed packets, the second compressed packet has a sequence number that is matched with a sequence number in the second dynamic chain information; and*

*a Robust Header Compression (RoHC) decoder to perform decompressing based on the IR packet and the IR-DYN packet, and the compressed packets excluding the first and second compress packets to generate an Internet Protocol (IP) packet stream including IP packets.*

*22. The apparatus of claim 21,*

*wherein the sequence number in the first compressed packet and the sequence number in the first dynamic chain information are used for synchronizing the static chain information and the first dynamic chain information and the first compressed packet, and*

*wherein the sequence number in the second compressed packet and the sequence number in the second dynamic chain information are used for synchronizing the second dynamic chain information and the second compressed packet.*

*23. The apparatus of claim 21, wherein the first PLP data further include IP-PLP mapping information for linking the IP stream with the second PLP.*

*24. The apparatus of claim 23, wherein the IP-PLP mapping information includes access information of the IP stream and an identifier for identifying the second PLP.*

*25. The apparatus of claim 21, wherein the compression information includes a context identifier (CID) of a compressed IP stream and profile information for identifying a range of protocols used to compress the IP stream.*

* * * * *